(12) United States Patent
Ellis et al.

(10) Patent No.: US 12,045,437 B2
(45) Date of Patent: Jul. 23, 2024

(54) DIGITAL ASSISTANT USER INTERFACES AND RESPONSE MODES

(71) Applicant: Apple Inc., Cupertino, CA (US)

(72) Inventors: Neal Ellis, San Jose, CA (US); Oluwatomiwa B. Alabi, Studio City, CA (US); Robert Burton, Los Gatos, CA (US); Richard R. Dellinger, San Jose, CA (US); Thomas R. Fazio, Campbell, CA (US); Craig M. Federighi, Los Altos Hills, CA (US); Rebecca P. Fish, San Francisco, CA (US); Nikrouz Ghotbi, San Jose, CA (US); James N. Jones, San Francisco, CA (US); Ieyuki Kawashima, San Jose, CA (US); Stephen O. Lemay, Palo Alto, CA (US); Pedro Mari, Santa Cruz, CA (US); Aaron Musengo, San Jose, CA (US); James E. Palmer, San Jose, CA (US); Patchaya Beam Seilaudom, Palo Alto, CA (US); Andrea Valentina Simes, San Francisco, CA (US); Tyler McClay Smith, San Jose, CA (US); Trungtin Tran, Sunnyvale, CA (US); Robert A. Walker, II, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/227,012

(22) Filed: Apr. 9, 2021

(65) Prior Publication Data

US 2021/0365161 A1    Nov. 25, 2021

Related U.S. Application Data

(60) Provisional application No. 63/028,821, filed on May 22, 2020.

(30) Foreign Application Priority Data

Aug. 24, 2020  (DK) .............................. PA202070547
Aug. 24, 2020  (DK) .............................. PA202070548

(51) Int. Cl.
*G06F 3/0488* (2022.01)
*G06F 3/041* (2006.01)
(Continued)

(52) U.S. Cl.
CPC ............ *G06F 3/0482* (2013.01); *G06F 3/041* (2013.01); *G06F 3/0481* (2013.01);
(Continued)

(58) Field of Classification Search
None
See application file for complete search history.

(56) References Cited

U.S. PATENT DOCUMENTS 7,992,085 B2   8/2011   Wang-Aryattanwanich et al.
9,223,537 B2   12/2015  Brown et al.
(Continued)

FOREIGN PATENT DOCUMENTS

CN   105264524 A   1/2016
CN   110647274 A   1/2020
(Continued)

OTHER PUBLICATIONS

Screen captures from YouTube video clip entitled "10 Google Assistant Tips!" 7 pages, uploaded Feb. 24, 2020 by user "Velian Speaks Tech." Retrieved from the internet: https://www.youtube.com/watch?v=3RNWA3NK9fs (Year: 2020).*
(Continued)

*Primary Examiner* — Matthew Ell
*Assistant Examiner* — Samuel Shen
(74) *Attorney, Agent, or Firm* — DLA Piper LLP (US)

(57) ABSTRACT

An example process includes: while displaying a user interface different from a digital assistant user interface, receiv-
(Continued)

ing a user input; in accordance with a determination that the user input satisfies a criterion for initiating a digital assistant: displaying, over the user interface, the digital assistant user interface, the digital assistant user interface including: a digital assistant indicator displayed at a first portion of the display; and a response affordance displayed at a second portion of the display, where: a portion of the user interface remains visible at a third portion of the display; and the third portion is between the first portion and the second portion.

45 Claims, 101 Drawing Sheets

(51) Int. Cl.
| | |
|---|---|
| *G06F 3/0481* | (2022.01) |
| *G06F 3/0482* | (2013.01) |
| *G06F 3/04842* | (2022.01) |
| *G06F 3/04883* | (2022.01) |
| *G06F 3/04886* | (2022.01) |
| *G06F 9/451* | (2018.01) |
| *G06F 40/134* | (2020.01) |
| *G06F 40/20* | (2020.01) |
| *G06F 3/16* | (2006.01) |

(52) U.S. Cl.
CPC ...... *G06F 3/04842* (2013.01); *G06F 3/04883* (2013.01); *G06F 3/04886* (2013.01); *G06F 9/453* (2018.02); *G06F 40/134* (2020.01); *G06F 40/20* (2020.01); *G06F 3/167* (2013.01); *G06F 2203/04803* (2013.01)

(56) References Cited

U.S. PATENT DOCUMENTS

| | | | |
|---|---|---|---|
| 9,531,862 | B1 | 12/2016 | Vadodaria |
| 10,088,972 | B2 | 10/2018 | Brown et al. |
| 10,175,879 | B2 | 1/2019 | Missig et al. |
| 10,185,542 | B2 | 1/2019 | Carson et al. |
| 10,229,109 | B1* | 3/2019 | Cherepanov .......... G10L 15/197 |
| 10,504,518 | B1 | 12/2019 | Irani et al. |
| 2005/0246716 | A1 | 11/2005 | Smith et al. |
| 2012/0272177 | A1* | 10/2012 | Vaghefinazari ....... G06F 3/0488 715/780 |
| 2014/0053101 | A1 | 2/2014 | Buehler et al. |
| 2014/0218372 | A1* | 8/2014 | Missig .................... G06F 3/167 345/473 |
| 2014/0310595 | A1 | 10/2014 | Acharya et al. |
| 2014/0317502 | A1 | 10/2014 | Brown et al. |
| 2014/0337370 | A1* | 11/2014 | Aravamudan .......... G10L 25/54 707/759 |
| 2014/0365885 | A1* | 12/2014 | Carson ................ G06F 16/3344 715/708 |
| 2015/0234556 | A1 | 8/2015 | Zhu et al. |
| 2015/0309691 | A1* | 10/2015 | Seo ........................ G06F 1/1647 345/173 |
| 2015/0382047 | A1 | 12/2015 | Van Os et al. |
| 2016/0291831 | A1 | 10/2016 | Baek et al. |
| 2017/0046025 | A1* | 2/2017 | Dascola ............ H04M 1/72436 |
| 2017/0132019 | A1 | 5/2017 | Karashchuk et al. |
| 2017/0161018 | A1 | 6/2017 | Lemay et al. |
| 2017/0329466 | A1 | 11/2017 | Krenkler et al. |
| 2017/0337035 | A1 | 11/2017 | Choudhary et al. |
| 2017/0358305 | A1 | 12/2017 | Kudurshian et al. |
| 2018/0091604 | A1* | 3/2018 | Yamashita ............. G06Q 50/30 |
| 2018/0101925 | A1* | 4/2018 | Brinig ................ G07F 17/0057 |
| 2018/0157408 | A1 | 6/2018 | Yu et al. |
| 2018/0308485 | A1 | 10/2018 | Kudurshian et al. |
| 2018/0315415 | A1* | 11/2018 | Mosley ................. G10L 15/063 |
| 2018/0335903 | A1* | 11/2018 | Coffman ............ G06F 3/04847 |
| 2019/0035385 | A1* | 1/2019 | Lawson ................ G10L 15/063 |
| 2019/0042059 | A1 | 2/2019 | Baer |
| 2019/0220247 | A1 | 7/2019 | Lemay et al. |
| 2019/0259386 | A1 | 8/2019 | Kudurshian et al. |
| 2019/0354252 | A1* | 11/2019 | Badr ..................... G06F 3/0481 |
| 2019/0369868 | A1 | 12/2019 | Tang et al. |
| 2019/0370292 | A1 | 12/2019 | Irani et al. |
| 2019/0371316 | A1 | 12/2019 | Weinstein et al. |
| 2019/0373102 | A1 | 12/2019 | Weinstein et al. |
| 2020/0081615 | A1 | 3/2020 | Lu et al. |
| 2020/0210142 | A1* | 7/2020 | Mu ..................... G06F 3/04883 |
| 2020/0226481 | A1 | 7/2020 | Sim et al. |
| 2020/0301950 | A1 | 9/2020 | Lorrain-Hale et al. |
| 2020/0304972 | A1 | 9/2020 | Gross et al. |
| 2021/0365174 | A1 | 11/2021 | Ellis et al. |
| 2022/0291816 | A1 | 9/2022 | Fan et al. |
| 2022/0391603 | A1 | 12/2022 | Pham et al. |

FOREIGN PATENT DOCUMENTS

| | | |
|---|---|---|
| CN | 110825469 A | 2/2020 |
| EP | 3038333 A1 | 6/2016 |
| JP | 2018-60550 A | 4/2018 |
| JP | 2019-204517 A | 11/2019 |
| WO | 2011/088053 A2 | 7/2011 |
| WO | 2011/088053 A3 | 1/2012 |
| WO | 2013/048880 A1 | 4/2013 |
| WO | 2014/200728 A1 | 12/2014 |
| WO | 2017/200777 A1 | 11/2017 |
| WO | 2017/213684 A1 | 12/2017 |
| WO | 2018/213481 A1 | 11/2018 |

OTHER PUBLICATIONS

Screen captures from YouTube video clip entitled "10 Google Assistant Tips!" 13 pages, uploaded Feb. 24, 2020 by user "Velian Speaks Tech." Retrieved from the internet: https://www.youtube.com/watch?v=3RNWA3NK9fs (Year: 2020).*
Screen captures from YouTube video clip entitled "10 Google Assistant Tips!" 15 pages, uploaded Feb. 24, 2020 by user "Velian Speaks Tech." Retrieved from the internet: https://www.youtube.com/watch?v=3RNWA3NK9fs (Year: 2020).*
Modern Techies,"Braina-Artificial Personal Assistant for PC (like Cortana, Siri) !!!!", Online available at: https://www.youtube.com/watch?v=_Coo2P8ilqQ, Feb. 24, 2017, 3 pages.
Rowland et al., "Designing Connected Products: UX for the Consumer Internet of Things", O'Reilly, May 2015, 452 pages.
Yates MichaelC., "How can I exit Google Assistant after i'm finished with it", Available online at:—https://productforums.google.com/forum/#!msg/phone-by-google/faECnR2RJwA/gKNtOkQgAQAJ, Jan. 11, 2016, 2 pages.
Yousef Zulfikara., "Braina (A.I) artificial intelligence virtual personal assistant", Online available at: https://www.youtube.com/watch?v=2h6xpB8bPSA, Feb. 7, 2017, 3 pages.
Office Action received for Danish Patent Application No. PA202070547, dated Jul. 7, 2021, 5 pages.
Office Action received for Danish Patent Application No. PA202070548, dated Feb. 25, 2021, 4 pages.
Search Report and Opinion received for Danish Patent Application No. PA202070547, dated Oct. 16, 2020, 10 pages.
Search Report and Opinion received for Danish Patent Application No. PA202070548, dated Oct. 16, 2020, 9 pages.
Pak Gamerz, "Braina: Artificially Intelligent Assistant Software for Windows PC in (Urdu / hindhi)", Online available at:—https://www.youtube.com/watch?v=JH_rMjw8lqc, Jul. 24, 2018, 3 pages.
Invitation to Pay Additional Fees received for PCT Patent Application No. PCT/US2021/027739, dated Jul. 30, 2021, 8 pages.
Non-Final Office Action received for U.S. Appl. No. 17/240,485, dated Jul. 22, 2021, 21 pages.
Velian Speaks Tech, "10 Google Assistant Tips!", Available online at: https://www.youtube.com/watch?v=3RNWA3NK9fs, Feb. 24, 2020, 3 pages.
Applicant-Initiated Interview Summary received for U.S. Appl. No. 17/240,485, dated Oct. 8, 2021, 3 pages.
Extended European Search Report received for European Patent Application No. 21174161.6, dated Oct. 20, 2021, 8 pages.

(56) References Cited

OTHER PUBLICATIONS

Final Office Action received for U.S. Appl. No. 17/240,485, dated Nov. 16, 2021, 25 pages.
International Search Report and Written Opinion received for PCT Patent Application No. PCT/US2021/027739, dated Oct. 19, 2021, 20 pages.
Office Action received for Danish Patent Application No. PA202070548, dated Nov. 23, 2021, 4 pages.
Tech With Brett, "Everything the Google Nest Hub Can Do", Available online at: https://www.youtube.com/watch?v=x3vdytgru2E, Nov. 12, 2018, 13 pages.
Applicant-Initiated Interview Summary received for U.S. Appl. No. 17/240,485, dated Jan. 28, 2022, 3 pages.
Office Action received for Danish Patent Application No. PA202070548, dated Feb. 8, 2022, 3 pages.
Intention to grant received for Danish Patent Application No. PA202070548, dated Mar. 4, 2022, 2 pages.
Decision to Grant received for Danish Patent Application No. PA202070548, dated Jun. 14, 2022, 2 pages.
Non-Final Office Action received for U.S. Appl. No. 17/240,485, dated Apr. 12, 2022, 33 pages.
Office Action received for Danish Patent Application No. PA202070547, dated Apr. 8, 2022, 2 pages.
Applicant-Initiated Interview Summary received for U.S. Appl. No. 17/240,485, dated May 24, 2022, 3 pages.
Office Action received for Indian Patent Application No. 202115022871, dated Oct. 28, 2022, 6 pages.
Office Action received for Chinese Patent Application No. 202010981441.X, dated Nov. 9, 2022, 18 pages (11 pages of English Translation and 7 pages of Official Copy).
Final Office Action received for U.S. Appl. No. 17/240,485, dated Nov. 4, 2022, 35 pages.
International Preliminary Report on Patentability received for PCT Patent Application No. PCT/US2021/027739, dated Dec. 1, 2022, 14 pages.
Office Action received for Danish Patent Application No. PA202070547, dated Nov. 17, 2022, 2 pages.
Non-Final Office Action received for U.S. Appl. No. 17/240,485, dated Jan. 20, 2023, 32 pages.
Office Action received for European Patent Application No. 21174161.6, dated Oct. 23, 2023, 7 pages.
Applicant-Initiated Interview Summary received for U.S. Appl. No. 17/240,485, dated Feb. 21, 2023, 3 pages.
Applicant-Initiated Interview Summary received for U.S. Appl. No. 17/240,485, dated Jul. 12, 2023, 5 pages.
Examiner's Answer to Appeal Brief received for U.S. Appl. No. 17/240,485, dated Sep. 22, 2023, 10 pages.
Final Office Action received for U.S. Appl. No. 17/240,485, dated Jun. 2, 2023, 34 pages.
Francis Christopher, "PTAB Broadest Reasonable Interpretation: "in response to" Means "subsequent to"", The B2 IP Report, retrieved from: http://web.archive.org/web/20220704055910/https:/www.b2ipreport.com/claims-interpreted/ptab-broadest-reasonable-interpretation-in-response-to-means-subsequent-to/, Jan. 27, 2017, 4 pages.
Office Action received for Australian Patent Application No. 2021275662, dated May 29, 2023, 3 pages.
Office Action received for Chinese Patent Application No. 202010981441.X, dated Feb. 17, 2023, 16 pages (10 pages of English Translation and 6 pages of Official Copy).
Office Action received for Chinese Patent Application No. 202010981441.X, dated May 14, 2023, 12 pages (7 pages of English Translation and 5 pages of Official Copy).
Office Action received for Indian Patent Application No. 202115022873, dated Mar. 15, 2023, 9 pages.
Office Action received for Australian Patent Application No. 2021275662, mailed on Dec. 13, 2023, 3 pages.
Notice of Allowance received for Japanese Patent Application No. 2022-571288, mailed on Jan. 5, 2024, 4 pages (1 page of English Translation and 3 pages of Official Copy).
Decision on Appeal received for U.S. Appl. No. 17/240,485, mailed on Feb. 23, 2024, 8 pages.
Record of Oral Hearing received for U.S. Appl. No. 17/240,485, mailed on Feb. 26, 2024, 14 pages.

* cited by examiner

"WHAT'S THE WEATHER TODAY?"

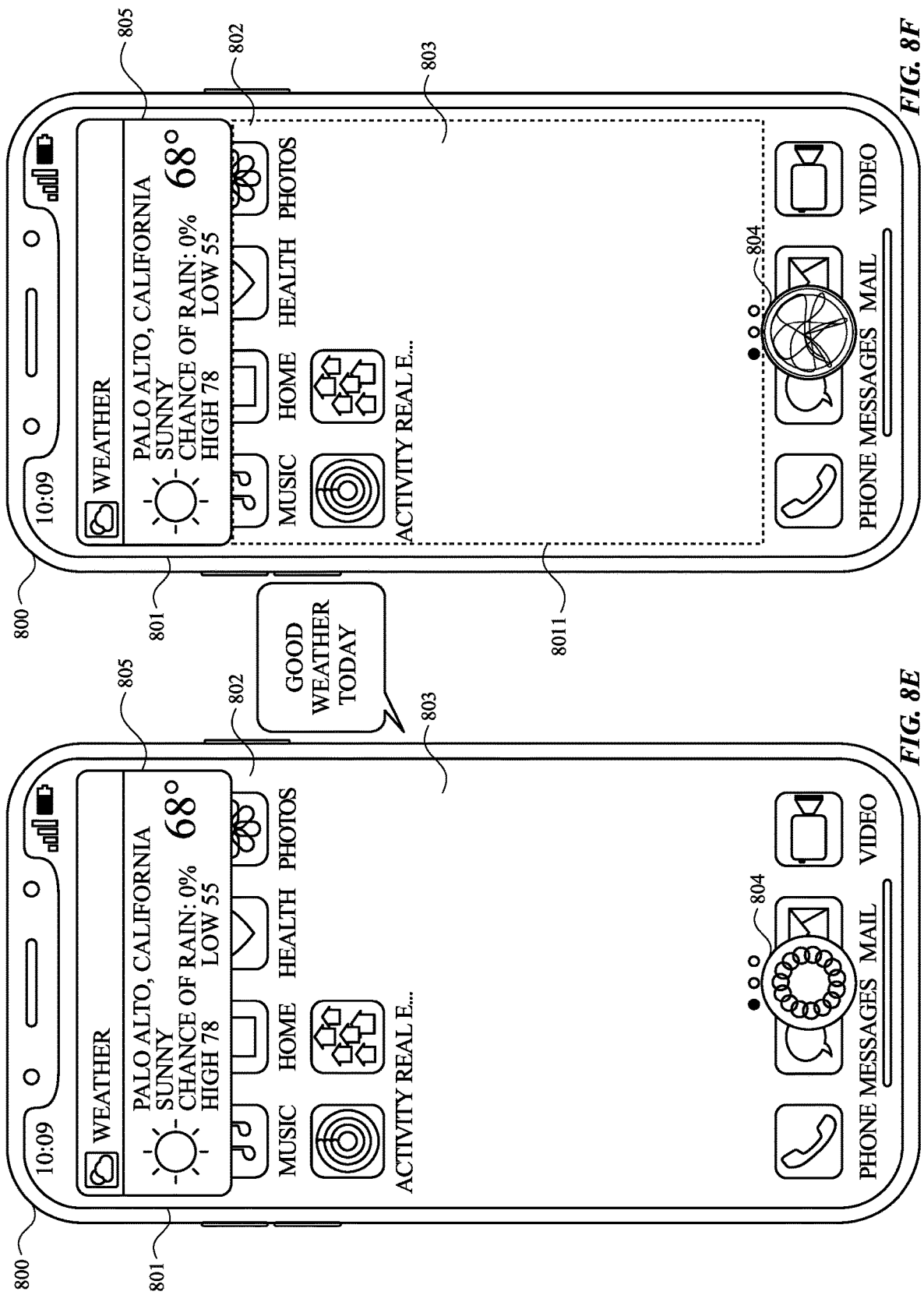

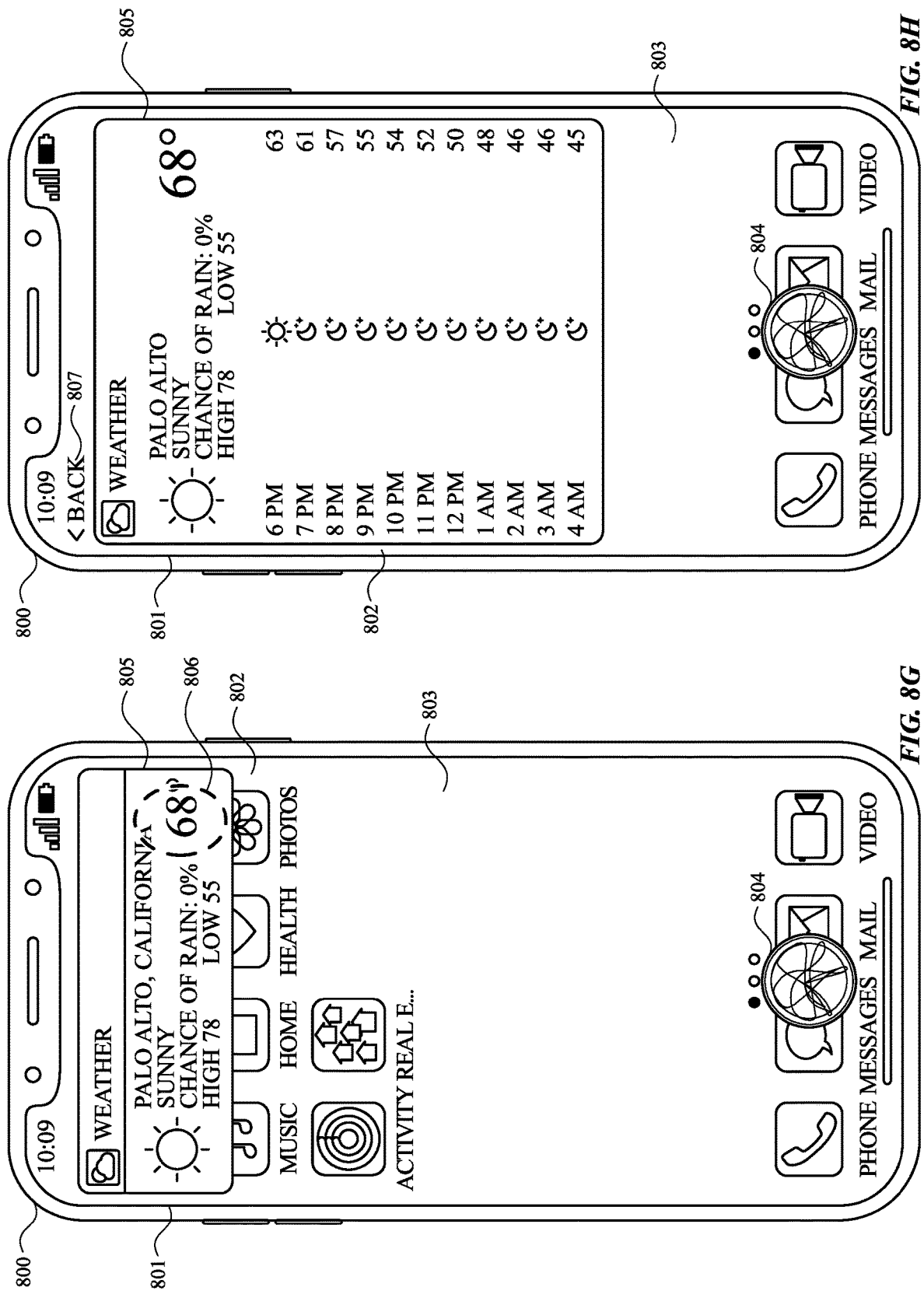

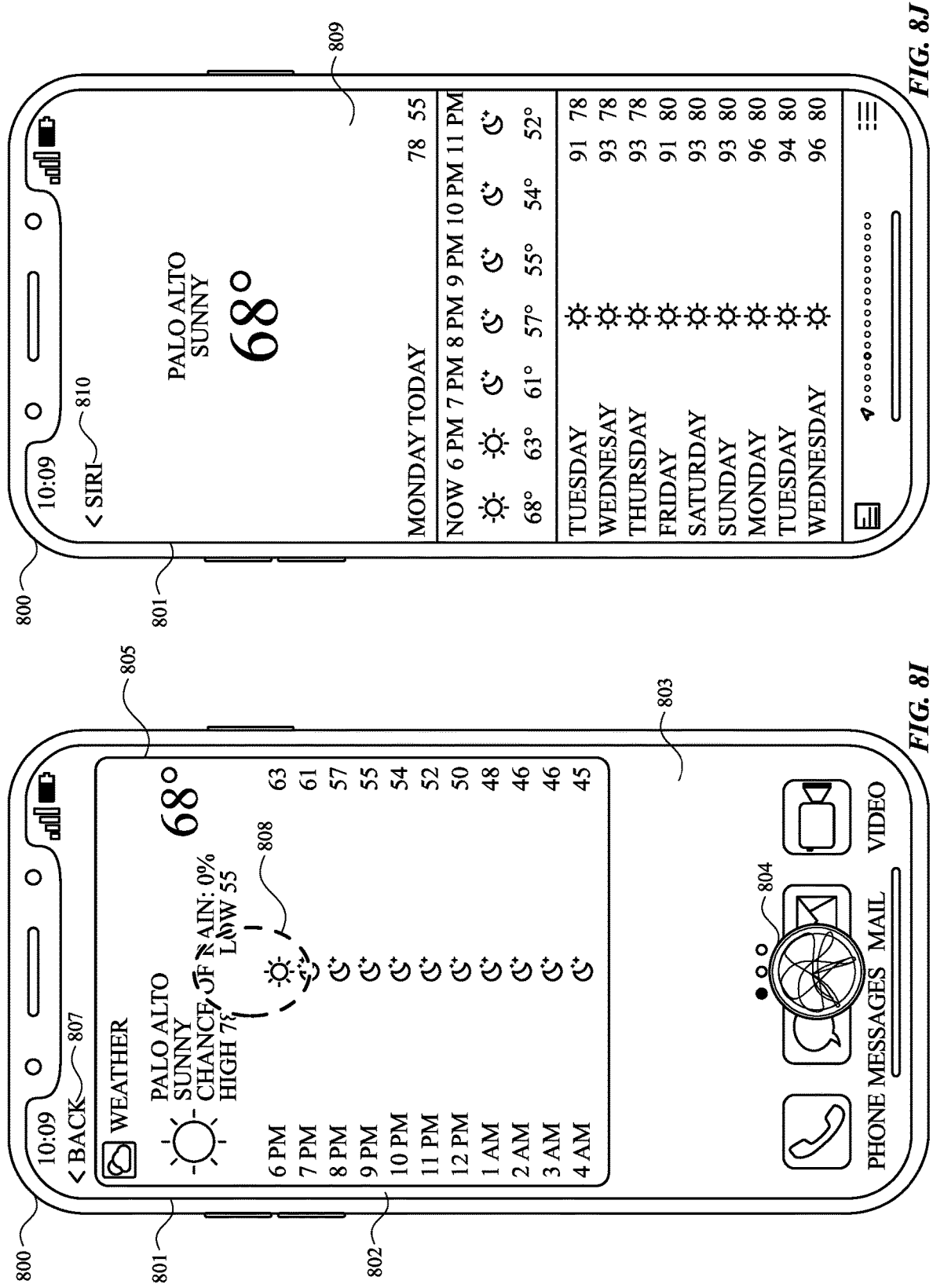

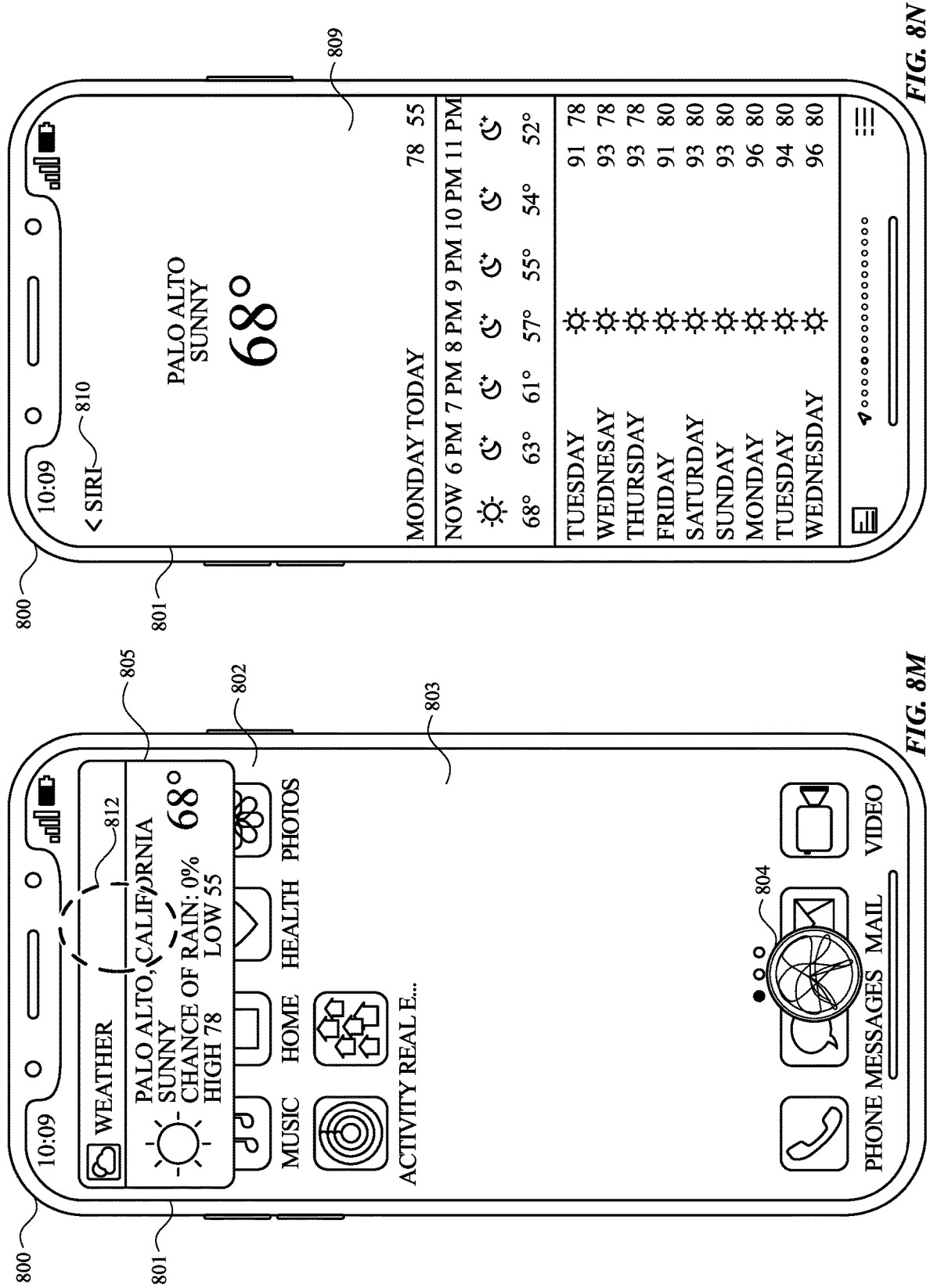

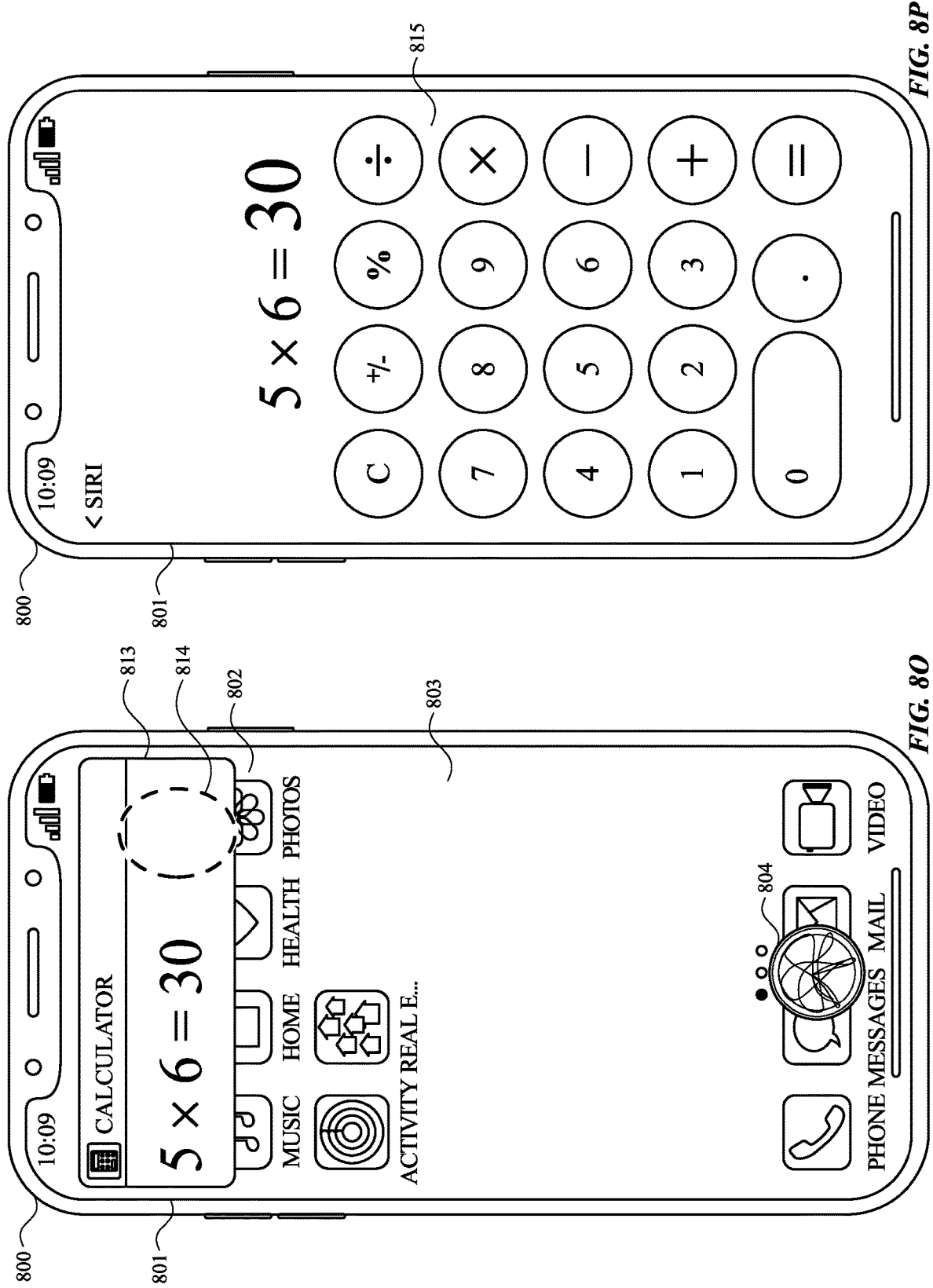

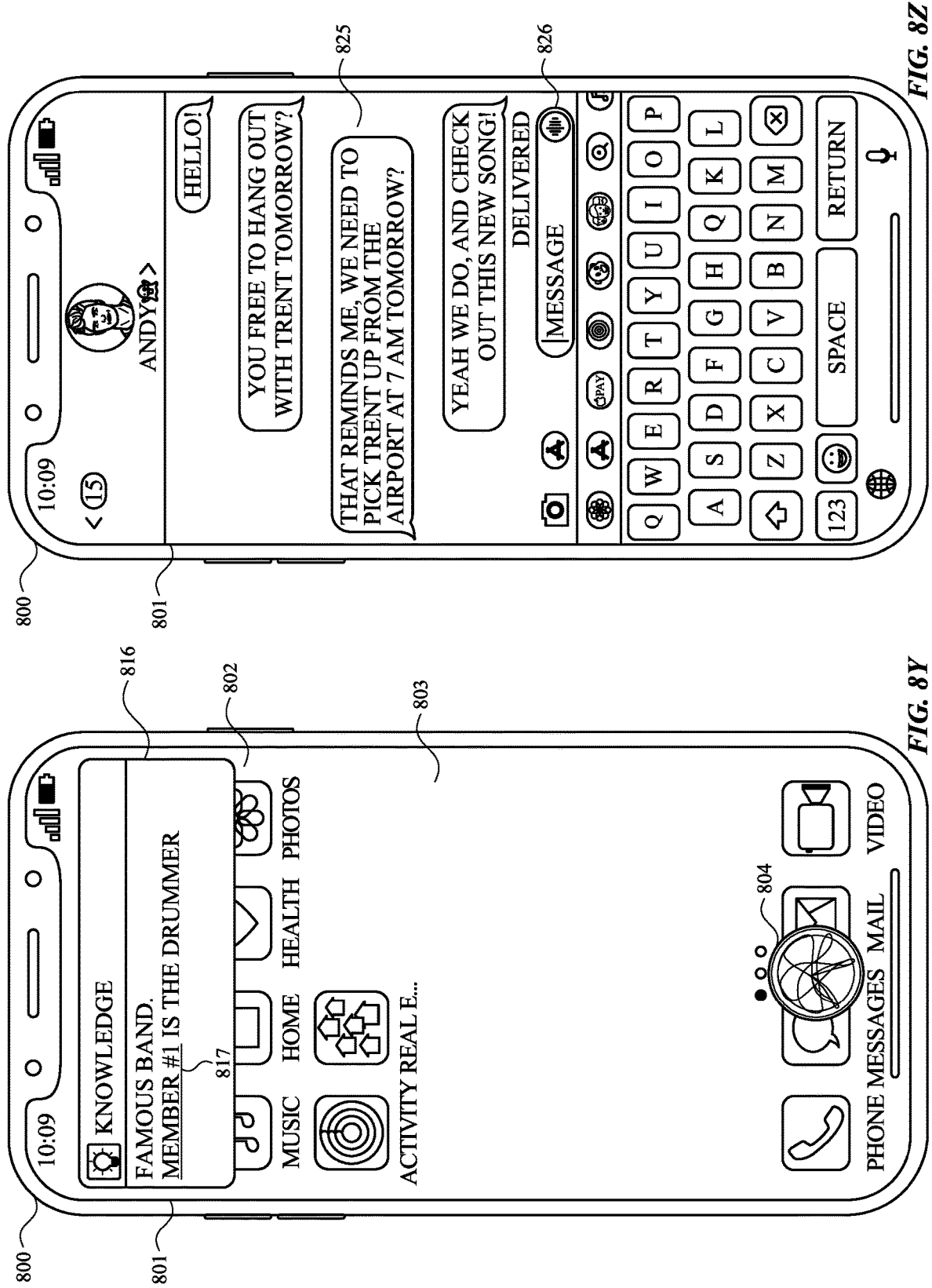

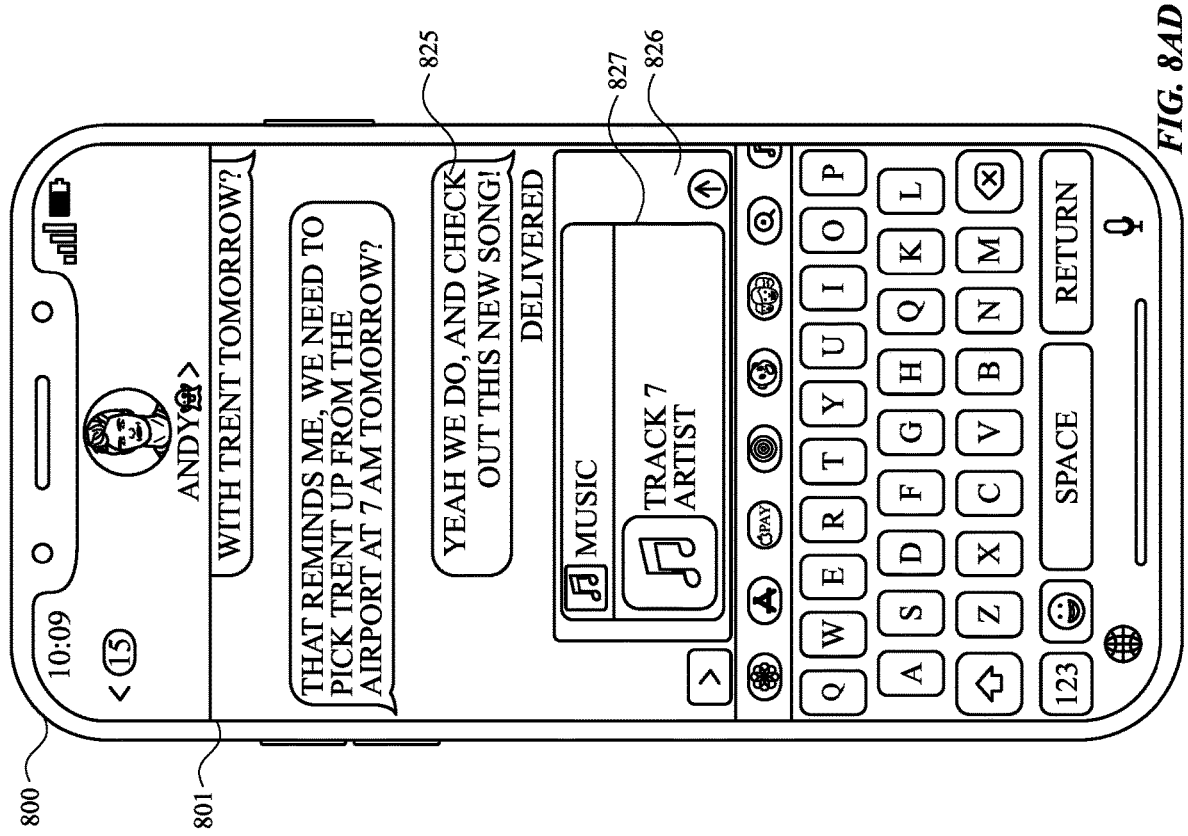
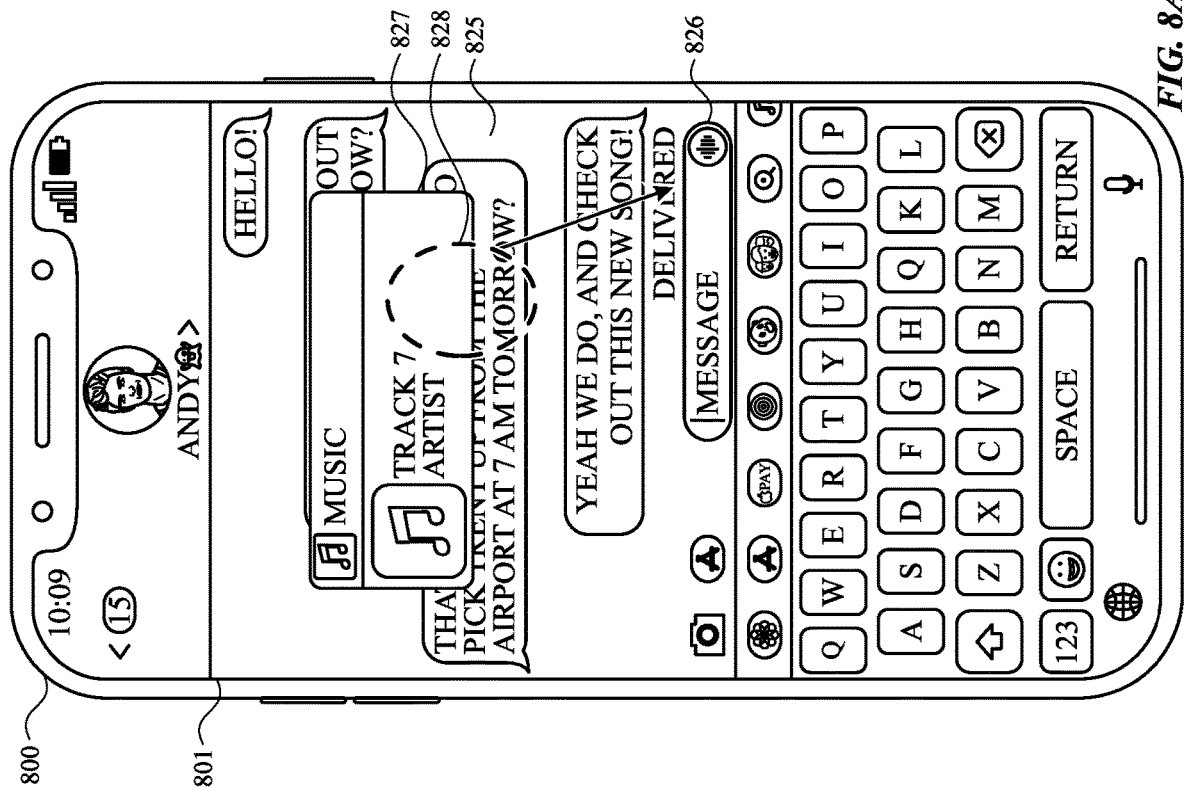
FIG. 8AD
FIG. 8AC

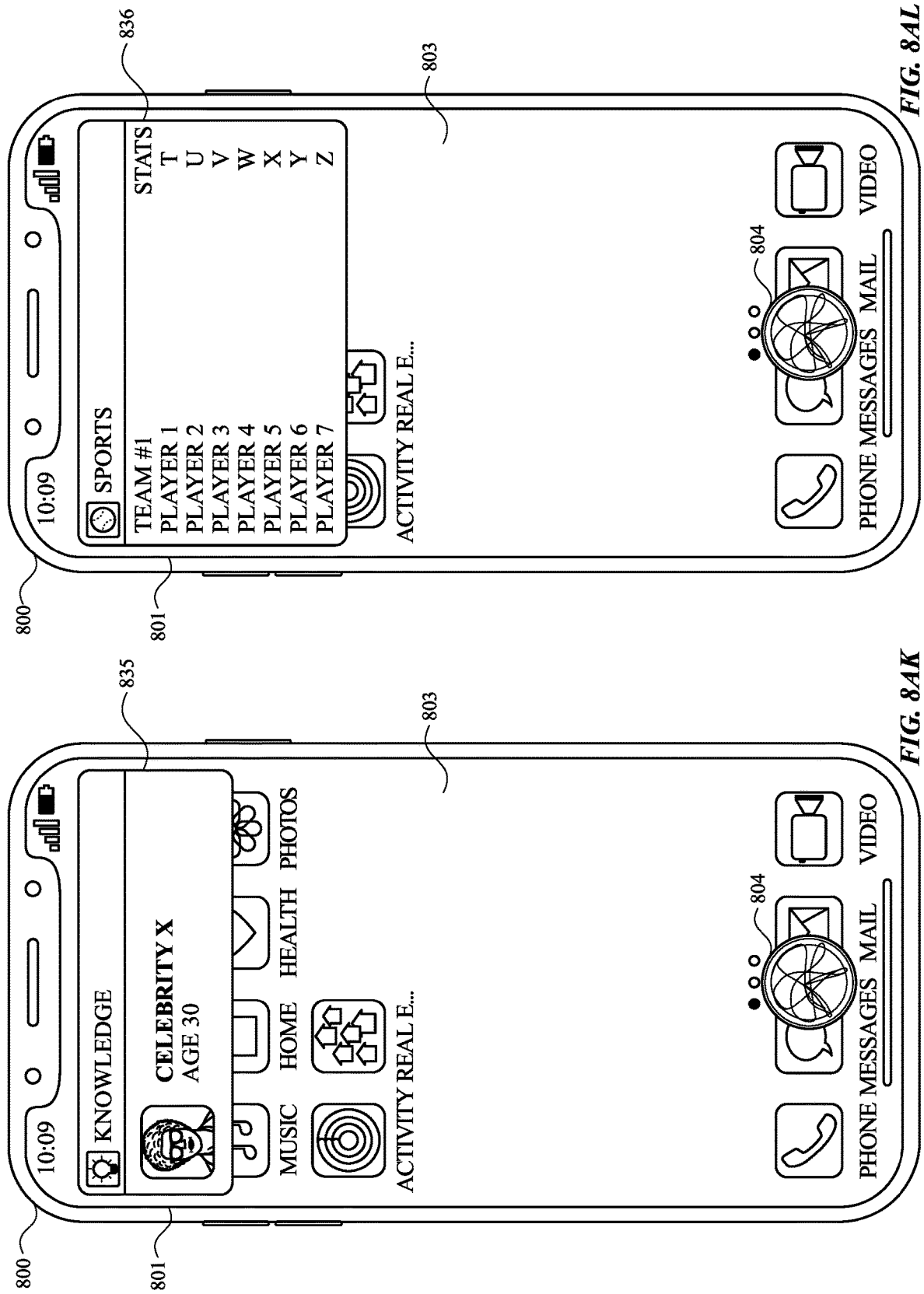

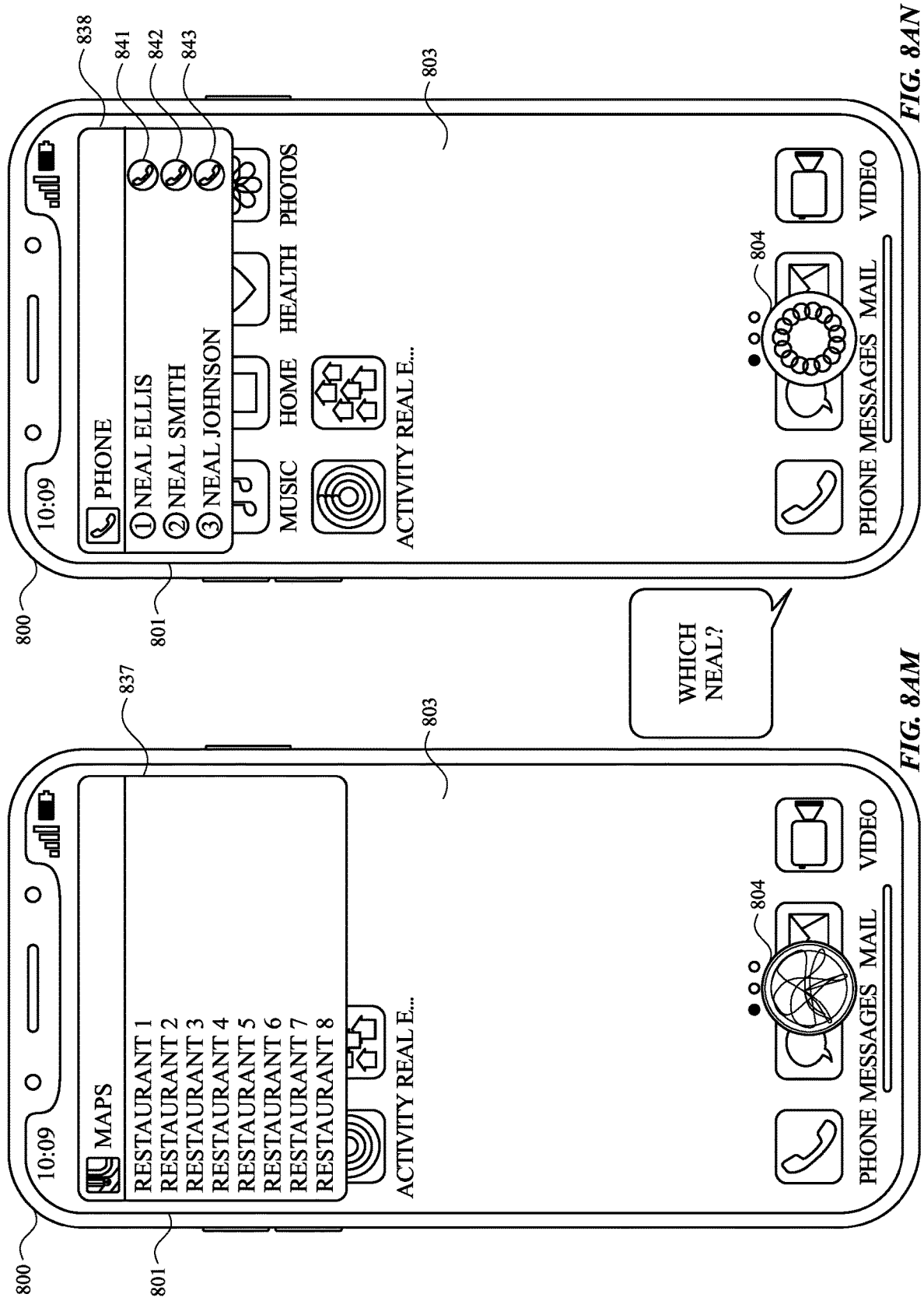

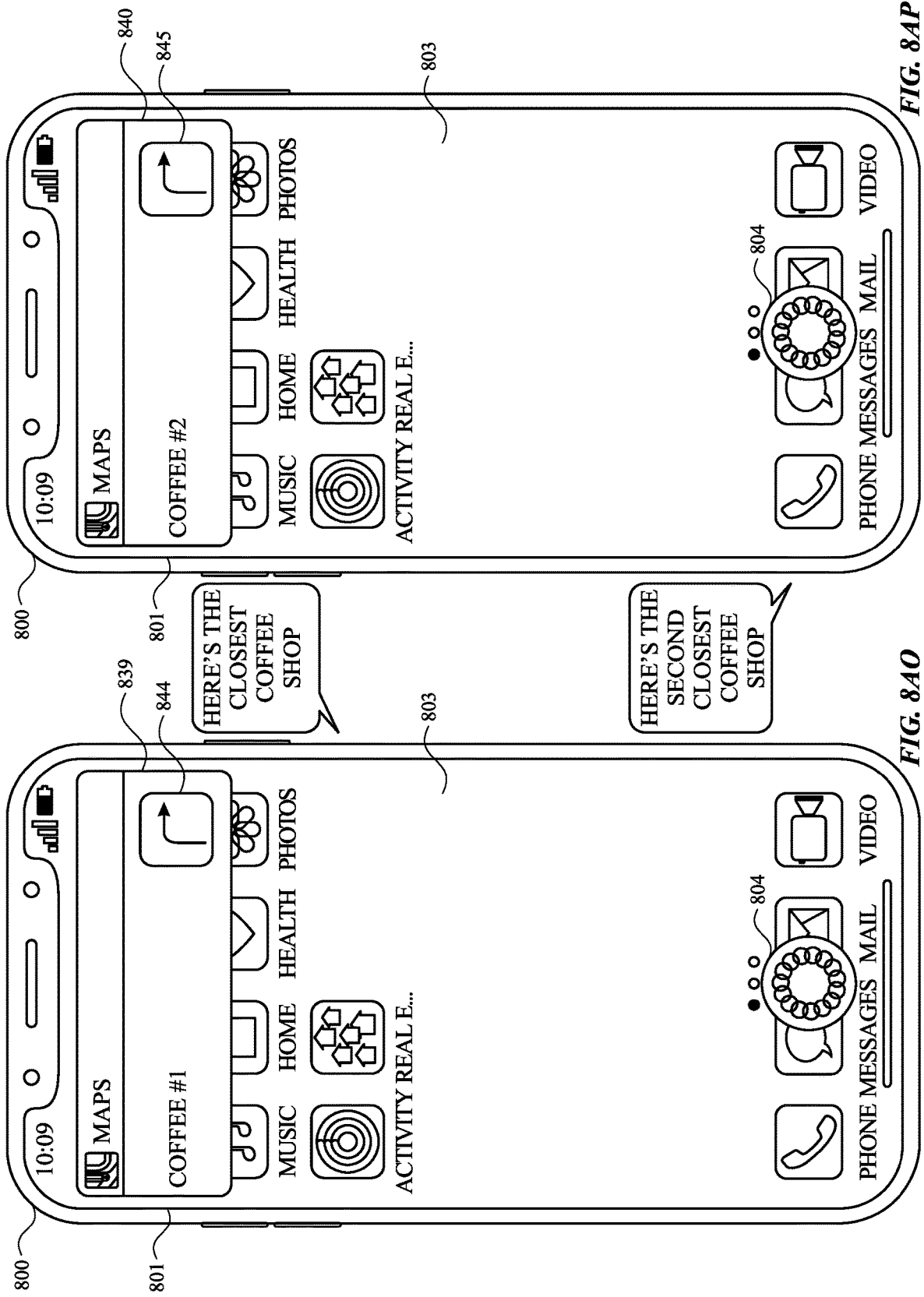

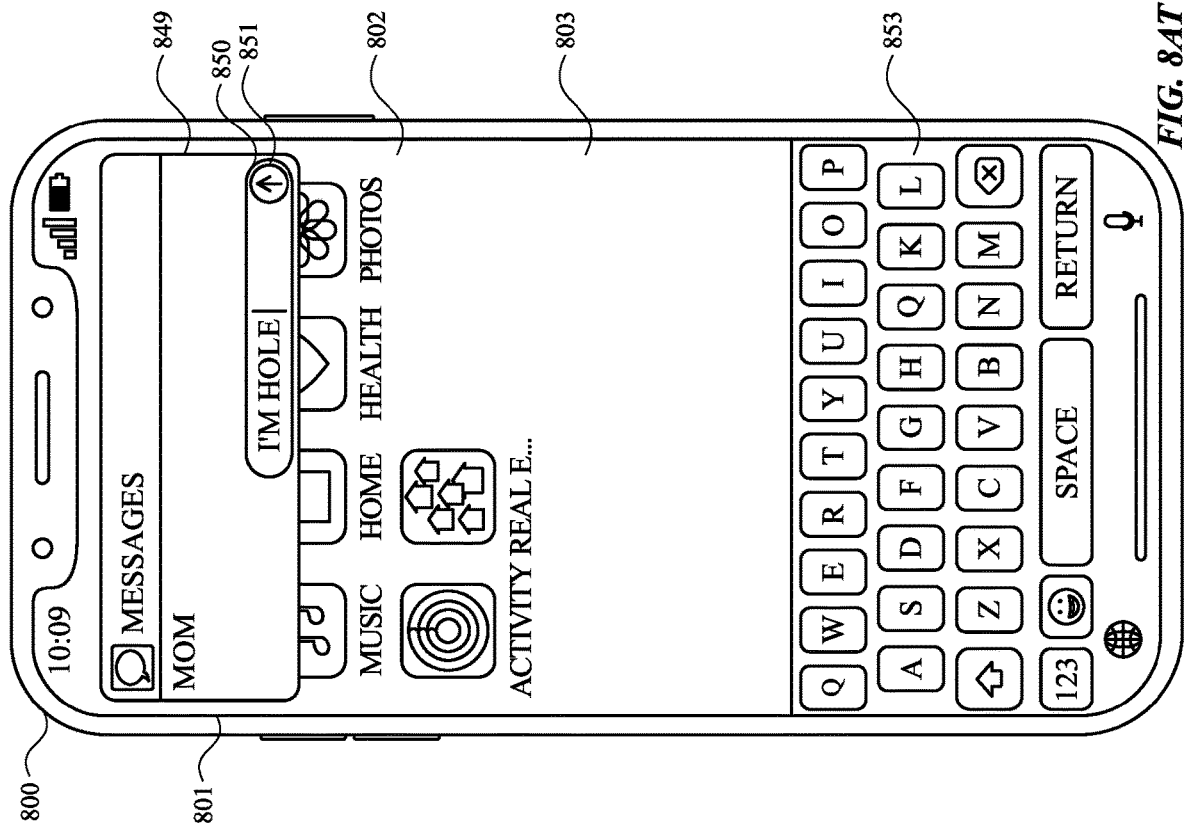
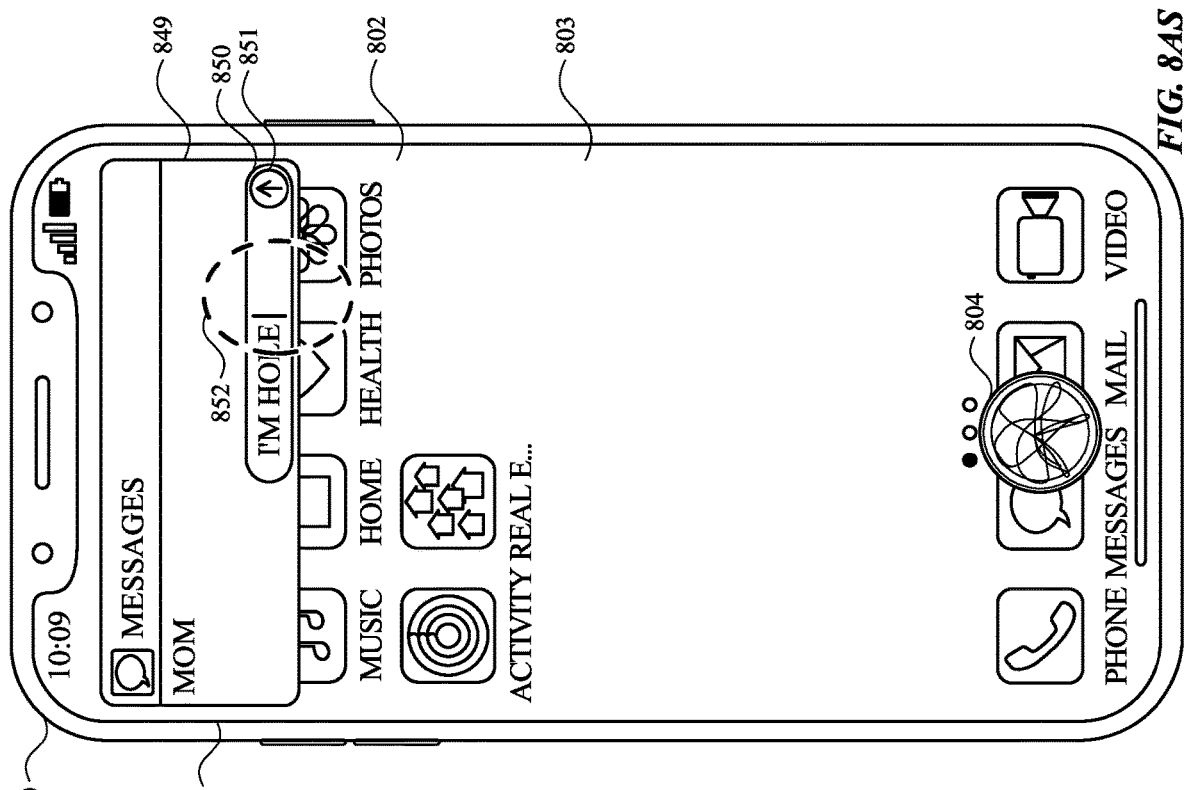

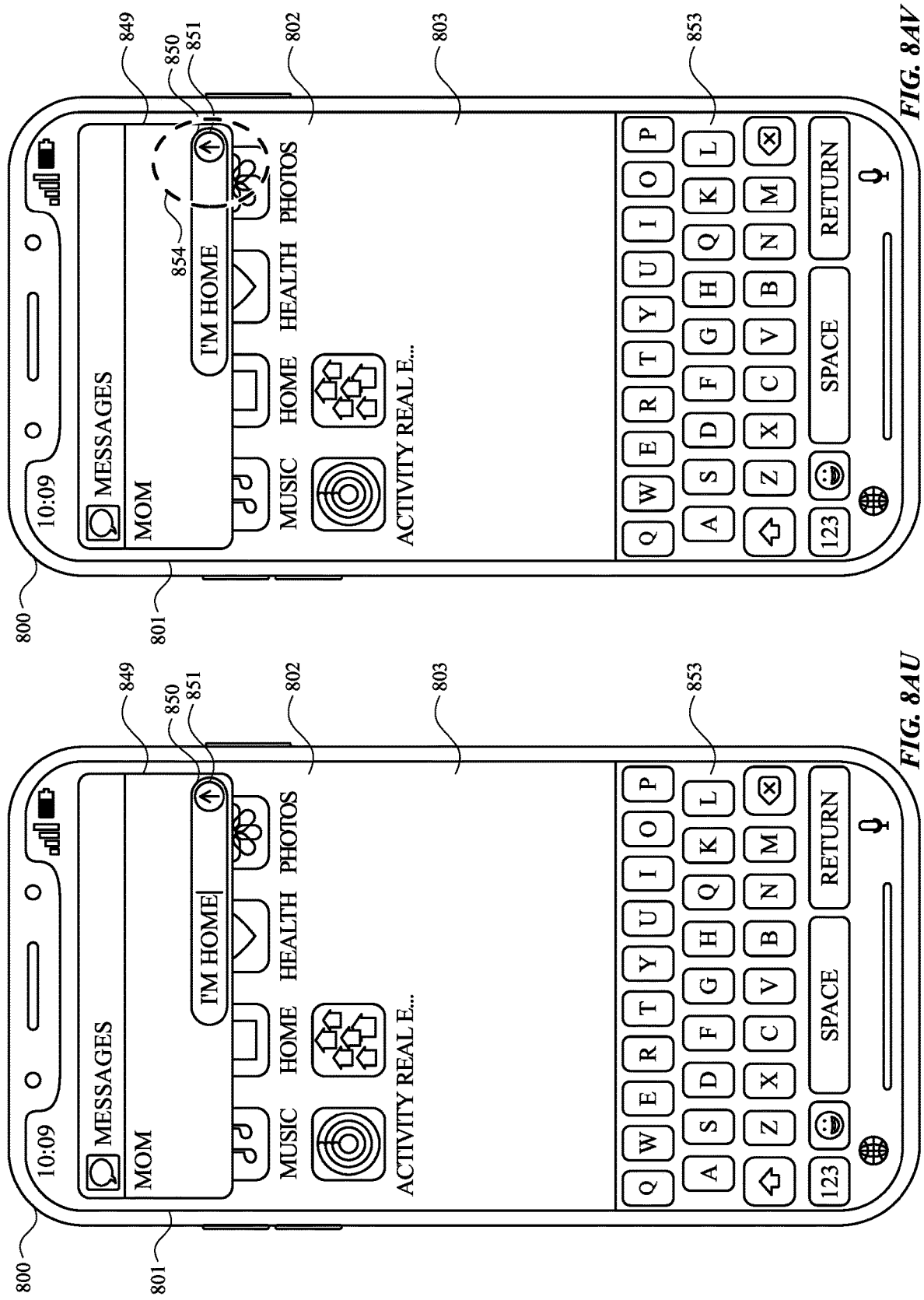

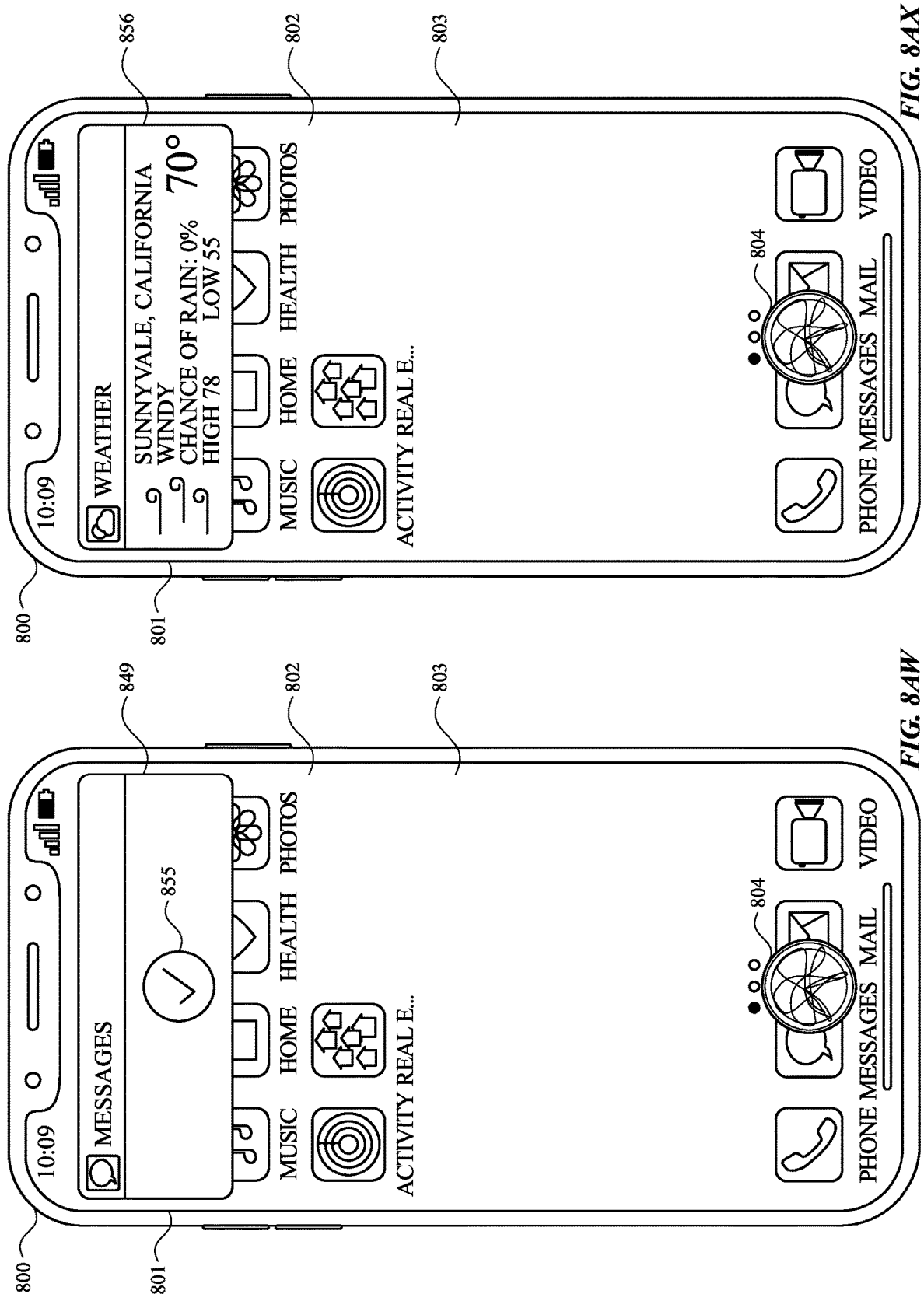

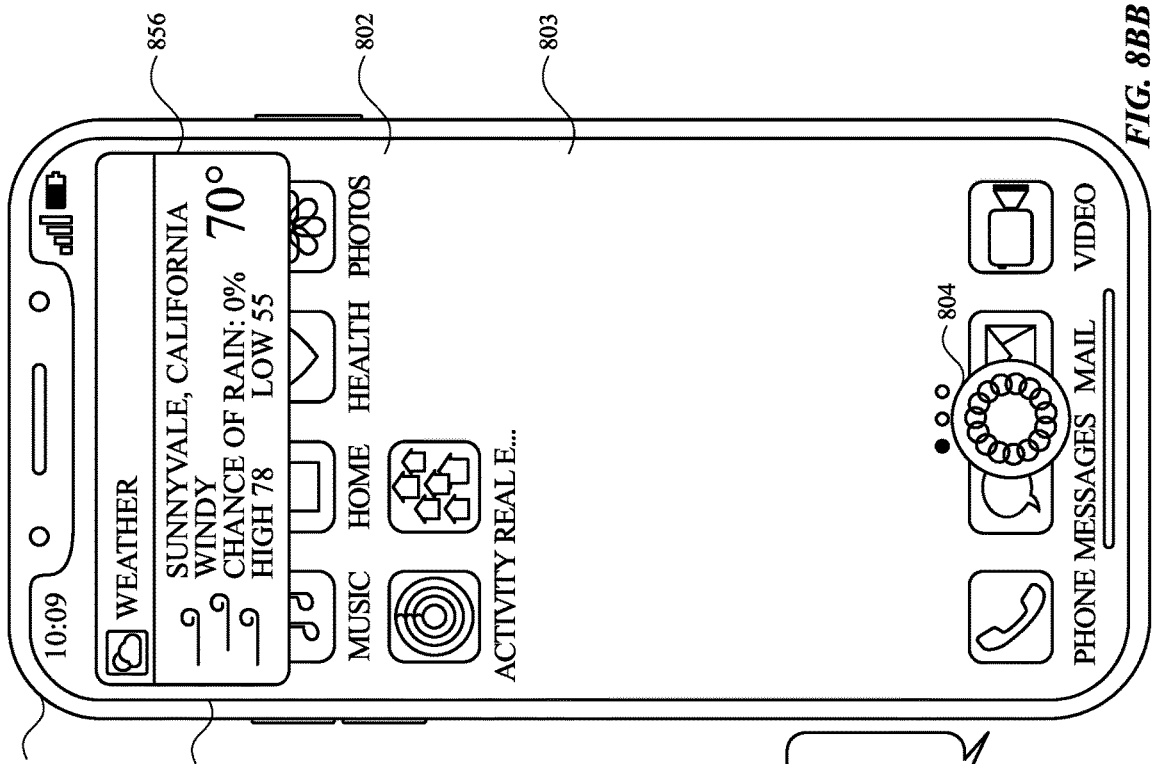
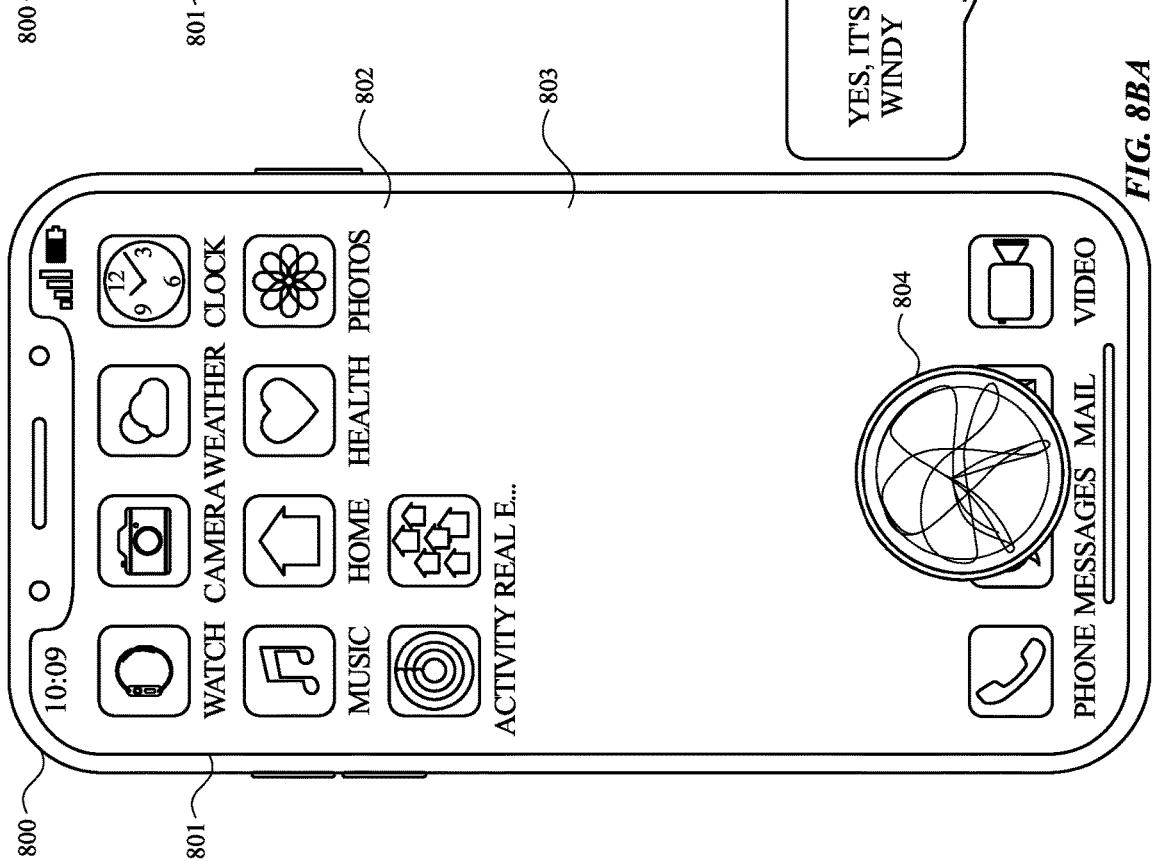

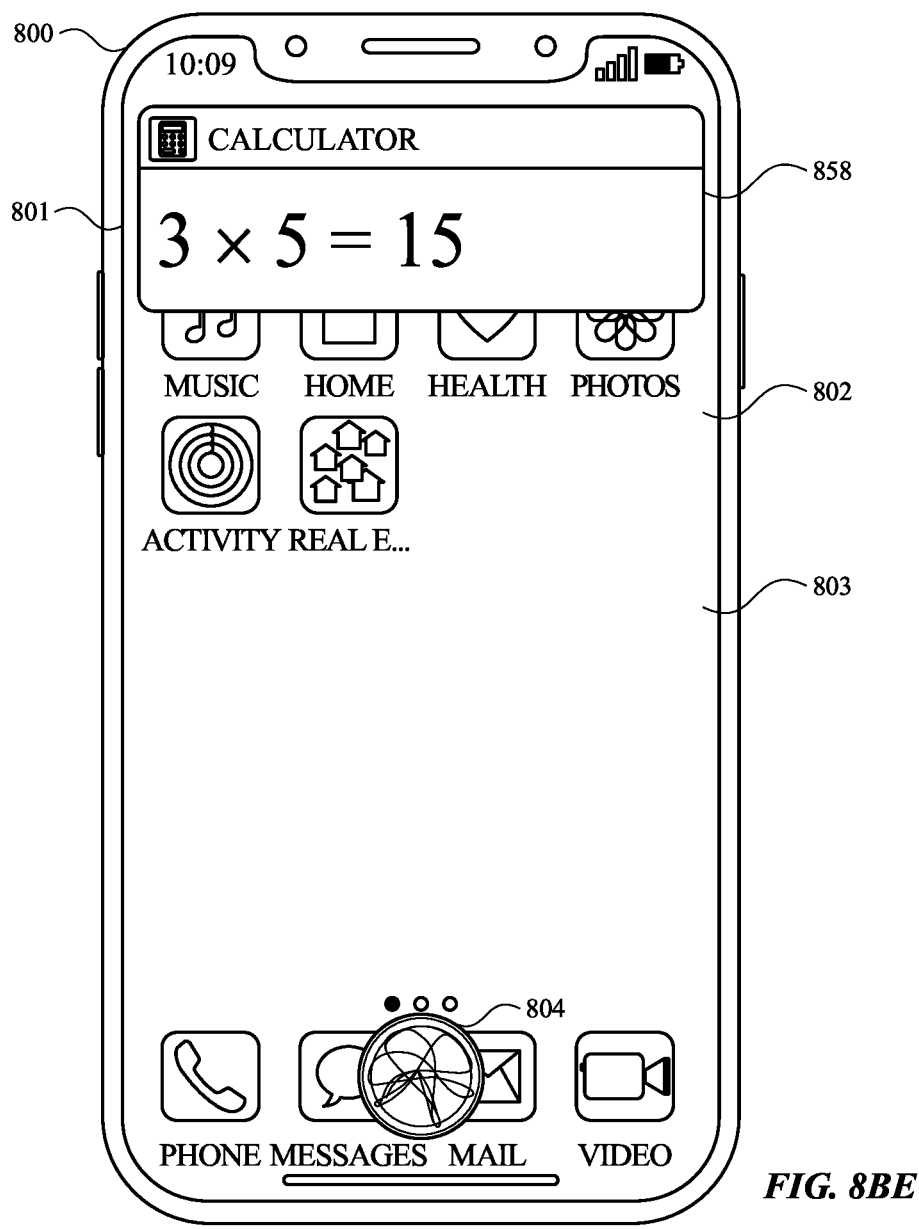
FIG. 8BE
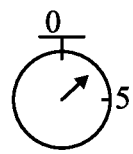

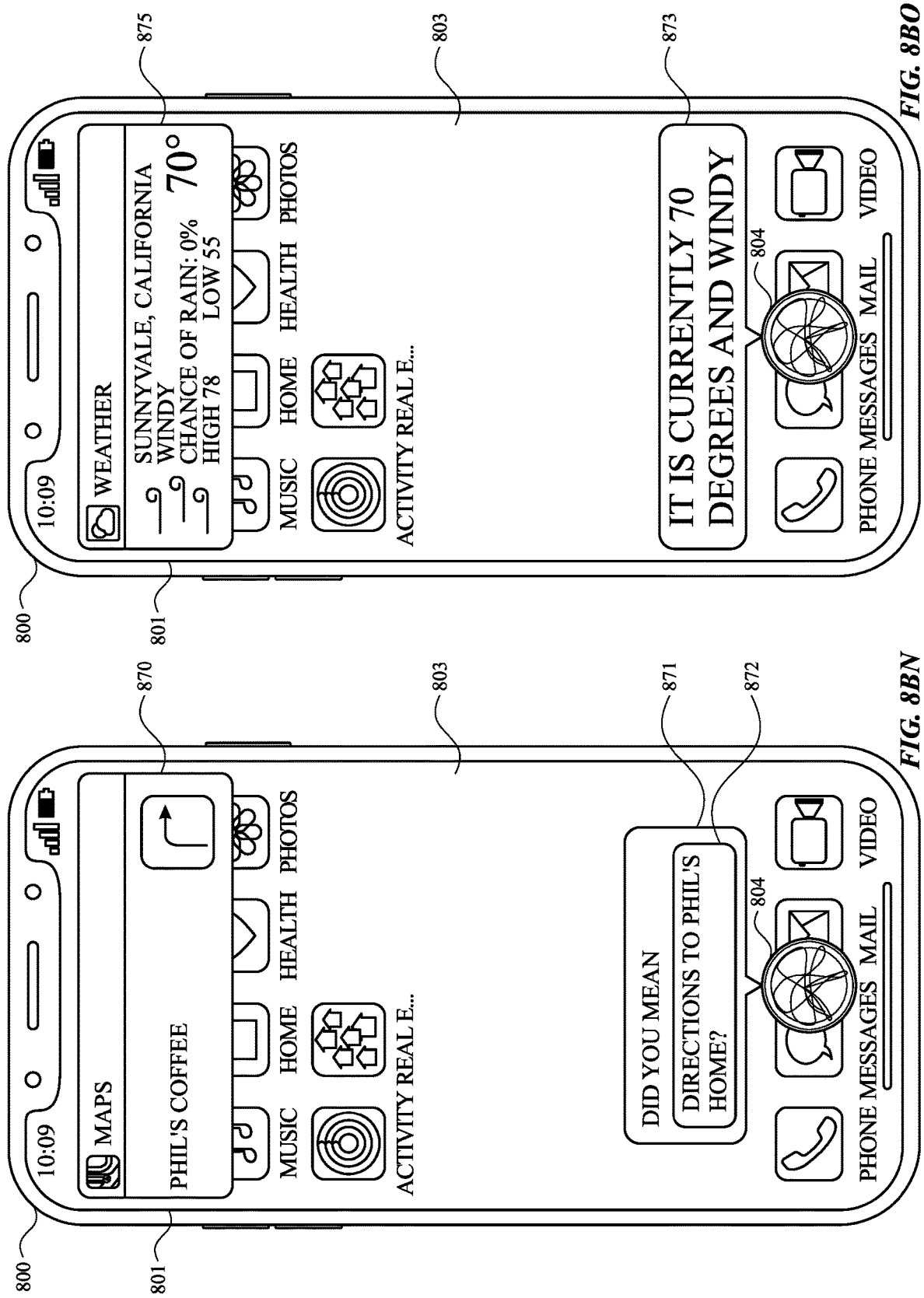

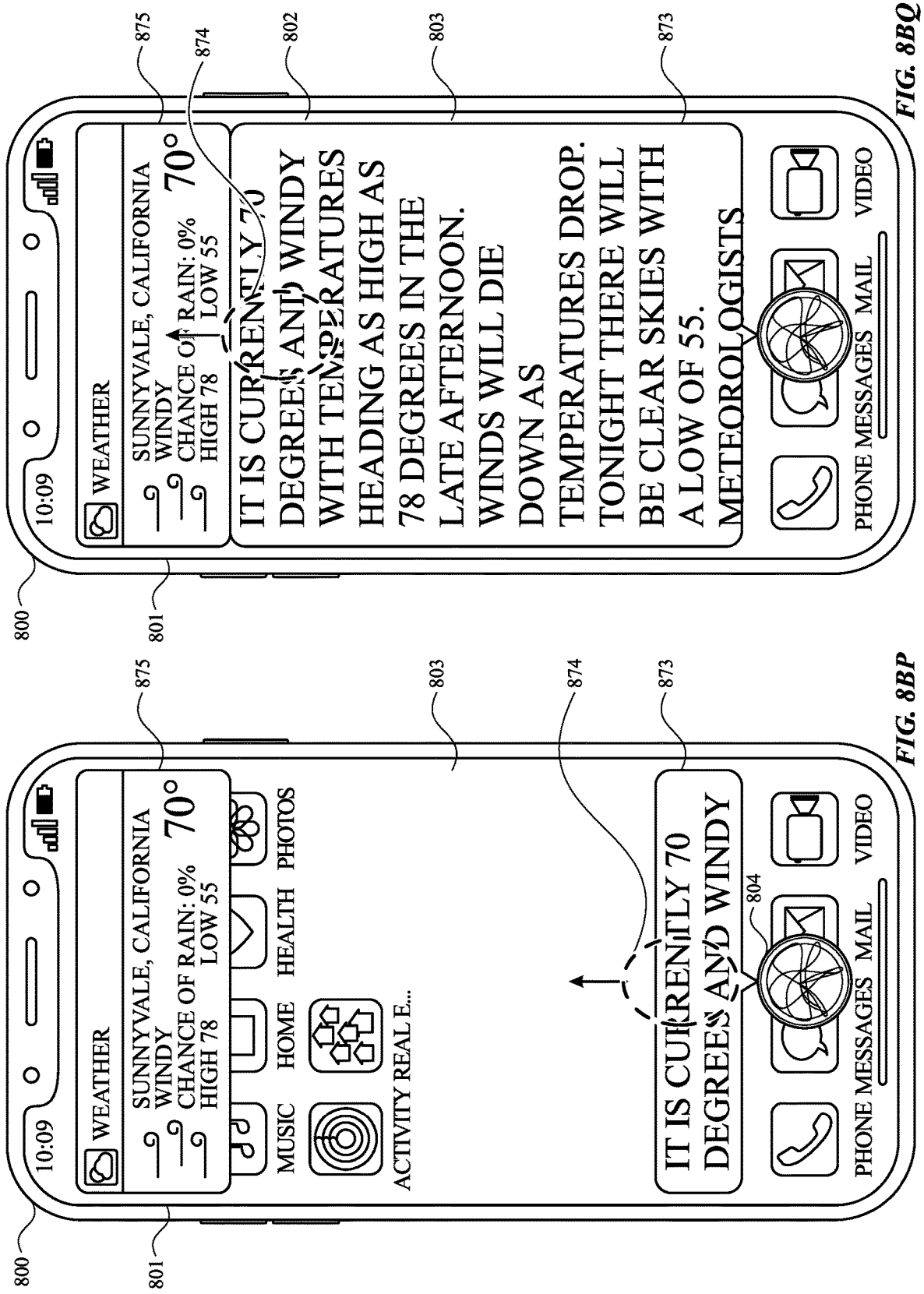

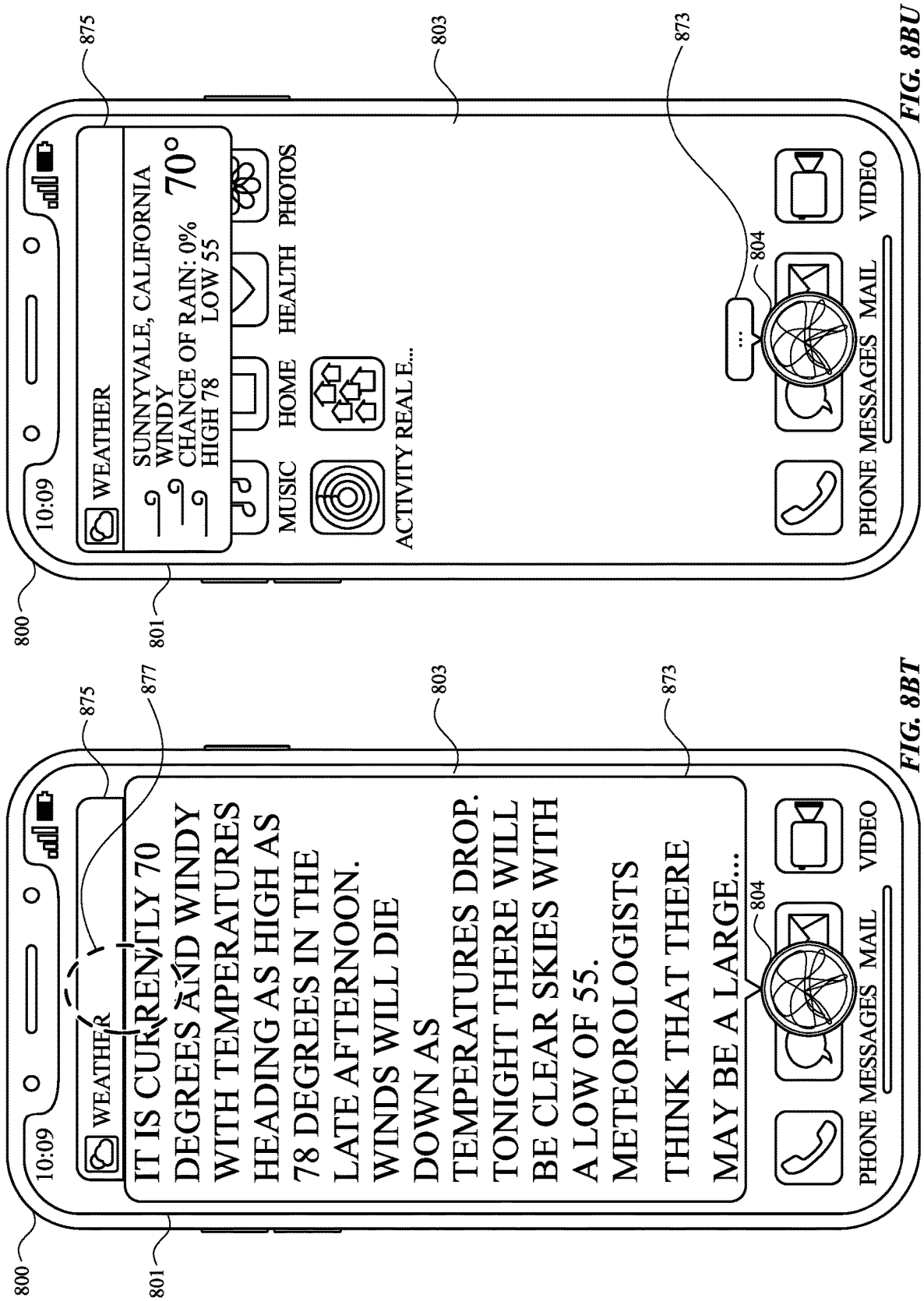

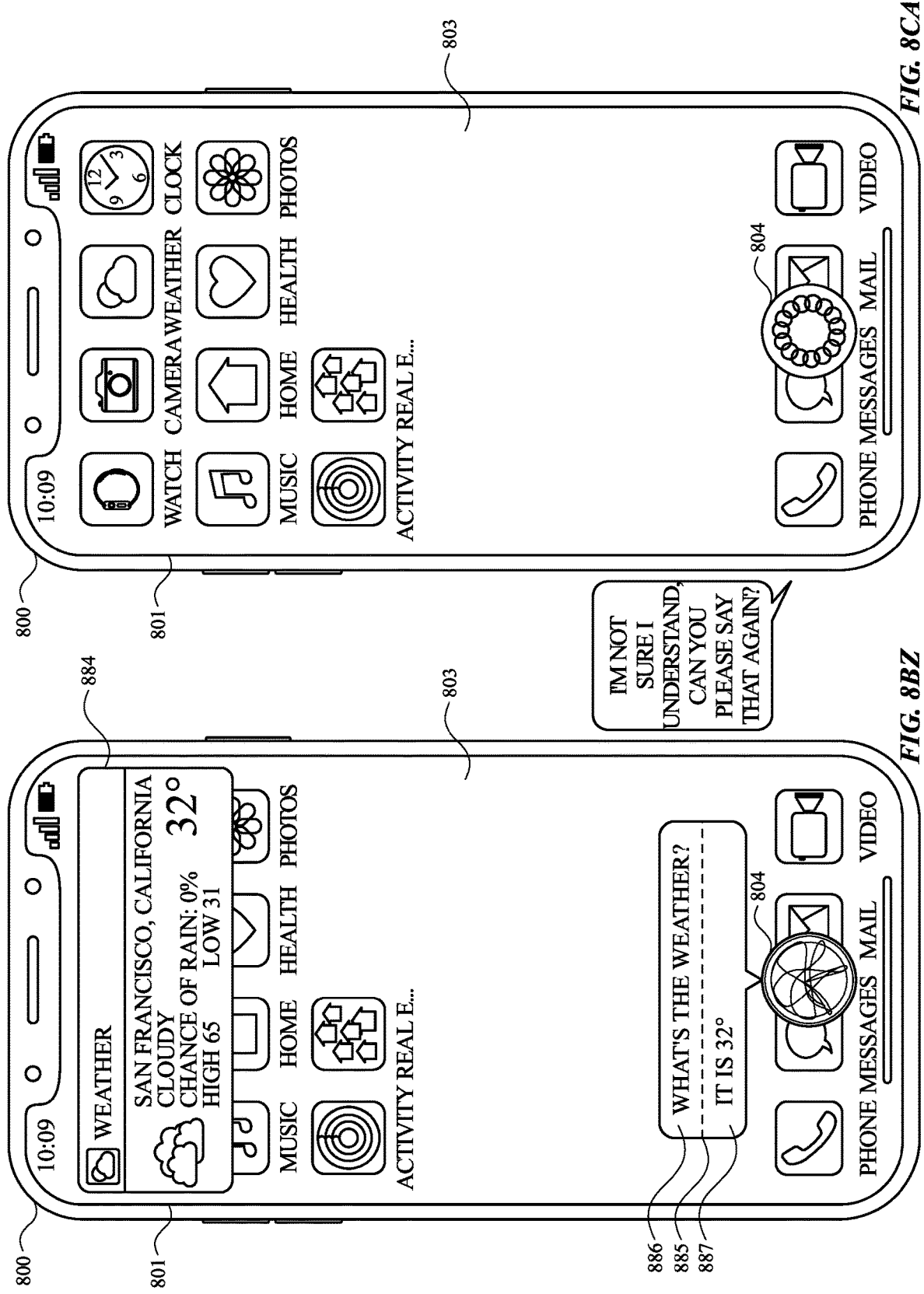

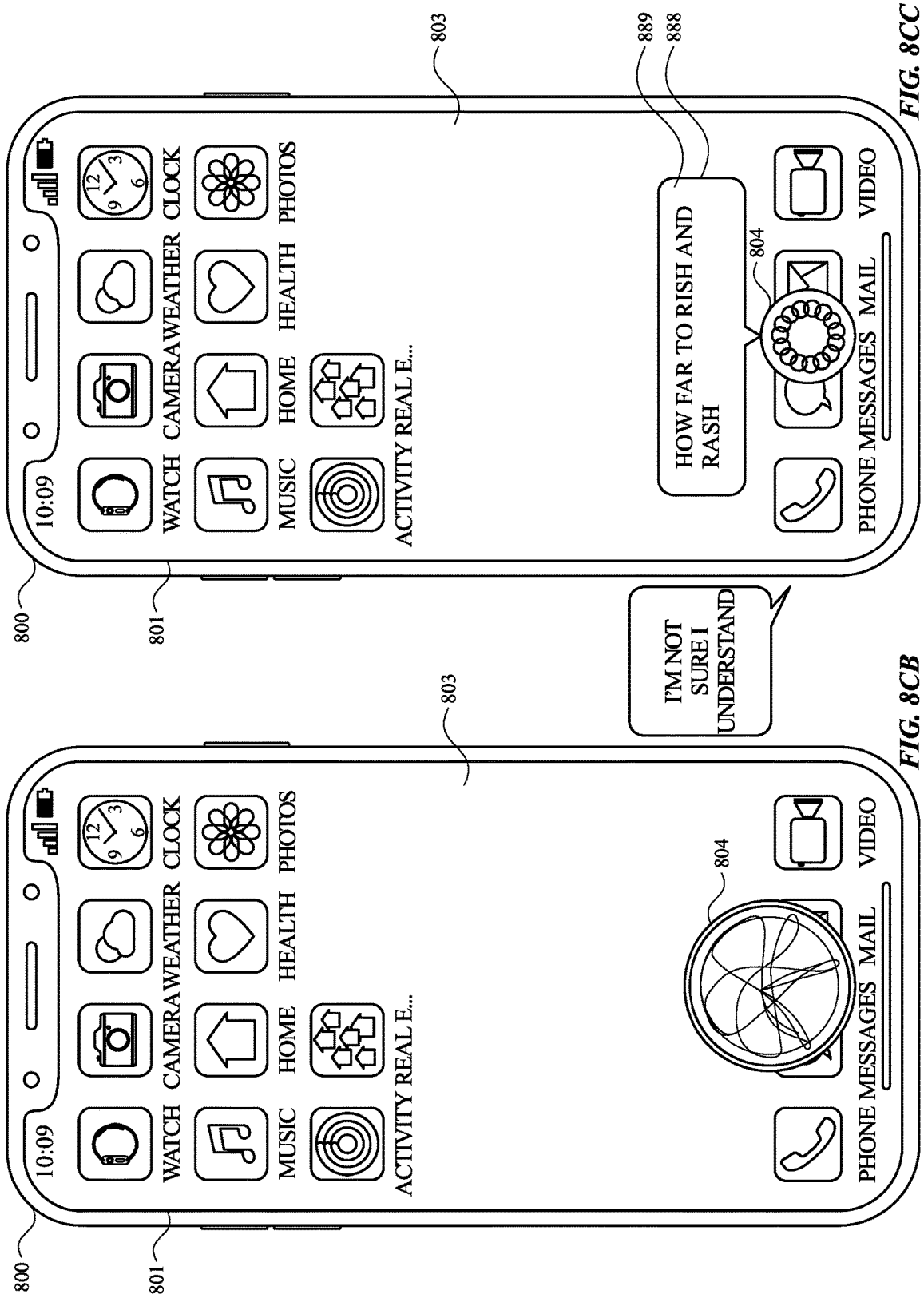

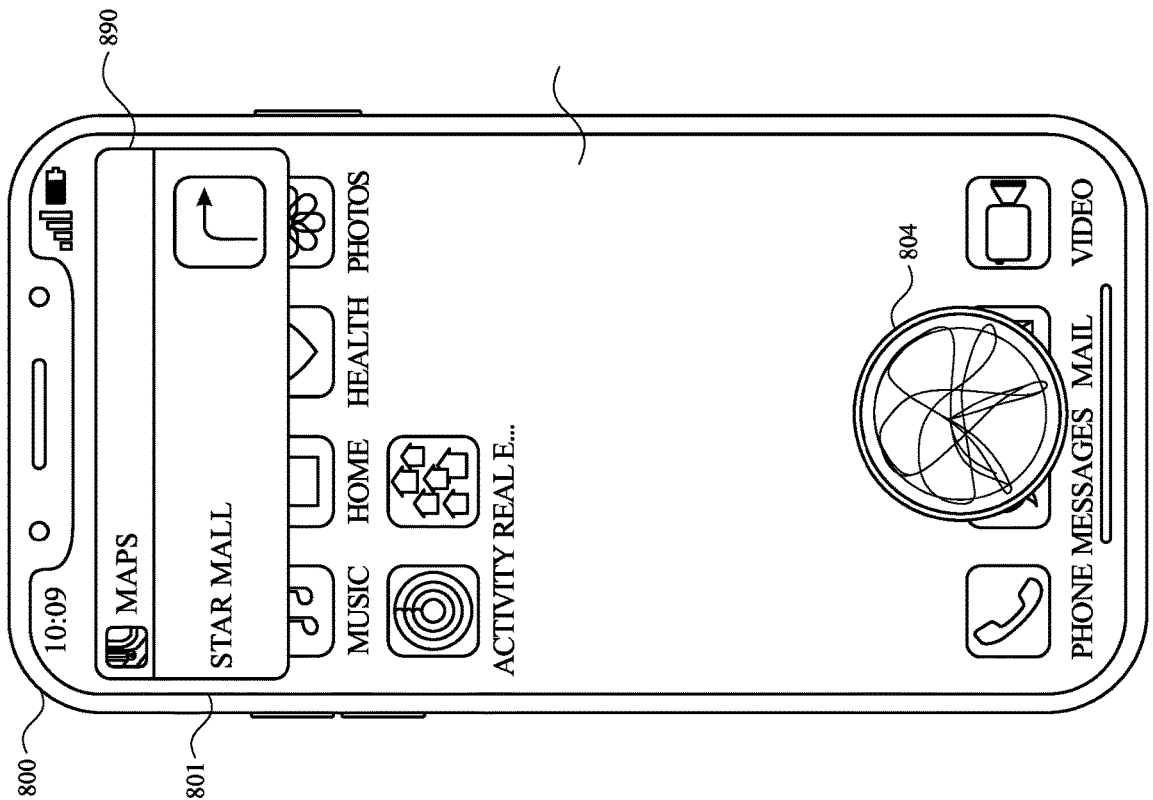

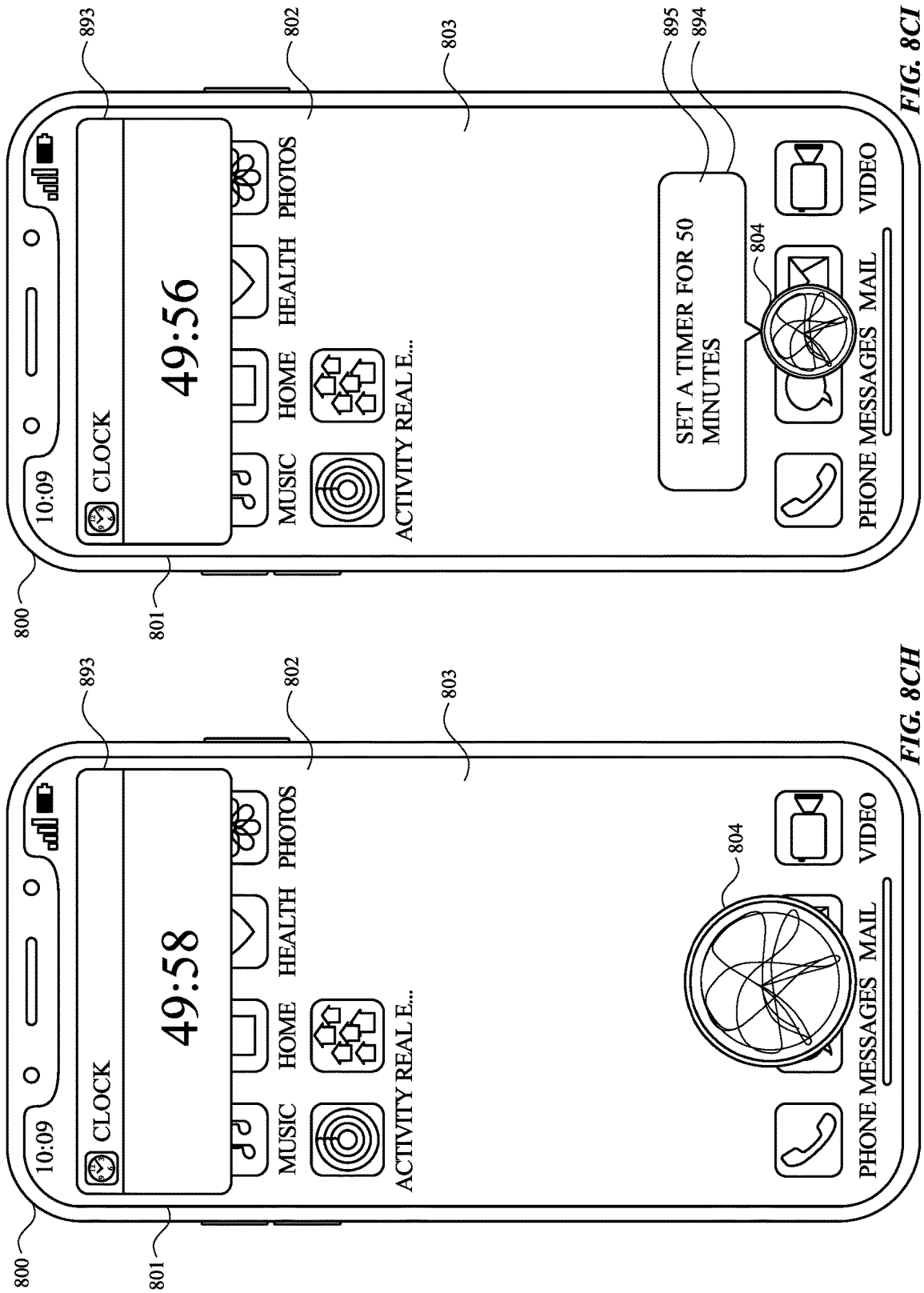

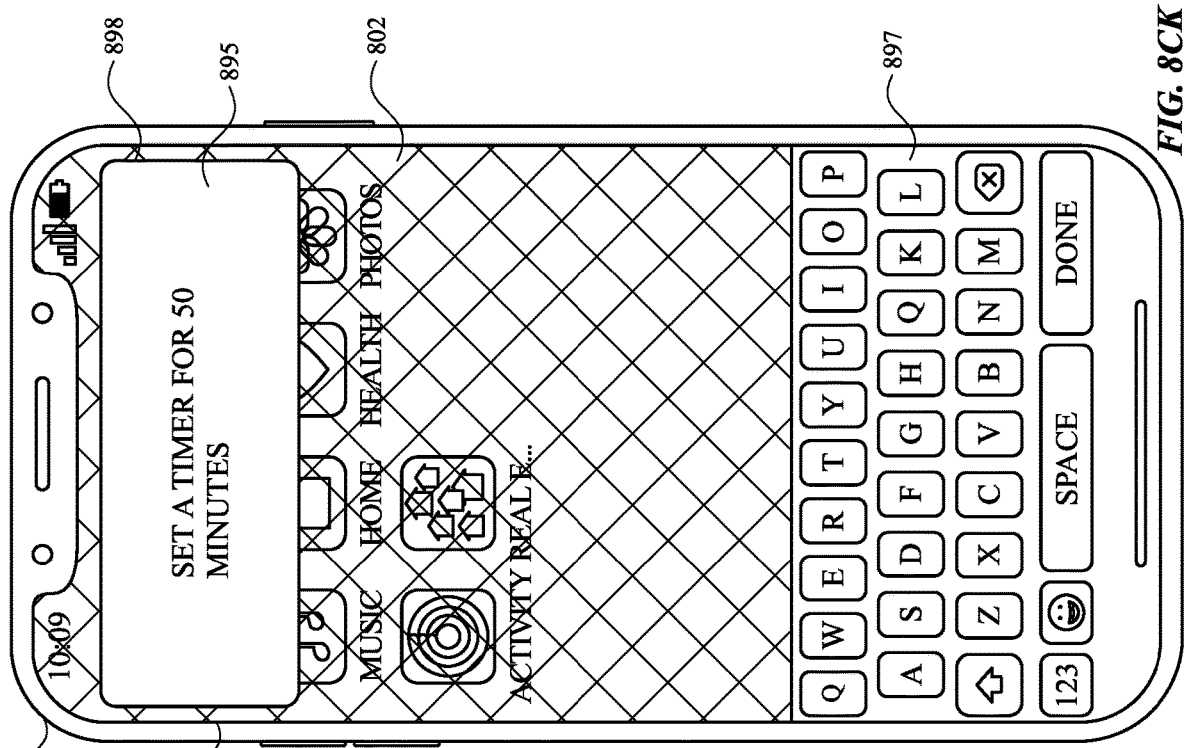
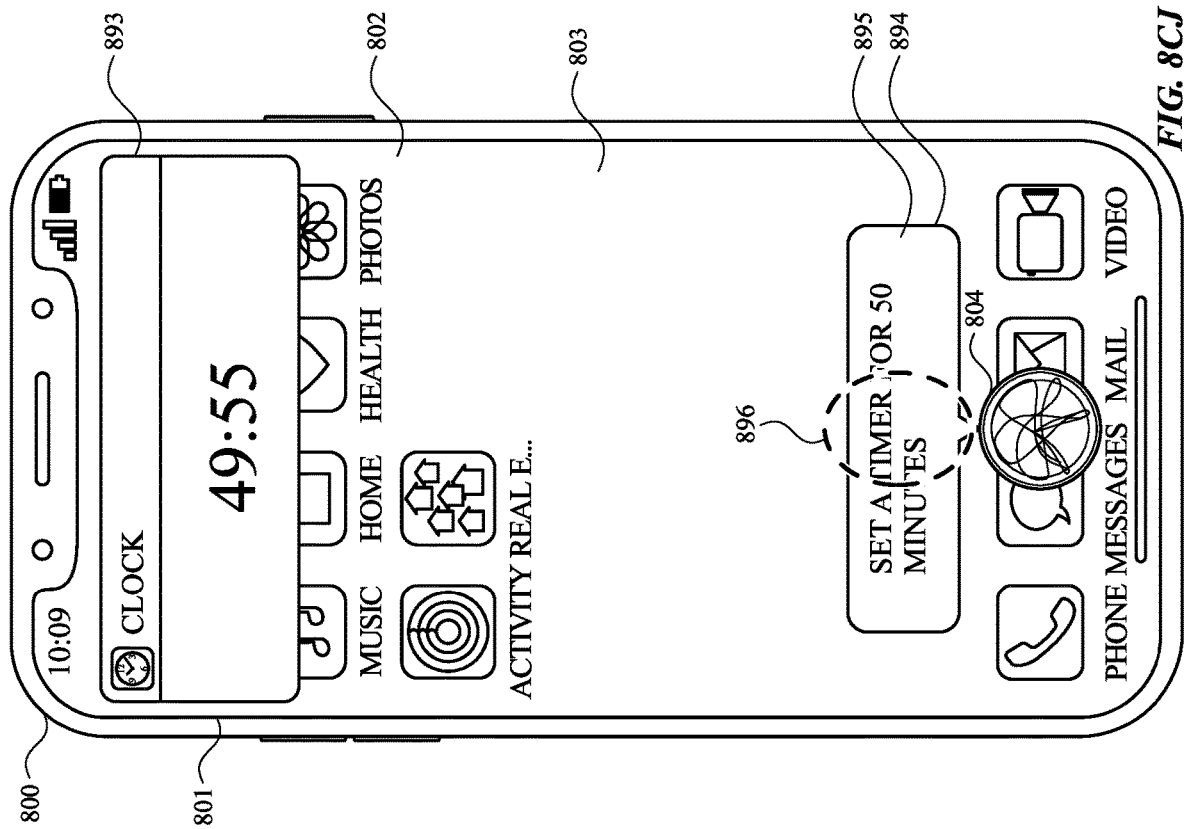
FIG. 8CJ
FIG. 8CK

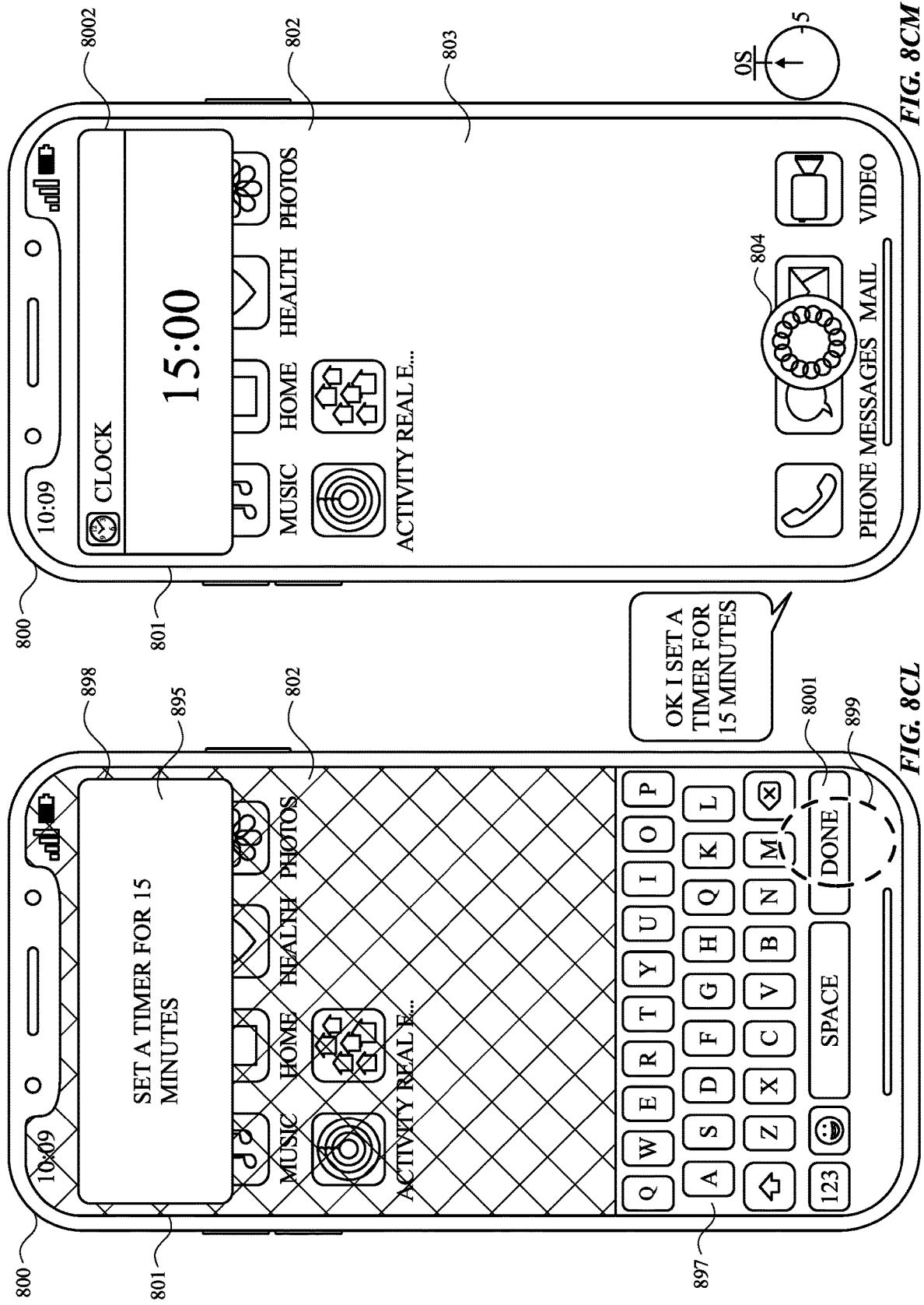

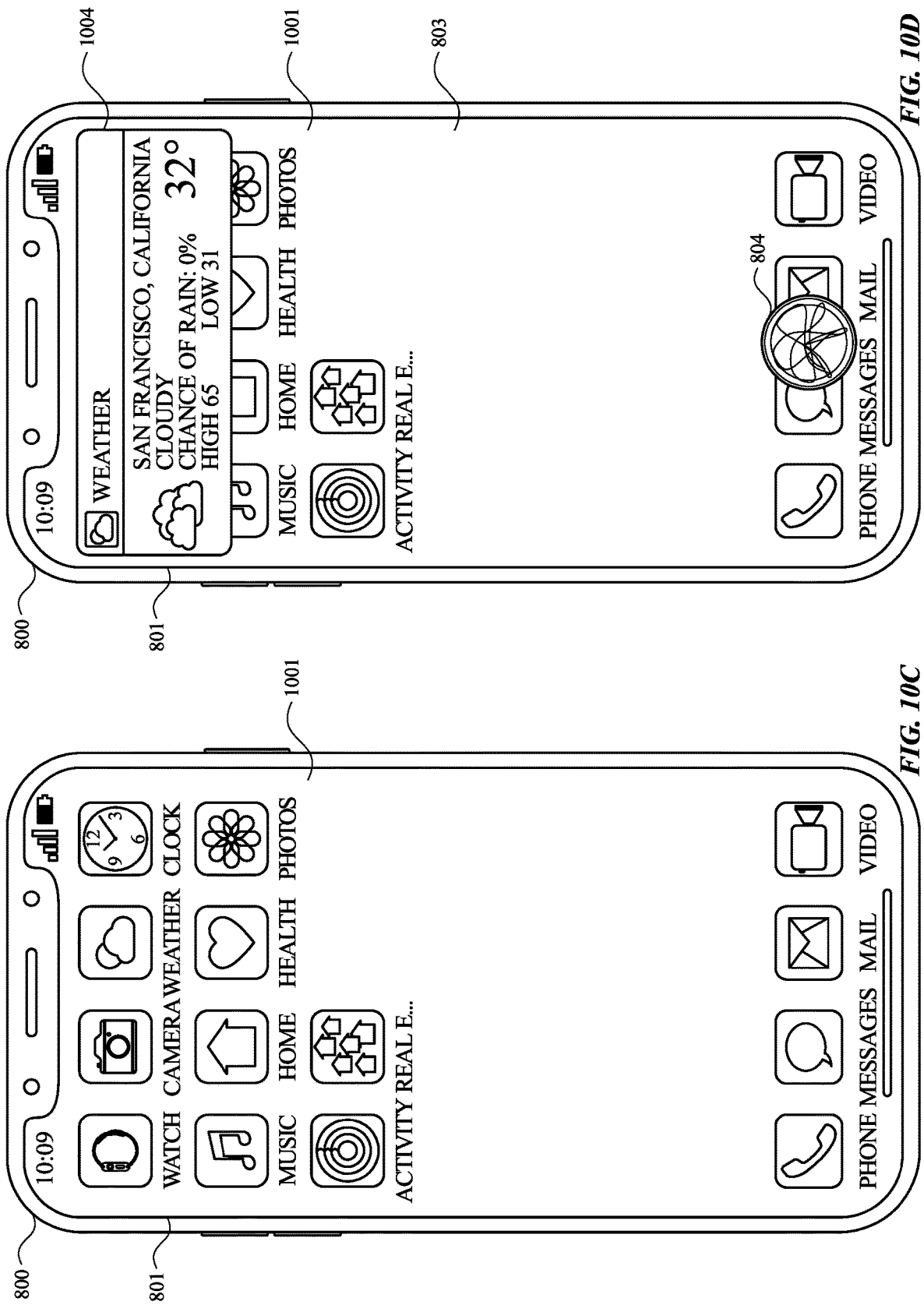

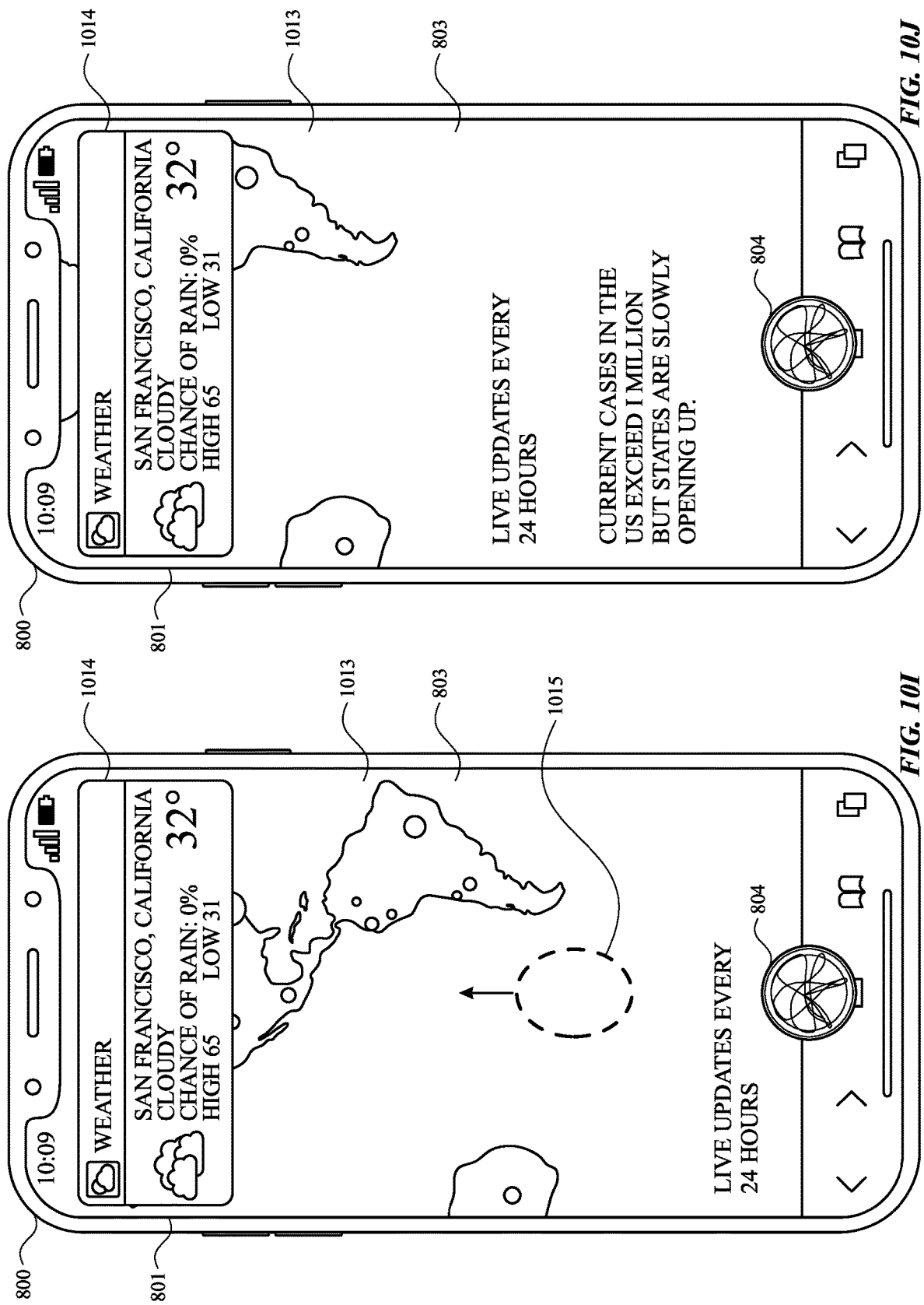

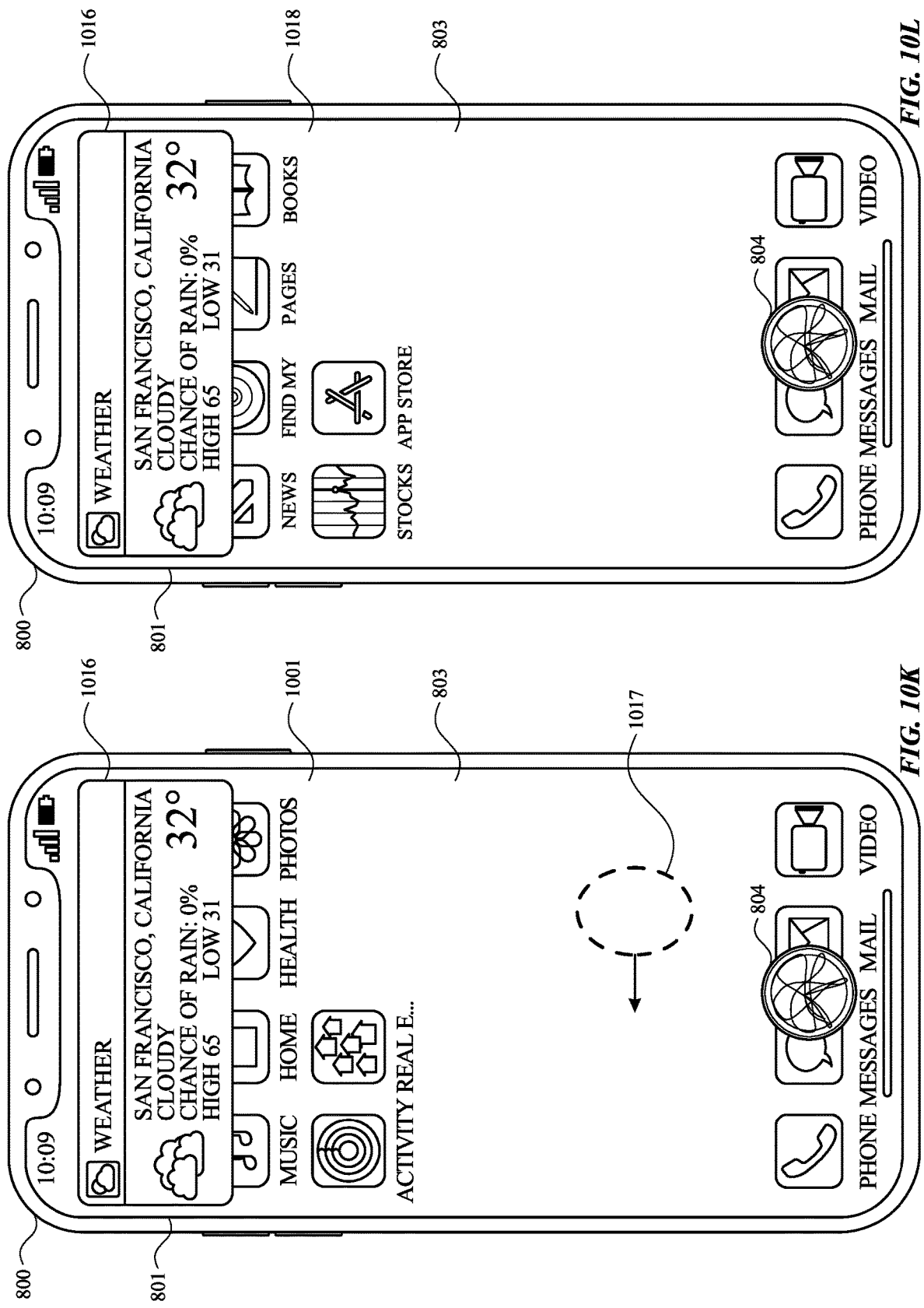

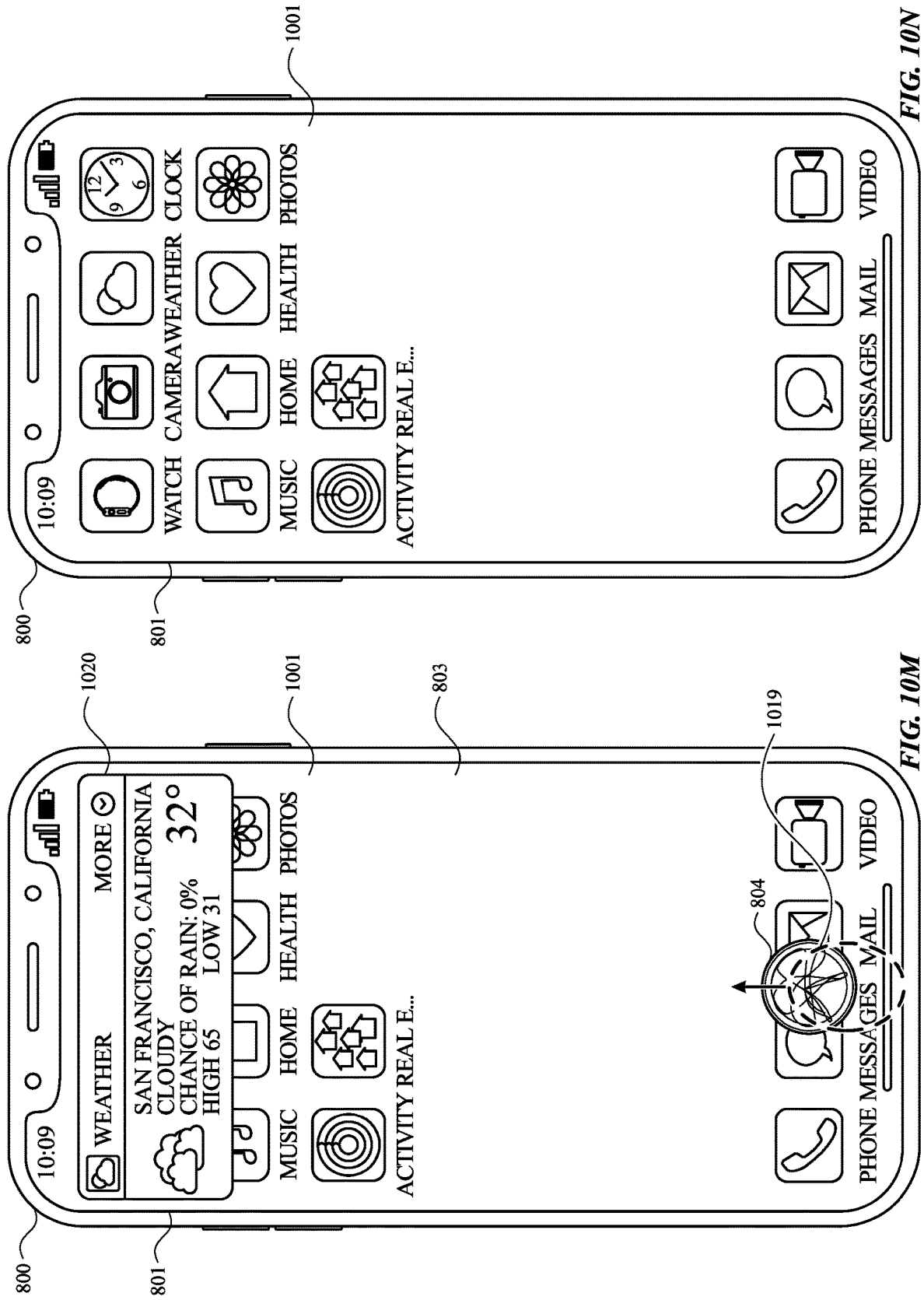

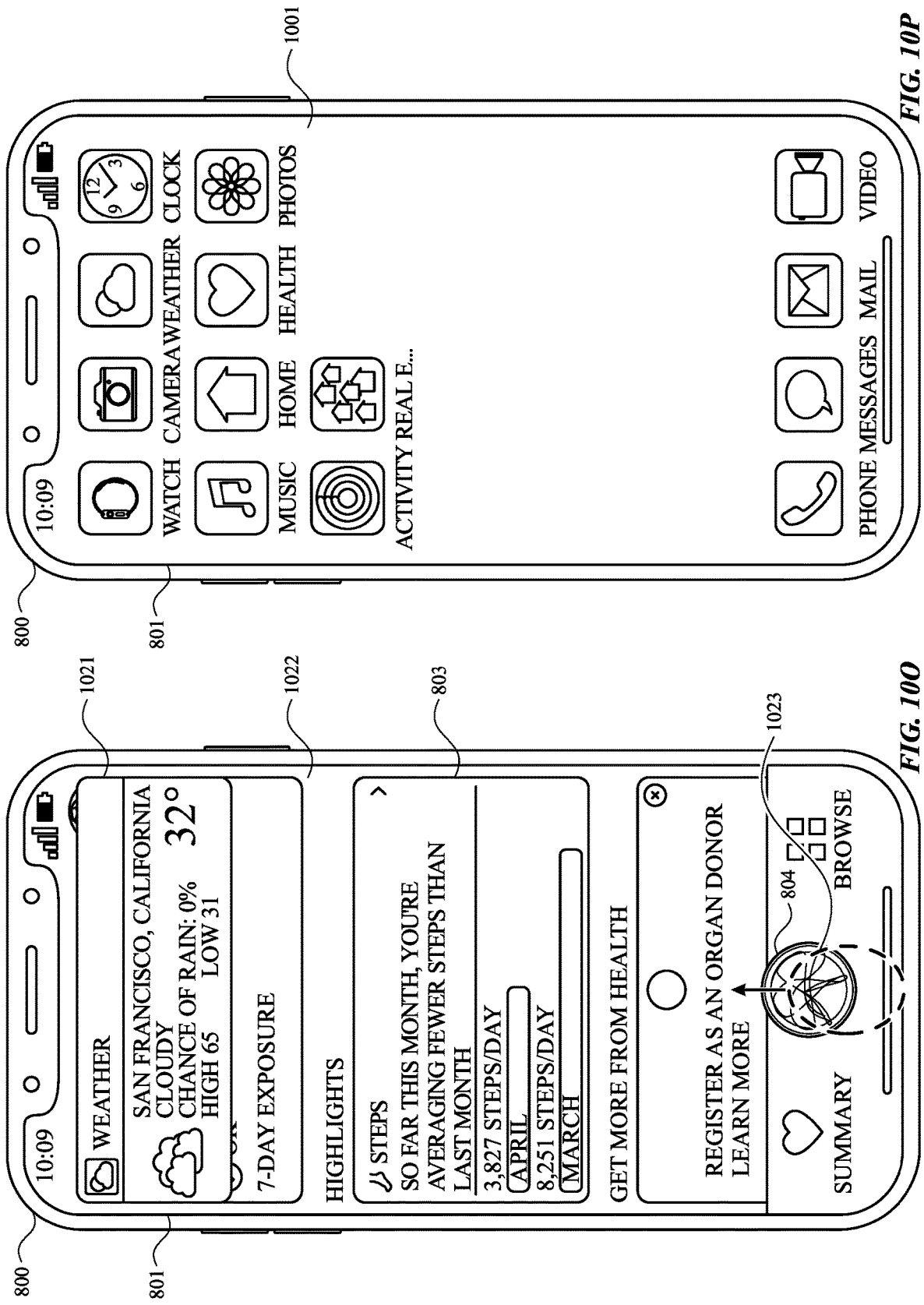

1700

```
┌─────────────────────────────────────────────────────────────┐
│ WHILE DISPLAYING A USER INTERFACE DIFFERENT FROM A DIGITAL  │─ 1701
│     ASSISTANT USER INTERFACE, RECEIVE A USER INPUT          │
└─────────────────────────────────────────────────────────────┘
                              ↓
┌─────────────────────────────────────────────────────────────┐
│ IN ACCORDANCE WITH A DETERMINATION THAT THE USER INPUT      │
│  SATISFIES A CRITERION FOR INITIATING A DIGITAL ASSISTANT:  │
│ DISPLAY, OVER THE USER INTERFACE, THE DIGITAL ASSISTANT USER│
│   INTERFACE, THE DIGITAL ASSISTANT USER INTERFACE INCLUDING:│─ 1702
│ A DIGITAL ASSISTANT INDICATOR DISPLAYED AT A FIRST PORTION OF│
│   THE DISPLAY; AND A RESPONSE AFFORDANCE DISPLAYED AT A     │
│ SECOND PORTION OF THE DISPLAY, WHERE A PORTION OF THE USER  │
│ INTERFACE REMAINS VISIBLE AT A THIRD PORTION OF THE DISPLAY │
└─────────────────────────────────────────────────────────────┘
                              ↓
┌─────────────────────────────────────────────────────────────┐
│ WHILE DISPLAYING THE OVER THE USER INTERFACE, THE DIGITAL   │
│  ASSISTANT USER INTERFACE, RECEIVE A SECOND USER INPUT      │─ 1703
│   CORRESPONDING TO A SELECTION OF THE RESPONSE AFFORDANCE   │
└─────────────────────────────────────────────────────────────┘
                              ↓
┌─────────────────────────────────────────────────────────────┐
│ IN RESPONSE TO RECEIVING THE SECOND USER INPUT, REPLACE THE │
│  DISPLAY OF THE RESPONSE AFFORDANCE IN THE FIRST STATE WITH │─ 1704
│     A DISPLAY OF THE RESPONSE AFFORDANCE IN A SECOND STATE  │
└─────────────────────────────────────────────────────────────┘
                              ↓
┌─────────────────────────────────────────────────────────────┐
│   WHILE DISPLAYING THE RESPONSE AFFORDANCE IN THE SECOND    │
│ STATE, RECEIVE A THIRD USER INPUT REQUESTING TO DISPLAY THE │─ 1705
│           RESPONSE AFFORDANCE IN THE FIRST STATE            │
└─────────────────────────────────────────────────────────────┘
                              ↓
┌─────────────────────────────────────────────────────────────┐
│ IN RESPONSE TO RECEIVING THE THIRD USER INPUT, REPLACE THE  │
│ DISPLAY OF THE RESPONSE AFFORDANCE IN THE SECOND STATE      │─ 1706
│ WITH THE DISPLAY OF THE RESPONSE AFFORDANCE IN THE FIRST    │
│                          STATE                              │
└─────────────────────────────────────────────────────────────┘
                              ↓
┌─────────────────────────────────────────────────────────────┐
│   WHILE DISPLAYING THE RESPONSE AFFORDANCE IN THE SECOND    │
│    STATE, RECEIVE A FOURTH USER INPUT CORRESPONDING TO A    │─ 1707
│           SELECTION OF THE RESPONSE AFFORDANCE              │
└─────────────────────────────────────────────────────────────┘
                              ↓
                             (A)
```

```
┌─────────────────────────────────────────────────────────────┐
│ DISPLAY A DIGITAL ASSISTANT USER INTERFACE OVER A USER      │
│ INTERFACE, THE DIGITAL ASSISTANT USER INTERFACE INCLUDING:  │─ 1801
│ A DIGITAL ASSISTANT INDICATOR DISPLAYED AT A FIRST PORTION OF│
│ THE DISPLAY; AND A RESPONSE AFFORDANCE DISPLAYED AT A       │
│ SECOND PORTION OF THE DISPLAY                               │
└─────────────────────────────────────────────────────────────┘
                              ↓
┌─────────────────────────────────────────────────────────────┐
│ WHILE DISPLAYING THE DIGITAL ASSISTANT USER INTERFACE OVER  │
│ THE USER INTERFACE, RECEIVE A USER INPUT CORRESPONDING TO   │─ 1802
│ A SELECTION OF A THIRD PORTION OF THE DISPLAY, THE THIRD    │
│ PORTION DISPLAYING A PORTION OF THE USER INTERFACE          │
└─────────────────────────────────────────────────────────────┘
                              ↓
┌─────────────────────────────────────────────────────────────┐
│ IN ACCORDANCE WITH A DETERMINATION THAT THE USER INPUT      │─ 1803
│ CORRESPONDS TO A FIRST TYPE OF INPUT: CEASE TO DISPLAY THE  │
│ DIGITAL ASSISTANT INDICATOR AND THE RESPONSE AFFORDANCE     │
│  ┌───────────────────────────────────────────────────────┐  │
│  │ REPLACE THE DISPLAY OF THE DIGITAL ASSISTANT          │─ 1804
│  │ INDICATOR WITH A DISPLAY OF A FIRST PORTION OF THE USER│ │
│  │ INTERFACE AT THE FIRST PORTION OF THE DISPLAY         │  │
│  └───────────────────────────────────────────────────────┘  │
│                              ↓                              │
│  ┌───────────────────────────────────────────────────────┐  │
│  │ REPLACE THE DISPLAY OF THE RESPONSE AFFORDANCE WITH   │─ 1805
│  │ A DISPLAY OF A SECOND PORTION OF THE USER INTERFACE AT│  │
│  │ THE SECOND PORTION OF THE DISPLAY                     │  │
│  └───────────────────────────────────────────────────────┘  │
└─────────────────────────────────────────────────────────────┘
                              ↓
┌─────────────────────────────────────────────────────────────┐
│ IN ACCORDANCE WITH A DETERMINATION THAT THE USER INPUT      │─ 1806
│ CORRESPONDS TO THE FIRST TYPE OF INPUT: DISPLAY A USER      │
│ INTERFACE CORRESPONDING TO THE SELECTABLE ELEMENT           │
│  ┌───────────────────────────────────────────────────────┐  │
│  │ REPLACE THE DISPLAY OF THE PORTION OF THE USER        │  │
│  │ INTERFACE, THE DISPLAY OF THE RESPONSE AFFORDANCE,    │─ 1807
│  │ AND THE DISPLAY OF THE DIGITAL ASSISTANT INDICATOR    │  │
│  │ WITH A DISPLAY OF THE USER INTERFACE CORRESPONDING    │  │
│  │ TO THE SELECTABLE ELEMENT                             │  │
│  └───────────────────────────────────────────────────────┘  │
└─────────────────────────────────────────────────────────────┘
                              ↓
                             (A)
```

*FIG. 18A*

DIGITAL ASSISTANT USER INTERFACES AND RESPONSE MODES

CROSS-REFERENCE TO RELATED APPLICATIONS

This application claims priority to U.S. Provisional Application No. 63/028,821, filed May 22, 2020, entitled "DIGITAL ASSISTANT USER INTERFACES AND RESPONSE MODES," to Denmark Patent Application No. PA 2020 70547, filed Aug. 24, 2020, entitled "DIGITAL ASSISTANT USER INTERFACES AND RESPONSE MODES," and to Denmark Patent Application No. PA 2020 70548, filed Aug. 24, 2020, entitled "DIGITAL ASSISTANT USER INTERFACES AND RESPONSE MODES." The entire contents of each of these applications are hereby incorporated by reference.

FIELD

This relates generally to intelligent automated assistants and, more specifically, to user interfaces for intelligent automated assistants and to the manners in which an intelligent automated assistant may respond to a user request.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

A displayed user interface of a digital assistant sometimes obscures other displayed elements that may be of user interest. Further, digital assistants may sometimes provide responses in a format undesirable for a user's current context. For example, a digital assistant may provide displayed output when a user does not desire to (or is unable to) view a device display.

SUMMARY

Example methods are disclosed herein. An example method includes, at an electronic device with a display and a touch-sensitive surface: while displaying a user interface different from a digital assistant user interface, receiving a user input; in accordance with a determination that the user input satisfies a criterion for initiating a digital assistant: displaying, over the user interface, the digital assistant user interface, the digital assistant user interface including: a digital assistant indicator displayed at a first portion of the display; and a response affordance displayed at a second portion of the display, wherein: a portion of the user interface remains visible at a third portion of the display; and the third portion is between the first portion and the second portion.

Example non-transitory computer-readable media are disclosed herein. An example non-transitory computer-readable storage medium stores one or more programs. The one or more programs comprise instructions, which when executed by one or more processors of an electronic device with a display and a touch-sensitive surface, cause the electronic device to: while displaying a user interface different from a digital assistant user interface, receive a user input; in accordance with a determination that the user input satisfies a criterion for initiating a digital assistant: display, over the user interface, the digital assistant user interface, the digital assistant user interface including: a digital assistant indicator displayed at a first portion of the display; and a response affordance displayed at a second portion of the display, wherein: a portion of the user interface remains visible at a third portion of the display; and the third portion is between the first portion and the second portion.

Example electronic devices are disclosed herein. An example electronic device comprises a display; a touch-sensitive surface; one or more processors; a memory; and one or more programs, where the one or more programs are stored in the memory and configured to be executed by the one or more processors, the one or more programs including instructions for: while displaying a user interface different from a digital assistant user interface, receiving a user input; in accordance with a determination that the user input satisfies a criterion for initiating a digital assistant: displaying, over the user interface, the digital assistant user interface, the digital assistant user interface including: a digital assistant indicator displayed at a first portion of the display; and a response affordance displayed at a second portion of the display, wherein: a portion of the user interface remains visible at a third portion of the display; and the third portion is between the first portion and the second portion.

An example electronic device comprises means for: while displaying a user interface different from a digital assistant user interface, receiving a user input; in accordance with a determination that the user input satisfies a criterion for initiating a digital assistant: displaying, over the user interface, the digital assistant user interface, the digital assistant user interface including: a digital assistant indicator displayed at a first portion of the display; and a response affordance displayed at a second portion of the display, wherein: a portion of the user interface remains visible at a third portion of the display; and the third portion is between the first portion and the second portion.

Displaying a digital assistant user interface over a user interface, where a portion of the user interface remains visible at a portion of a display may improve the usefulness of the digital assistant and reduce the digital assistant's visual disruption to the user-device interaction. For example, information included in the underlying visible user interface may allow a user to better formulate a request to the digital assistant. As another example, displaying the user interfaces in such manner may facilitate interaction between elements of the digital assistant user interface and the underlying user interface (e.g., including a digital assistant response in a message of an underlying messaging user interface). Further, having both a digital assistant user interface and an underlying user interface co-exist on a display allows simultaneous user interaction with both user interfaces, thereby better integrating the digital assistant into the user-device interaction. In this manner, the user-device interface may be more efficient (e.g., by enabling the digital assistant to more accurately and efficiently perform user requested tasks, by reducing the digital assistant's visual disruption to what a user is viewing, by reducing the number of user inputs required to operate the device as desired), which additionally reduces power usage and improves battery life of the device by enabling the user to use the device more quickly and efficiently.

Example methods are disclosed herein. An example method includes, at an electronic device with a display and a touch-sensitive surface: displaying a digital assistant user interface over a user interface, the digital assistant user interface including: a digital assistant indicator displayed at a first portion of the display; and a response affordance displayed at a second portion of the display; while displaying the digital assistant user interface over the user interface, receiving a user input corresponding to a selection of a third portion of the display, the third portion displaying a portion of the user interface; in accordance with a determination that the user input corresponds to a first type of input: ceasing to display the digital assistant indicator and the response affordance; and in accordance with a determination that the user input corresponds to a second type of input different from the first type of input: updating the display of the user interface at the third portion according to the user input while displaying the response affordance at the second portion.

Example non-transitory computer-readable media are disclosed herein. An example non-transitory computer-readable storage medium stores one or more programs. The one or more programs comprise instructions, which when executed by one or more processors of an electronic device with a display and a touch-sensitive surface, cause the electronic device to: display a digital assistant user interface over a user interface, the digital assistant user interface including: a digital assistant indicator displayed at a first portion of the display; and a response affordance displayed at a second portion of the display; while displaying the digital assistant user interface over the user interface, receive a user input corresponding to a selection of a third portion of the display, the third portion displaying a portion of the user interface; in accordance with a determination that the user input corresponds to a first type of input: cease to display the digital assistant indicator and the response affordance; and in accordance with a determination that the user input corresponds to a second type of input different from the first type of input: update the display of the user interface at the third portion according to the user input while displaying the response affordance at the second portion.

Example electronic devices are disclosed herein. An example electronic device comprises a display; a touch-sensitive surface; one or more processors; a memory; and one or more programs, where the one or more programs are stored in the memory and configured to be executed by the one or more processors, the one or more programs including instructions for: displaying a digital assistant user interface over a user interface, the digital assistant user interface including: a digital assistant indicator displayed at a first portion of the display; and a response affordance displayed at a second portion of the display; while displaying the digital assistant user interface over the user interface, receiving a user input corresponding to a selection of a third portion of the display, the third portion displaying a portion of the user interface; in accordance with a determination that the user input corresponds to a first type of input: ceasing to display the digital assistant indicator and the response affordance; and in accordance with a determination that the user input corresponds to a second type of input different from the first type of input: updating the display of the user interface at the third portion according to the user input while displaying the response affordance at the second portion.

An example electronic device comprises means for: displaying a digital assistant user interface over a user interface, the digital assistant user interface including: a digital assistant indicator displayed at a first portion of the display; and a response affordance displayed at a second portion of the display; while displaying the digital assistant user interface over the user interface, receiving a user input corresponding to a selection of a third portion of the display, the third portion displaying a portion of the user interface; in accordance with a determination that the user input corresponds to a first type of input: ceasing to display the digital assistant indicator and the response affordance; and in accordance with a determination that the user input corresponds to a second type of input different from the first type of input: updating the display of the user interface at the third portion according to the user input while displaying the response affordance at the second portion.

Ceasing to display the digital assistant indicator and the response affordance in accordance with a determination that the user input corresponds to the first type of input may provide an intuitive and efficient manner of dismissing a digital assistant. For example, a user may simply provide input selecting the underlying user interface to dismiss the digital assistant user interface, thereby reducing the digital assistant's disruption to the user-device interaction. Updating the display of the user interface at the third portion according to the user input while displaying the response affordance at the second portion provides an intuitive manner for a digital assistant user interface to co-exist with an underlying user interface. For example, a user may provide input selecting the underlying user interface to cause the underlying user interface to update as if the digital assistant user interface were not displayed. Further, preserving the digital assistant user interface (which may include information of user interest) while allowing user interaction with the underlying user interface may reduce the digital assistant's disruption to the underlying user interface. In this manner, the user-device interface may be more efficient (e.g., by allowing user inputs to interact with an underlying user interface while a digital assistant user interface is displayed, by reducing the digital assistant's visual disruption to what a user is viewing, by reducing the number of user inputs required to operate the device as desired), which additionally reduces power usage and improves battery life of the device by enabling the user to use the device more quickly and efficiently.

Example methods are disclosed herein. An example method includes, at an electronic device with one or more processors, a memory, and a display: receiving a natural language input; initiating the digital assistant; in accordance with initiating the digital assistant, obtaining a response package responsive to the natural language input; after receiving the natural language input, selecting, based on context information associated with the electronic device, a first response mode of the digital assistant from a plurality of digital assistant response modes; and in response to selecting the first response mode, presenting, by the digital assistant, the response package according to the first response mode.

Example non-transitory computer-readable media are disclosed herein. An example non-transitory computer-readable storage medium stores one or more programs. The one or more programs comprise instructions, which when executed by one or more processors of an electronic device with a display, cause the electronic device to: receive a natural language input; initiate the digital assistant; in accordance with initiating the digital assistant, obtain a response package responsive to the natural language input; after receiving the natural language input, select, based on context information associated with the electronic device, a first response mode of the digital assistant from a plurality of digital assistant response modes; and in response to selecting the first response mode, present, by the digital assistant, the response package according to the first response mode.

Example electronic devices are disclosed herein. An example electronic device comprises a display; one or more processors; a memory; and one or more programs, where the one or more programs are stored in the memory and configured to be executed by the one or more processors, the one or more programs including instructions for: receiving a natural language input; initiating the digital assistant; in accordance with initiating the digital assistant, obtaining a response package responsive to the natural language input; after receiving the natural language input, selecting, based on context information associated with the electronic device, a first response mode of the digital assistant from a plurality of digital assistant response modes; and in response to selecting the first response mode, presenting, by the digital assistant, the response package according to the first response mode.

An example electronic device comprises means for: receiving a natural language input; initiating the digital assistant; in accordance with initiating the digital assistant, obtaining a response package responsive to the natural language input; after receiving the natural language input, selecting, based on context information associated with the electronic device, a first response mode of the digital assistant from a plurality of digital assistant response modes; and in response to selecting the first response mode, presenting, by the digital assistant, the response package according to the first response mode.

Presenting, by the digital assistant, the response package according to the first response mode may allow presentation of digital assistant responses in an informative manner appropriate for a user's current context. For example, a digital assistant may present responses in an audio format when the user's current context indicates that visual user-device interaction is undesirable (or impossible). As another example, the digital assistant may present responses in a visual format when the user's current context indicates that audible user-device interaction is undesirable. As yet another example, the digital assistant may present responses having a visual component and a concise audio component when the user's current context indicates that both audible and visual user-device interaction is desired, thereby reducing the length of the digital assistant's audio outputs. Further, selecting the first response mode after receiving the natural language input (and before presenting the response package) may allow more accurate determination of the user's current context (and thus more accurate determination of the appropriate response mode). In this manner, the user-device interface may be more efficient and safe (e.g., by reducing a digital assistant's visual disruption, by efficiently presenting responses in an informative manner, by intelligently adapting the manner of response based on a user's current context), which additionally reduces power usage and improves battery life of the device by enabling the user to use the device more quickly and efficiently.

BRIEF DESCRIPTION OF THE DRAWINGS

FIGS. 17A-17F illustrate a process for operating a digital assistant, according to various examples.

FIGS. 18A-18B illustrate a process for operating a digital assistant, according to various examples.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
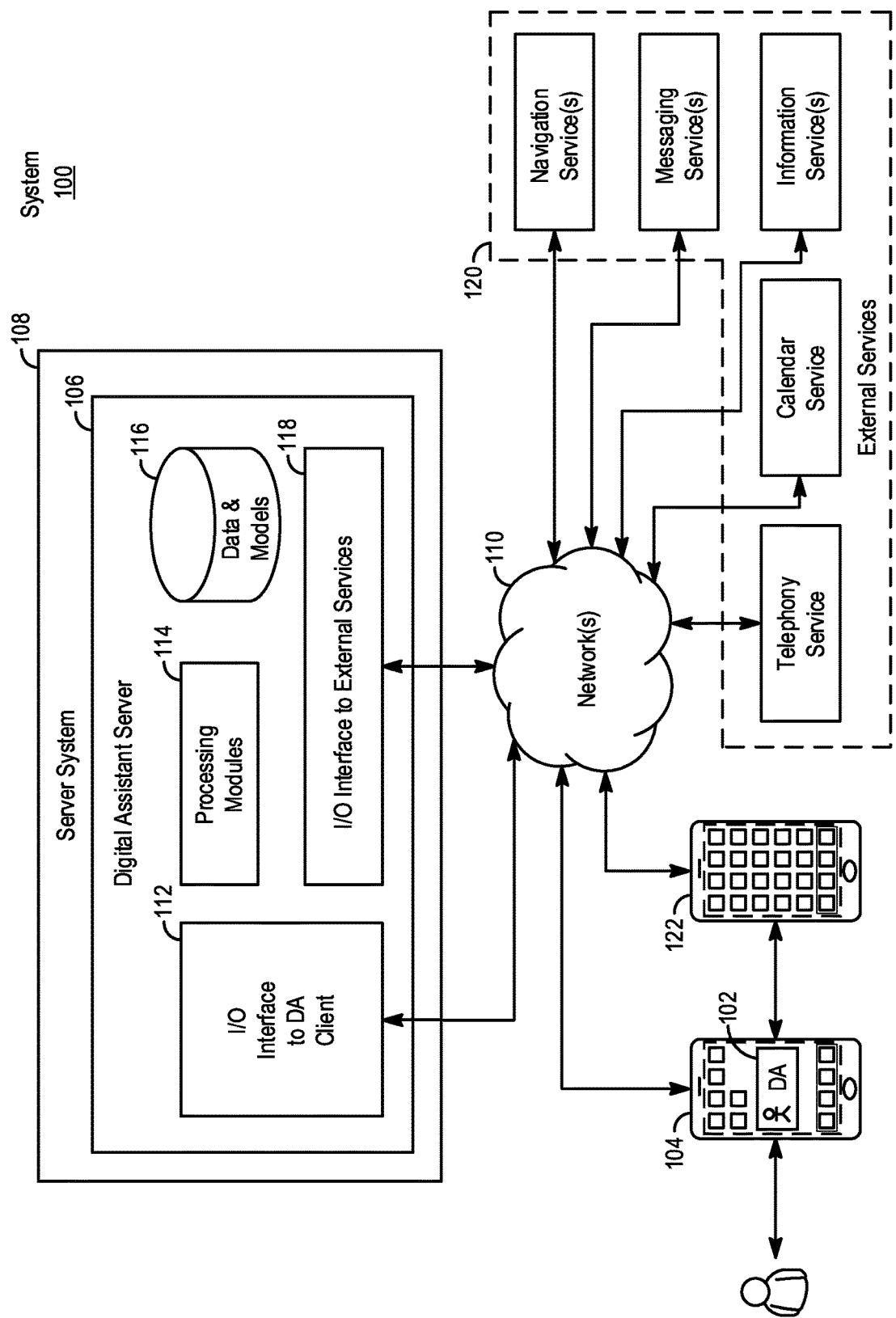
FIG. 1 is a block diagram illustrating a system and environment for implementing a digital assistant, according to various examples.

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-6B.) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, California Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, voice over Internet Protocol (VOW), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-6B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
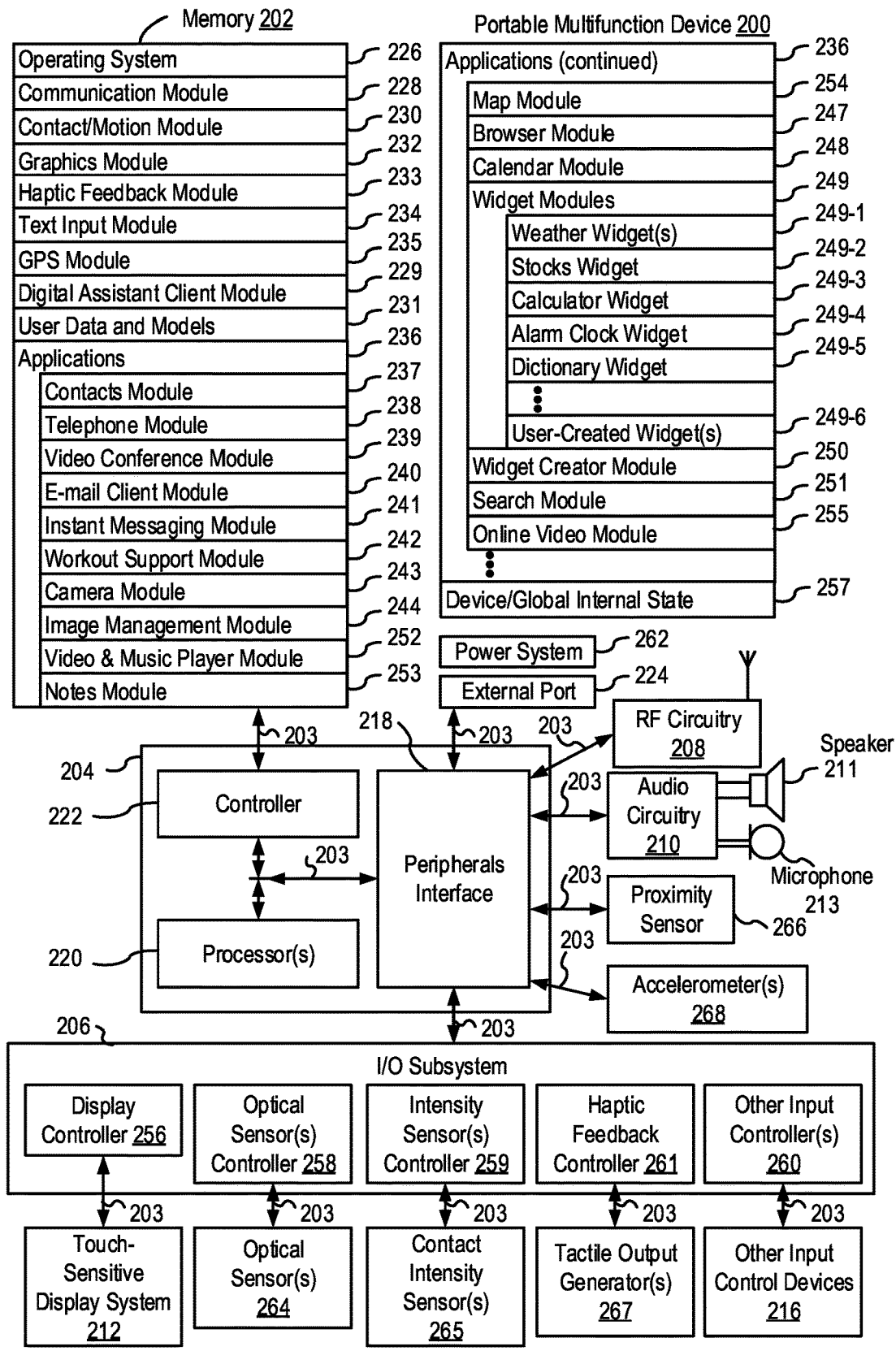
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data. GSM Environment (EDGE), high-speed downlink packet access (HSDPA), high-speed uplink packet access (HSUPA), Evolution, Data-Only (EV-DO), HSPA, HSPA+, HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointe device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 display's visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al), U.S. Pat. No. 6,570,557 (Westerman et al), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737; "Activating Virtual Keys Of A Touch-Screen Virtual Keyboard," filed Sep. 16, 2005; and (9) U.S. patent application Ser. No. 11/367,749 "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housings so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
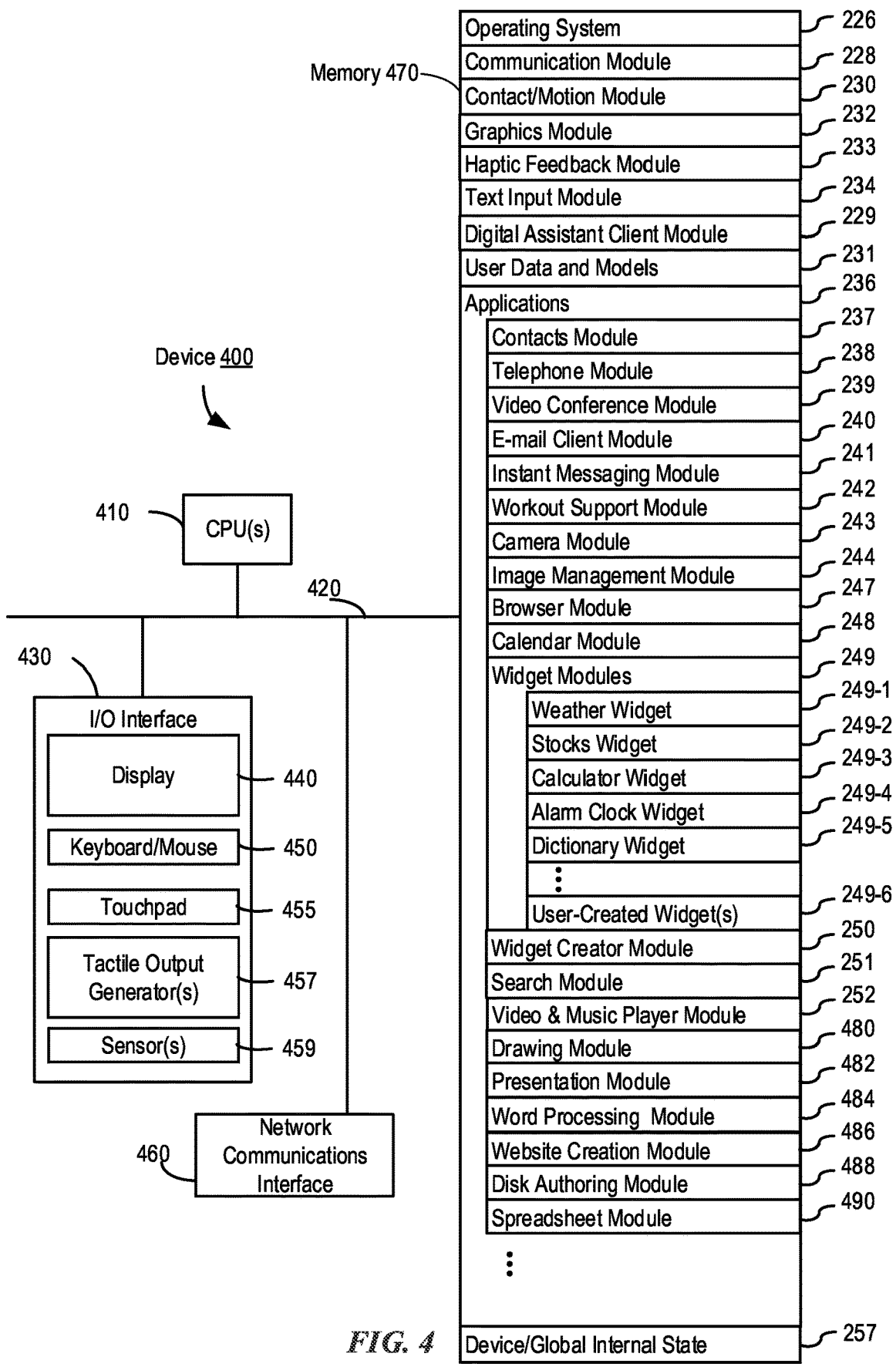
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and trap/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 include the following modules (or sets of instructions), or a subset or superset thereof:
Contacts module 237 (sometimes called an address book or contact list);
Telephone module 238;
Video conference module 239;
E-mail client module 240;
Instant messaging (IM) module 241;
Workout support module 242;
Camera module 243 for still and/or video images;
Image management module 244;
Video player module;
Music player module;
Browser module 247;
Calendar module 248;
Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
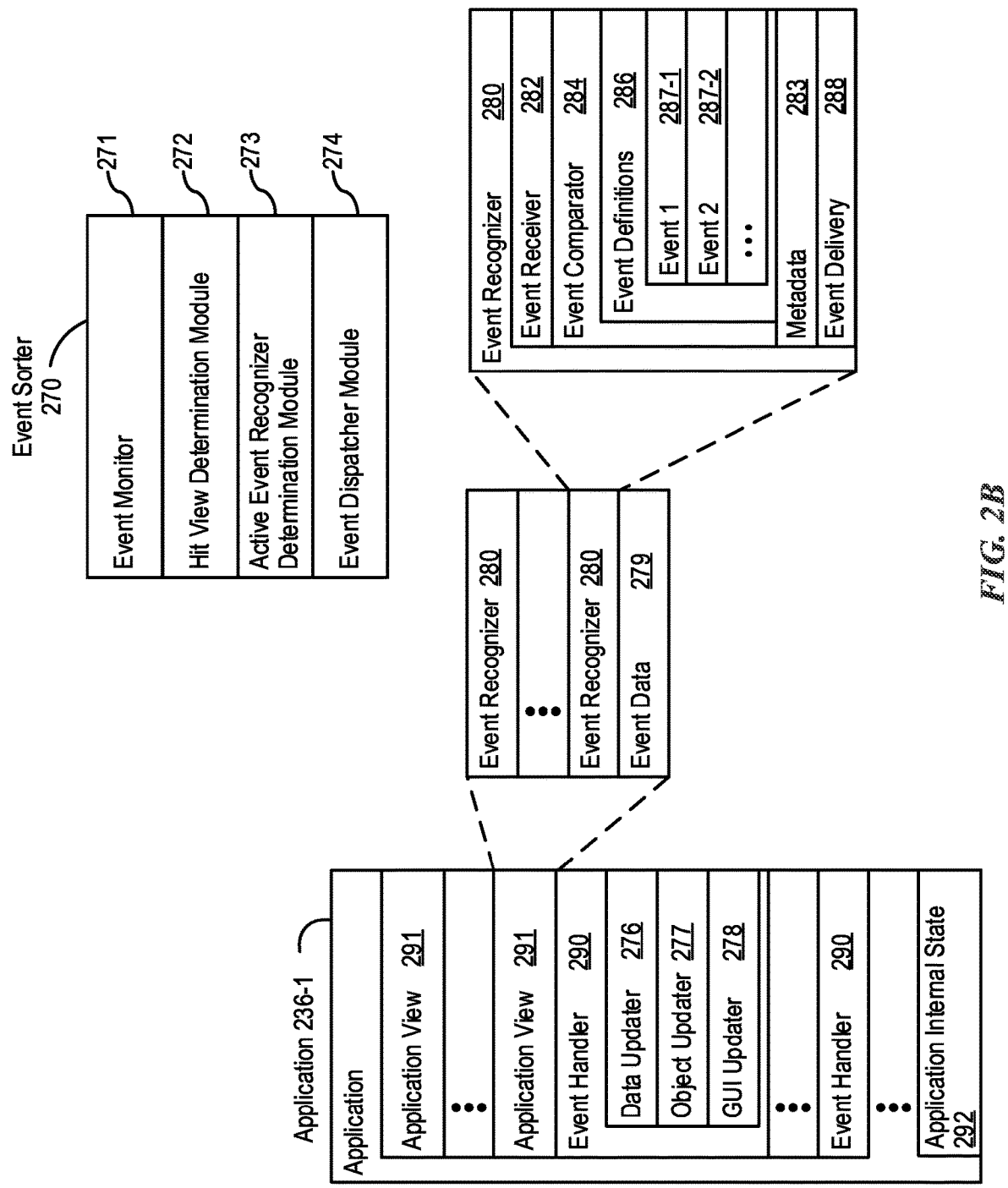
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata. 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
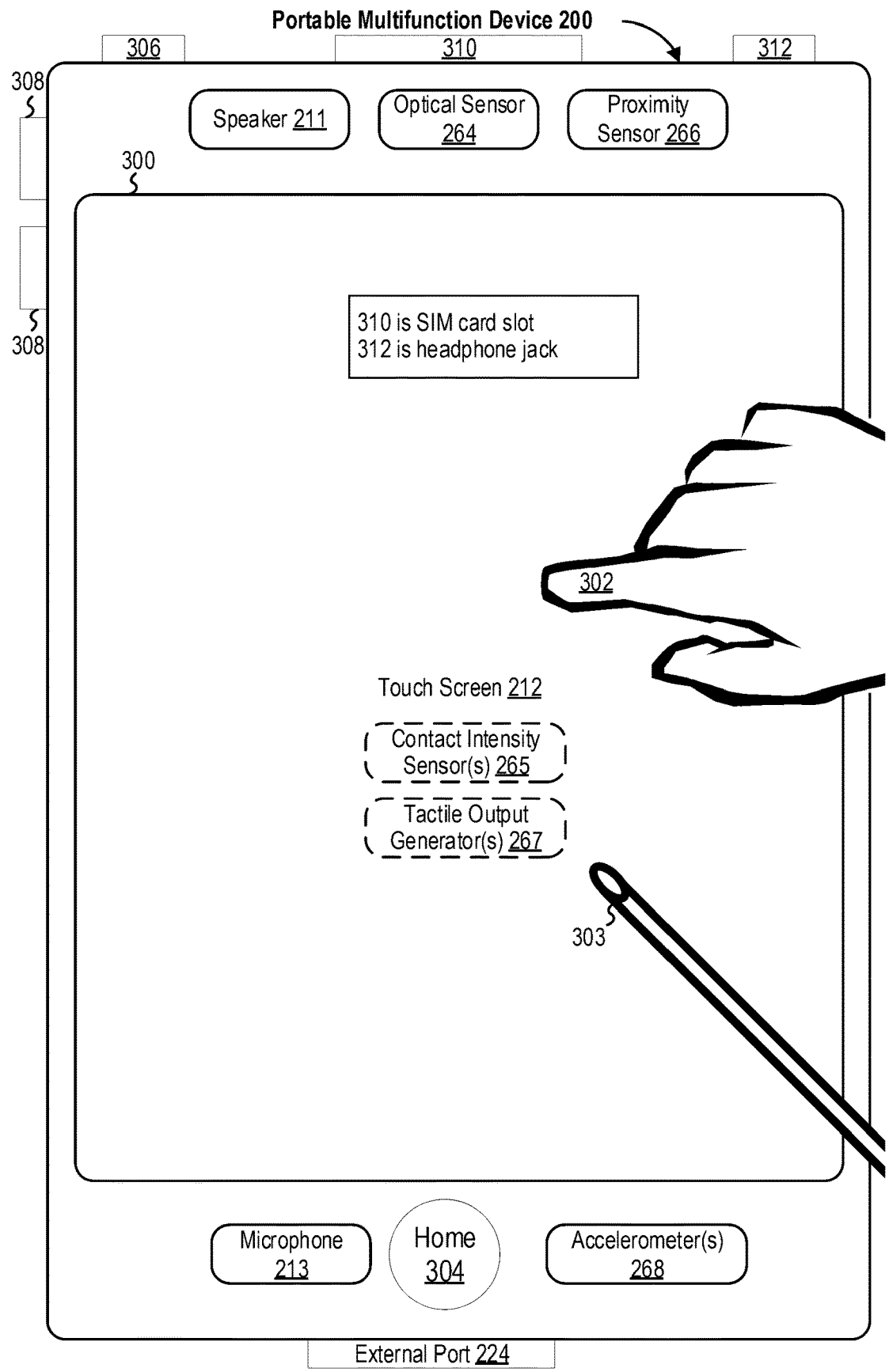
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
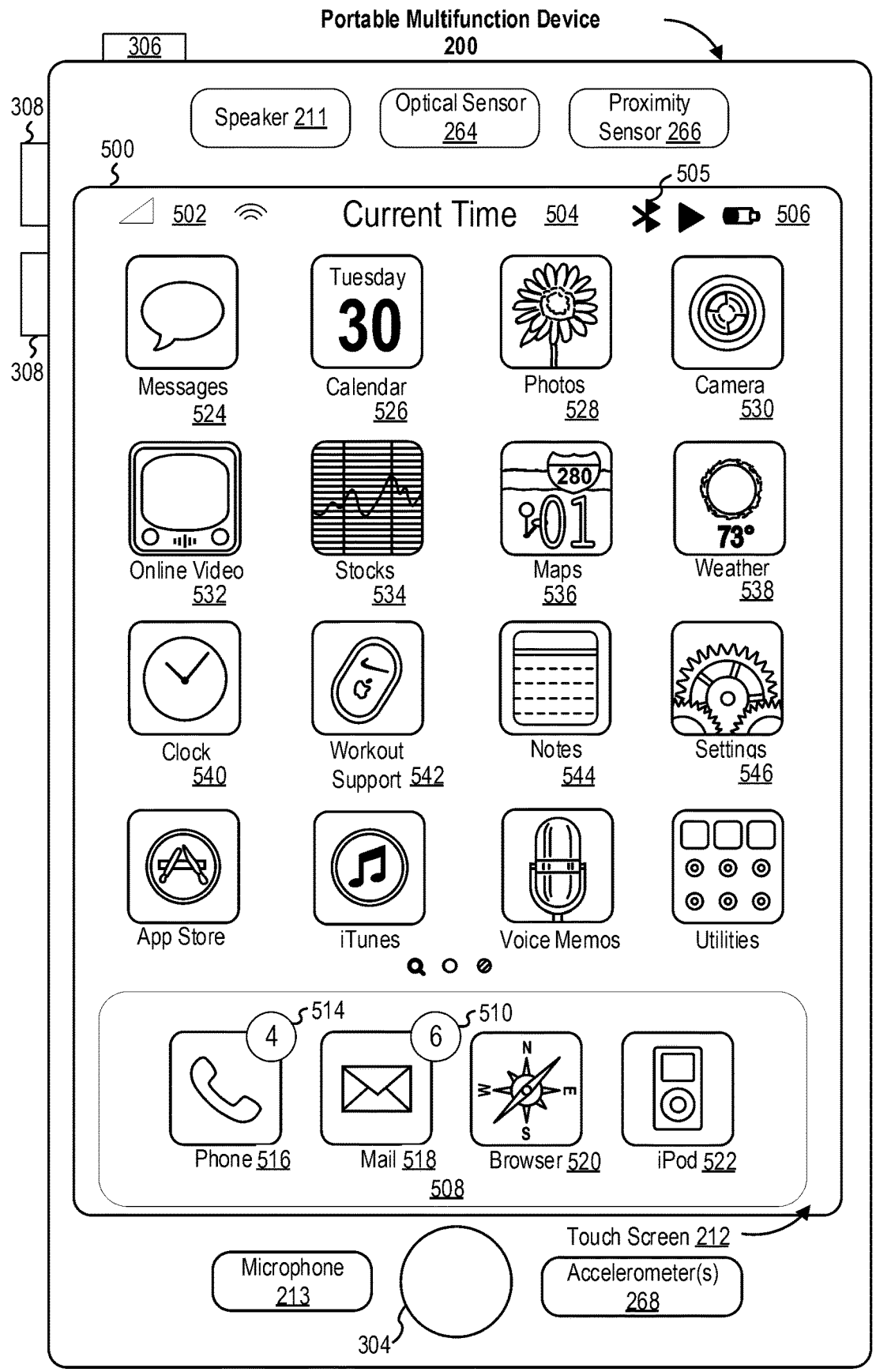
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:
    Icon 516 for telephone module 238, labeled "Phone," which optionally includes an indicator 514 of the number of missed calls or voicemail messages;
    Icon 518 for e-mail client module 240, labeled "Mail," which optionally includes an indicator 510 of the number of unread e-mails;
    Icon 520 for browser module 247, labeled "Browser;" and
    Icon 522 for video and music player module 252, also referred to as iPod (trademark of Apple Inc.) module 252, labeled "iPod;" and
Icons for other applications, such as:
    Icon 524 for IM module 241, labeled "Messages;"
    Icon 526 for calendar module 248, labeled "Calendar;"
    Icon 528 for image management module 244, labeled "Photos;"
    Icon 530 for camera module 243, labeled "Camera,"

Icon 532 for online video module 255, labeled "Online Video;"
Icon 534 for stocks widget 249-2, labeled "Stocks;"
Icon 536 for map module 254, labeled "Maps;"
Icon 538 for weather widget 249-1, labeled "Weather;"
Icon 540 for alarm clock widget 249-4, labeled "Clock;"
Icon 542 for workout support module 242, labeled "Workout Support;"
Icon 544 for notes module 253, labeled "Notes;" and
Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
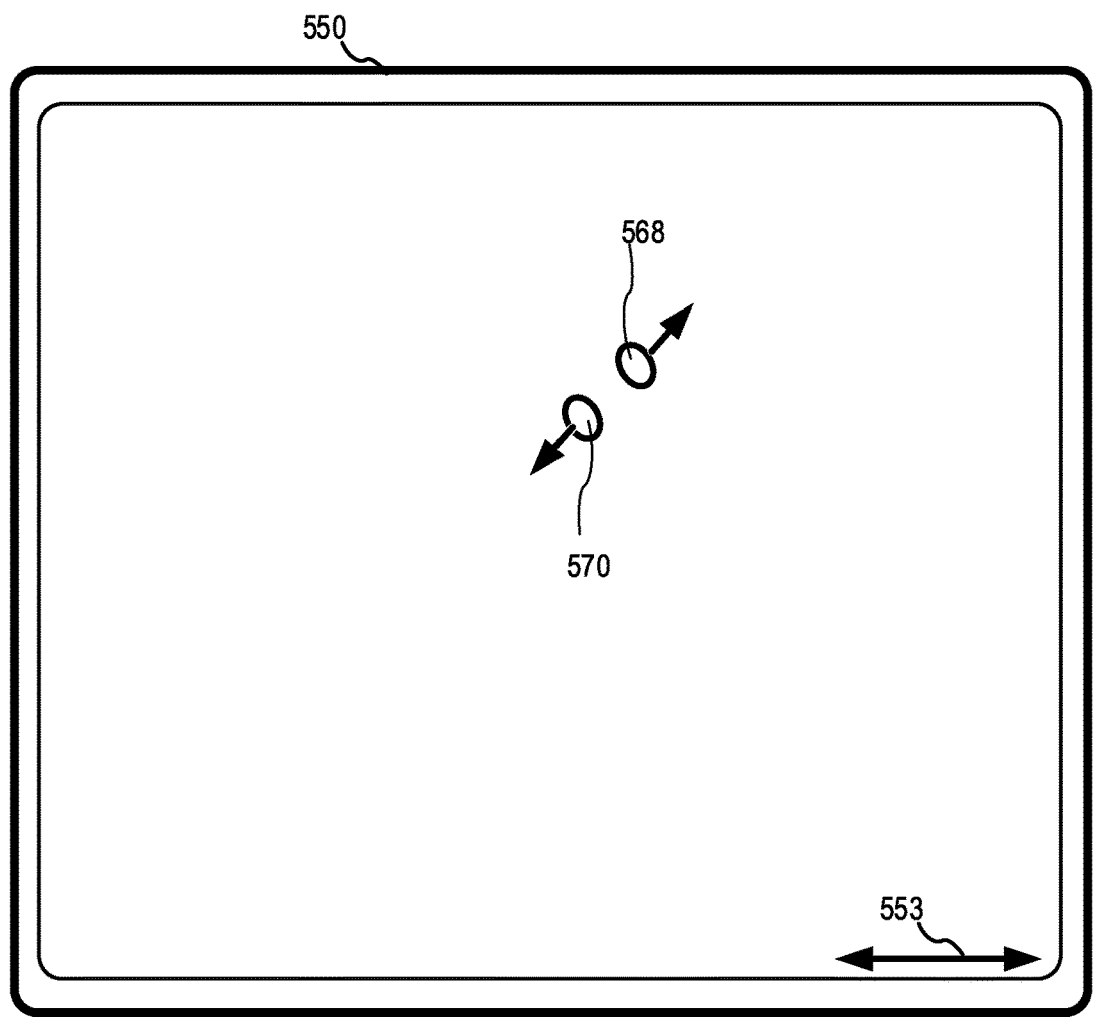
FIG. 5B illustrates an exemplary user interface for a multifunction device with a touch-sensitive surface that is separate from the display, according to various examples.
Figure 5B:
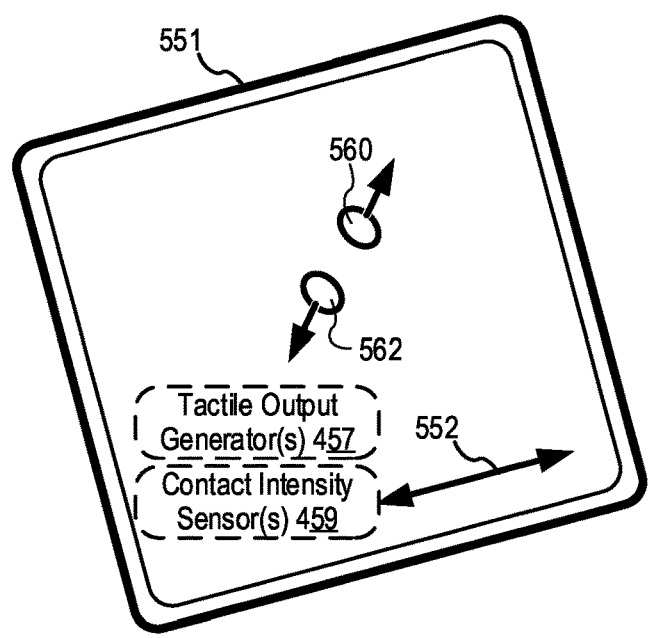

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. SB) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
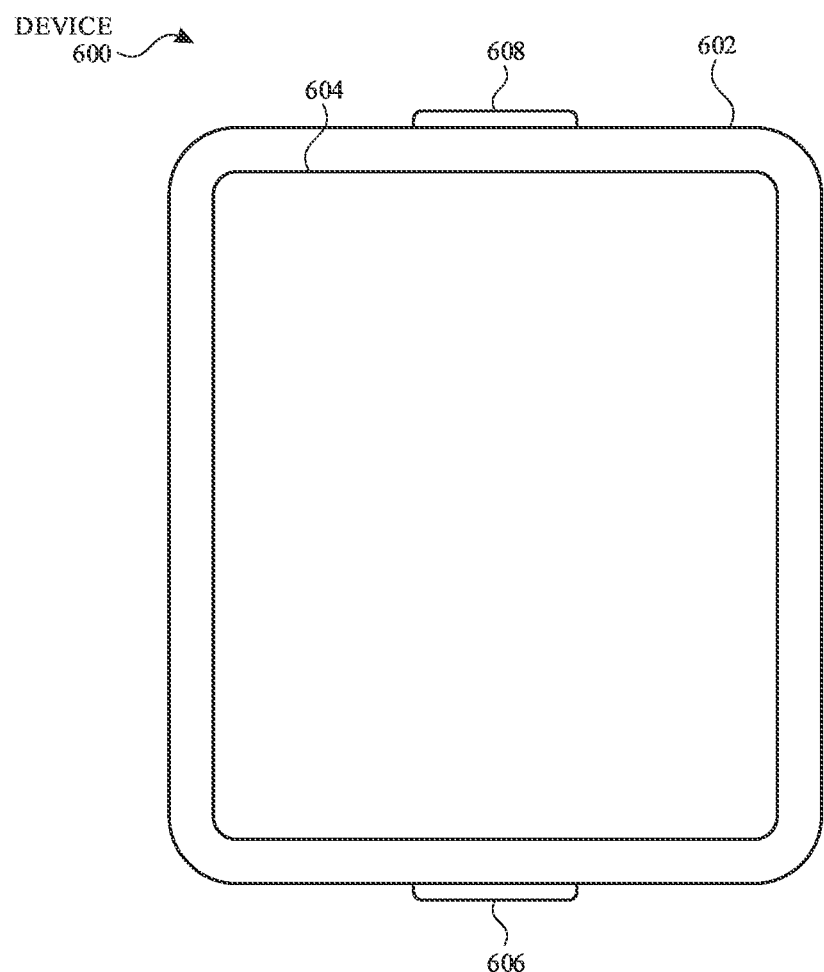
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input, to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
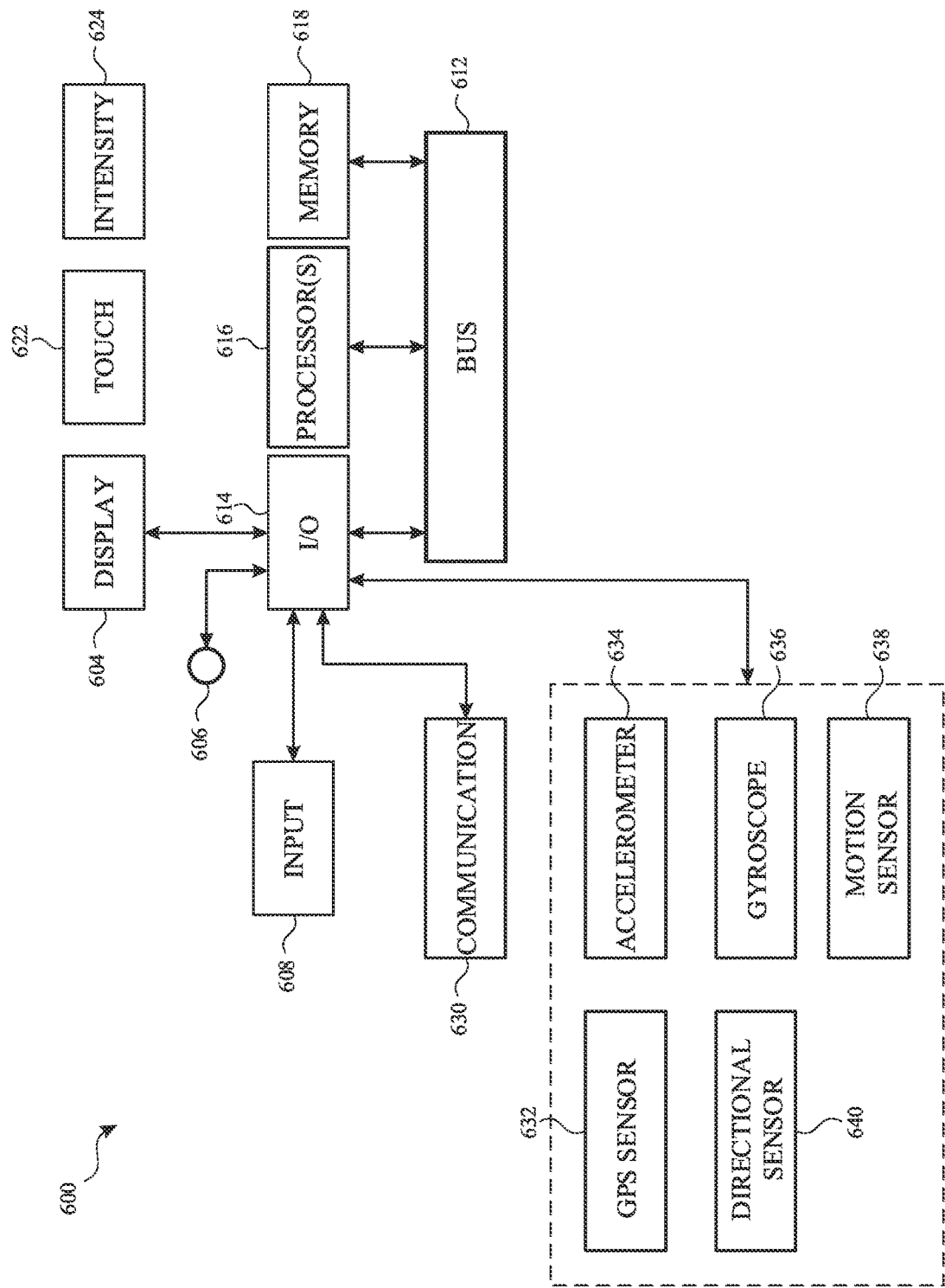
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, 600, 800, 900, 902, or 904 (FIGS. 2A, 4, 6A-6B, 8A-8CT, 9A-9C, 10A-10V, 12, 14, 15, and 16). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. SB) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
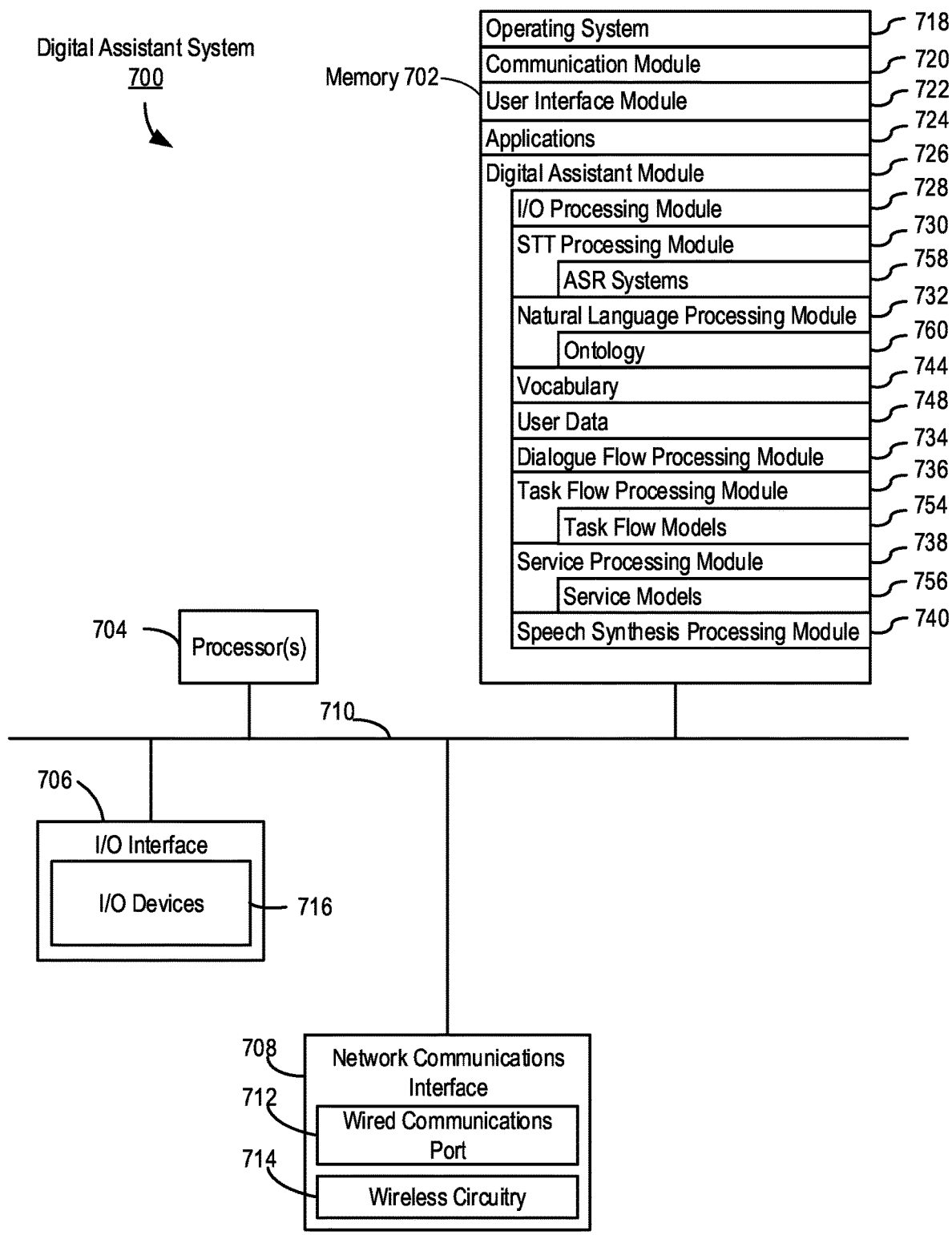
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, 600, 800, 900, 902, or 904) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722, I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, 600, 800, 900, 902, and 904 in FIGS. 2A, 4, 6A-6B, 8A-8CT, 9A-9C, 10A-10V, 12, 14, 15, and 16. In some examples, digital assistant system 700 represents the server portion of a digital assistant implementation, and can interact with the user through a client-side portion residing on a user device (e.g., devices 104, 200, 400, 600, 800, 900, 902, or 904).

In some examples, the network communications interface 708 includes wired communication port(s) 712 and/or wireless transmission and reception circuitry 714. The wired communication port(s) receives and send communication signals via one or more wired, interfaces, e.g., Ethernet, Universal Serial Bus (USB), FIREWIRE, etc. The wireless circuitry 714 receives and sends RE signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-6B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
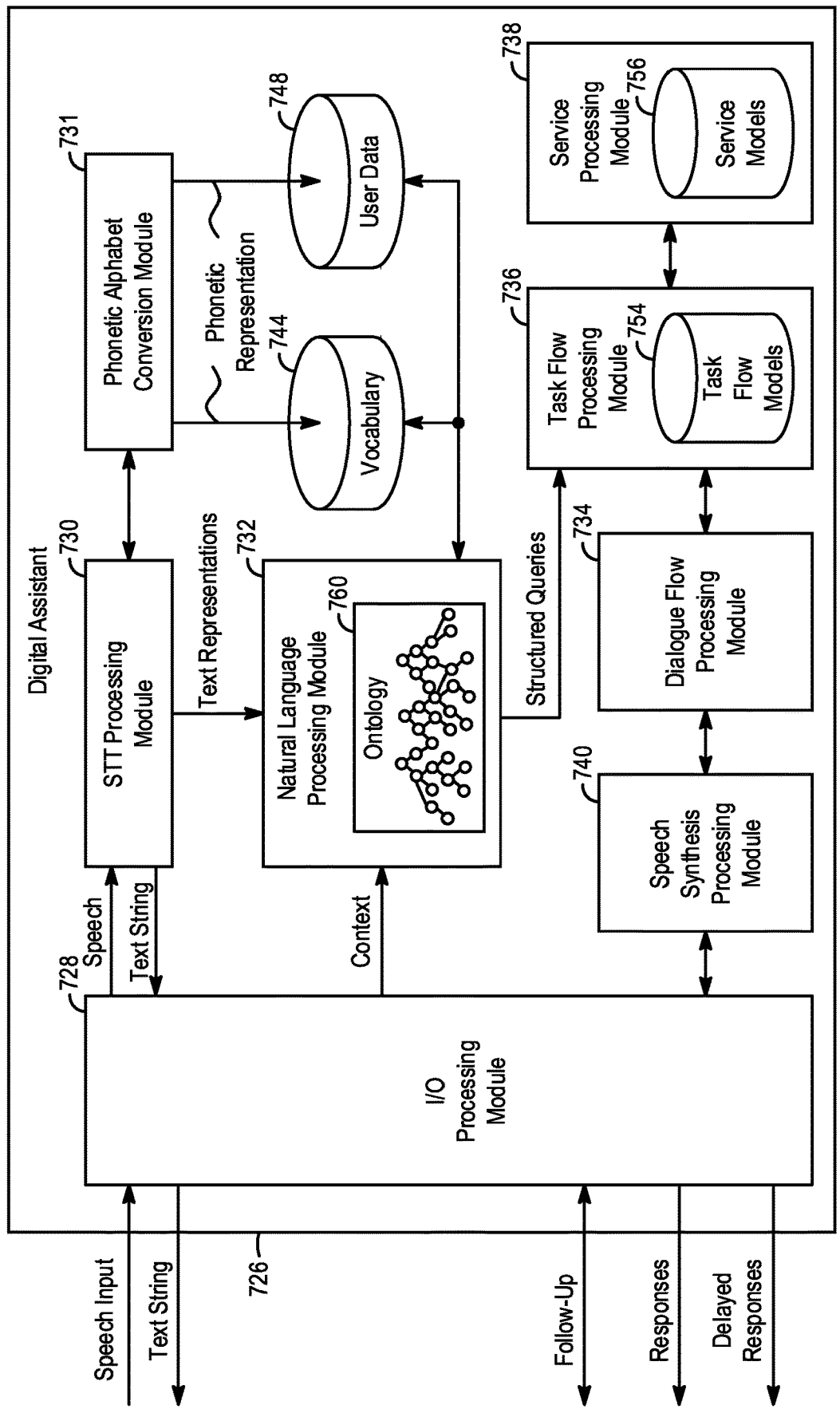
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device devices 104, 200, 400, 600, or 800) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, 600, or 800) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, SIT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, SIT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of / təˈmeɪroʊ/ and / təˈmɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation / təˈmeɪroʊ/ is ranked higher than / təˈmɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation / təˈmeɪroʊ/ is associated with the United States, whereas the candidate pronunciation / təˈmɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation / təˈmeɪroʊ/ (associated with the United States) is ranked higher than the candidate pronunciation / təˈmɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes / təˈmeɪroʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the SIT processing module 730 determines that the sequence of phonemes / təˈmeɪroʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from SIT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
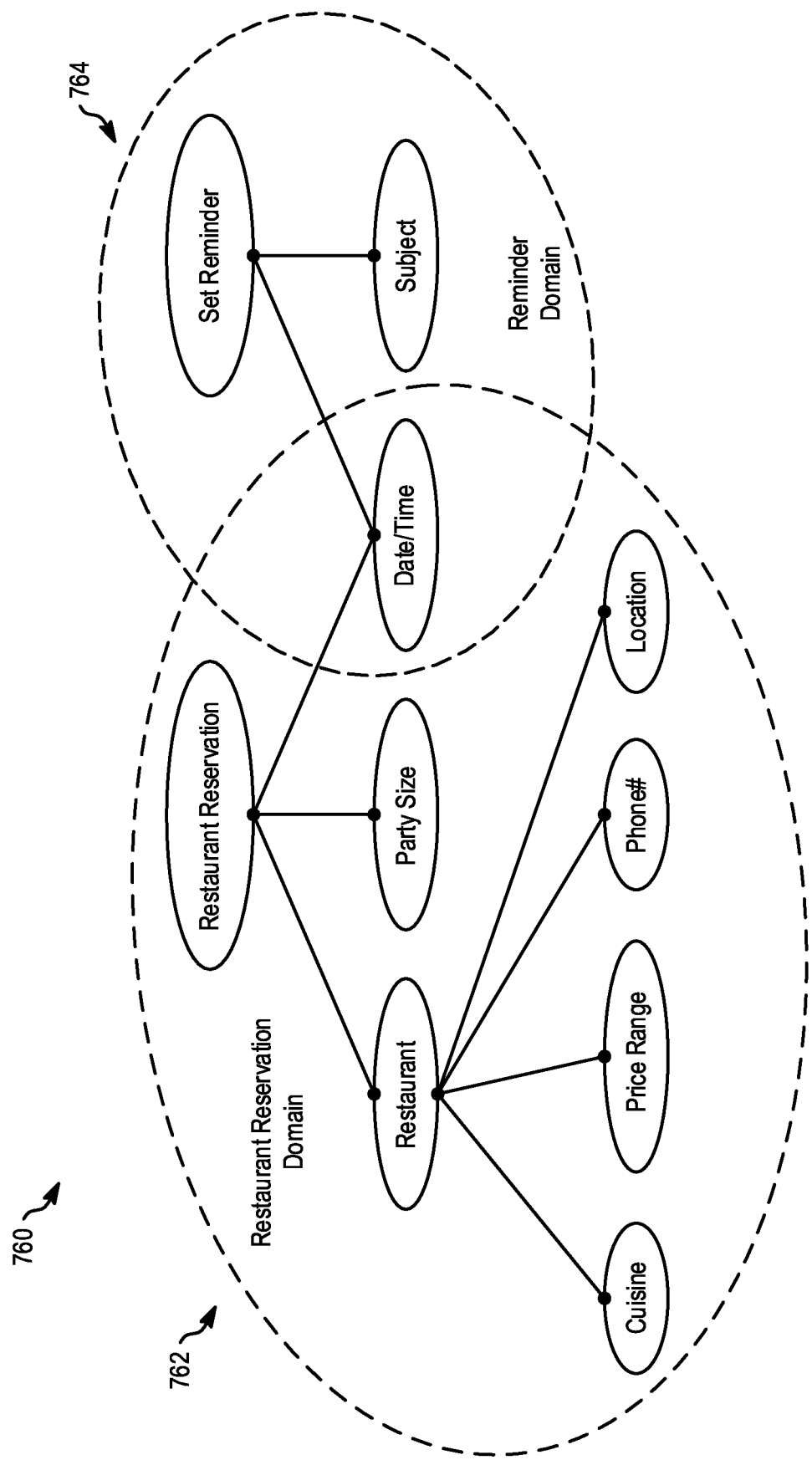
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Digital Assistant User Interfaces

Figures 8A, 8B:
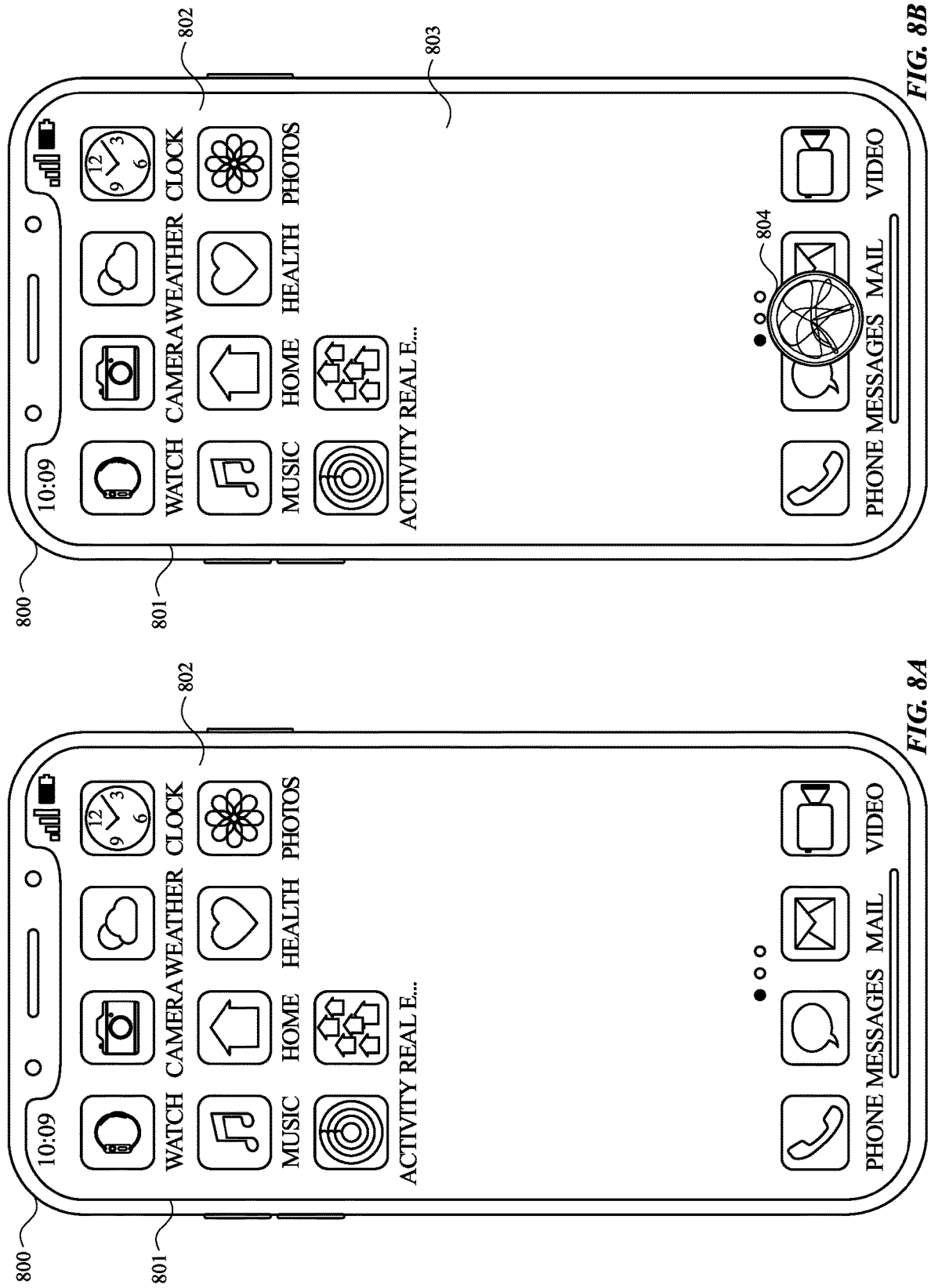
FIGS. 8A-8CT illustrate user interfaces and digital assistant user interfaces, according to various examples.
Figure 8D:
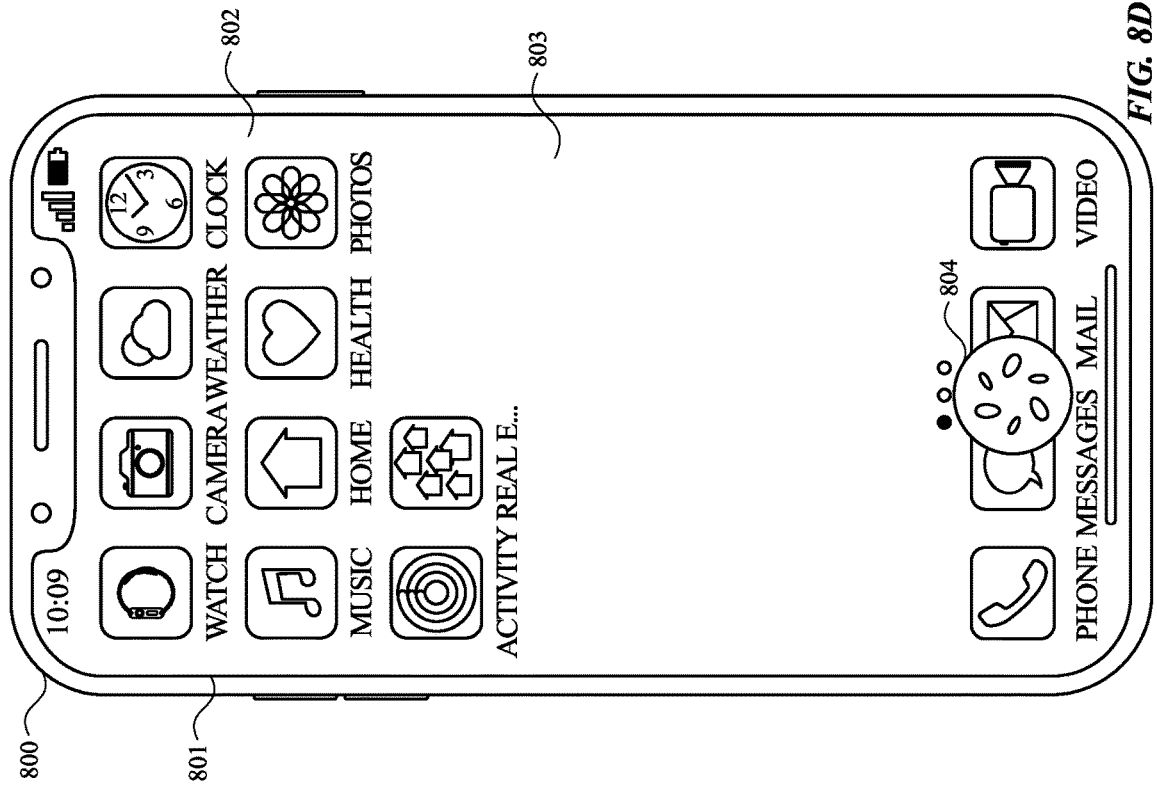
Figure 8C:
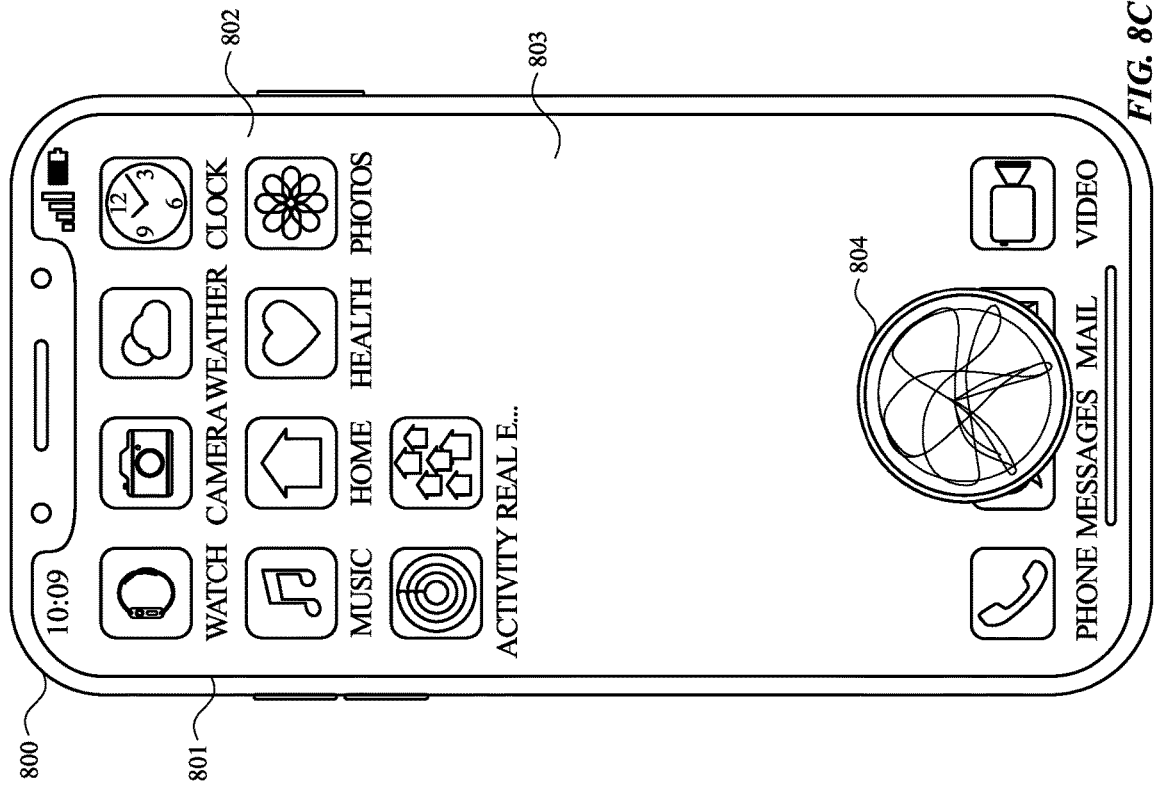

FIGS. 8A-8CT illustrate user interfaces and digital assistant user interfaces, according to various examples. FIGS. 8A-8CT are used to illustrate the processes described below, including the processes in FIGS. 17A-17F.

FIG. 8A shows electronic device 800. Device 800 is implemented as device 104, device 122, device 200, or device 600. In some examples, device 800 at least partially implements digital assistant system 700. In the example of FIG. 8A, device 800 is a smartphone with a display and a touch sensitive surface. In other examples, device 800 is a different type of device, such as a wearable device (e.g., smartwatch), a tablet device, a laptop computer, or a desktop computer.

In FIG. 8A, device 800 displays, on display 801, user interface 802 different from digital assistant (DA) user interface 803, discussed below. In the example of FIG. 8A, user interface 802 is a home screen user interface. In other examples, the user interface is another type of user interface, such as a lock screen user interface or an application-specific user interface, e.g., maps application user interface, weather application user interface, messaging application user interface, music application user interface, movie application user interface, and the like.

In some examples, while displaying a user interface different from DA user interface 803, device 800 receives a user input. Device 800 determines whether the user input satisfies a criterion for initiating a DA. Example user input that satisfies a criterion for initiating a DA includes predetermined types of speech input (e.g., "Hey Siri"), input selecting a virtual or physical button of device 800 (or input selecting such buttons for a predetermined duration), types of input received at an external device coupled to device 800, types of user gestures performed on display 801 (e.g., a drag or swipe gesture from a corner of display 801 towards the center of display 801), and types of input representing motion of device 800 (e.g., raising device 800 to a viewing position).

In some examples, in accordance with a determination that the user input satisfies a criterion for initiating a DA, device 800 displays, over the user interface, DA user interface 803. In some examples, displaying DA user interface 803 (or another displayed element) over the user interface includes replacing at least a portion of the display of the user interface with display of the DA user interface 803 (or display of the another graphical element). In some examples, in accordance with a determination that the user input does not satisfy a criterion for initiating a DA, device 800 forgoes displaying DA user interface 803 and instead performs an action responsive to the user input (e.g., updates user interface 802).

FIG. 8B shows DA user interface 803 displayed over user interface 802. In some examples, as shown in FIG. 8B, DA user interface 803 includes DA indicator 804. In some examples, indicator 804 is displayed in different states to indicate respective states of the DA. The DA states include a listening state (indicating that the DA is sampling speech input), a processing state (indicating that the DA is processing a natural language request), a speaking state (indicating that the DA is providing audio and/or textual output), and an idle state. In some examples, indicator 804 includes respectively different visualizations indicating the different DA states. FIG. 8B shows indicator 804 in a listening state because the DA is ready to accept speech input after initiation based on detecting user input satisfying the criterion.

In some examples, a size of indicator 804 in the listening state varies based on received natural language input. For example, indicator 804 expands and shrinks in real-time according to an amplitude of received speech input. FIG. 8c shows indicator 804 in the listening state. In FIG. 8C, device 800 receives the natural language speech input "what's the weather today?" and indicator 804 expands and shrinks in real-time according to the speech input.

FIG. 8D shows indicator 804 in the processing state, e.g., indicating that the IDA is processing the request "what's the weather today?" FIG. SE shows indicator 804 in a speaking state, e.g., indicating that the DA is currently providing the audio output "good weather today" responsive to the request. FIG. 8F shows indicator 804 in the idle state. In some examples, user input selecting indicator 804 in the idle state causes the DA (and indicator 804) to enter the listening state, e.g., by activating one or more microphones to sample audio input.

In some examples, the DA provides audio output responsive to a user request while device 800 provides other audio output. In some examples, while simultaneously providing the audio output responsive to the user request and the other audio output, the DA lowers a volume of the other audio output. For example, DA user interface 803 is displayed over a user interface including currently playing media (e.g., a movie or a song). When the DA provides audio output responsive to a user request, the DA lowers the volume of the playing media's audio output.

In some examples, DA user interface 803 includes a DA response affordance. In some examples, the response affordance corresponds to a response, by the DA, to received natural language input. For example, FIG. 8E shows device 800 displaying response affordance 805 including weather information responsive to the received speech input.

As shown in FIGS. 8E-8F, device 800 displays indicator 804 at a first portion of display 801 and response affordance 805 at a second portion of display 801. A portion of user interface 802 that IDA user interface 803 is displayed over remains visible (e.g., is not visually obscured) at a third portion of display 801. For example, the portion of user interface 802 that remains visible was displayed at the third portion of display 801 prior to receiving the user input that initiated the digital assistant (e.g., FIG. 8A). In some examples, the first, second, and third portions of display 801 are referred to as the "indicator portion," the "response portion," and the "user interface (UI) portion," respectively.

In some examples, the UI portion is between the indicator portion (displaying indicator 804) and the response portion (displaying response affordance 805). For example, in FIG. 8F, the UI portion includes (or is) display area 8011 (e.g., rectangular area) between the bottom of response affordance 805 to the top of indicator 804, with the side edges of display area 8011 defined by the side edges of response affordance 805 (or display 801). In some examples, the portion of user interface 802 that remains visible at the UI portion of display 801 includes one or more user-selectable graphical elements, e.g., links and/or affordances such as the home screen application affordances in FIG. 8F.

In some examples, device 800 displays response affordance 805 in a first state. In some examples, the first state includes a compact state, where the display size of response affordance 805 is small (e.g., compared to an expanded response affordance state, discussed below) and/or response affordance 805 displays information in a compact (e.g., summarized) form (e.g., compared to the expanded response affordance state). In some examples, device 800 receives a user input corresponding to a selection of response affordance 805 in the first state, and in response, replaces display of response affordance 805 in the first state with a display of response affordance 805 in a second state. In some examples, the second state is an expanded state, where the display size of response affordance 805 is large (e.g., compared to the compact state) and/or response affordance 805 displays a greater amount of information/more detailed information (e.g., compared to the compact state). In some examples, device 800 displays response affordance 805 in the first state by default, e.g., such that device 800 initially displays (FIGS. 8E-8G) response affordance 805 in the first state.

FIGS. 8E-8G show response affordance 805 in the first state. As shown, response affordance 805 provides weather information compactly, e.g., by providing the current temperature and status and omitting more detailed weather information (e.g., hourly weather information). FIG. 8G shows that device 800 receives user input 806 (e.g., tap gesture) corresponding to a selection of response affordance 805 in the first state. While FIGS. 8G-8P generally show that the user inputs corresponding to respective selections of response affordances are touch inputs, in other examples, user input corresponding to a selection of a response affordance is another type of input such as voice input (e.g., "show me more") or peripheral device input (e.g., an input front a mouse or touchpad). FIG. 8H shows that responsive to receiving user input 806, device 800 replaces display of response affordance 805 in the first state with a display of response affordance 805 in the second state. As shown, response affordance 805 in the second state now includes more detailed weather information.

In some examples, while displaying response affordance 805 in the second state, device 800 receives a user input requesting to display response affordance 805 in the first state. In some examples, in response to receiving the user input, device 800 replaces the display of response affordance 805 in the second state with the display of response affordance 805 in the first state. For example, in FIG. 8H, DA user interface 803 includes selectable element (e.g., back button) 807. User input selecting selectable element 807 causes device 800 to revert to the display of FIG. 8F.

In some examples, while displaying response affordance 805 in the second state, device 800 receives a user input corresponding to a selection of response affordance 805. In response to receiving the user input, device 800 displays a user interface of an application corresponding to response affordance 805. For example, FIG. 8I illustrates device 800 receiving user input 808 (e.g., tap gesture) corresponding to a selection of response affordance 805. FIG. 8J shows that responsive to receiving user input 808, device 800 displays user interface 809 of the weather application.

In some examples, while displaying the user interface of the application, device 800 displays a selectable DA indicator. For example, FIG. 8J shows selectable DA indicator 810. In some examples, while displaying the user interface of the application, device 800 additionally or alternatively displays indicator 804 at the first portion of display 801, e.g., in an idle state.

Figure 8L:
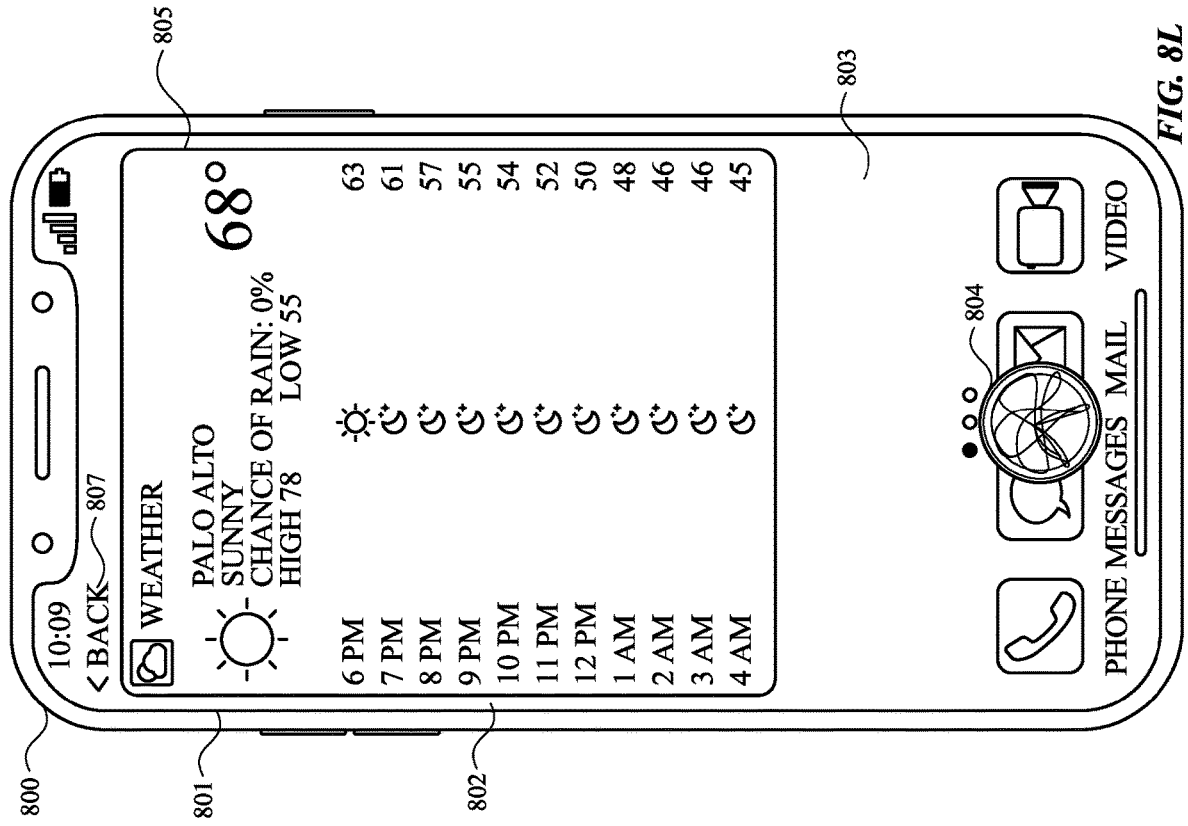
Figure 8K:
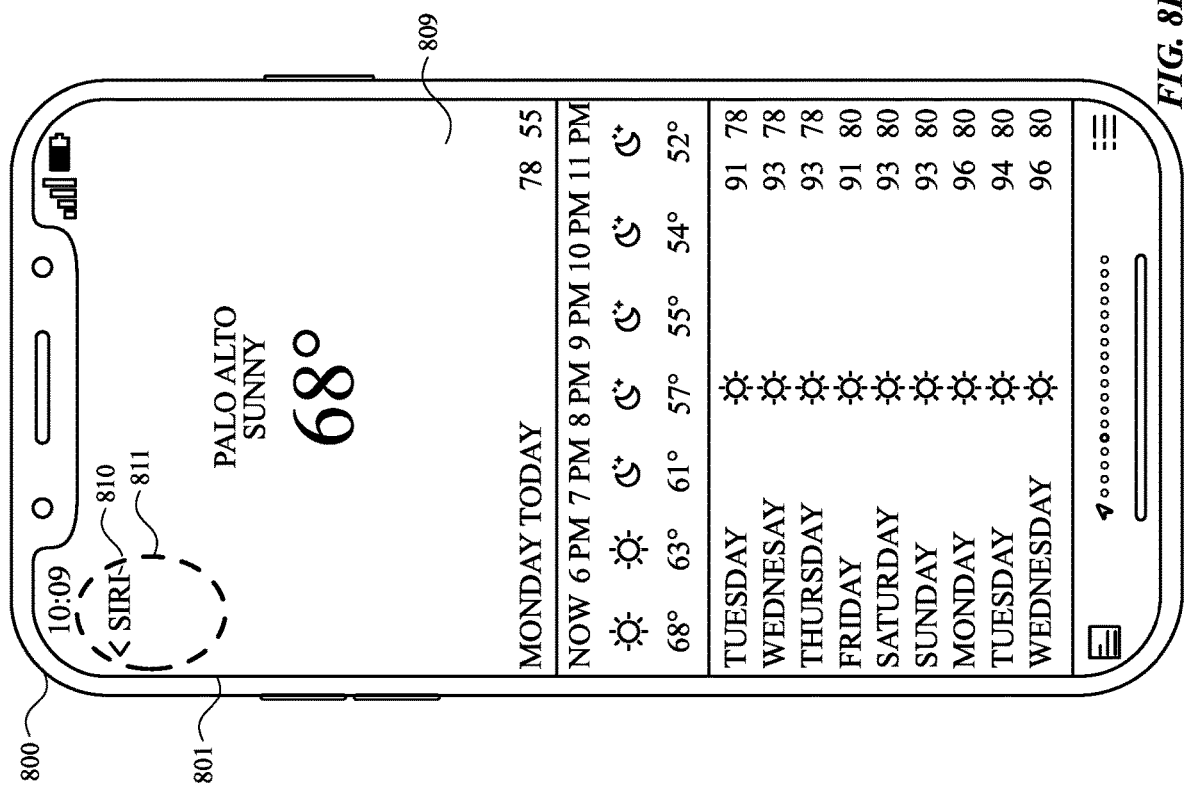

In some examples, while displaying the user interface of the application, device 800 receives a user input selecting the selectable DA indicator. In some examples, in response to receiving the user input, device 800 replaces the display of the user interface of the application with DA user interface 803. In some examples, DA user interface 803 is the DA user interface displayed immediately prior to displaying the user interface of the application. For example, FIG. 8K shows device 800 receiving user input 811 (e.g., a tap gesture) selecting DA indicator 810. FIG. 8L shows that responsive to receiving user input 811, device 800 replaces display of user interface 809 of the weather application with display of DA user interface 803.

User input 806 in FIG. 8G corresponds to a selection of a first portion of response affordance 805. In some examples, while device 800 displays response affordance 805 in the first state (e.g., compact state), device 800 receives a user input corresponding to a selection of a second portion of response affordance 805. In some examples, the first portion of response affordance 805 (e.g., the bottom portion) includes information intended to answer the user's request. In some examples, the second portion of response affordance 805 (e.g., the top portion) includes a glyph indicating a category of response affordance 805 and/or associated text. Example categories of response affordances include weather, stocks, knowledge, calculator, messaging, music, maps, and the like. The categories may correspond to the categories of services the DA can provide. In some examples, the first portion of response affordance 805 occupies a larger display area than the second portion of response affordance 805.

In some examples, in response to receiving the user input corresponding to the selection of the second portion of response affordance 805, device 800 displays a user interface of an application corresponding to response affordance 805 (e.g., without displaying response affordance 805 in the second state). For example, FIG. 8M shows device 800 receiving user input 812 (e.g., a tap gesture) selecting the second portion of response affordance 805 displayed in the first state. FIG. 8N shows that responsive to receiving user input 812, device 800 displays user interface 809 of the weather application (e.g., without displaying response affordance 805 in an expanded state). In this manner, a user may provide input selecting different portions of response affordance 805 to either expand response affordance 805 or cause display of the application corresponding to response affordance 805, as shown by FIGS. 8G-8H and 8M-8N.

FIG. 8N further shows that while displaying user interface 809, device 800 displays selectable DA indicator 810. User input selecting DA indicator 810 causes device 800 to revert to the display of FIG. 8M, e.g., similar to the example illustrated by FIGS. 8K-8L. In some examples, while displaying user interface 809, device 800 displays DA indicator 804 (e.g., in an idle state) at the first portion of display 801.

In some examples, for some types of response affordances, user input corresponding to a selection of any portion of the response affordance causes device 800 to display a user interface of an application corresponding to the response affordance. In some examples, this is because the response affordance cannot be displayed in a more detailed manner (e.g., in a second state). For example, there may be no additional information the DA can provide responsive to the natural language input. Consider, for example, the natural language input "what is 5 times 6?" FIG. 8O shows DA user interface 803 displayed responsive to the natural language input. DA user interface 803 includes response affordance 813 displayed in the first state. Response affordance 813 includes an answer "5×6=30," but there is no additional information the DA can provide. FIG. 8O further shows device 800 receiving user input 814 (e.g., a tap gesture) selecting the first portion of response affordance 813. FIG. 8P shows that responsive to receiving user input 814, device 800 displays user interface 815 of an application corresponding to response affordance 813, e.g., a calculator application user interface.

Figure 8Q:
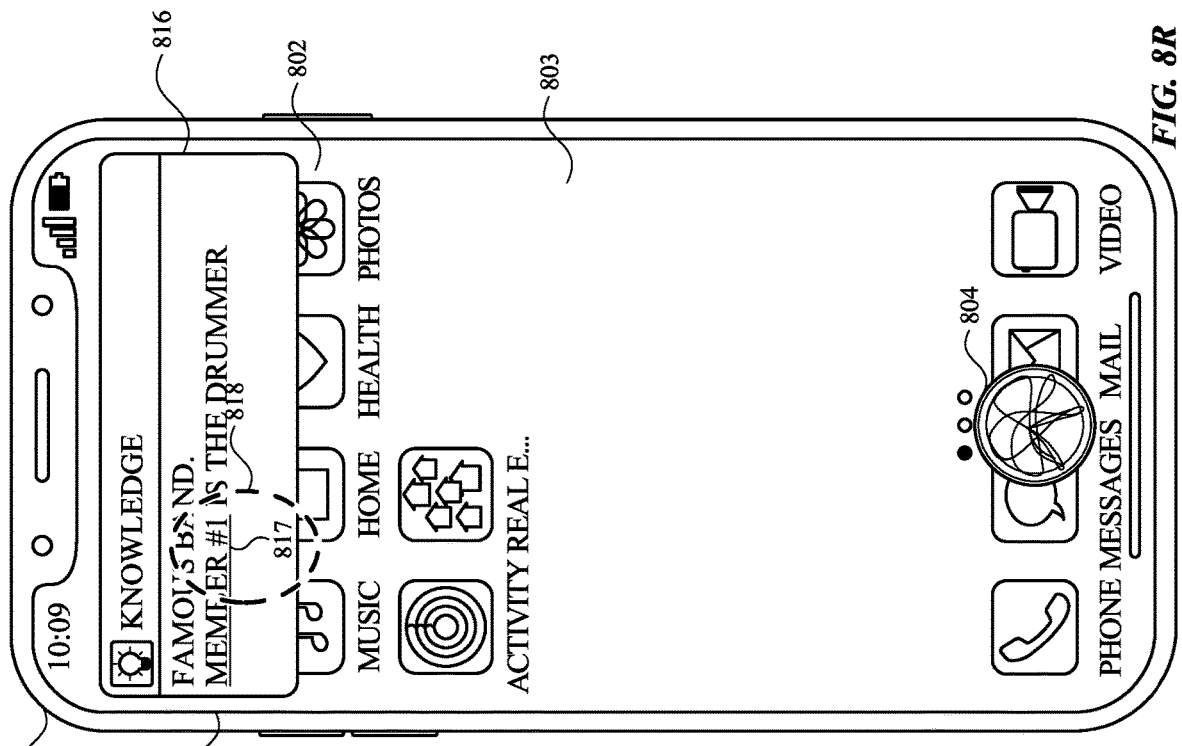
Figure 8R:
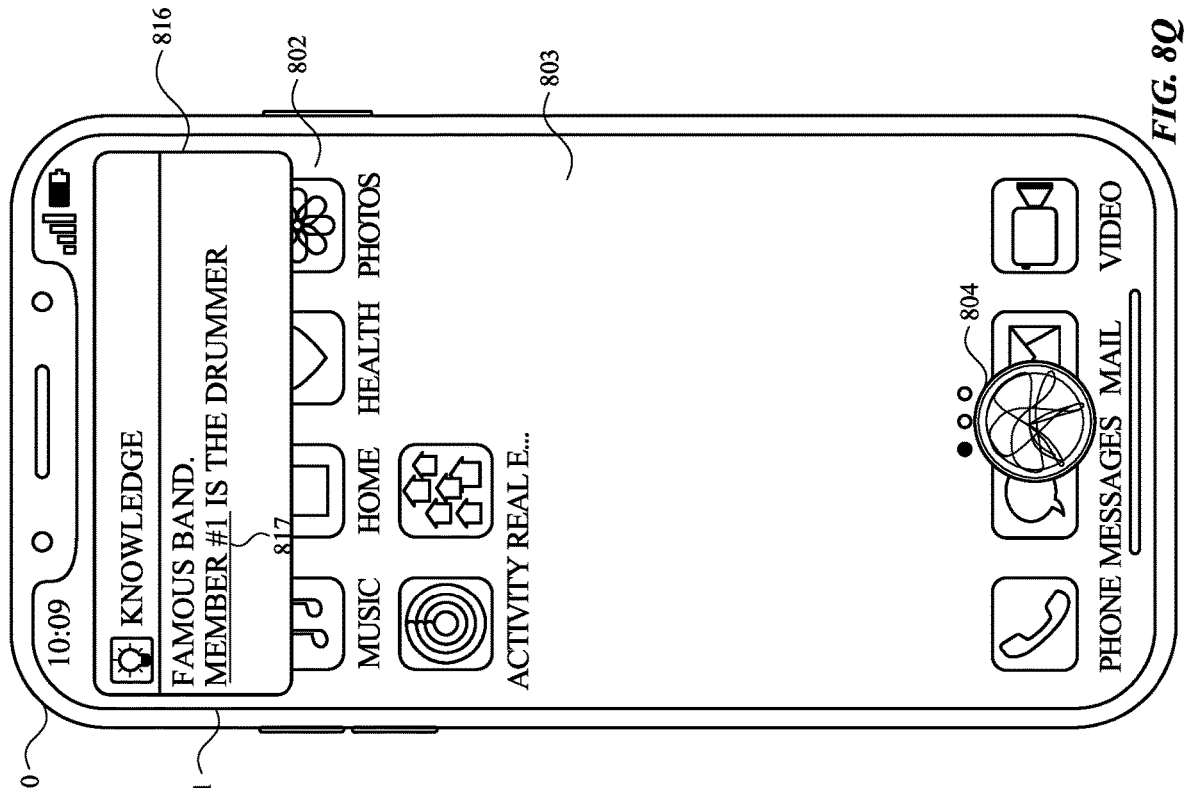
Figure 8S:
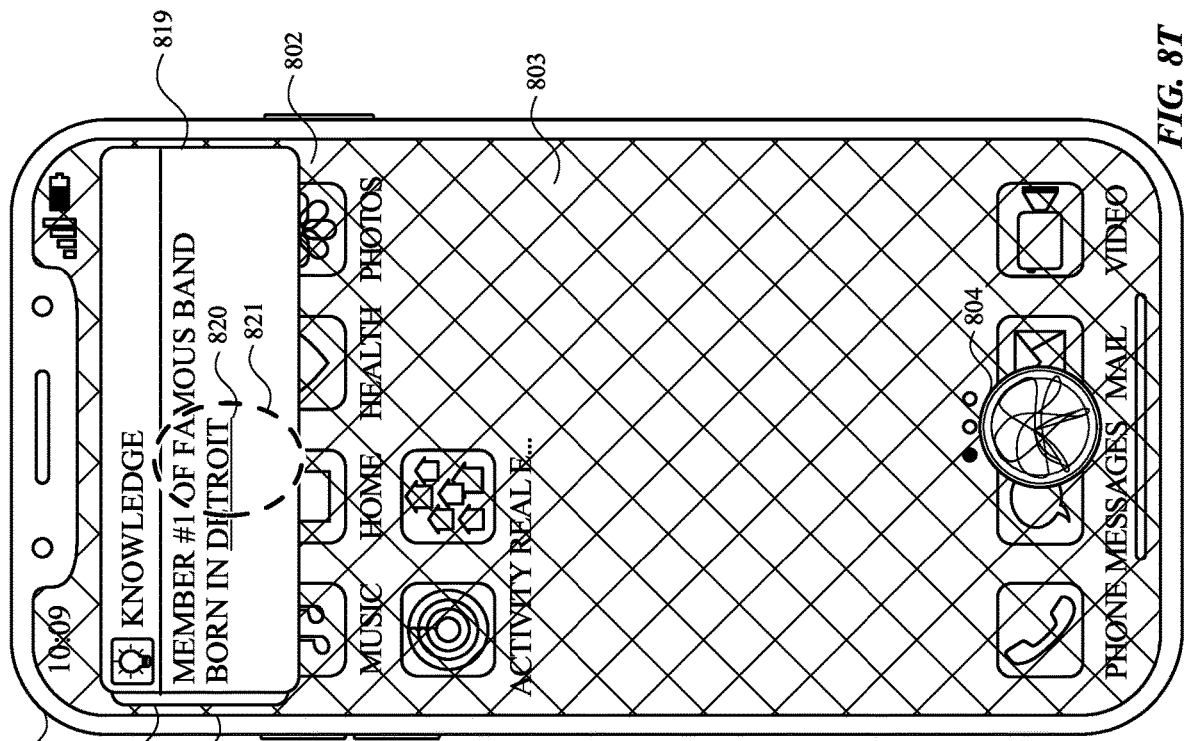

In some examples, a response affordance includes a selectable element, such as selectable text indicating a link. FIG. 8Q shows DA user interface 803 displayed responsive to the natural language input "tell me about Famous Band," DA user interface 803 includes response affordance 816. Response affordance 816 includes information about "Famous Band" and selectable element 817 corresponding to Member #1 of "Famous Band". In some examples, device 800 receives user input corresponding to a selection of the selectable element, and in response, displays, over the response affordance, an affordance corresponding to the selectable element (second response affordance). FIG. 8R shows device 800 receiving user input 818 (e.g., a tap gesture) selecting selectable element 817. FIG. 8S shows that responsive to receiving user input 818, device 800 displays, over response affordance 816, second response affordance 819 including information about Member #1 to form a stack of response affordances.

In some examples, while displaying the second response affordance over the response affordance, device 800 visually obscures the user interface at the third portion of display 801 (e.g., the portion not displaying any response affordance or indicator 804), or at a portion thereof. In some examples visually obscuring the user interface includes darkening the user interface or blurring the user interface. FIG. 8S shows that while second response affordance 819 is displayed over response affordance 816, device 800 visually obscures user interface 802 at the third portion of display 801.

FIG. 8S shows that a portion of response affordance 816 remains visible while second response affordance 819 is displayed over it. In other examples, second response affordance 819 replaces the display of response affordance 816, such that no portion of response affordance 816 is visible.

Figure 8T:
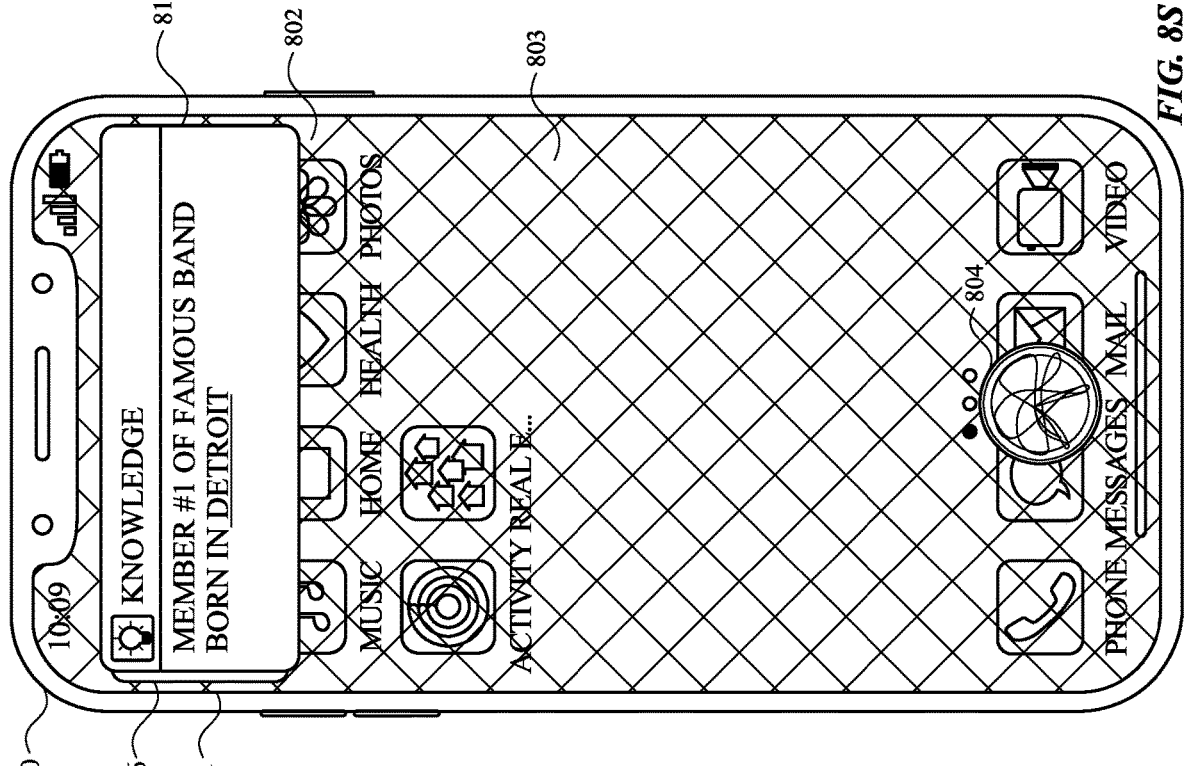
Figure 8V:
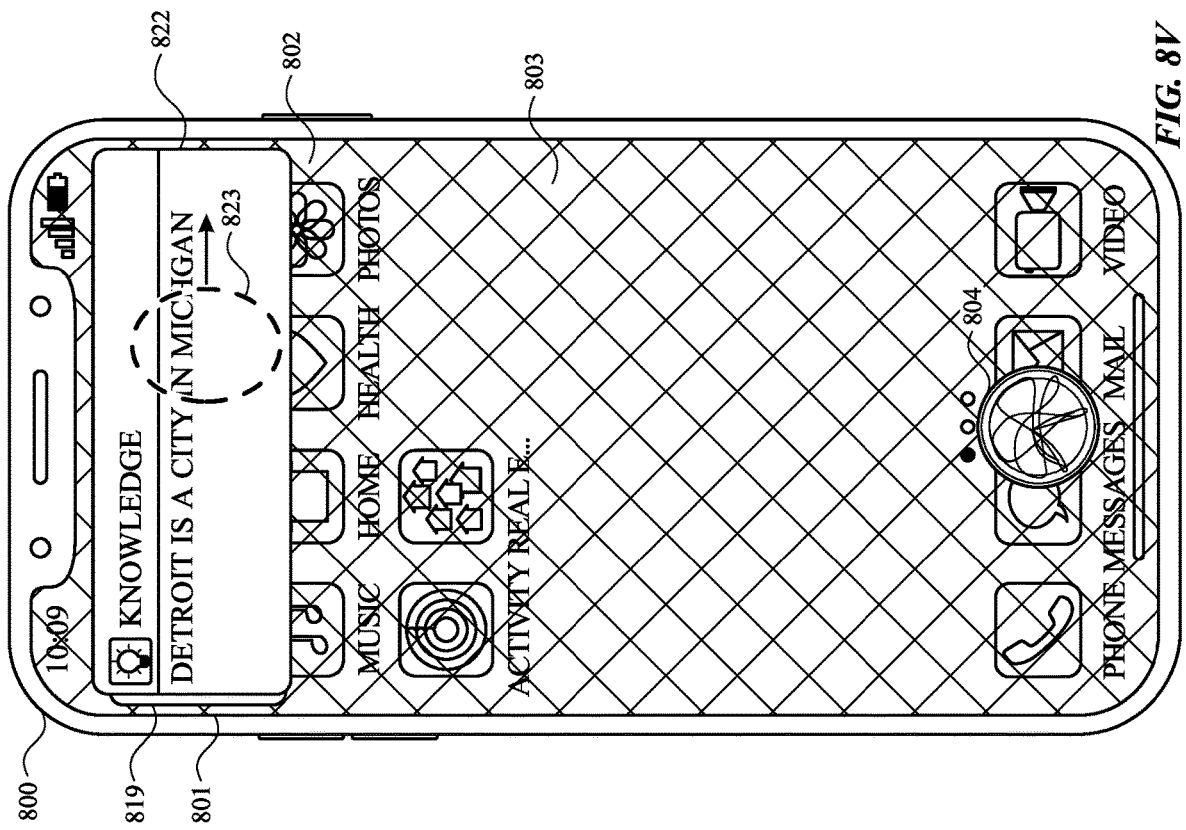
Figure 8U:
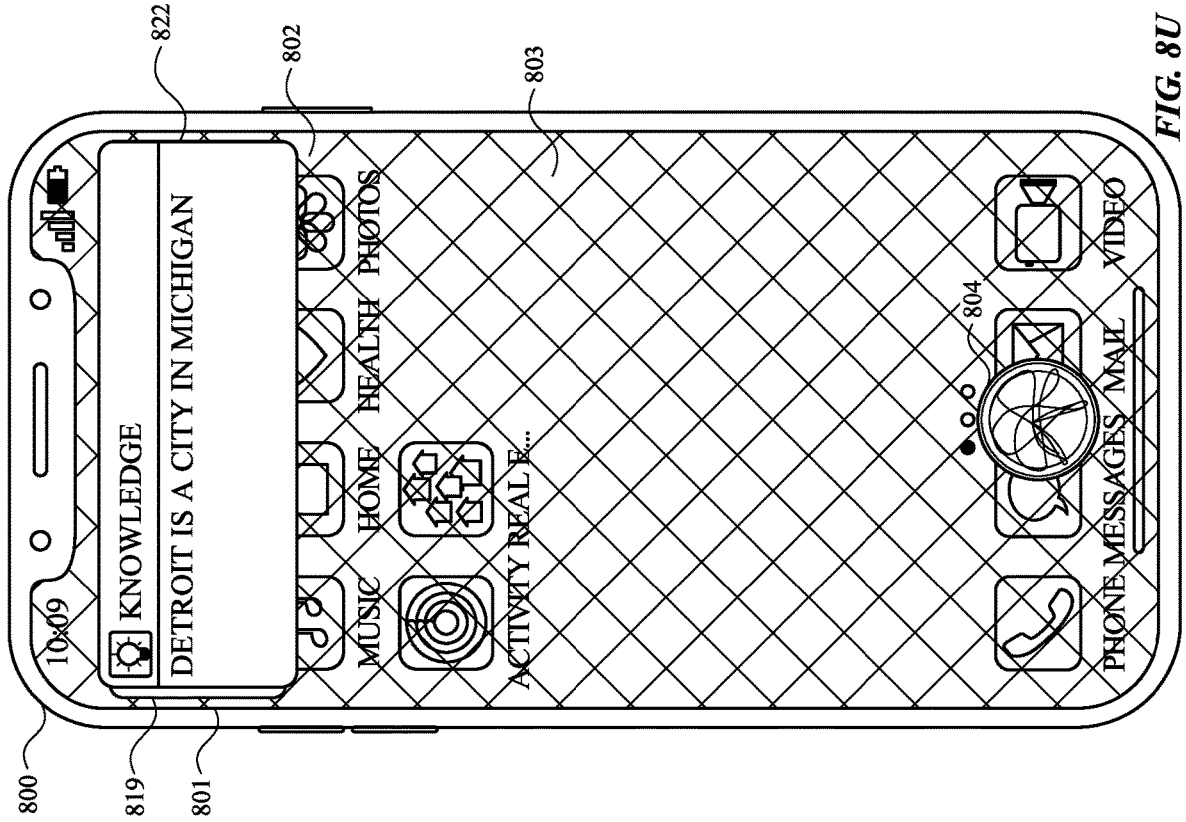

FIG. 8T shows device 800 receiving a user input 820 (e.g., a tap gesture) selecting selectable element 821 ("Detroit") in second response affordance 819. FIG. 8U shows that responsive to receiving user input 820, device 800 displays a third response affordance 822 over second response affordance 819. Third response affordance 822 includes information about Detroit, the birthplace of Member #1. FIG. 8U shows that user interface 802 continues to be visually obscured at the third portion of display 801.

FIG. 8U further shows that although there are three response affordances (e.g., 816, 819, and 822) in the stack of response affordances, device 800 only indicates two response affordances in the stack. For example, third response affordance 822 and a portion of second response affordance 819 are displayed, but no portion of response affordance 816 is displayed. Thus, in some examples, when more than two response affordances are stacked, device 800 only visually indicates that two response affordances are in the stack. In other examples, when response affordances are stacked, device 800 only visually indicates a single response affordance of the stack (e.g., such that the display of a next response affordance entirely replaces the display of a previous response affordance).

Figure 8X:
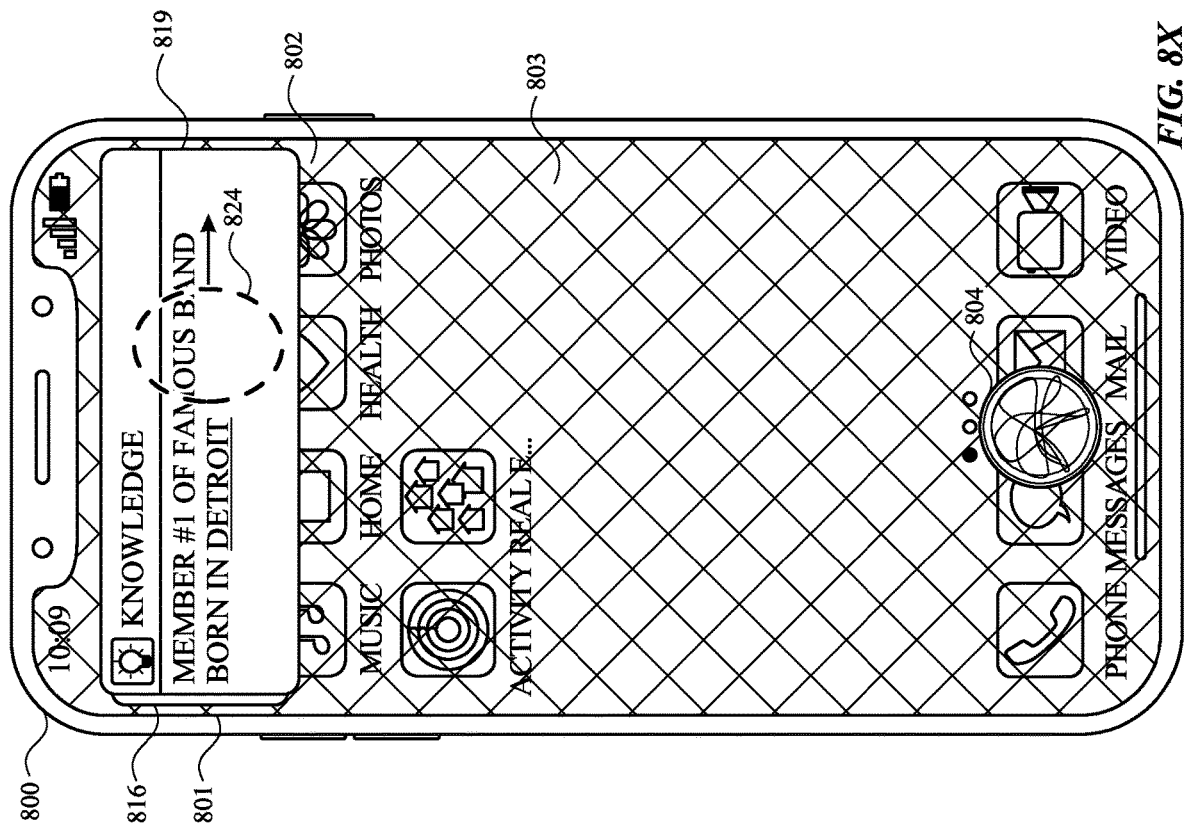
Figure 8W:
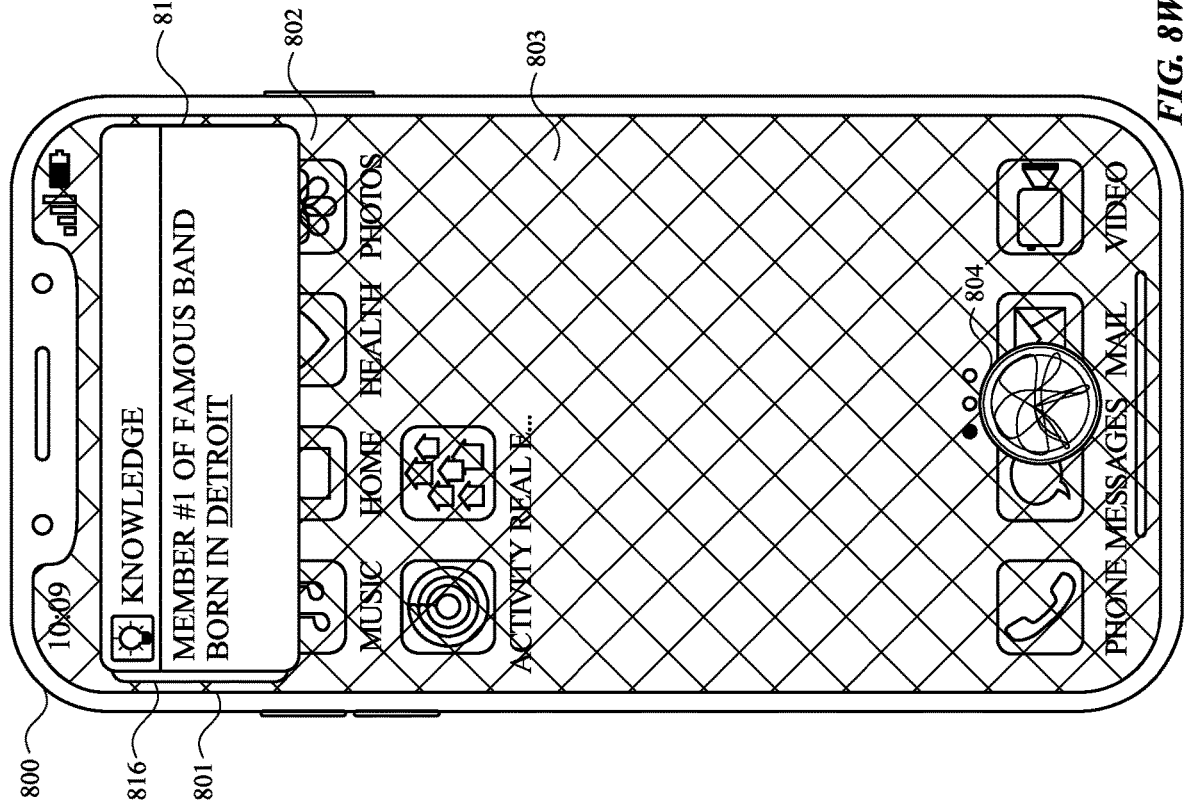
Figure 8A:
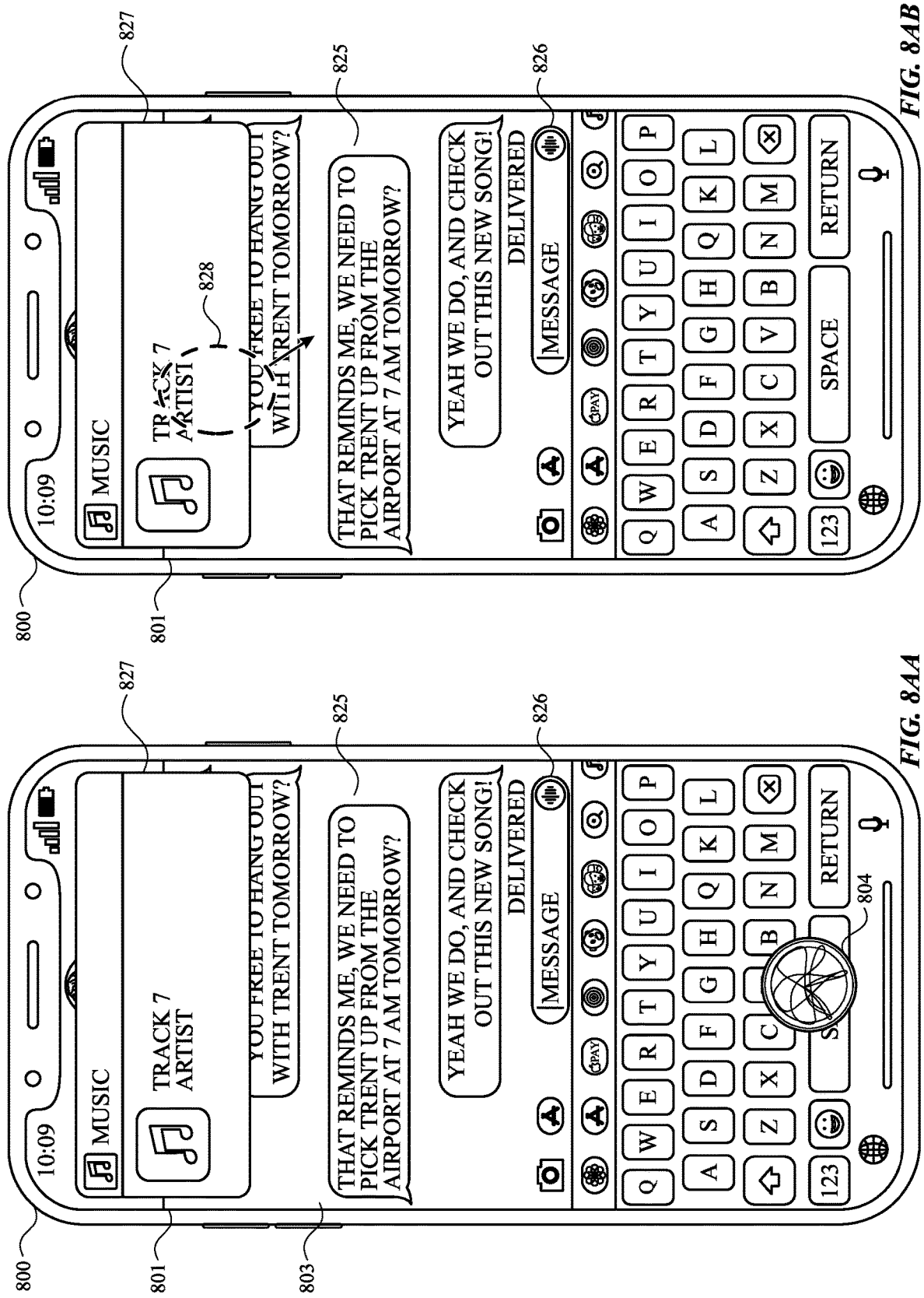
Figure 8A:
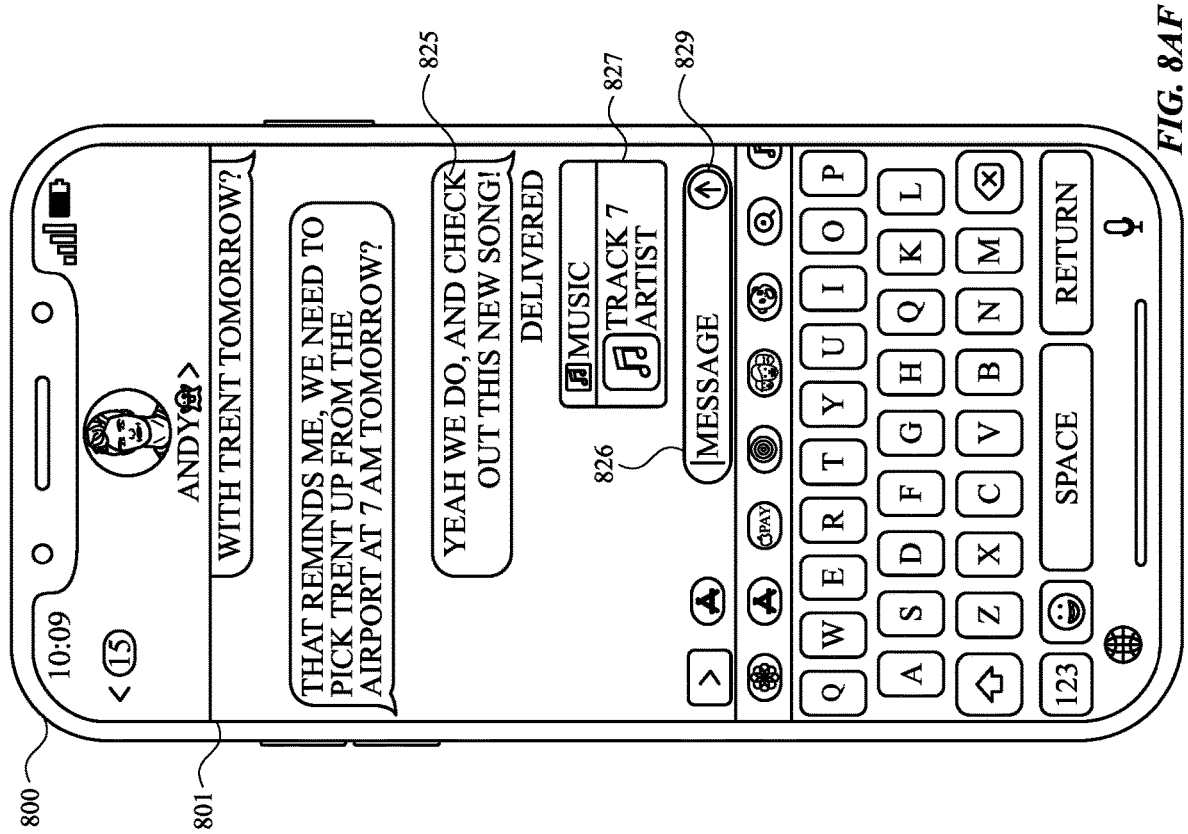
Figure 8A:
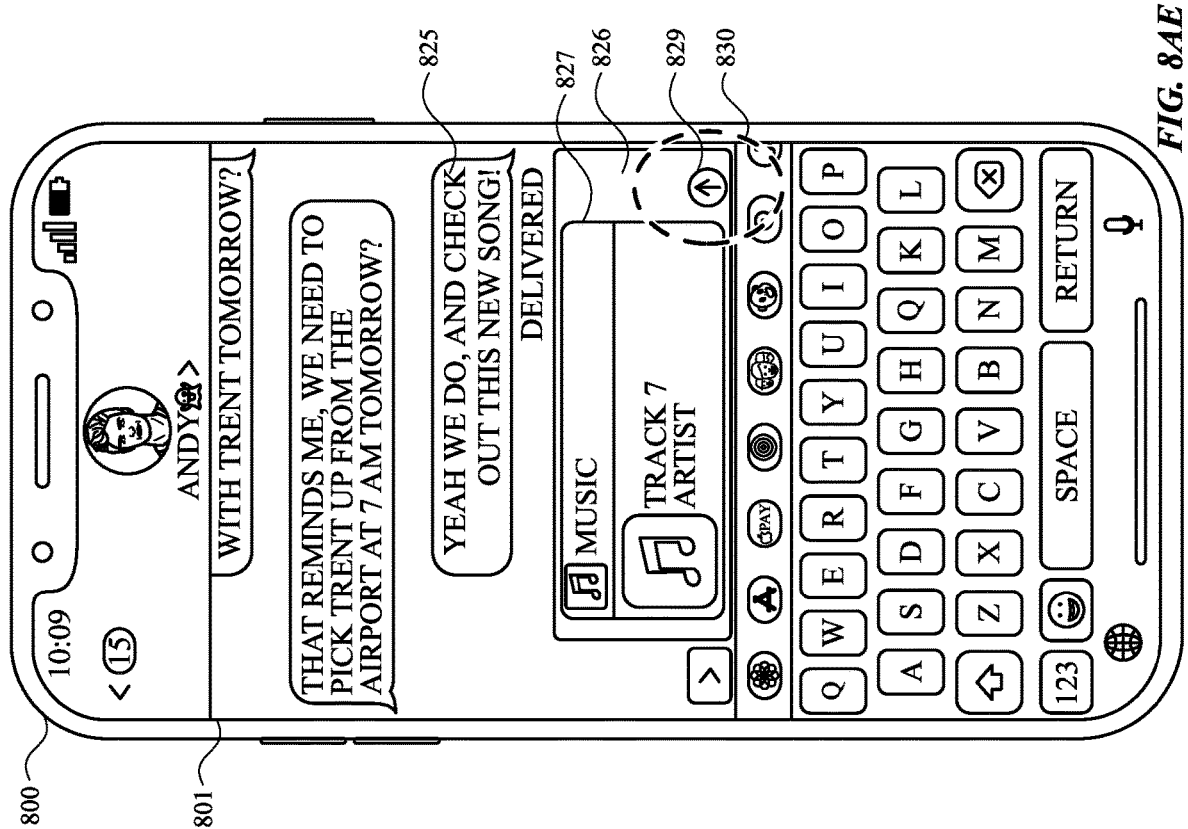
Figure 8A:
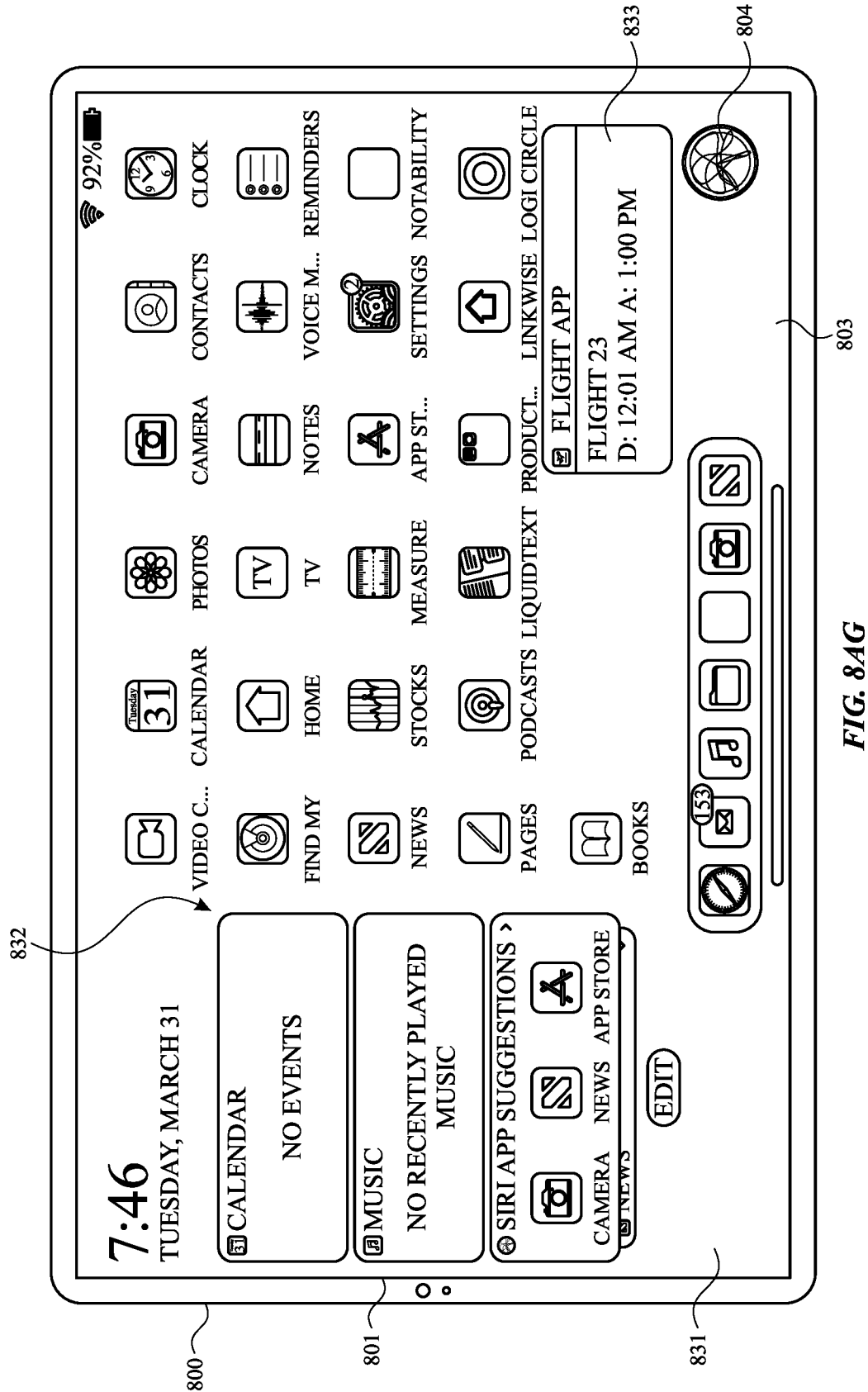
Figure 8A:
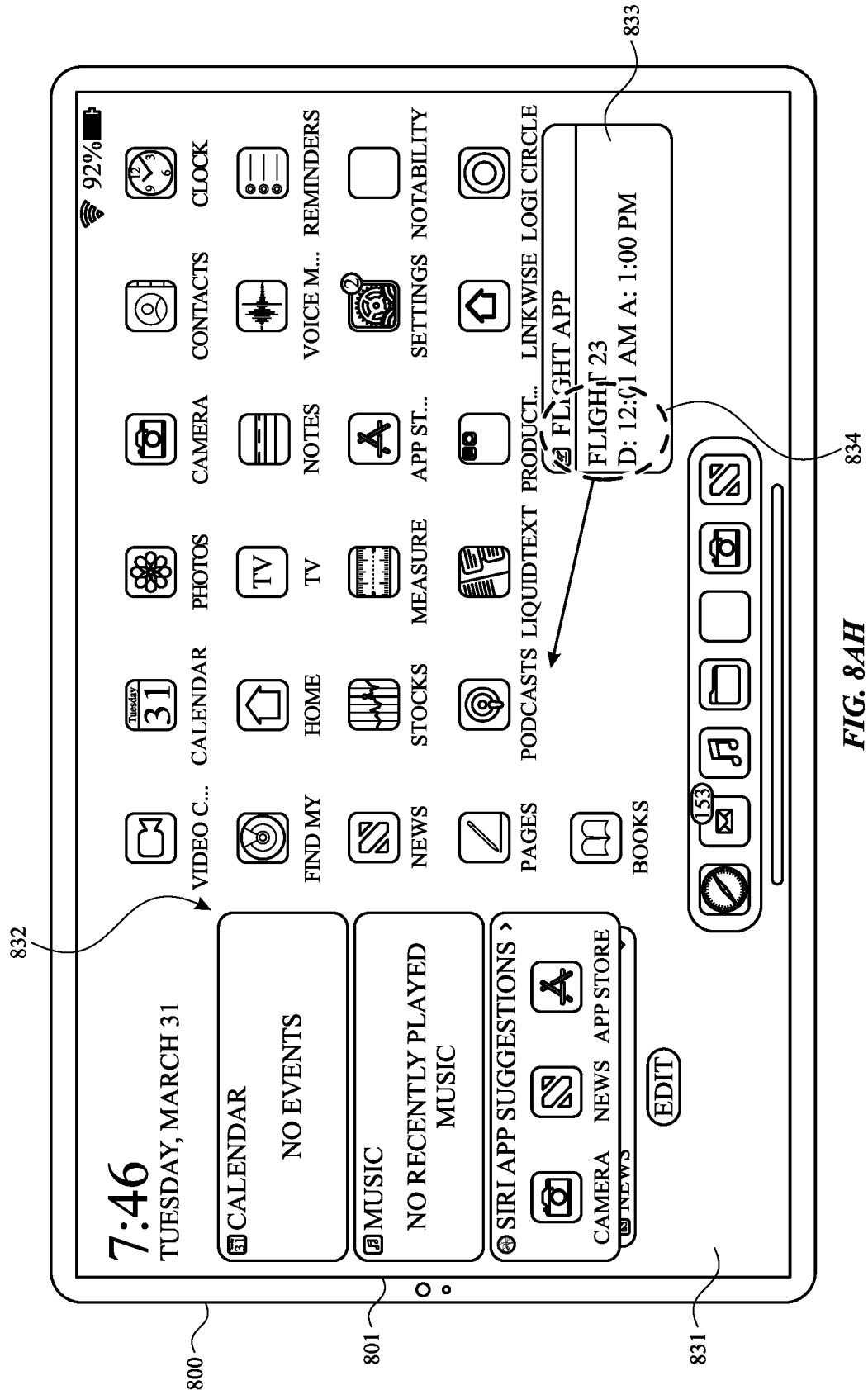
Figure 8A:
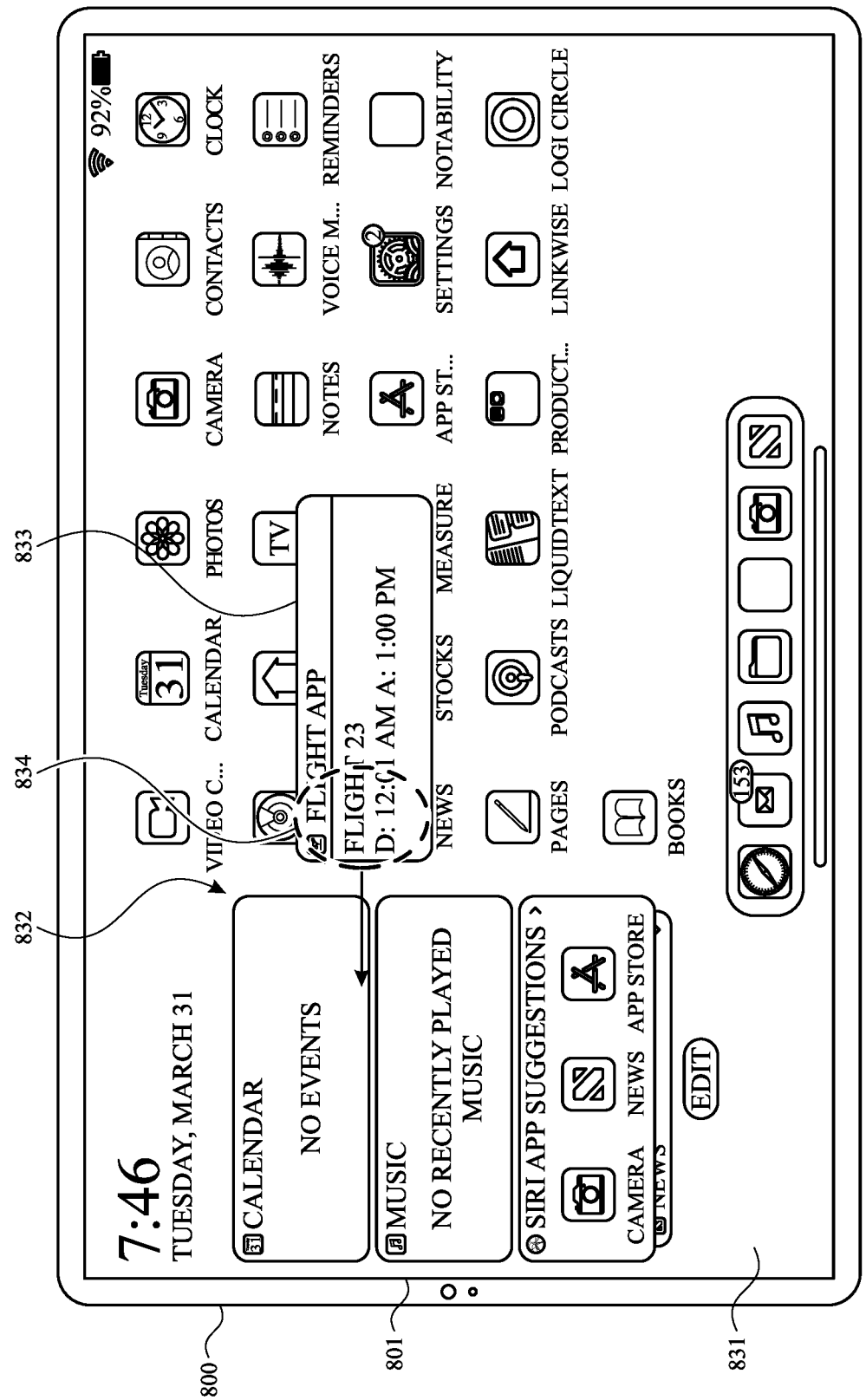
Figure 8A:
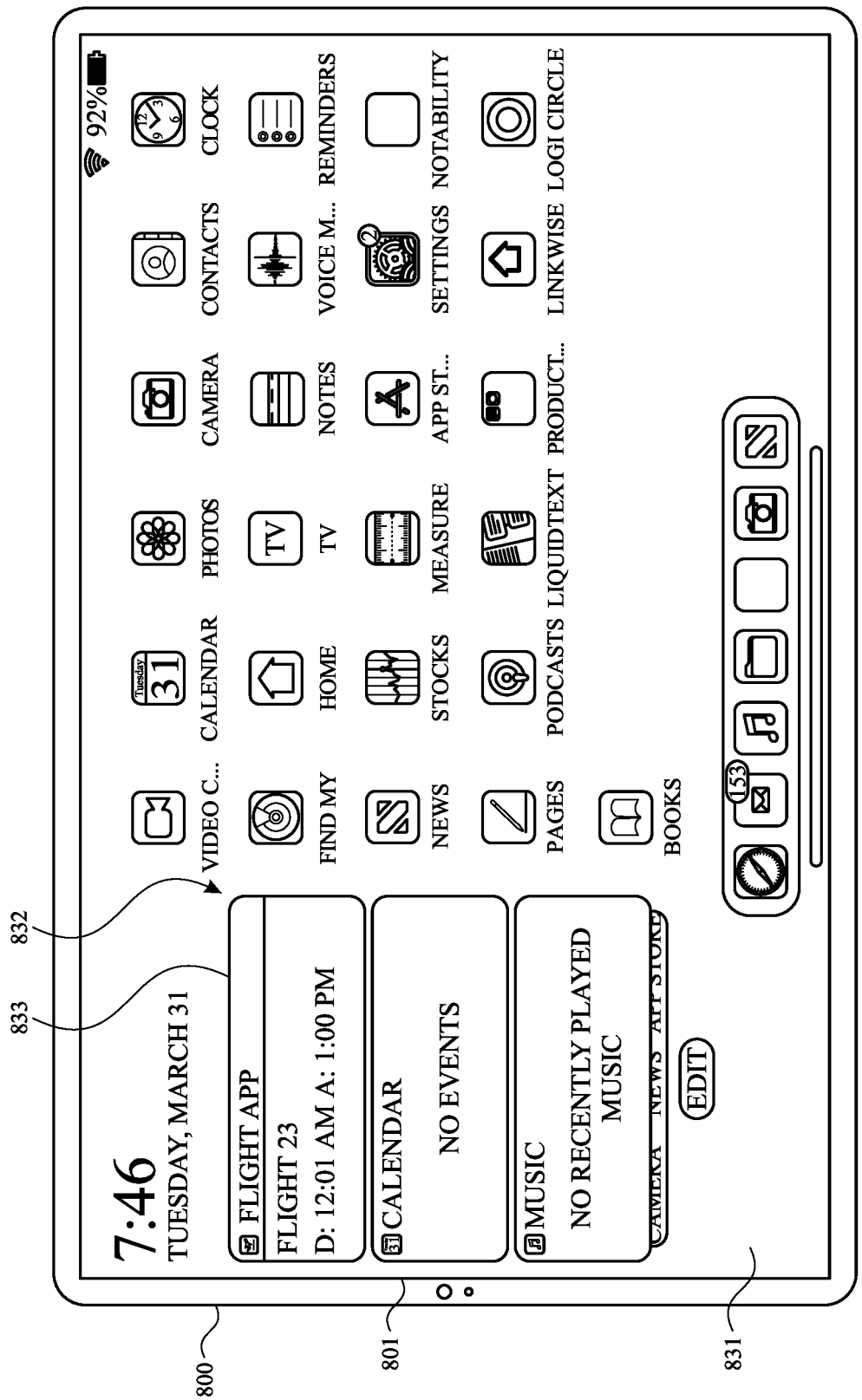
Figure 8A:
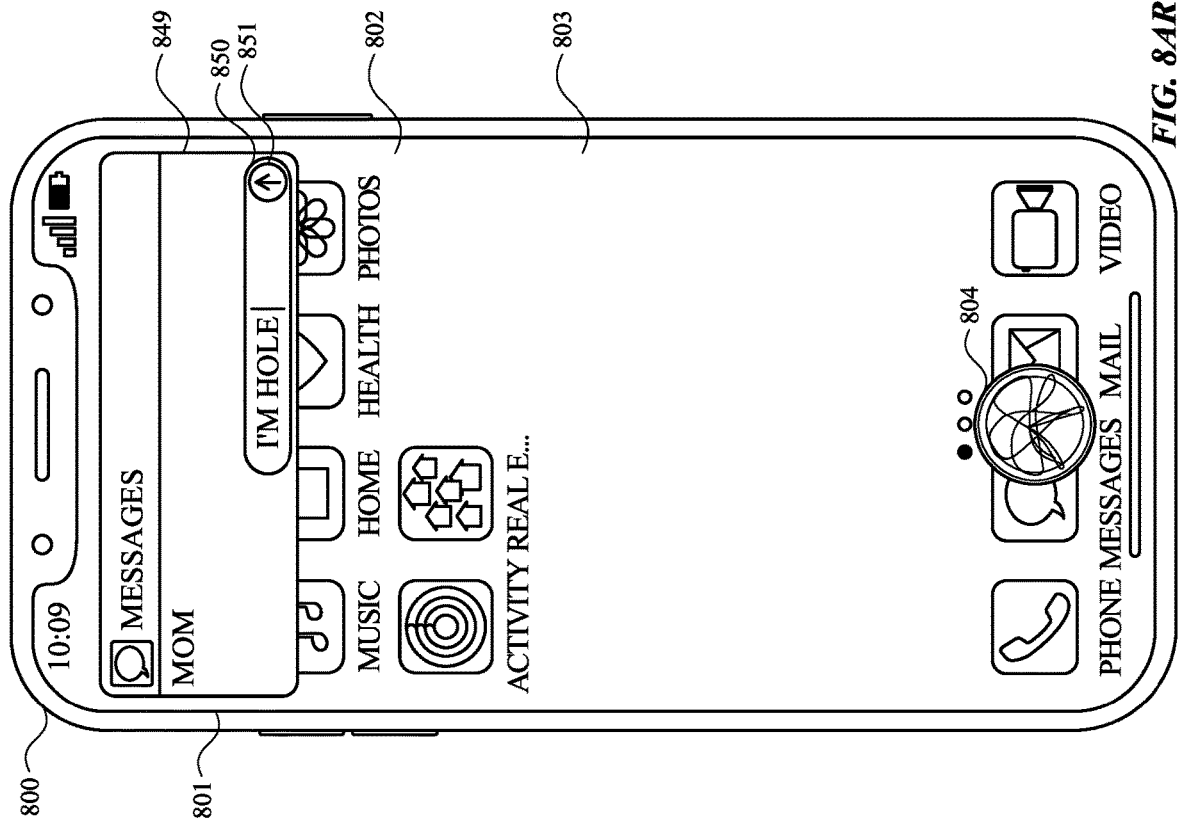
Figure 8A:
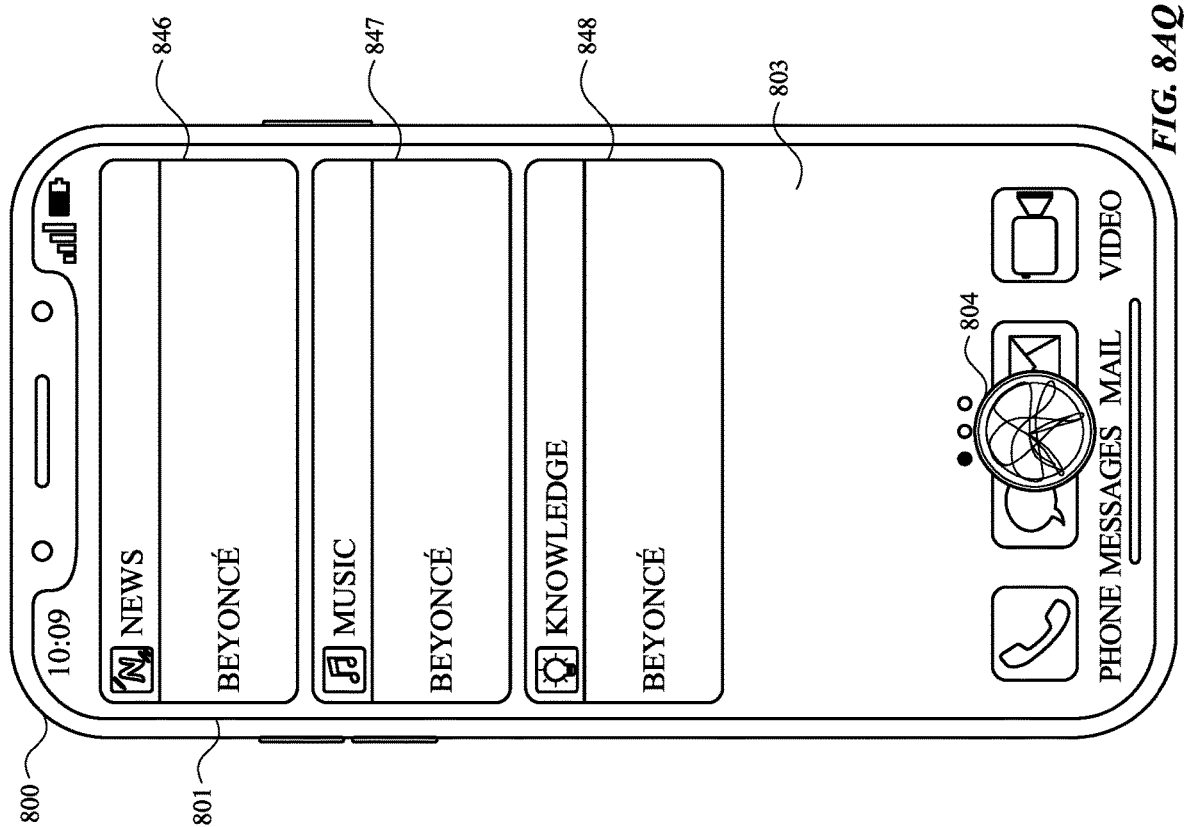
Figure 8A:
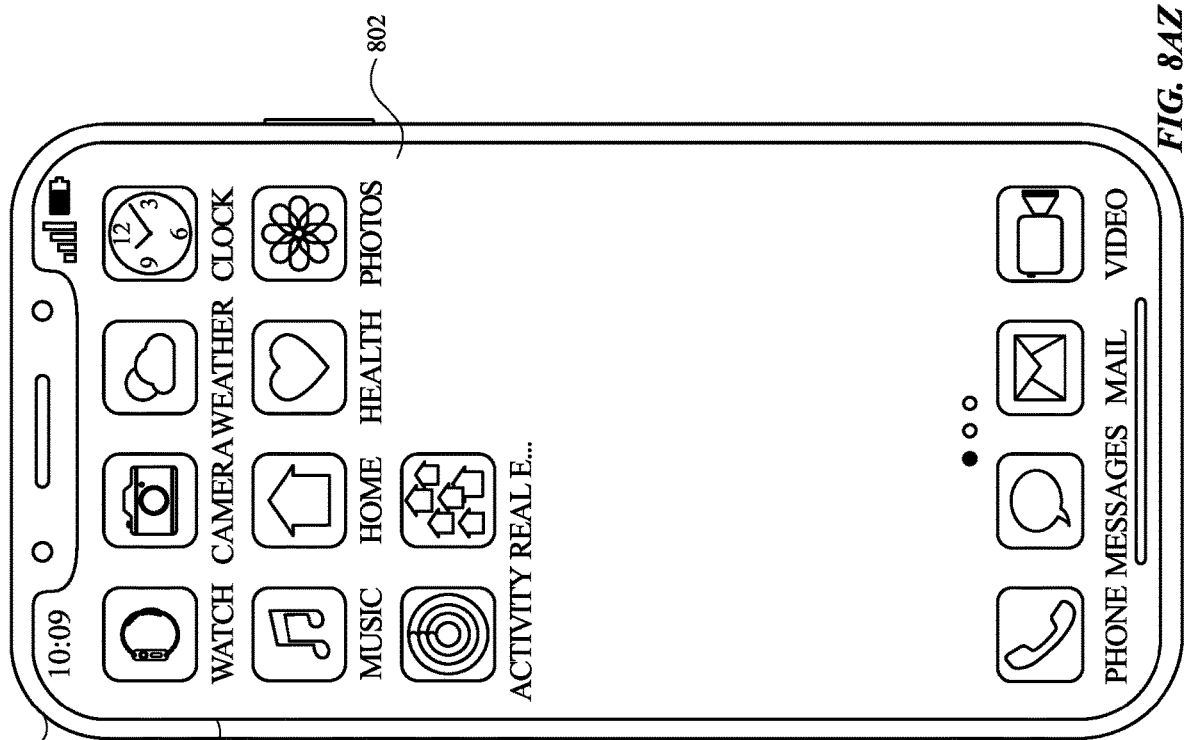
Figure 8A:
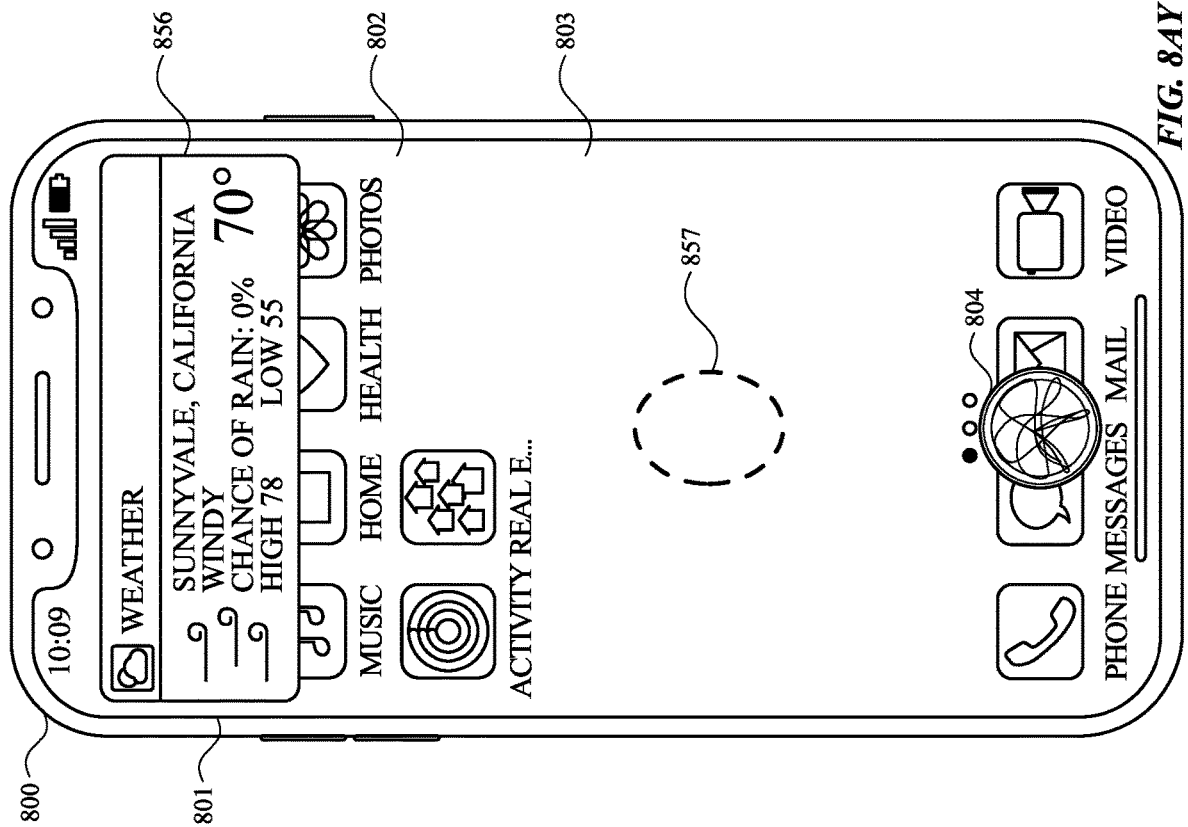
Figure 8B:
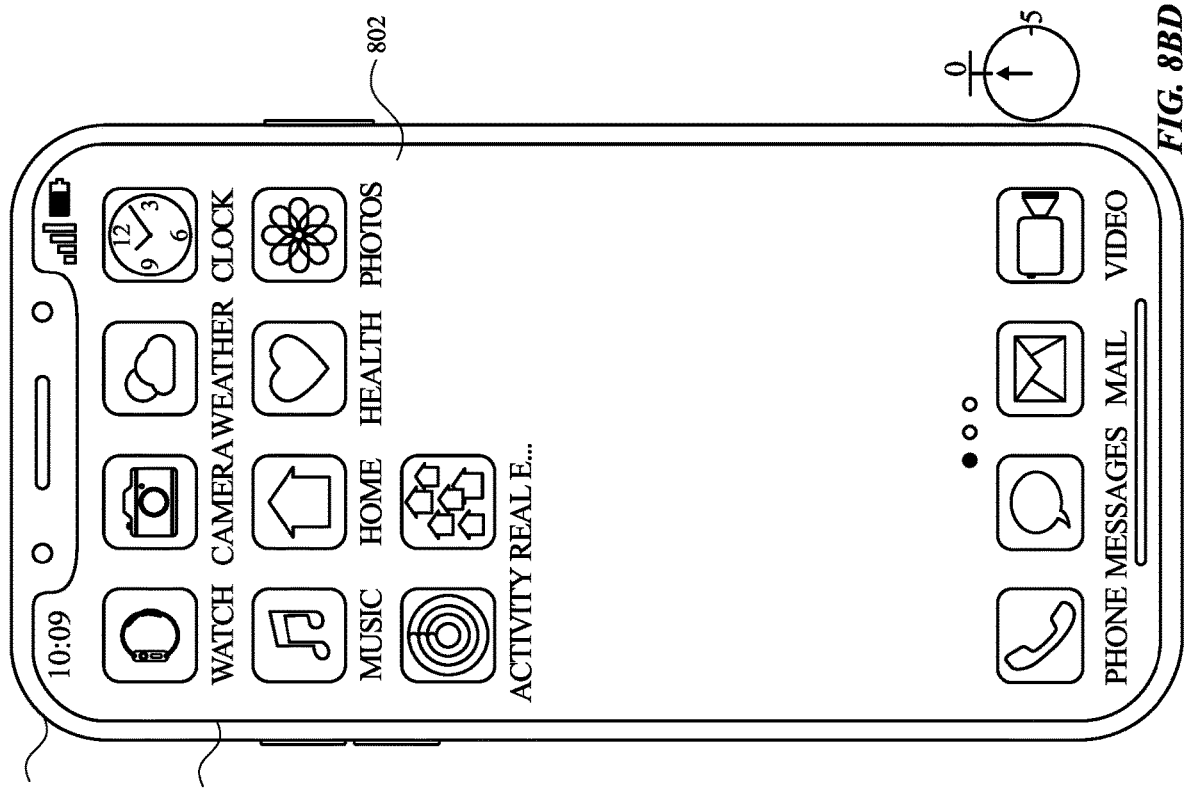
Figure 8B:
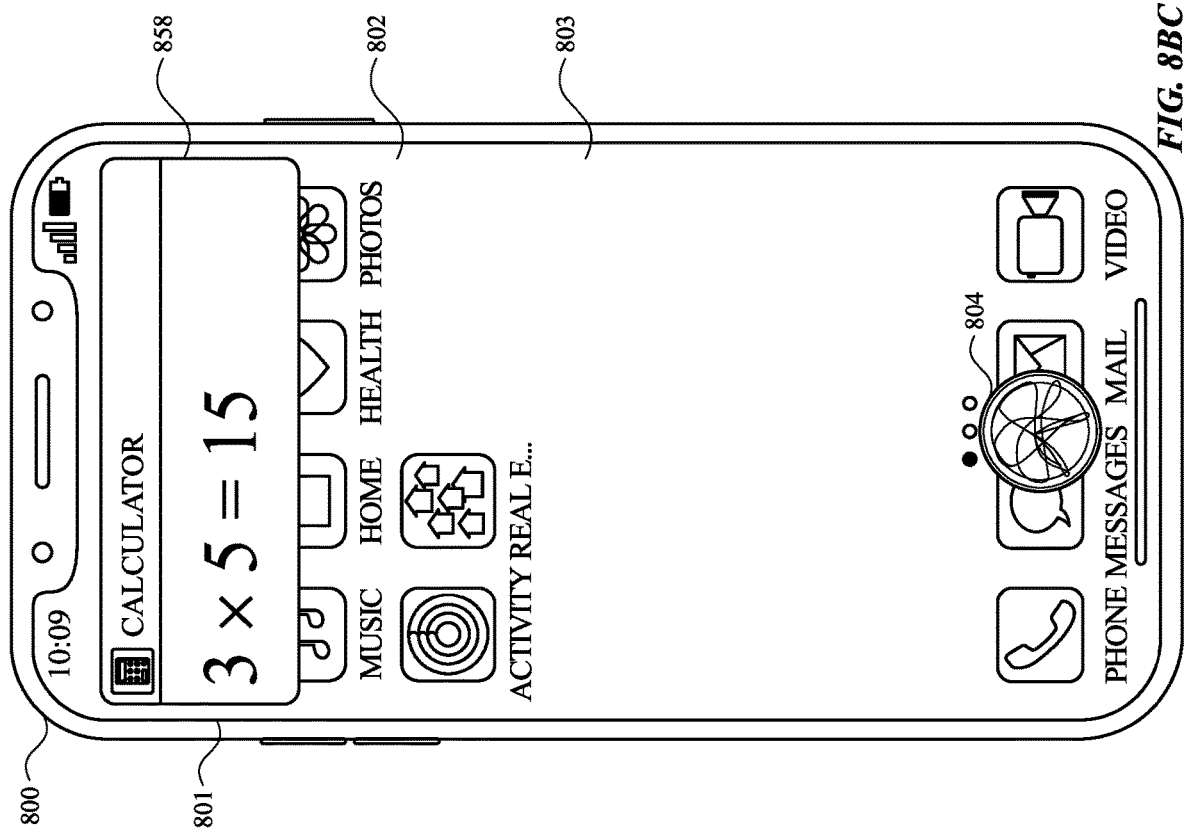
Figure 8B:
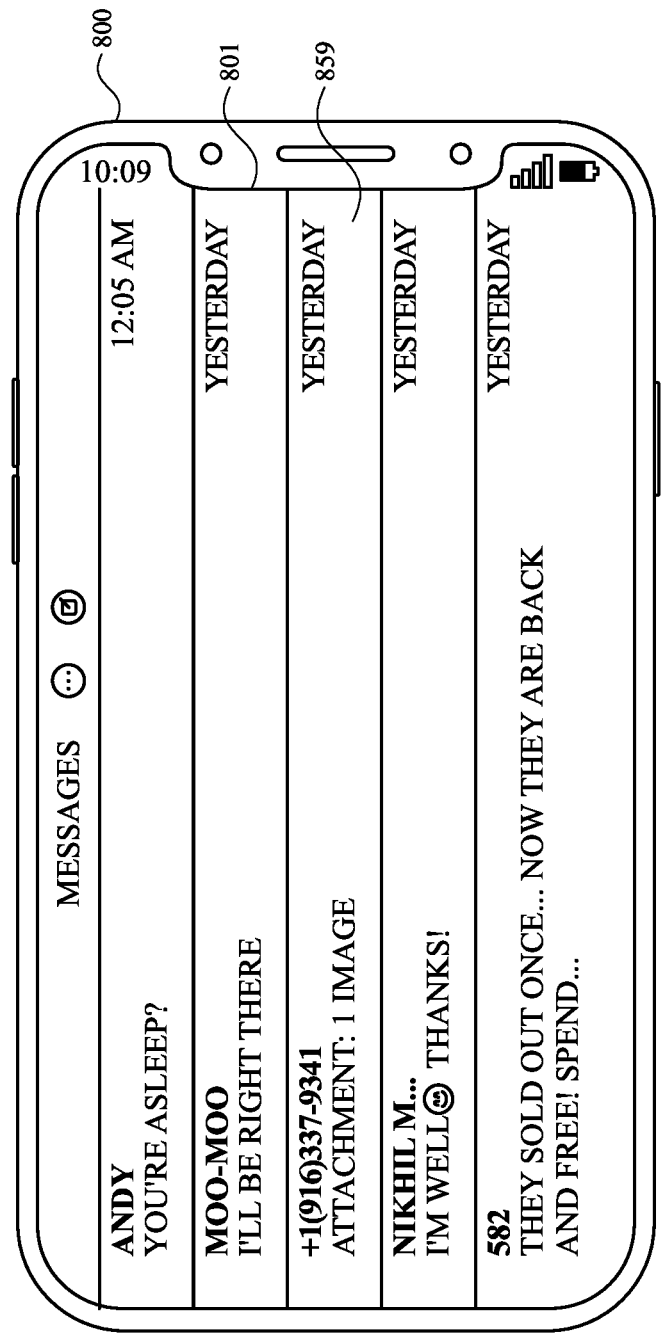
Figure 8B:
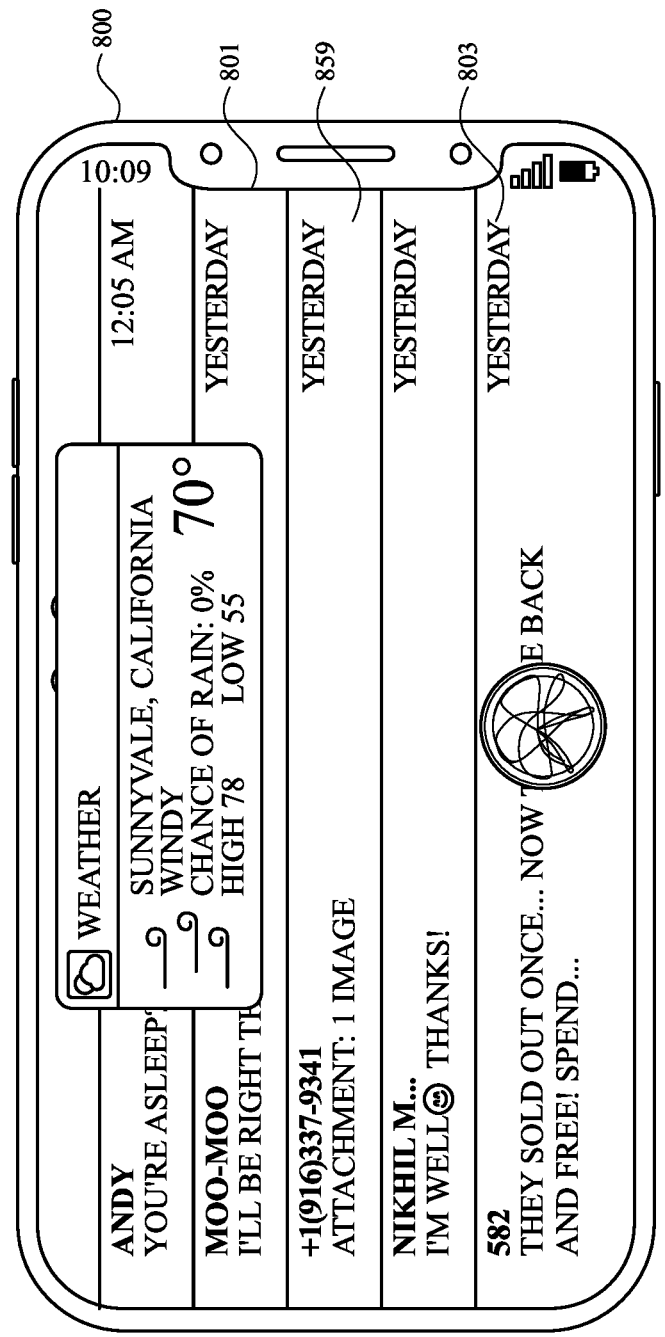
Figure 8B:
Figure 8B:
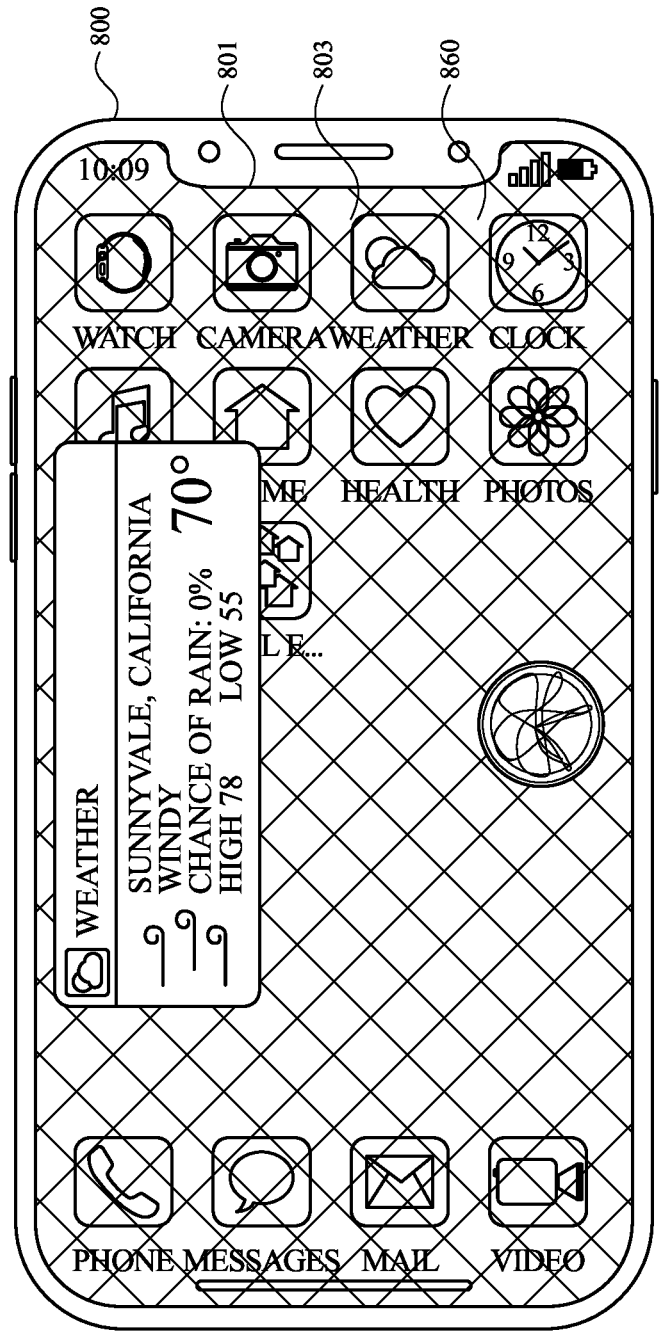
Figure 8B:
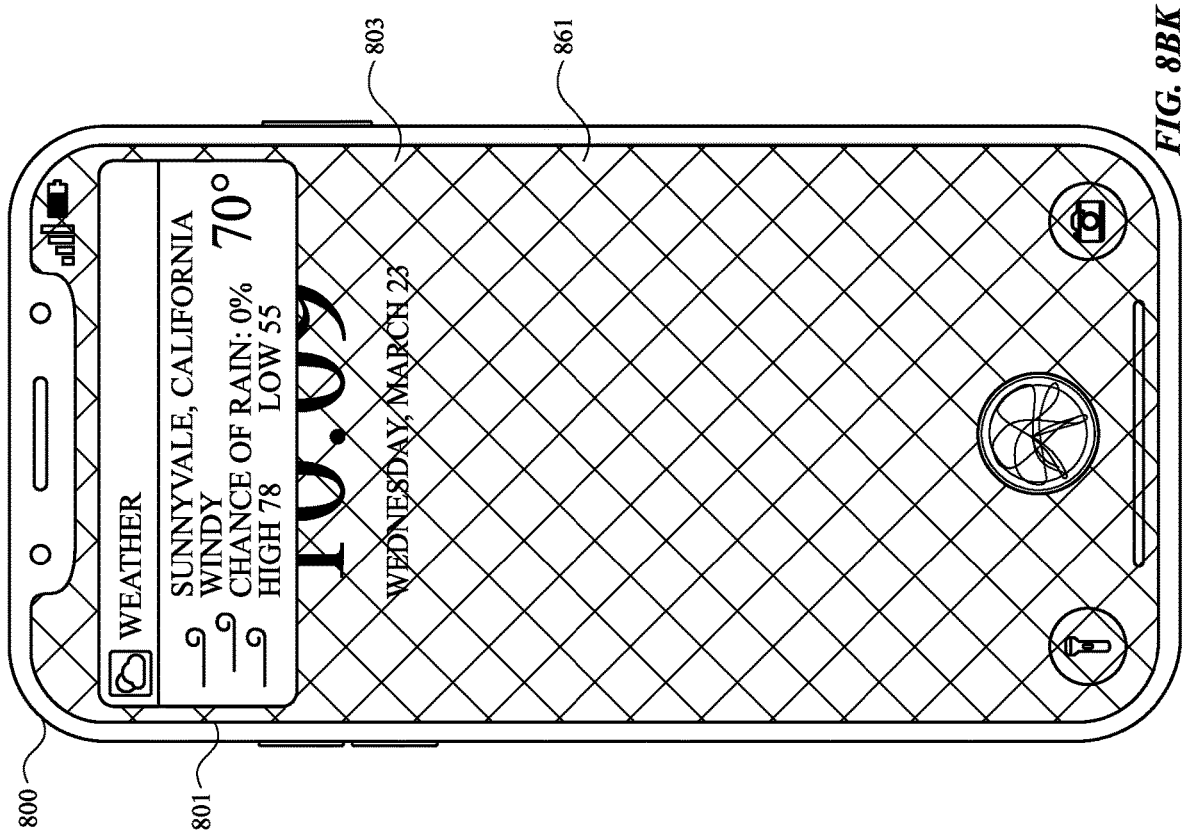
Figure 8B:
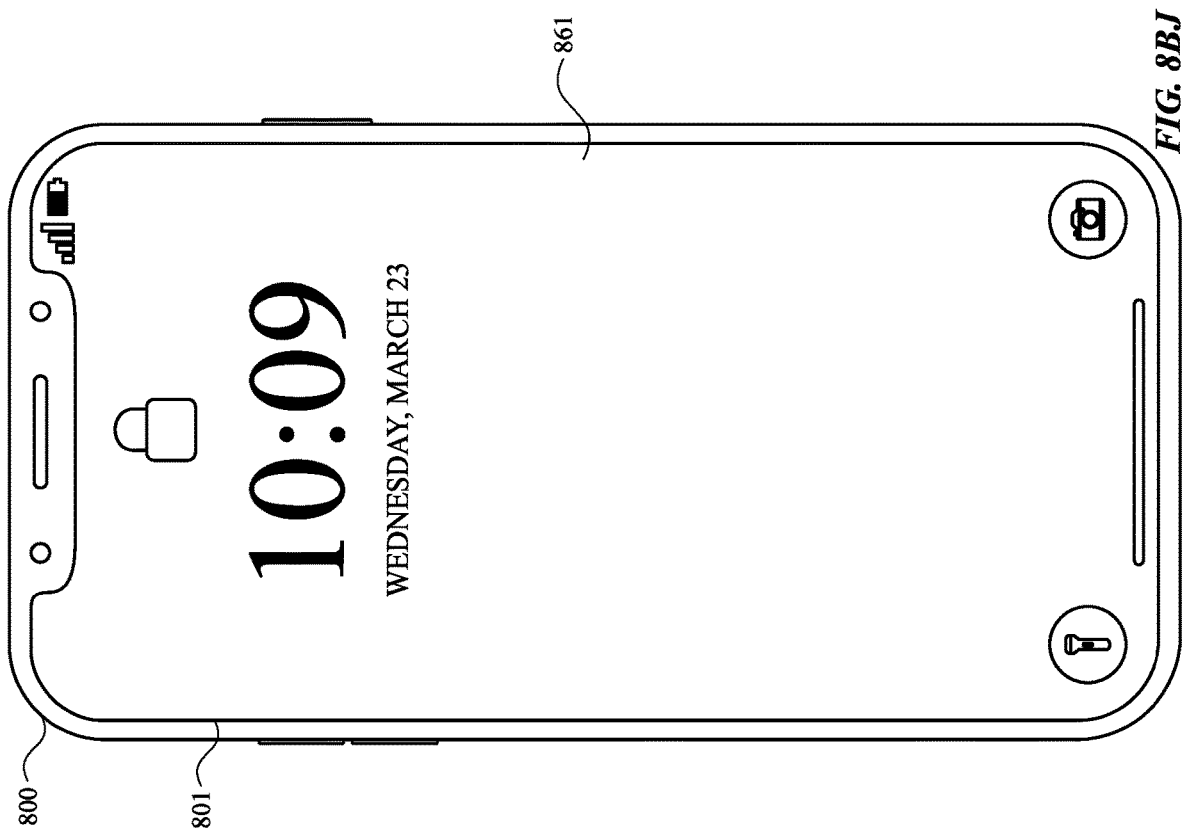
Figure 8B:
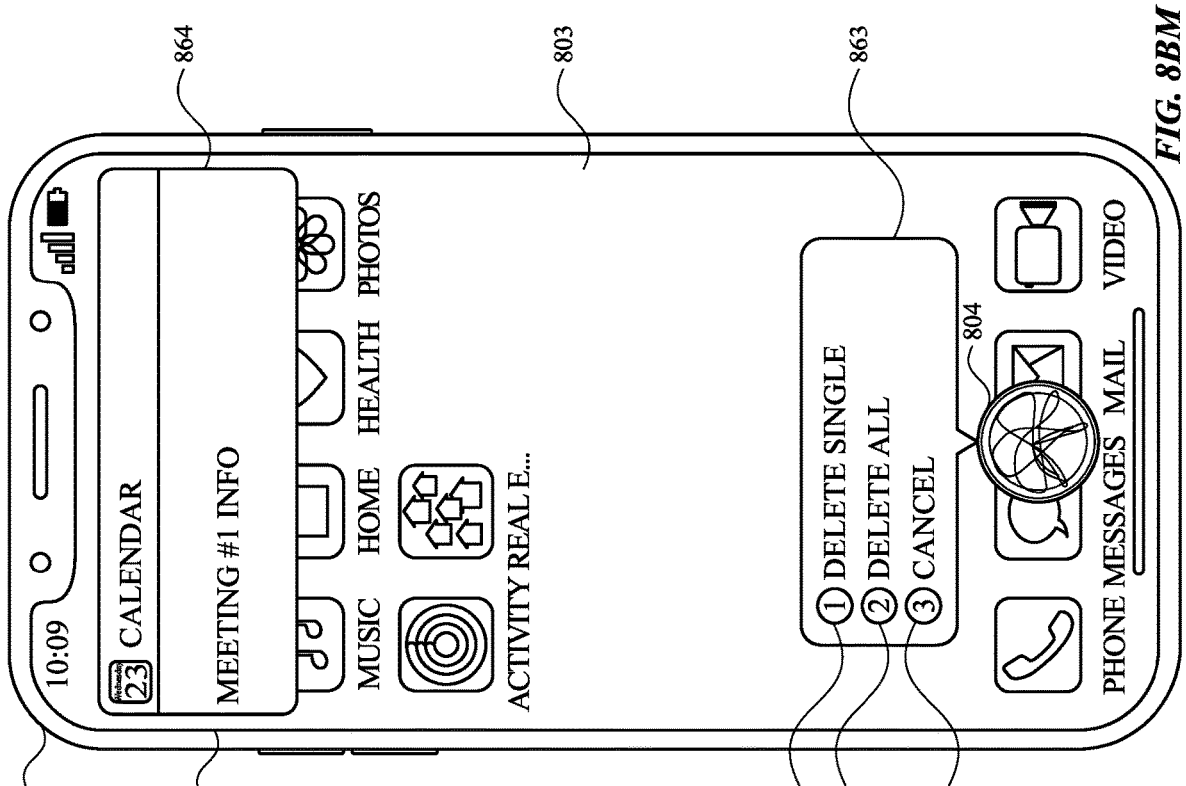
Figure 8B:
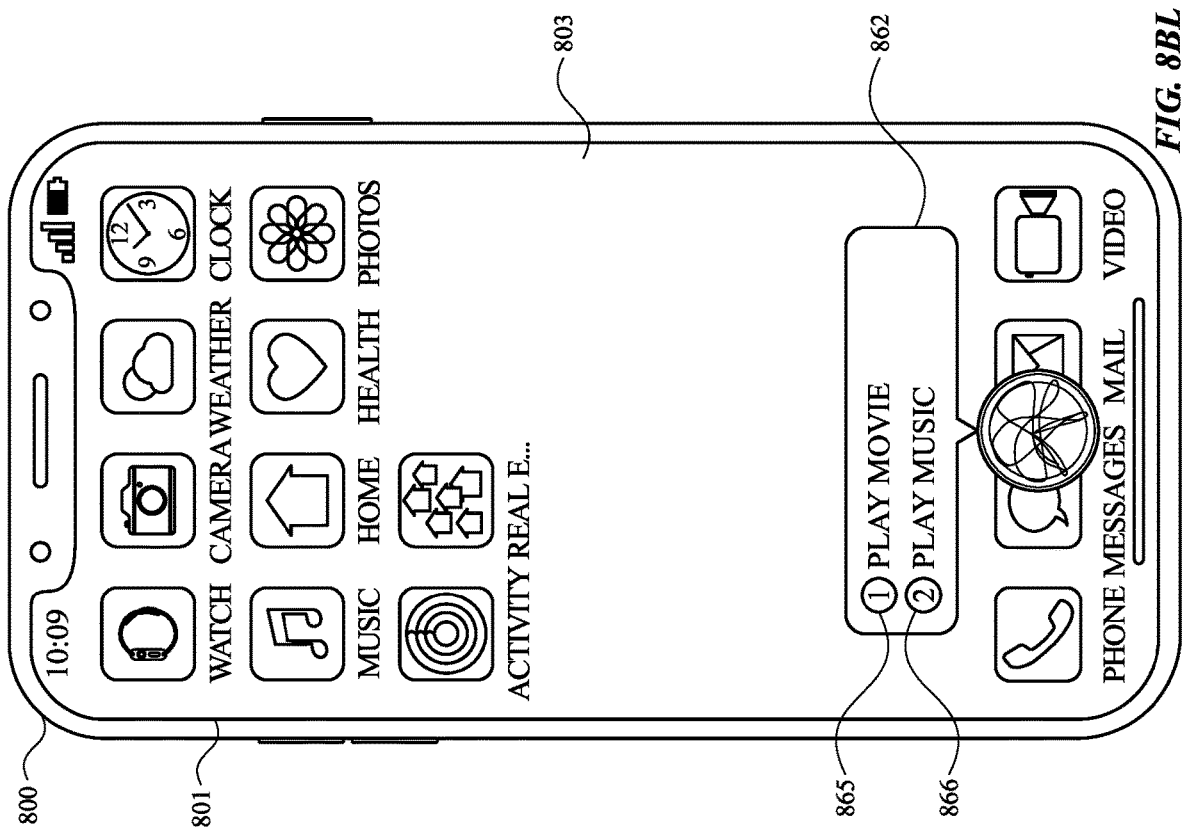
Figure 8B:
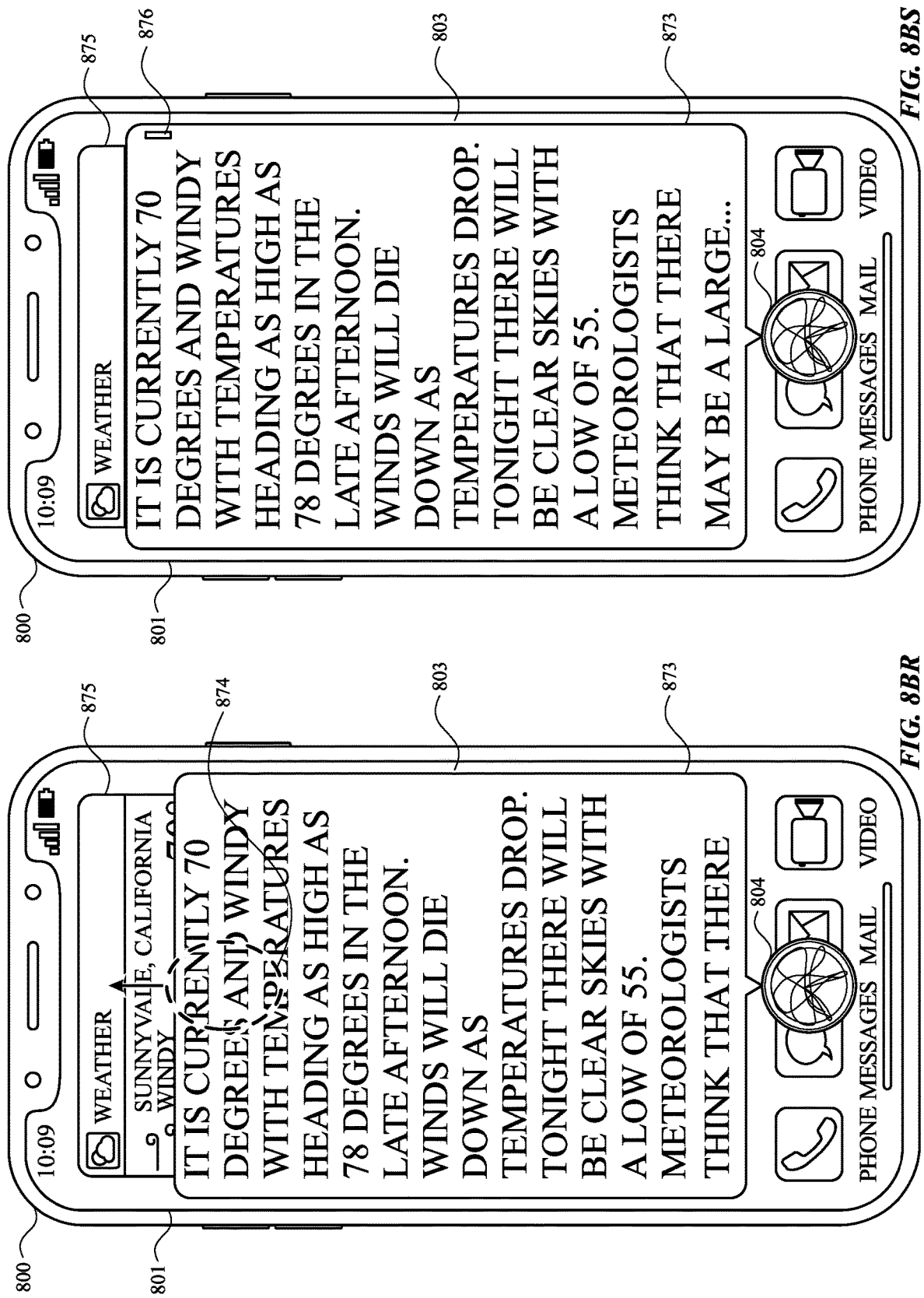
Figure 8B:
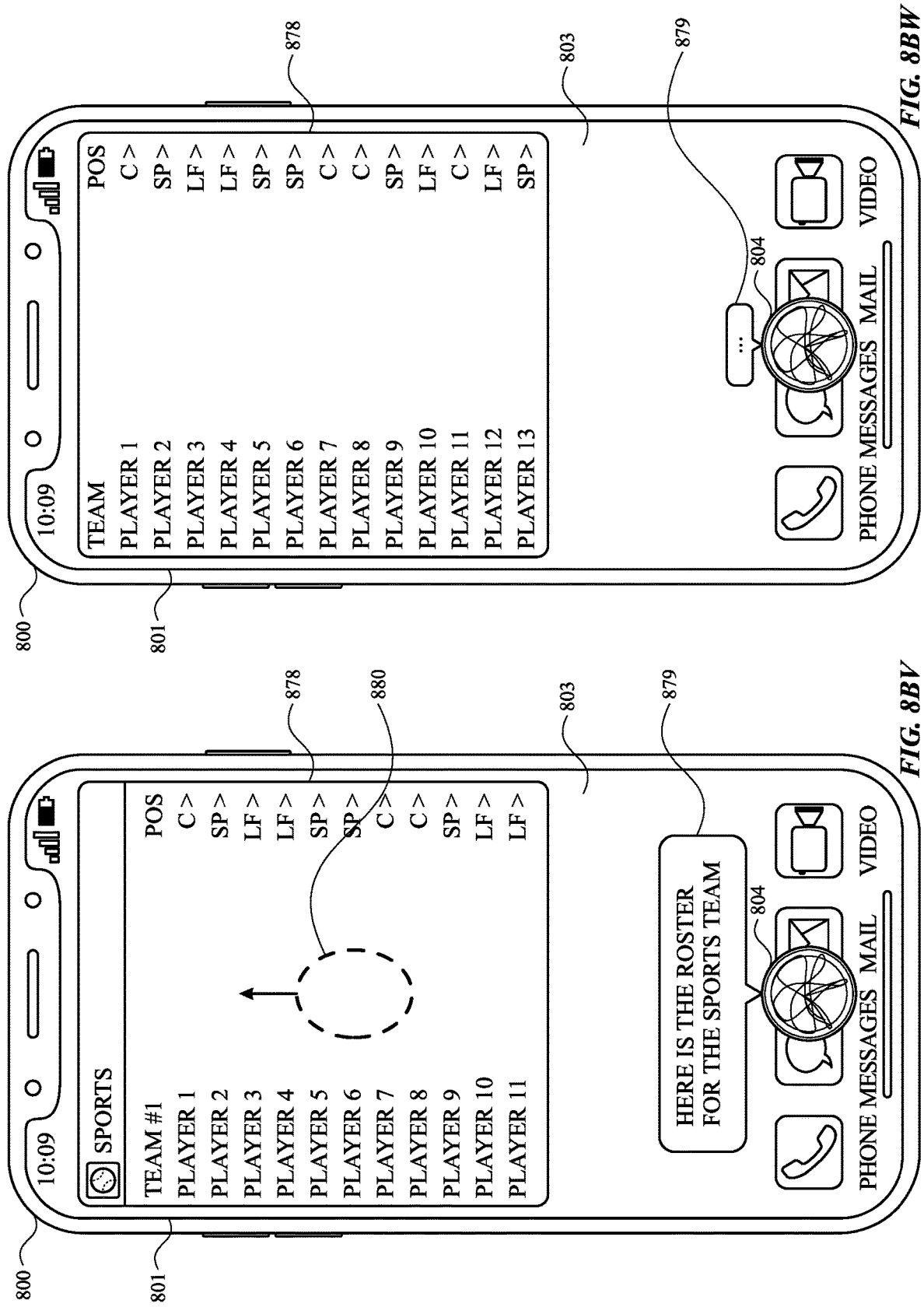
Figure 8B:
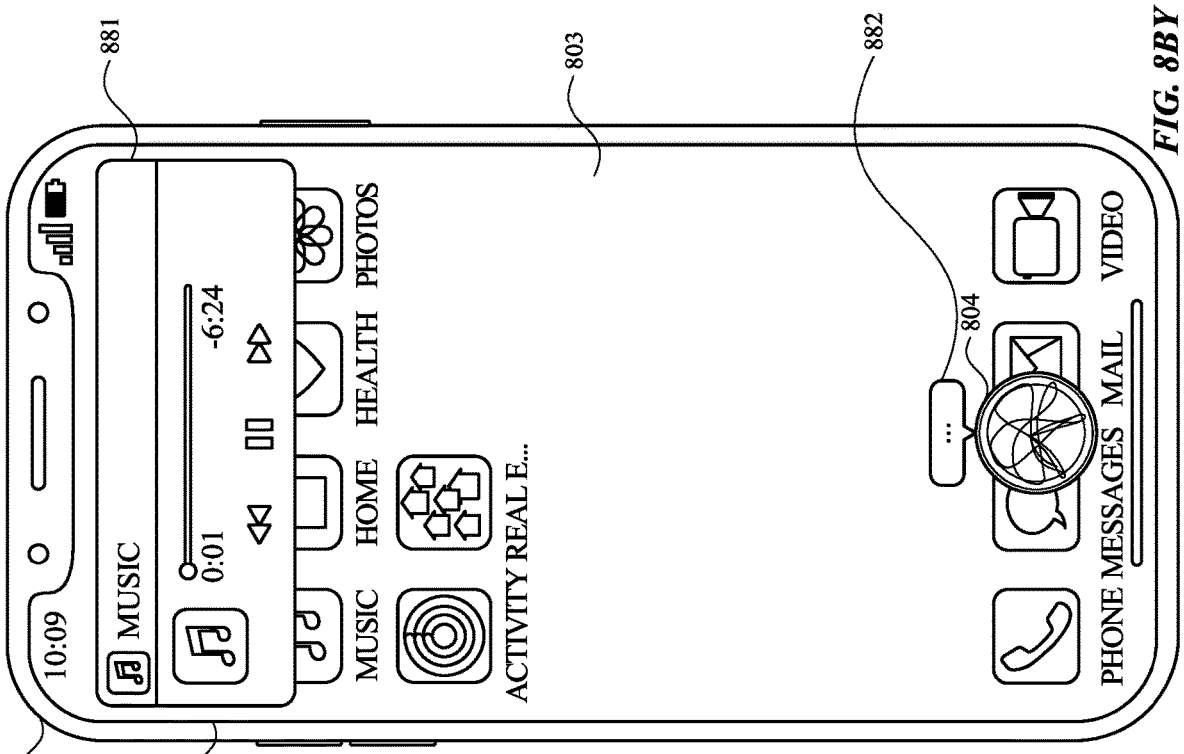
Figure 8B:
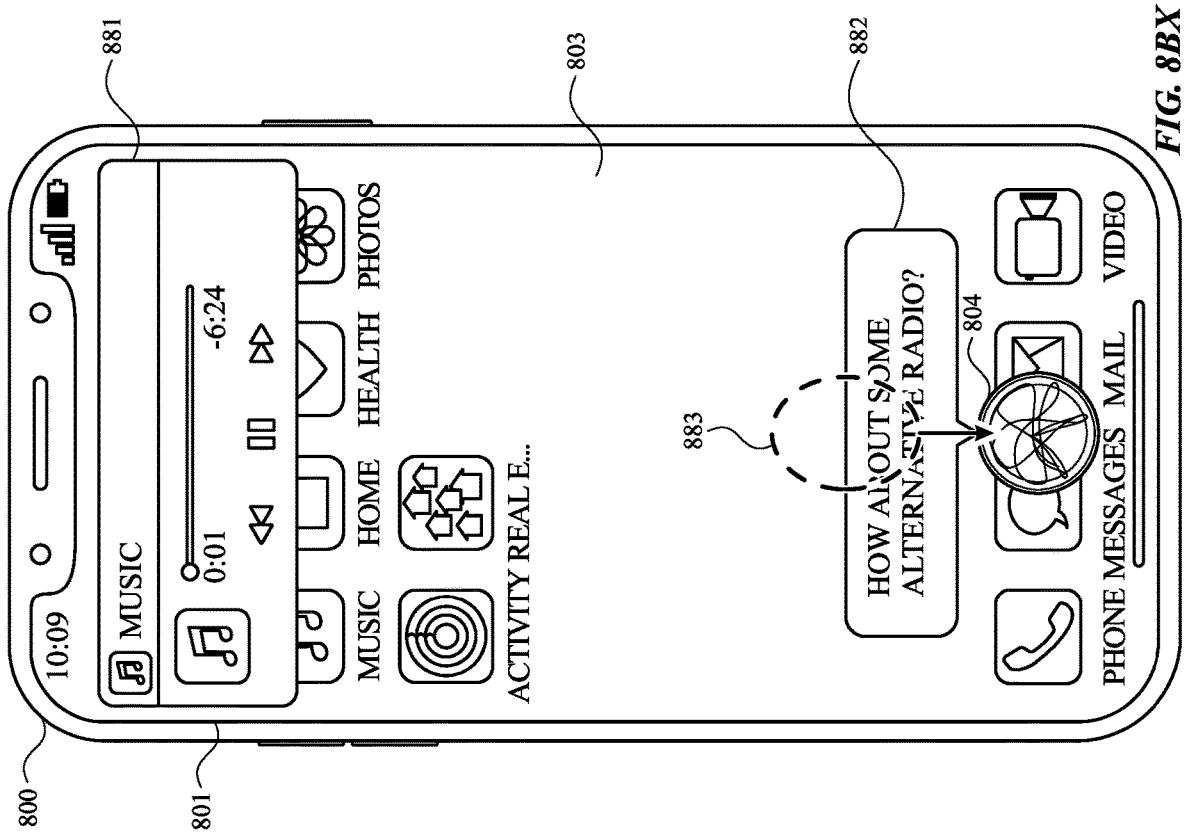
Figure 8C:
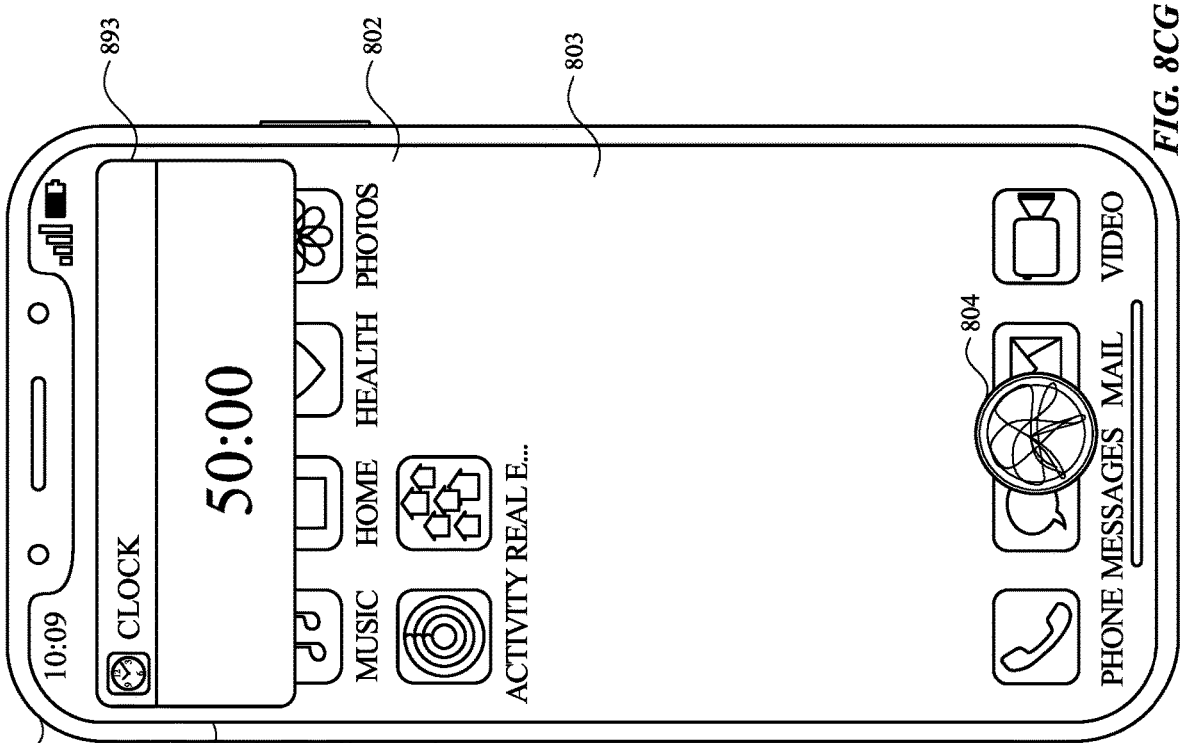
Figure 8C:
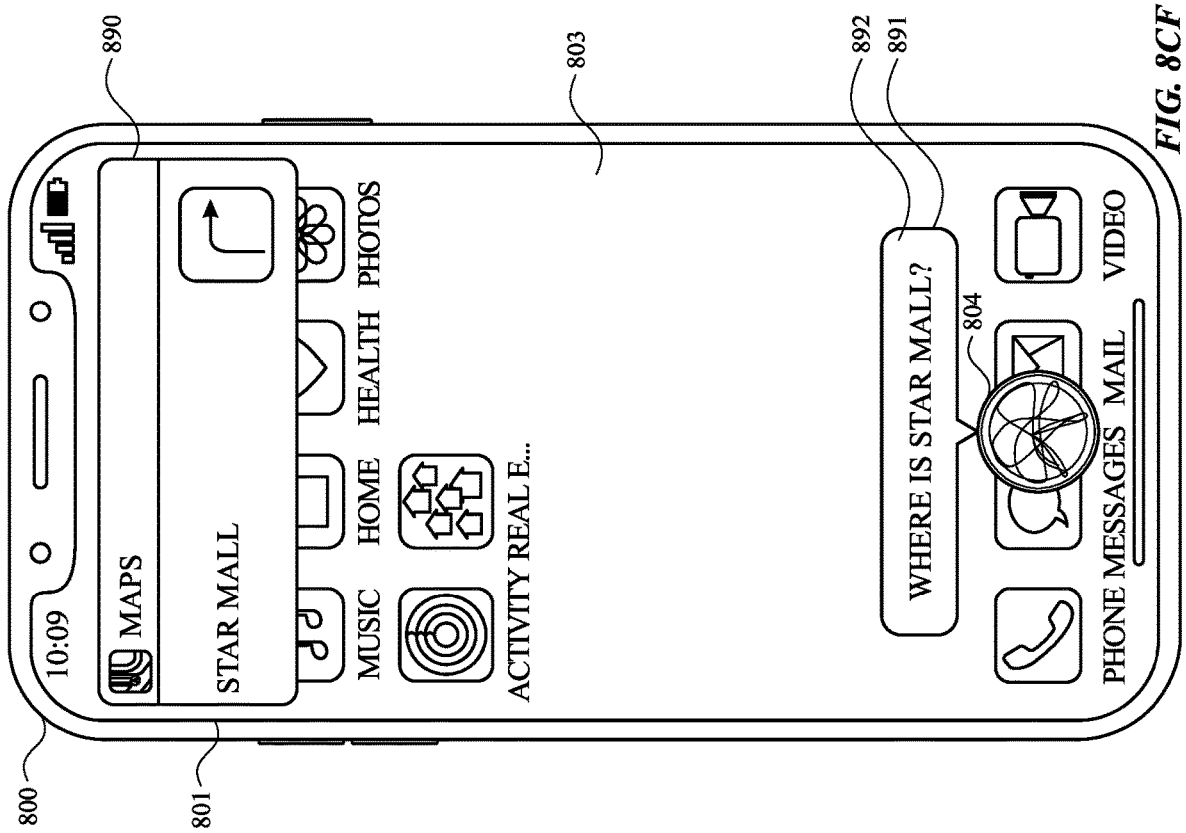
Figure 8C:
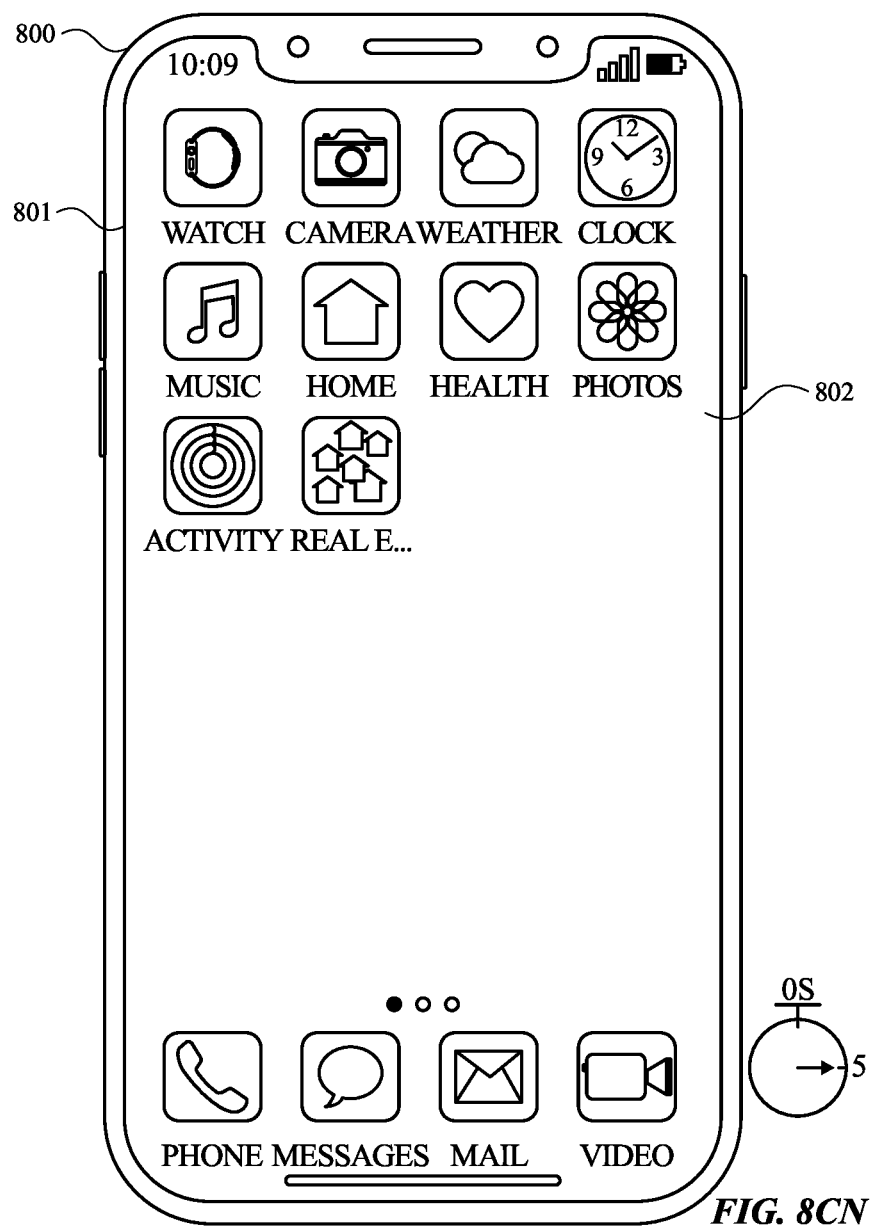
Figure 8C:
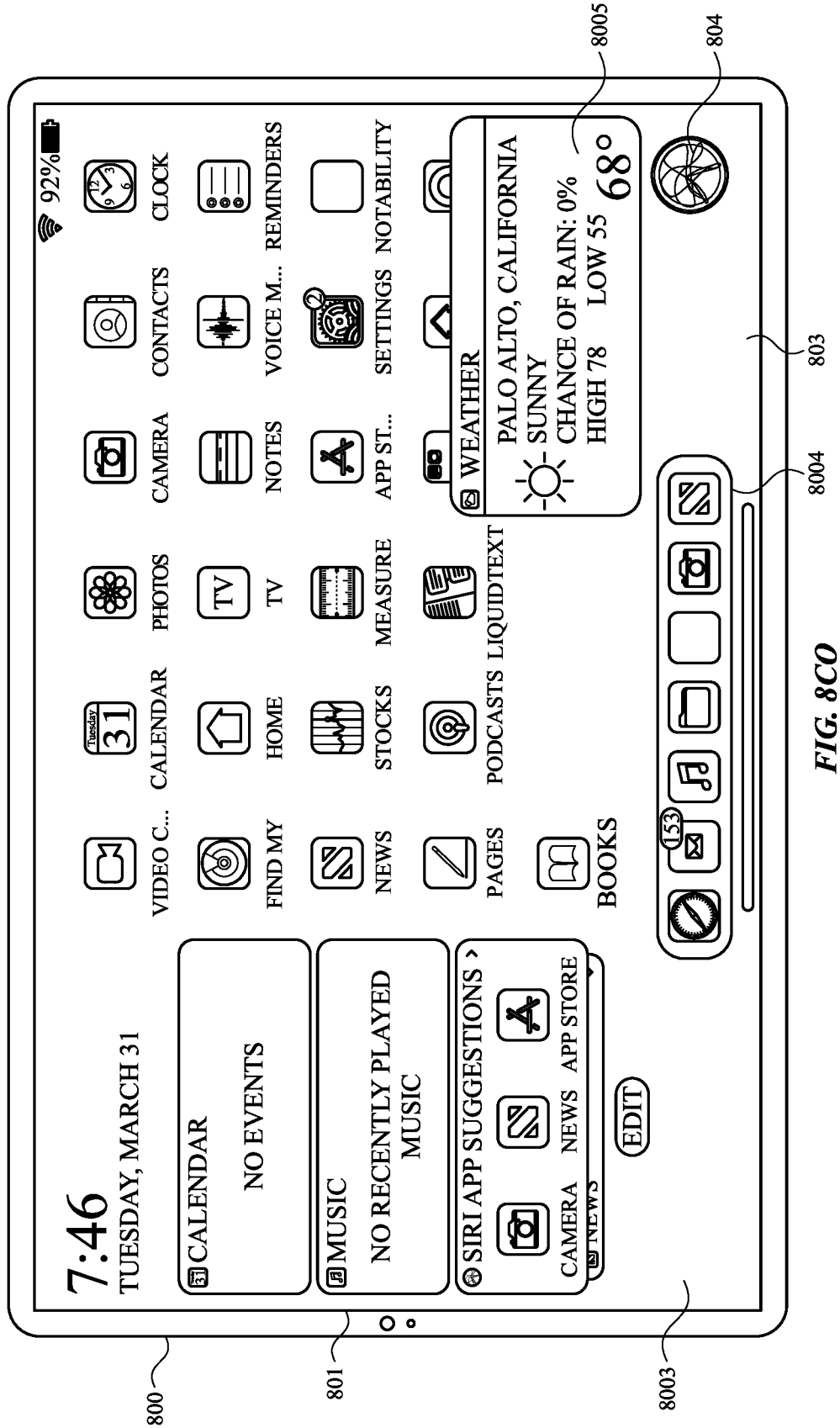
Figure 8C:
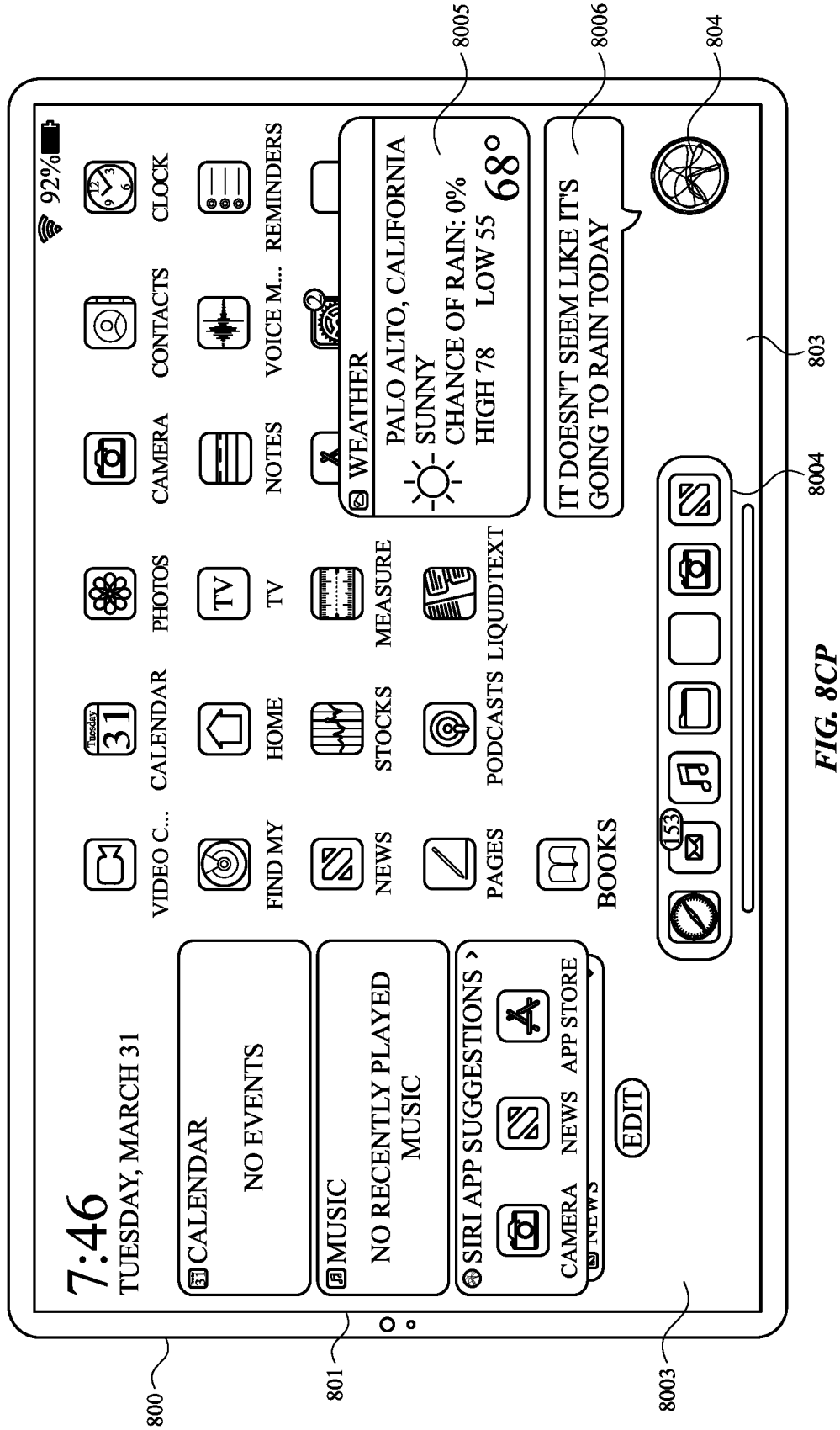
Figure 8C:
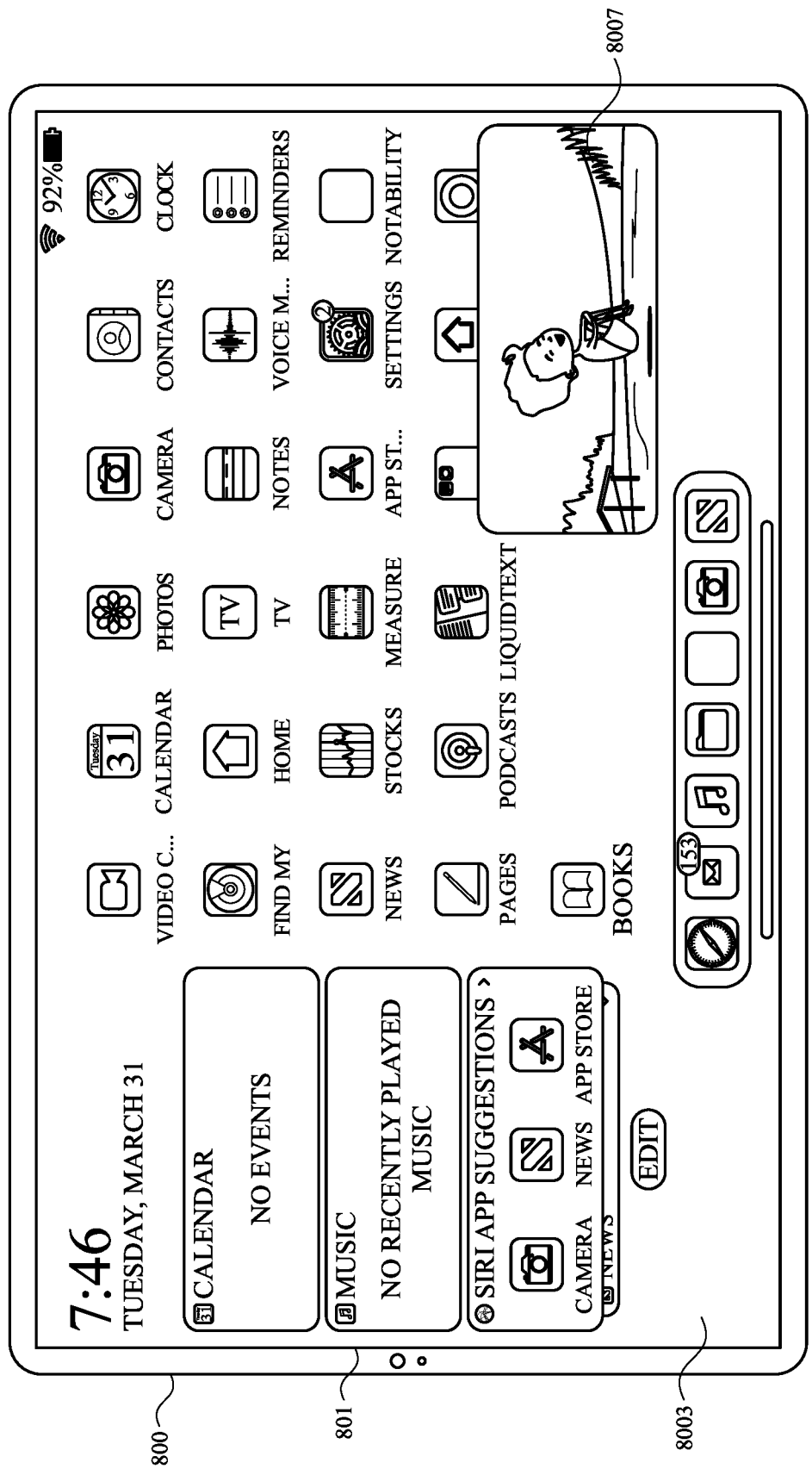
Figure 8C:
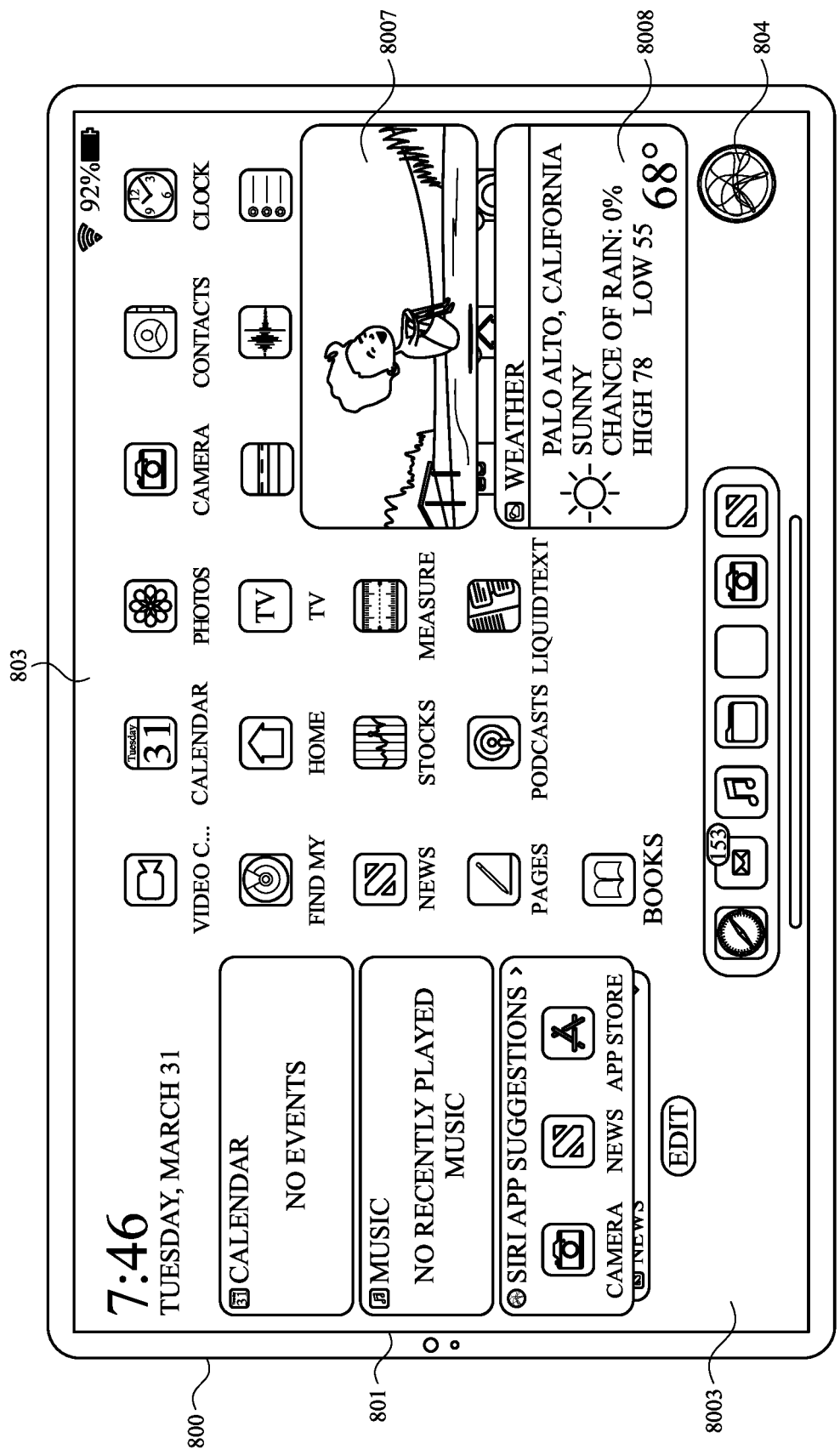
Figure 8C:
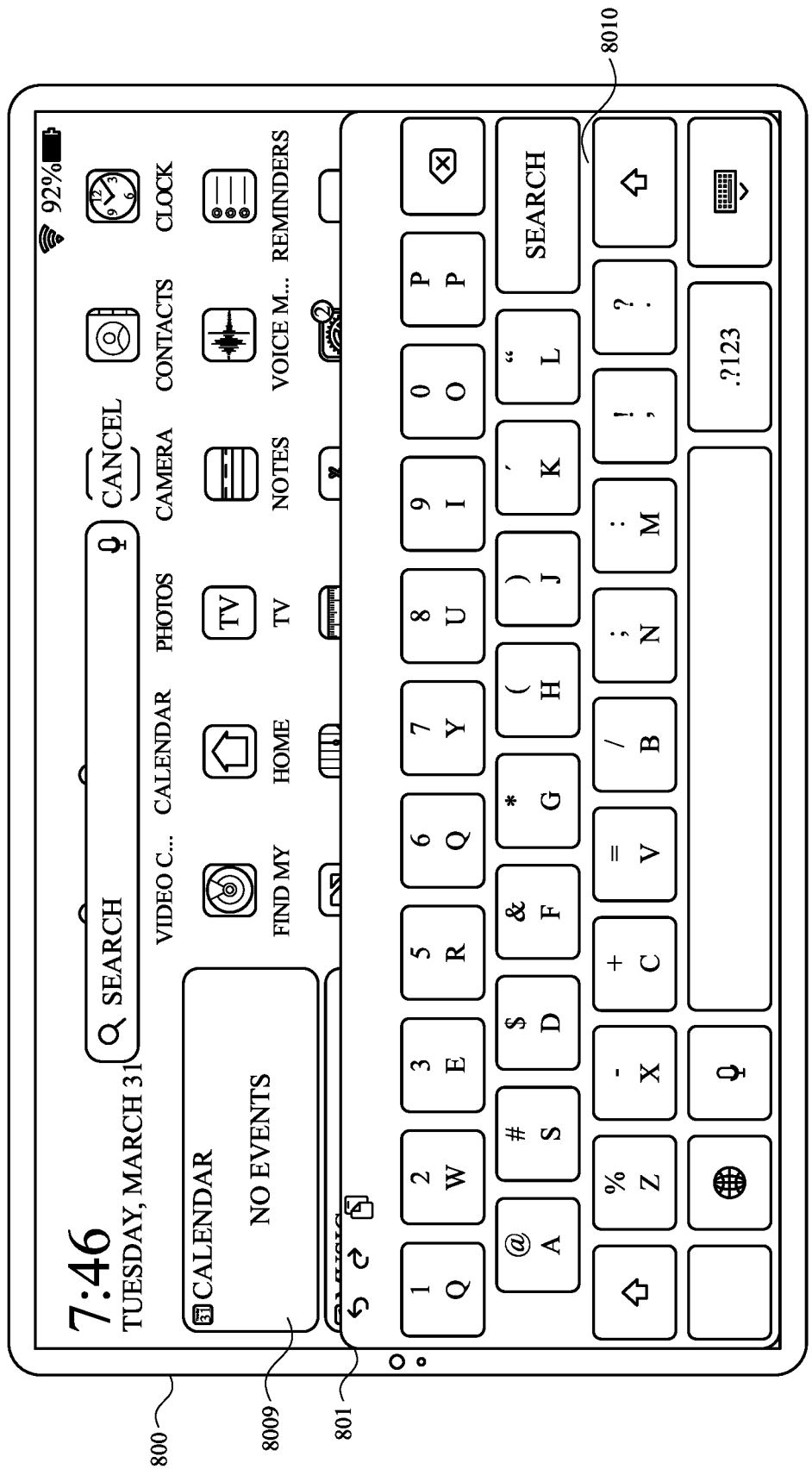
Figure 8C:
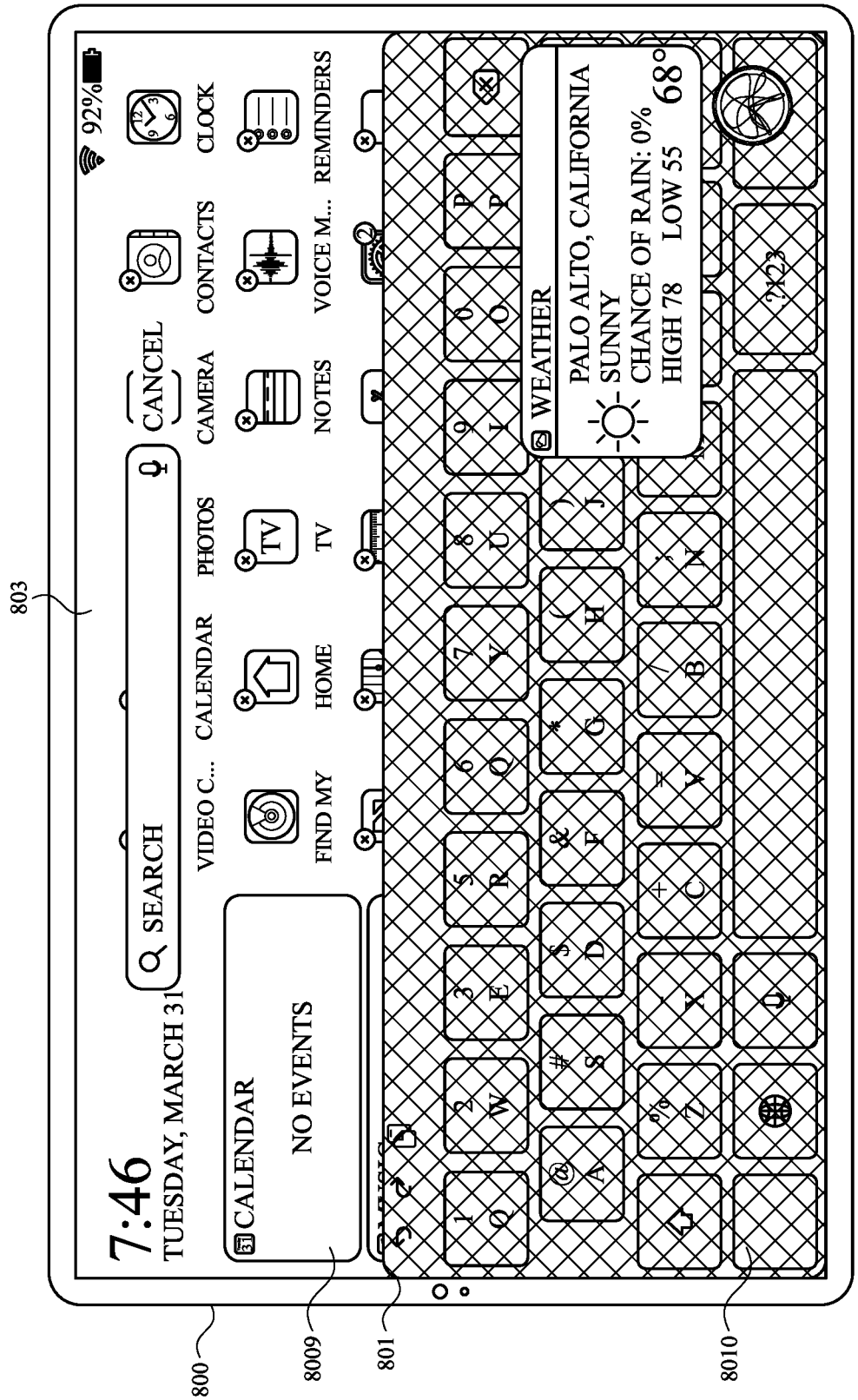

FIGS. 8V-8Y show that a user provides inputs to return to previous response affordances in the stack. In particular, in FIG. 8V, device 800 receives user input 823 (e.g., a swipe gesture) on third response affordance 822 requesting to return to second response affordance 819. FIG. 8W illustrates that in response to receiving user input 823, device 800 ceases to display third response affordance 822 and displays second response affordance 819 in its entirety. Device 800 further displays (e.g., reveals) a portion of response affordance 816. FIG. 8X illustrates device 800 receiving user input 824 (e.g., a swipe gesture) on second response affordance 819 requesting to return to response affordance 816. FIG. 8Y shows that in response to receiving user input 824, device 800 ceases to display second response affordance 819 and displays response affordance 816 in its entirety. In some examples, device 800 receives an input to display a next response affordance in the stack (e.g., swipe gesture in the opposite direction), and in response, displays the next response affordance in the stack, in a manner analogous to that described above. In other examples, navigating through response affordances in a stack relies on other input means (e.g., user selection of displayed "back" or "next" buttons), in a manner analogous to that described above.

FIG. 8Y further shows that user interface 802 is no longer visually obscured at the third portion of display 801. Thus, in some examples, as shown in FIGS. 8Q-8Y, user interface 802 is visually obscured when response affordances are stacked and not visually obscured when affordances are not stacked. For example, user interface 802 is visually obscured when initial response affordance 816 is not displayed (or only partially displayed) and user interface 802 is not visually obscured when initial response affordance 816 is displayed in its entirety.

In some examples, a user interface (e.g., a user interface that DA user interface 803 is displayed over) includes an input field occupying a fourth portion (e.g., "input field portion") of display 801. An input field includes an area where a user may provide natural language input. In some examples, the input field corresponds to an application, such as a messaging application, an email application, a note taking application, reminders application, a calendar application, and the like. FIG. 8Z shows user interface 825 of a messaging application including input field 826 occupying a fourth portion of display 801.

FIG. 8AA shows DA user interface 803 displayed over user interface 825. Device 800 displays DA user interface 803 responsive to the natural language input "what is this song?" DA user interface 803 includes indicator 804 at a first portion of display 801 and response affordance 827 (indicating the song identified by the DA) at a second portion of display 801.

In some examples, device 800 receives a user input corresponding to a displacement of a response affordance from the first portion display 801 to the fourth portion of display 801. In response to receiving the user input, device 800 replaces the display of the response affordance at the first portion of display 801 with a display of the response affordance in the input field. For example, FIGS. 8AB-8AD show that device 800 receives user input 828 displacing response affordance 827 from the first portion of display 801 to input field 826. User input 828 corresponds to a drag gesture from the first portion of display 801 to the fourth portion of display 801 and ends with a lift-off event (e.g., finger lift-off event) at the display of input field 826.

In some examples, as shown in FIGS. 8AB-8AD, while receiving user input 828, device 800 continuously displaces response affordance 827 from the first portion of display 801 to the fourth portion of display 801. For example, while response affordance 827 is displaced, device 800 displays response affordance 827 at locations corresponding to the respective current display contact locations of user input 828. In some examples, while response affordance 827 is displaced, a display size of response affordance 827 decreases, e.g., such that response affordance 827 shrinks under a user's finger (or other input apparatus) while being displaced. FIGS. 8AB-8AD further show that while continuously displacing response affordance 827, indicator 804 ceases to be displayed.

FIG. 8AD shows that response affordance 827 is now displayed in input field 826 of the messaging application. FIG. 8AE shows that device 800 receives user input 830 (e.g., a tap gesture) corresponding to a selection of send message affordance 829. FIG. 8AF shows that in response to receiving user input 830, device 800 sends response affordance 827 as a message. In this manner, a user may send a response affordance in a communication (e.g., text message, email) by providing input (e.g., drag and drop) to displace the response affordance into an appropriate input field. In other examples, a user may include a response affordance in a note, a calendar entry, a word processing document, a reminder entry, and the like, in an analogous manner.

In some examples, the user input corresponding to a displacement of a response affordance from the first portion display 801 to the fourth portion of display 801 (displaying the input field) corresponds to a selection of an affordance. In some examples, the affordance is either a share affordance (e.g., to share the response affordance in a communication) or a save affordance (e.g., to save the affordance in a note or reminder entry). For example, when device 800 display's DA user interface 803 over a user interface including an input field, the response affordance includes either a share affordance or a save affordance, depending on the type of the user interface. For example, the response affordance includes a share affordance when the user interface corresponds to a communication application (e.g., messaging or email) and the response affordance includes a save affordance when the user interface corresponds to another type of application with an input field (e.g., word processing, reminders, calendars, notes). User input selecting the share or save affordance causes device 800 to replace the display of the response affordance at the first portion of display 801 with a display of the response affordance in the input field, in manner analogous to that described above. For example, when the response affordance is displayed in the input field, device 800 ceases to display indicator 804.

In some examples, a user interface (e.g., a user interface that DA user interface 803 is displayed over) includes a widgets area occupying a fifth portion (e.g., "widgets portion") of display 801. In the example of FIG. 8AG, device 800 is a tablet device. Device 800 displays, on display 801, user interface 831 including widgets area 832 occupying a fifth portion of display 801. Device 800 further displays, over user interface 831, DA user interface 803. DA user interface 803 is displayed responsive to the natural language input "track flight 23." DA user interface 803 includes indicator 804 displayed at a first portion of display 801 and response affordance 833 (including information about flight 23) displayed at a second portion of display 801.

In some examples, device 800 receives a user input corresponding to displacement of a response affordance from the first portion of display 801 to the fifth portion of display 801. In some examples, in response to receiving the user input, device 800 replaces the display of the response affordance at the first portion of the display with a display of the response affordance in the widgets area. For example, FIGS. 8AH-8AJ show that device 800 receives user input 834 displacing response affordance 833 from the first portion of display 801 to widgets area 832. User input 834 corresponds to a drag gesture from the first portion of display 801 to the fifth portion of display 801 and ends with a lift-off event at the display of widgets area 832. In some examples, displacing response affordance 833 from the first portion of display 801 to the fifth portion of display 801 is performed in a manner analogous to the displacement of response affordance 827, discussed above. For example, while response affordance 833 is displaced, indicator 804 ceases to be displayed.

FIG. 8AJ shows that response affordance 833 is now displayed in widgets area 832 with the displayed calendar and music widgets. In this manner, a user may provide input (e.g., drag and drop) displacing response affordance 833 to widgets area 832 to add response affordance 833 as a widget.

In some examples, a user input corresponding to displacement of a response affordance from the first portion of display 801 to the fifth portion of display 801 corresponds to a selection of an affordance. In some examples, the affordance is a "display in widgets" affordance. For example, when device 800 displays DA user interface 803 over a user interface including a widgets area, the response affordance includes the "display in widgets" affordance. User input selecting the "display in widgets" affordance causes device 800 to replace the display of the response affordance at the first portion of display 801 with a display of the response affordance in the widgets area, in a manner analogous to that discussed above.

In some examples, a response affordance corresponds to an event, and device 800 determines a completion of the event. In some examples, in response to determining the completion of the event, device 800 ceases to display the response affordance in the widgets area (e.g., a predetermined duration after determining the completion). For example, response affordance 833 corresponds to a flight, and in response to a determination that the flight has completed (e.g., landed), device 800 ceases to display response affordance 833 in widgets area 832. As another example, a response affordance corresponds to a sports game, and in response to a determination that the sports game has ended, device 800 ceases to display the response affordance in the widgets area.

FIGS. 8AK-8AN show various example types of response affordances. In particular, FIG. 8AK shows compact response affordance 835 displayed responsive to the natural language request "how old is celebrity X?" Compact response affordance 835 includes a direct answer to the request (e.g., "30 years old") without including further information (e.g., additional information about celebrity X). In some examples, all compact response affordances have a same maximum size, so that a compact response affordance can only occupy a (relatively small) area of display 801. FIG. 8AL shows detailed response affordance 836 displayed responsive to the natural language request "give me the stats on team #1." Detailed response affordance 836 includes detailed information about team #1 (e.g., various statistics)

and has a larger display size than compact response affordance 835. FIG. 8AM shows list response affordance 837 displayed responsive to the natural language "show me a list of restaurants nearby." List response affordance 837 includes a list of options (e.g., restaurants) and has a larger display size than compact response affordance 835. FIG. 8AN shows a disambiguation response affordance 838 displayed responsive to the natural language request "call Neal." Disambiguation response affordance includes selectable disambiguation options: (1) Neal Ellis, (2) Neal Smith, and (3) Neal Johnson. Device 800 further provides audio output asking "which Neal?"

As FIGS. 8AK-8AN show, the type of displayed response affordance (e.g., compact, detailed, list, disambiguation) depends on the content of the natural language input and/or the DA's interpretation of the natural language input. In some examples, affordance authoring rules specify the particular types of response affordance to display for particular types of natural language inputs. In some examples, the authoring rules specify to attempt to display a compact response affordance by default, e.g., such that device 800 displays compact response affordances responsive to natural language inputs that may be sufficiently answered by a compact response affordance. In some examples, when a response affordance may be displayed in different states (e.g., a first compact state and a second expanded (detailed) state), the authoring rules specify to initially display the response affordance as a compact affordance. As discussed with respect to FIGS. 8G-8H, the detailed version of the compact affordance may be available for display responsive receiving appropriate user input. It will be appreciated that some natural language inputs (e.g., "give me the stats on team #1" and "show me a list of restaurants nearby") cannot be sufficiently answered (or it may be undesirable to answer the input) with a compact affordance. Accordingly, the authoring rules may specify the particular type of affordance to display (e.g., detailed, list) for such inputs.

In some examples, the DA determines a plurality of results corresponding to a received natural language input. In some examples, device 800 displays a response affordance including a single result of the plurality of results. In some examples, while displaying the response affordance, no other result of the plurality of results is displayed. For example, consider the natural language input "nearest coffee." The DA determines a plurality of results (a plurality of nearby coffee shops) corresponding to the input. FIG. 8AO shows response affordance 839 (e.g., a compact affordance) displayed responsive to the input. Response affordance 839 includes a single result of the plurality of results (the closest coffee shop to device 800's location). Device 800 further provides speech output "here's the closest coffee shop." In this manner, for natural language requests implicating multiple results, the DA may initially provide a single result, e.g., most relevant result.

In some examples, after providing the single result (e.g., displaying response affordance 839), the DA provides a next result of the plurality of results. For example, in FIG. 8AP, device 800 replaces response affordance 839 with response affordance 840 that includes the second closest coffee shop. Device 800 further provides speech output "here's the second closest coffee shop." In some examples, device 800 transitions from FIG. 8AO to 8AP responsive to receiving user input rejecting the single result (e.g., "I don't want that one") or user input instructing to provide the next result. In some examples, device 800 transitions from FIG. 8AO to 8AP a predetermined duration after displaying affordance 839 and/or after providing the speech output "here's the closest coffee shop," e.g., if no user input selecting affordance 839 is received. In this manner, device 800 may sequentially provide results for natural language inputs implicating a plurality of results.

In some examples, a response affordance includes one or more task affordances. User input (e.g., a tap gesture) selecting a task affordance causes device 800 to perform a corresponding task. For example, in FIG. 8AN, response affordance 838 includes task affordances 841, 842, and 843 User selection of task affordance 841 causes device 800 to initiate a phone call to Neal Ellis, user selection of task affordance 842 causes device 800 to initiate a phone call to Neal Smith, and so on. As another example, response affordance 839 includes task affordance 844 and response affordance 840 includes task affordance 845. User selection of task affordance 844 causes device 800 to launch a maps application displaying directions to the closest coffee shop, while user selection of task affordance 845 causes device 800 to launch the maps application displaying directions to the second closest coffee shop.

In some examples, device 800 concurrently displays a plurality of response affordances responsive to a natural language input. In some examples, each of the plurality of response affordances corresponds to a different possible domain for the natural language input. In some examples, device 800 displays the plurality of response affordances when the natural language input is determined to be ambiguous, e.g., corresponds to multiple domains.

For example, consider the natural language input "Beyoncé." FIG. 8AQ shows response affordances 846, 847, and 848 concurrently displayed responsive to the natural language input. Response affordances 846, 847, and 848 respectively correspond to the news domain (e.g., the user requested news about Beyoncé), the music domain (e.g., the user requested to play music by Beyoncé), and the knowledge domain (e.g., the user requested information about Beyoncé). In some examples, respective user inputs corresponding to selection of response affordances 846, 847, and 848 cause device 800 to perform corresponding actions. For example, selection of response affordance 846 causes display of a detailed response affordance including news about Beyoncé, selection of response affordance 847 causes device 800 to launch a music application including songs by Beyoncé, and selection of response affordance 848 causes display of a detailed response affordance including information about Beyoncé.

In some examples, a response affordance includes an editable text field, the editable text field including text determined from the natural language input. For example, FIG. 8AR shows response affordance 849 displayed responsive to the natural language speech input "text mom I'm home." Response affordance 849 includes editable text field 850 including the text "I'm hole", e.g., because the DA mistakenly recognized "I'm home" as "I'm hole." Response affordance further includes task affordance 851. User input selecting task affordance 851 causes device 800 to send the text message.

In some examples, device 800 receives a user input corresponding to a selection of the editable text field, and in response, displays a keyboard while displaying the response affordance. For example, FIG. 8AS shows device 800 receiving user input 852 (e.g., a tap gesture) selecting editable text field 850. FIG. 8AT shows that in response to receiving user input 852, device 800 displays keyboard 853 while displaying response affordance 849. As shown, device 800 displays keyboard 853 over user interface 802 (e.g., the user interface DA user interface 803 is displayed over).

While FIGS. 8AT-8AV show that a portion of user interface 802 is not visually obscured while a response affordance and a keyboard are displayed over user interface 802, in other examples, at least a portion of user interface 802 is visually obscured (e.g., at portions of display 801 not displaying the keyboard or response affordance 849).

In some examples, device 800 receives one or more keyboard inputs, and in response, updates the text in the editable text field according to the one or more keyboard inputs. For example, FIG. 8AU shows that device 800 has received keyboard input correcting "hole" to "home." Device 800 displays the corrected text in editable text field 850 of response affordance 849.

In other examples, device 800 receives speech input requesting to edit text displayed in the editable text field. In response to receiving the speech input, device 800 updates text in the editable text field according to the speech input. For example, in FIG. 8AR, a user may provide speech input "No, I said I'm home" to cause device 800 to update the text in editable text field 850 accordingly.

In some examples, after updating text in the editable text field, device 800 receives a user input requesting to perform a task associated with the affordance. In response to receiving the user input, device 800 performs the requested task based on the updated text. For example, FIG. 8AV shows that device 800 receives a user input 854 (e.g., a tap gesture) corresponding to a selection of task affordance 851, after editing "hole" to "home." FIG. 8AW shows that responsive to receiving, user input 854, device 800 sends the message "I'm home" to the user's mom. Device 800 further displays glyph 855, indicating the completion of the task. FIG. 8AW further shows that responsive to receiving user input 854, device 800 ceases to display keyboard 853 to display (e.g., reveal) a portion of user interface 802 and that device 800 displays indicator 804.

In this manner, a user may edit text included in response affordances (e.g., if the DA misrecognized the user's speech input) and cause the DA to perform an action using correct text. Although FIGS. 8AR-8AW show the example of editing and sending a text message, in other examples, users can edit and save (or send) notes, calendar entries, reminder entries, email entries, and the like, in an analogous manner.

In some examples, device 800 receives user input to dismiss a DA. In some examples, dismissing the DA includes ceasing to display DA user interface 803. DA dismissal is discussed in greater detail with respect to FIGS. 10A-10V below. In some examples, after dismissing a DA, device 800 receives user input to re-initiate the DA (e.g., user input that satisfies a criterion for initiating a DA). In some examples, in accordance with receiving the user input to re-initiate the DA, device 800 displays a DA user interface including the same response affordance, e.g., the response affordance displayed before the DA was dismissed.

In some examples, device 800 displays the same response affordance in accordance with a determination that the same response affordance corresponds to a response to received natural language input (e.g., input intended for the re-initiated DA). For example, FIG. 8AX shows DA user interface 803 including response affordance 856. Device 800 displays DA user interface 803 responsive to the natural language input "what's the weather?" FIG. 8AY shows device 800 receiving a user input 857 to dismiss the DA, e.g., a tap gesture corresponding to a selection of user interface 802. FIG. 8AZ illustrates that in response to receiving user input 857, device 800 dismisses the DA, e.g., ceases to display DA user interface 803. FIG. 8BA shows that device 800 has received input to re-initiate the DA and is currently receiving the natural language input "is it windy?" FIG. 8BB shows device 800 displaying DA user interface 803 including the same response affordance 856 and providing the speech output "yes, it is windy." For example, the DA has determined that the same response affordance 856 corresponds to the natural language inputs "what's the weather?" and "is it windy?" In this manner, a previous response affordance may be included in a subsequently initiated DA user interface if the previous response affordance is relevant to a current natural language request.

In some examples, device 800 displays the same response affordance in accordance with a determination that the user input to re-initiate the DA is received within a predetermined duration of dismissing the DA. For example, FIG. 813C shows DA user interface 803 displayed responsive to the natural language input "what is 3 times 5?" DA user interface 803 includes response affordance 858, FIG. 8BD shows that the DA has been dismissed at a first time. FIG. 8BE shows that within a predetermined duration (e.g., 5 seconds) of the first time, device 800 has received user input to re-initiate the DA. For example, device 800 has received any one of the types of input discussed above satisfying a criterion for initiating a DA, but has not received another natural language input including a different request to the DA. Accordingly, in FIG. 8BE, device 800 displays DA user interface 803 including the same response affordance 858 and indicator 804 in the listening state. In this manner, a previous response affordance may be included in a subsequently initiated DA user interface if the user quickly re-initiates the DA, e.g., because the user previously accidentally dismissed the DA.

FIG. 8BF shows device 800 in a landscape orientation. In some examples, because device 800 is in the landscape orientation, device 800 displays a user interface in a landscape mode. For example, FIG. 8BF shows messaging application user interface 859 displayed in the landscape mode. In some examples, device 800 displays DA user interface 803 in a landscape mode over a user interface in the landscape mode. For example, FIG. 8BG shows DA user interface 803 in the landscape mode displayed over user interface 859. It will be appreciated that a user may provide one or more inputs to interact with DA user interface 803 in the landscape mode in a manner consistent with the techniques discussed herein.

In some examples, some user interfaces do not have a landscape mode. For example, the display of the user interface is the same regardless of whether device 800 is in a landscape orientation or a portrait orientation. Example user interfaces without landscape modes include a home screen user interface and a lock screen user interface. FIG. 8BH shows home screen user interface 860 (without a landscape mode) displayed when device 800 is in a landscape orientation.

In some examples, when device 800 is in a landscape orientation, device 800 displays DA user interface 803 over a user interface without a landscape mode. In some examples, when displaying DA user interface 803 (in the landscape mode) over a user interface without a landscape mode, device 800 visually obscures the user interface, e.g., visually obscures the portions of the user interface that DA user interface 803 is not displayed over. For example, FIG. 8BI shows device 800, in a landscape orientation, displaying DA user interface 803 in the landscape mode over home screen user interface 860. Home screen user interface 860 is displayed in a portrait mode (despite device 800 being in the landscape orientation) because home screen user interface 860 does not have a landscape mode. As shown, device 800 visually obscures home screen user interface 860. In this manner, device 800 avoids simultaneously displaying a landscape mode DA user interface 803 and a non-visually obscured portrait mode user interface (e.g., home screen user interface 860), which may provide a confusing user visual experience.

In some examples, when device 800 displays DA user interface 803 over a predetermined type of user interface, device 800 visually obscures the user interface of the predetermined type. An example predetermined type of user interface includes a lock screen user interface. FIG. 8BI shows device 800 displaying example lock screen user interface 861. FIG. 8BK shows device 800 displaying DA user interface 803 over lock screen user interface 861. As shown, device 800 visually obscures lock screen user interface 861 at the portions of lock screen user interface 861 DA user interface 803 is not displayed over.

In some examples, DA user interface 803 includes a dialog affordance. In some examples, the dialog affordance includes dialog, generated by the DA, in response to received natural language input. In some examples, the dialog affordance is displayed at a sixth portion (e.g., "conversation portion") of display 801, the sixth portion of display 801 being between the first portion of display 801 (displaying DA indicator 804) and the second portion of display 801 (displaying a response affordance). For example, FIG. 8BL shows dialog affordance 862 including dialog generated by the DA responsive to the natural language input "play Frozen," discussed further below. FIG. 8BM shows dialog affordance 863 including dialog generated by the DA responsive to the natural language input "delete meeting #1," discussed further below. FIG. 8BM further shows that device 800 displays dialog affordance 863 at a sixth portion of display 801, the sixth portion being between the display of indicator 804 and the display of response affordance 864.

In some examples, the DA determines a plurality of selectable disambiguation options for received natural language input. In some examples, the dialog of a dialog affordance includes the plurality of selectable disambiguation options. The plurality of disambiguation options are determined, in some examples, in accordance with the DA determining that the natural language input is ambiguous. An ambiguous natural language input corresponds to multiple possible actionable intents, e.g., each having a relatively high (and/or equal) confidence score. For example, consider the natural language input "play Frozen" in FIG. 8BL. The DA determines two selectable disambiguation options: option 865 "play movie" (e.g., the user intended to play the movie "Frozen") and option 866 "play music" (e.g., the user intended to play music from the movie "Frozen"). Dialog affordance 862 includes options 865 and 866, where user selection of option 865 causes device 800 to play the movie "Frozen" and user selection of option 866 causes device 800 to play music from the movie "Frozen." As another example, consider the natural language input "delete meeting #1" in FIG. 8BM, where "meeting #1" is a recurring meeting. The DA determines two selectable disambiguation options: option 867 "delete single" (e.g., the user intended to delete a single instance of meeting #1) and option 868 "delete all" (e.g., the user intended to delete all instances of meeting #1). Dialog affordance 863 includes options 867 and 868, along with cancel option 869.

In some examples, the DA determines that additional information is required to perform a task based on received natural language input. In some examples, the dialog of a dialog affordance includes one or more selectable options, suggested by the DA, for the required additional information. For example, the DA may have determined a domain for the received natural language input, but is unable to determine a parameter required for completing a task associated with the domain. Consider, for example, the natural language input "call." The DA determines the phone call domain (e.g., a domain associated with the actionable intent of making phone calls) for the natural language input, but is unable to determine the parameter of who to call. In some examples, the DA thus determines one or more selectable options as suggestions for the parameter. For example, device 800 displays, in a dialog affordance, selectable options corresponding the user's most frequently called contacts. User selection of any one of the selectable options causes device 800 to call the respective contact.

In some examples, the DA determines a primary user intent based on received natural language input and alternate user intent based on the received natural language input. In some examples, the primary intent is the highest ranked actionable intent, while the alternate user intent is the second highest ranked actionable intent. In some examples, a displayed response affordance corresponds to the primary user intent, while the dialog of a concurrently displayed dialog affordance includes a selectable option corresponding to the alternate user intent. For example, FIG. 8BN shows DA user interface 803 displayed responsive to the natural language input "Directions to Phil's." The DA determines a primary user intent that the user intends to get directions to "Phil's Coffee" and an alternate user intent that the user intends to get directions to the home of a contact named "Phil." DA user interface 803 includes response affordance 870 corresponding to the primary user intent and dialog affordance 871. Dialog 872 of dialog affordance 871 corresponds to the secondary user intent. User input selecting dialog 872 causes device 800 to get directions to the home of the contact named "Phil," while user input selecting response affordance 870 causes device 800 to get directions to "Phil's Coffee."

In some examples, a dialog affordance is displayed in a first state. In some examples, the first state is an initial state, e.g., the describing manner in which the dialog affordance is initially displayed before receiving user input to interact with the dialog affordance. FIG. 8BO shows DA user interface 803 including dialog affordance 873 displayed in the initial state. Device 800 displays DA user interface 803 responsive to the natural language input "what's the weather?" Dialog affordance 873 includes at least a portion of dialog, generated by the DA, responsive to the input, e.g., "it is currently 70 degrees and windy . . . ." Further description regarding whether to display dialog generated by the DA is discussed below with respect to FIGS. 11-16.

In some examples, device 800 receives a user input corresponding to a selection of a dialog affordance displayed in the first state. In response to receiving the user input, device 800 replaces the display of the dialog affordance in the first state with a display of the dialog affordance in a second state. In some examples, the second state is an expanded state, where the display size of the dialog affordance in the expanded state is greater than the display size of the dialog affordance in the initial state and/or where the dialog affordance in the expanded state displays a greater amount of content than the dialog affordance in the initial state, FIG. 8BP shows device 800 receiving user input 874 (e.g., a drag gesture) corresponding to a selection of dialog affordance 873 displayed in the initial state. FIG. 8BQ shows that in response to receiving user input 874 (or a portion thereof), device 800 replaces the display of dialog affordance 873 in the initial state with a display of dialog affordance 873 in the expanded state. As shown, dialog affordance 873 in FIG. 8BQ has a larger display size and includes a greater amount of text than dialog affordance in FIG. 8BP.

In some examples, a display size of a dialog affordance (in the second state) is proportional to a length of the user input causing the dialog affordance to be displayed in the second state. For example, in FIG. 8BP-8BQ the display size of dialog affordance 873 increases proportionally to the length (e.g., physical distance) of drag gesture 874. In this manner, a user can provide a continuous drag gesture to expand response affordance 873 according to the drag length of the drag gesture. Further, although FIGS. 8BO-8BQ show that device 800 initially displays dialog affordance 873 as shown in FIG. 8BO and then expands the dialog affordance in FIG. 8BQ, in other examples, device 800 initially displays dialog affordance 873 as shown in FIG. 8BQ. Thus, in some examples, device 800 initially displays a dialog affordance such that the dialog affordance displays a maximal amount of content, e.g., without obscuring (covering) any concurrently displayed response affordance.

In some examples, display of a dialog affordance obscures the display of a concurrently displayed response affordance. Specifically, in some examples, the display of the dialog affordance in the second (e.g., expanded) state occupies at least a portion of the second portion of display 801 (displaying the response affordance). In some examples, displaying the dialog affordance in the second state further includes displaying the dialog affordance over at least a portion of the response affordance. For example, FIG. 8BQ shows that drag gesture 874 continues. FIG. 8BR shows that in response to receiving continued drag gesture 874, device 800 expands the display of dialog affordance 873 over the display of response affordance 875.

In some examples, prior to receiving the user input causing a dialog affordance to be displayed in the second state (e.g., to expand), the response affordance was displayed in an original state. In some examples, the original state describes the state of the response affordance before the dialog affordance (or a portion thereof) was displayed over the response affordance. For example, FIGS. 8BO-8BQ show response affordance 875 displayed in the original state. In some examples, displaying the dialog affordance in the second (e.g., expanded) state over at least a portion of the response affordance includes replacing the display of the response affordance in the original state with a display of the response affordance in a covered state. FIG. 8BR shows response affordance 875 displayed in a covered state. In some examples, when displayed in the covered state, the response affordance shrinks in display size (e.g., relative to the original state) and/or dims (e.g., is displayed less colorfully than the original state). In some examples, the degree to which the response affordance shrinks and/or dims is proportional to the amount of the dialog affordance displayed over the response affordance.

In some examples, a dialog affordance has a maximum display size and the second (e.g., expanded) state of the dialog affordance corresponds to the maximum display size. In some examples, a dialog affordance displayed at the maximum display size cannot be further expanded responsive to user input, such as a drag gesture. In some examples, a dialog affordance displayed at the maximum display size displays the entirety of the content of the dialog affordance. In other examples, a dialog affordance displayed at the maximum display size does not display the entirety of the content of the dialog affordance. Accordingly, in some examples, while device 800 displays a dialog affordance in the second state (with the maximum display size), device 800 enables user input (e.g., drag gestures/swipe gestures) to scroll through the content of the dialog affordance. FIG. 8BS shows dialog affordance 873 displayed at the maximum display size. In particular, in FIG. 8BR, drag gesture 874 continues. In response to receiving continued drag gesture 874, device 800 displays (e.g., expands) dialog affordance 873 to its maximum display size in FIG. 8BS. Dialog affordance 873 includes scroll indicator 876, indicating that a user may provide input to scroll through a content of dialog affordance 873.

In some examples, a portion of a response affordance remains visible when a dialog affordance is displayed in the second state (and at its maximum size). Thus is some examples, device 800 constrains maximum size of a dialog affordance displayed over a response affordance so that the dialog affordance does not completely cover the response affordance. In some examples, the portion of the response affordance remaining visible is the second portion of the response affordance discussed above with respect to FIG. 8M. For example, the portion is the top portion of the response affordance including a glyph indicating a category of the response affordance and/or associated text. FIG. 8BS shows that when device 800 displays dialog affordance 873 at its maximum size over response affordance 875, the top portion of response affordance 875 remains visible.

In some examples, device 800 receives a user input corresponding to a selection of the portion of the response affordance that remains visible (when the dialog affordance is displayed in the second state over the response affordance). In response to receiving the user input, device displays the response affordance at the first portion of display 801, e.g., displays the response affordance in its original state. In response to receiving the user input, device 800 further replaces the display of the dialog affordance in the second (e.g., expanded) state with a display of the dialog affordance in a third state. In some examples, the third state is a collapsed state, where the dialog affordance in the third state has a smaller display size (than the dialog affordance in the initial or expanded state) and/or the dialog affordance includes a lesser amount of content (than the dialog affordance in the initial or expanded state). In other examples, the third state is the first state (e.g., the initial state). FIG. 8BT shows device 800 receiving user input 877 (e.g., a tap gesture) selecting the top portion of response affordance 875. FIG. 8BU shows that in response to receiving user input 877, device 800 replaces display of dialog affordance 873 in the expanded state (FIG. 8BT) with a display of dialog affordance 873 in the collapsed state. Device 800 further displays response affordance 875 in its original state.

In some examples, device 800 receives user input corresponding to a selection of a dialog affordance displayed in the third state. In response to receiving the user input, device 800 replaces the display of the response affordance in the third state with a display of the dialog affordance in the first state. For example, in FIG. 8BU, a user may provide input (e.g., a tap gesture) selecting dialog affordance 873 displayed in the collapsed state. In response to receiving the input, device 800 displays dialog affordance in the initial state, e.g., reverts to the display of FIG. 8BO.

In some examples, while a dialog affordance is displayed in a first or second state (e.g., initial or expanded state), device 800 receives a user input corresponding to a selection of a concurrently displayed response affordance. In response to receiving the user input, device 800 replaces the display of the dialog affordance in the first or the second state with a display of the dialog affordance in a third (e.g., collapsed) state. For example, FIG. 8BV shows DA user interface 803 displayed responsive to the natural language input "show me the roster for Team #1." DA user interface 803 includes detailed response affordance 878 and dialog affordance 879 displayed in an initial state. FIG. 813V further shows device 800 receiving user input 880 (e.g., a drag gesture) selecting response affordance 878. FIG. 8BW shows that responsive to receiving user input 880, device 800 replaces the display of dialog affordance 879 in the initial state with a display of dialog affordance 879 in the collapsed state.

In some examples, while displaying a dialog affordance in a first or second state (e.g., initial or expanded state), device 800 receives a user input corresponding to a selection of the dialog affordance. In response to receiving the user input, device 800 replaces the display of the dialog affordance in the first or the second state with a display of the dialog affordance in a third (e.g., collapsed) state. For example, FIG. 8BX shows DA user interface 803 displayed responsive to the natural language input "what music do you have for me?" DA user interface 803 includes response affordance 881 and dialog affordance 882 displayed in an initial state. FIG. 8BX further shows device 800 receiving user input 883 (e.g., a downward drag or swipe gesture) selecting dialog affordance 882. FIG. 8BY shows that responsive to receiving user input 883, device 800 replaces the display of dialog affordance 882 in the initial state with display of dialog affordance 882 in the collapsed state. Although FIGS. 8BX-8BY show that the user input corresponding to the selection of the dialog affordance is a drag or swipe gesture, in other examples, the user input is a selection of a displayed affordance included in the dialog affordance. For example, a user input (e.g., a tap gesture) selecting a "collapse" affordance in the dialog affordance displayed in the first or second state causes device 800 to replace the display of the dialog affordance in the first or second state with a display of the dialog affordance in the third state.

In some examples, device 800 displays a transcription of received natural language speech input in a dialog affordance. The transcription is obtained by performing automatic speech recognition (ASR) on the natural language speech input. FIG. 8BZ show DA user interface 803 displayed responsive to the natural language speech input "what's the weather?" DA user interface includes response affordance 884 and dialog affordance 885. Dialog affordance 885 includes transcription 886 of the speech input and dialog 887 generated by the DA responsive to the speech input.

In some examples, device 800 does not display a transcription of received natural language speech input by default. In some examples, device 800 includes a setting that when activated, causes device 800 to always display the transcription of natural language speech input. Various other instances in which device 800 may display a transcription of received natural language speech input are now discussed.

In some examples, the natural language speech input (with a displayed transcription) is consecutive to a second natural language speech input received prior to the natural language speech input. In some examples, displaying the transcription is performed in accordance with a determination that the DA was unable to determine a user intent for the natural language speech input and unable to determine a second user intent for the second natural language speech input. Accordingly, in some examples, device 800 displays a transcription for natural language input if the DA was unable to determine an actionable intent for two consecutive natural language inputs.

For example, FIG. 8CA shows that device 800 has received the speech input "how far to Dish n'Dash?" and that the DA is unable to determine a user intent for the natural language input. For example, device 800 provides the audio output "I'm not sure I understand, can you please say that again?" The user thus repeats the speech input. For example, FIG. 8CB shows device 800 receiving the consecutive speech input "how far to Dish n'Dash?" FIG. 8CC shows that the DA is still unable to determine a user intent for the consecutive speech input. For example, device 800 provides the audio output "I'm not sure I understand." Thus, device 800 further displays dialog affordance 888 including transcription 889 "how far to Rish and Rash?" of the consecutive speech input. In this example, transcription 889 reveals that the DA twice incorrectly recognized "how far to Dish n'Dash?" as "how far to Rish and Rash?" As "Rish and Rash" may not be a real location, the DA was unable to determine a user intent for both speech inputs.

In some examples, displaying a transcription of received natural language speech input is performed in accordance with a determination that the natural language speech input repeats a previous natural language speech input. For example, FIG. 8CD shows DA user interface 803 displayed responsive to the speech input (previous speech input) "where is Starbucks?" The DA incorrectly recognized the speech input as "where is Star Mall?" and thus displays response affordance 890 including "Star Mall." Because the DA incorrectly understood the speech input, the user repeats the speech input. For example, FIG. 8CE shows device 800 receiving a repetition (e.g., consecutive repetition) of the previous speech input "where is Starbucks?" The DA determines that the speech input repeats the previous speech input. FIG. 8CF shows that in accordance with such determination, device 800 displays dialog affordance 891 including transcription 892. Transcription 892 reveals that the DA incorrectly recognized (e.g., twice) "where is Starbucks?" as "where is Star Mall?"

In some examples, after receiving a natural language speech input (e.g., for which a transcription will be displayed), the device receives a second natural speech input consecutive to the natural language speech input. In some examples, displaying the transcription is performed in accordance with a determination that the second natural language speech input indicates a speech recognition error. Thus, in some examples, device 800 displays a transcription for a previous speech input if a subsequent speech input indicates that the DA incorrectly recognized the previous speech input. For example, FIG. 8CG shows DA user interface 803 displayed responsive to the speech input "set a timer for 15 minutes." The DA incorrectly recognized "15 minutes" as "50 minutes." DA user interface 803 thus includes response affordance 893, indicating that a timer is set for 50 minutes. Because the DA incorrectly recognized the speech input, the user provides a second speech input indicating a speech recognition error (e.g., "that's not what I said." "you heard me wrong," "that's incorrect," and the like), For example, FIG. 8CH shows device 800 receiving the second speech input "that's not what I said." The DA determines that the second speech input indicates a speech recognition error. FIG. 8CI shows that in accordance with such determination, device 800 displays dialog affordance 894 including transcription 895. Transcription 895 reveals that the DA incorrectly recognized "15 minutes" as "50 minutes."

In some examples, device 800 receives a user input corresponding to a selection of a displayed transcription. In response to receiving the user input, device 800 concurrently displays a keyboard and an editable text field including the transcription, e.g., displays the keyboard and the editable text field over the user interface DA user interface 803 was displayed over. In some examples, device 800 further visually obscures at least a portion of the user interface (e.g., at the portions of display 801 not displaying the keyboard or editable text field). Continuing with the example of FIG. 8CI, 8CJ shows device 800 receiving user input 896 (e.g., a tap gesture) selecting transcription 895. FIG. 8CK shows that responsive to receiving user input 896, device 800 displays keyboard 897 and editable text field 898 including transcription 895. FIG. 8CK further shows that device 800 visually obscures a portion of user interface 802.

FIG. 8CL shows that device 800 has received one or more keyboard inputs and has edited transcription 895 according to the one or more keyboard inputs, e.g., from "set a timer for 50 minutes" to "set a timer for 15 minutes." FIG. 8L further shows device 800 receiving user input 899 (e.g., a tap gesture) corresponding to selection of completion key 8001 of keyboard 897. FIG. 8CM shows that in response to receiving user input 899, the DA performs a task based on the current (e.g., edited) transcription 895. For example, device 800 displays DA user interface 803 including response affordance 8002 indicating the timer is set for 15 minutes. Device 800 further provides the speech output "Ok, I set the timer for 15 minutes." In this manner, a user may manually correct an incorrect transcription (e.g., using keyboard inputs) to cause performance of a correct task.

In some examples, while displaying a keyboard and an editable text field, device 800 receives a user input corresponding to a selection of the visually obscured user interface. In some examples, in response to receiving the user input, device 800 ceases to display the keyboard and the editable text field. In some examples, device 800 additionally or alternatively ceases to display DA user interface 803. For example, in FIGS. 8CK-8CL, user input (e.g., tap gesture) selecting the visually obscured user interface 802 may cause device 800 to revert to the display of FIG. 8CI or cause device 800 to cease displaying DA user interface 803 and display user interface 802 in its entirety, as shown in FIG. 8A.

In some examples, device 800 presents a digital assistant result (e.g., response affordance and/or audio output) at a first time. In some examples, in accordance with a determination that the digital assistant result corresponds to a predetermined type of digital assistant result, device 800 automatically ceases to display DA user interface 803 a predetermined duration after the first time. Thus, in some examples, device 800 may quickly (e.g., within 5 seconds) dismiss DA user interface 803 after providing predetermined types of results. Example predetermined types of results correspond to completed tasks for which no further user input is required (or for which no further user interaction is desired). For example, such results include results confirming that a timer has been set, that a message has been sent, and that a household appliance (e.g., light) has changed states. Examples of results that do not correspond to the predetermined type include results where the DA asks for further user input and results where the DA provides information (e.g., news, a Wikipedia article, a location) responsive to a user's informational request.

For example FIG. 8CM shows that device 800 presents a result at a first time, e.g., finishes providing the speech output "Ok, I set the timer for 15 minutes." Because the result corresponds to the predetermined type, FIG. 8CN shows that device 800 automatically (e.g., without further user input) dismisses the DA a predetermined duration (e.g., 5 seconds) after the first time.

FIGS. 8CO-8CT show examples of DA user interface 803 and example user interfaces when device 800 is a tablet device. It will be appreciated that any of the techniques discussed herein with respect to device 800 being a tablet device are equally applicable to when device 800 is another type of device (and vice-versa).

FIG. 8CO shows device 800 displaying user interface 8003. User interface 8003 includes dock area 8004. In FIG. 8CO, device 800 displays DA user interface 803 over user interface 8003. DA user interface 803 includes indicator 804 displayed at a first portion of display 801 and response affordance 8005 displayed at a second portion of display 801. As shown, a portion of user interface 8003 remains visible (e.g., is not visually obscured) at a third portion of display 801. In some examples, the third portion is between the first portion of display 801 and the second portion of display 801. In some examples, as shown in FIG. 8CO, display of DA user interface 803 does not visually obscure dock area 8004, e.g., no portion of DA user interface 803 is displayed over dock area 8004.

FIG. 8CP shows device 800 displaying DA user interface 803 including dialog affordance 8006. As shown, dialog affordance 8006 is displayed at a portion of display 801 between the first portion of display 801 (displaying indicator 804) and a second portion of display (displaying response affordance 8005). Displaying dialog affordance 8006 further causes response affordance 8005 to displace (from FIG. 8CO) towards the top portion of display 801.

FIG. 8CQ shows device 800 displaying user interface 8003 including media panel 8007 indicating currently playing media. FIG. 8CR shows device 800 displaying DA user interface 803 over user interface 8003. DA user interface 803 includes response affordance 8008?" and indicator 804. As shown, display of DA user interface 803 does not visually obscure media panel 8007. For example, as shown, displaying elements of DA user interface 803 (e.g., indicator 804, response affordance 8008, a dialog affordance) causes media panel 8007 to displace towards the top portion of display 801.

FIG. 8CS shows device 800 displaying user interface 8009 including keyboard 8010. FIG. 8CT shows DA user interface 803 displayed over user interface 8009. As FIG. 8CT shows, in some examples, displaying DA user interface 803 over user interface 8009 including keyboard 8010 causes device 800 to visually obscure (e.g., gray out) the keys of the keyboard 8010.

Figure 9A:
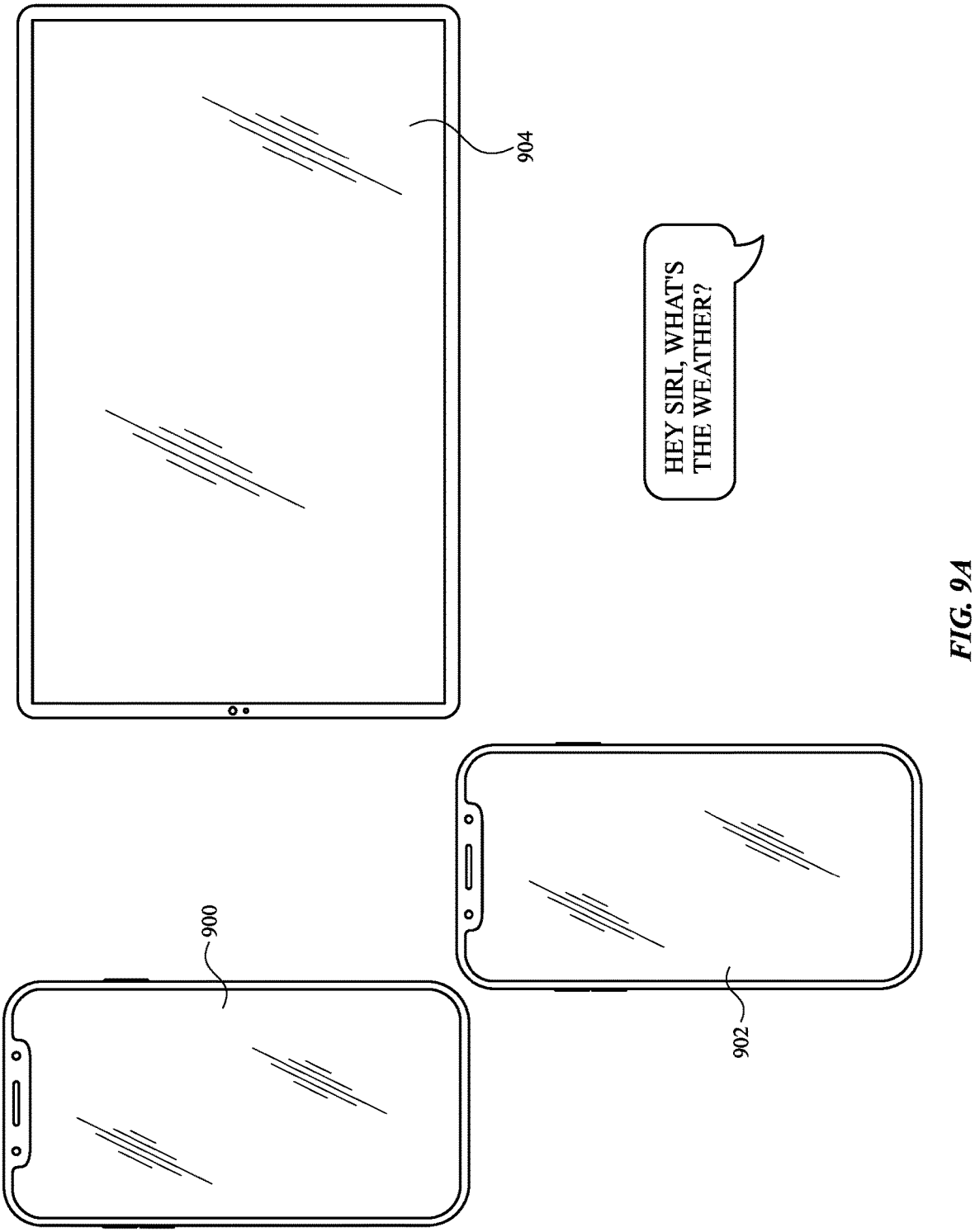
FIGS. 9A-9C illustrate multiple devices determining which device should respond to speech input, according to various examples.
Figure 9B:
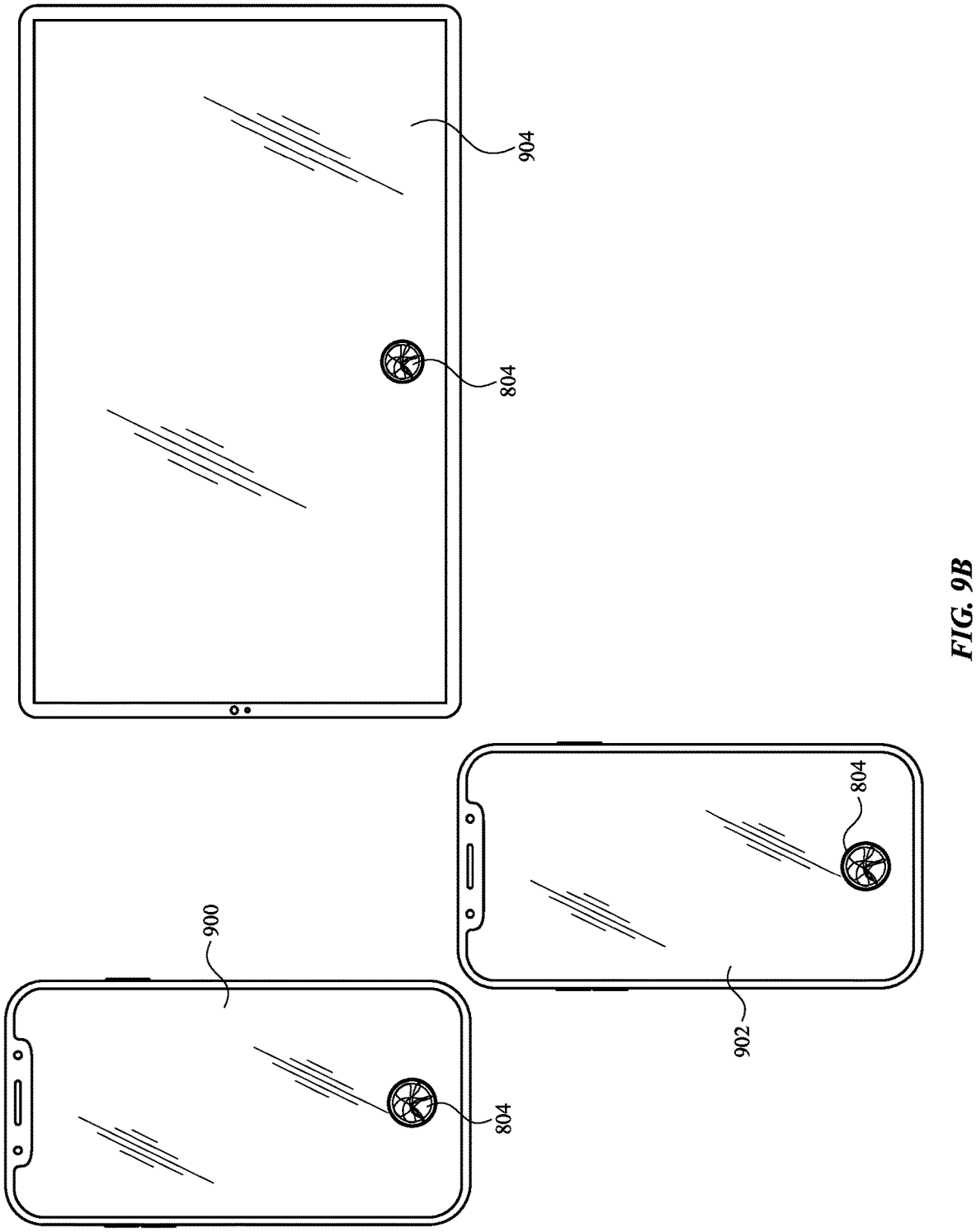
Figure 9C:
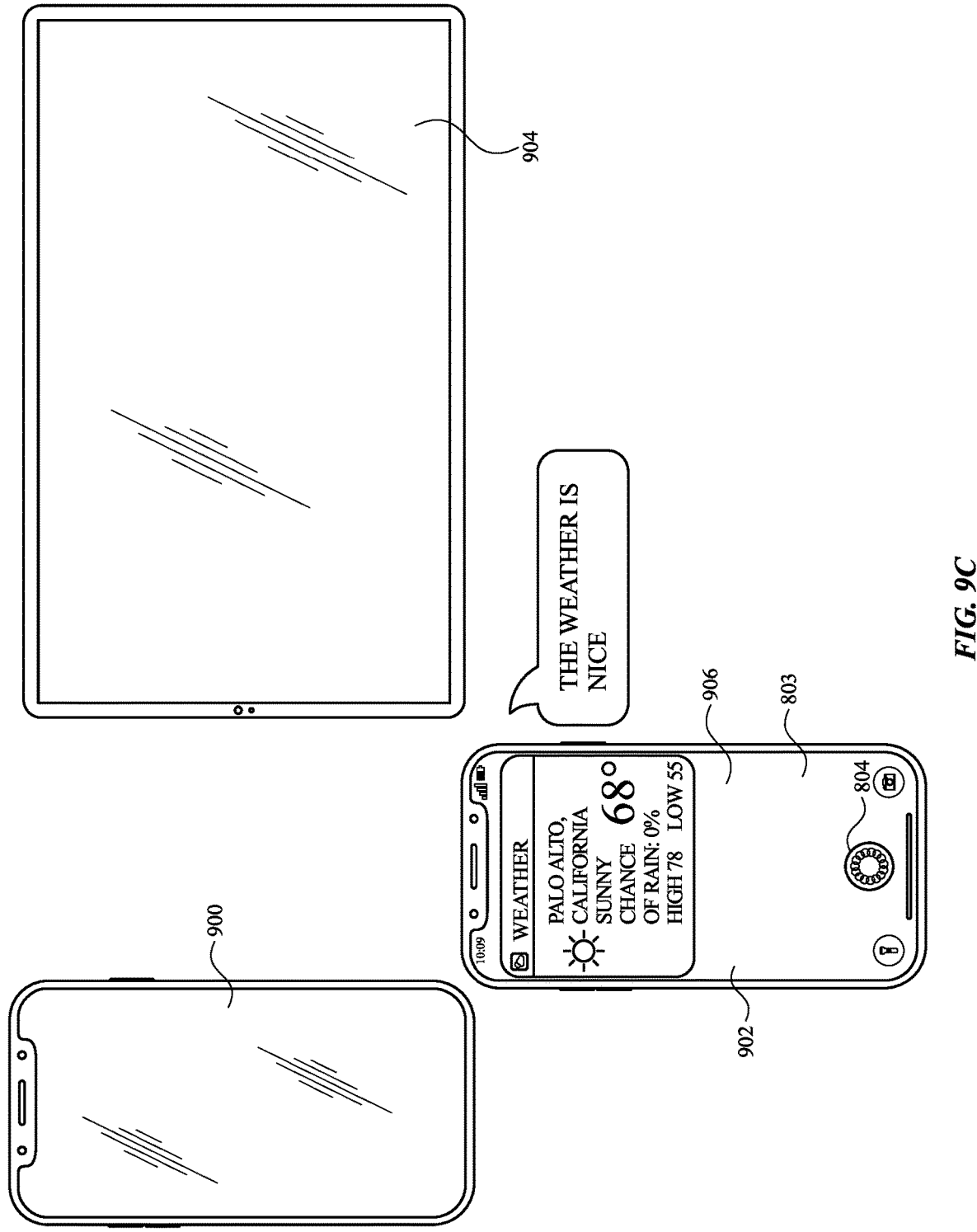

FIGS. 9A-9C illustrate multiple devices determining which device should respond to speech input, according to various examples. In particular, FIG. 9A shows devices 900, 902, and 904. Devices 900, 902, and 904 are each implemented as device 104, device 122, device 200, or device 600. In some examples, devices 900, 902, and 904 each at least partially implement DA system 700.

In FIG. 9A, the respective displays of devices 900, 902, and 904 are not displaying when a user provides speech input including a trigger phrase (e.g., "Hey Sid") for initiating a DA, e.g., "Hey Siri, what's the weather?" In some examples, the respective displays of at least one of devices 900, 902, and 904 display a user interface (e.g., home screen user interface, application-specific user interface) when the user provides the speech input. FIG. 9B shows that in response to receiving the speech input including the trigger phrase, devices 900, 902, and 904 each display indicator 804. In some examples, each indicator 804 is displayed in a listening state, e.g., indicating that the respective devices are sampling audio input.

In FIG. 9B devices 900, 902, and 904 coordinate amongst themselves (or via a fourth device) to determine which device should respond to the user request. Example techniques for device coordination to determine which device should respond to a user request are described in U.S. Pat. No. 10,089,072, entitled "INTELLIGENT DEVICE ARBITRATION AND CONTROL," dated Oct. 2, 2018 and U.S. Patent Application No. 63/022,942, entitled "DIGITAL ASSISTANT HARDWARE ABSTRACTION," filed on May 11, 2020, the contents of which are hereby incorporated by reference in their entireties. As FIG. 9B shows, while each device determines whether to respond to the user request, each device only displays indicator 804. For example, the respective portions of the displays of devices 900, 902, and 904 not displaying indicator 804 are each not displaying. In some examples, when at least one of devices 900, 902, and 904 display a user interface (previous user interface) when the user provides speech input, while the least one device determines whether to respond to the user request, the at least one device only additionally displays indicator 804 over the previous user interface.

FIG. 9C shows that device 902 is determined as the device to respond to the user request. As shown, in response to a determination that another device (e.g., device 902) should respond to the user request, the displays of devices 900 and 904 cease displaying (or cease displaying indicator 804 to fully display the previous user interface). As further shown, in response to a determination that device 902 should respond to the user request, device 902 displays user interface e.g., lock screen user interface) 906 and DA user interface 803 over user interface 906. DA user interface 803 includes a response to the user request. In this manner, visual disruption when determining which device, of multiple devices, should respond to a speech input is minimized. For example, in FIG. 9B, the displays of devices determined not to respond to the user request only display indicator 804, e.g., as opposed to displaying user interfaces with the entirety of the displays.

Determining which device, of multiple devices, should respond to speech input in the manner illustrated and described above provides the user with feedback that the speech input has been received and is being processed. Further, providing feedback in such manner may advantageously reduce unnecessary visual or audible disruption when responding to the speech input. For example, the user is not required to manually cause the non-selected device(s) to cease displayed and/or audible output and visual disruption to the user interface(s) of the non-selected device(s) is minimized (e.g., if the user was previously interacting with the user interface(s) of the non-selected device(s)). Providing improved visual feedback to the user enhances the operability of the device and makes the user-device interface more efficient (e.g., by reducing the amount of user inputs required for desirable performance of a requested task) which, additionally, reduces power usage and improves battery life of the device by enabling the user to use the device more quickly and efficiently.

Figures 10A, 10B:
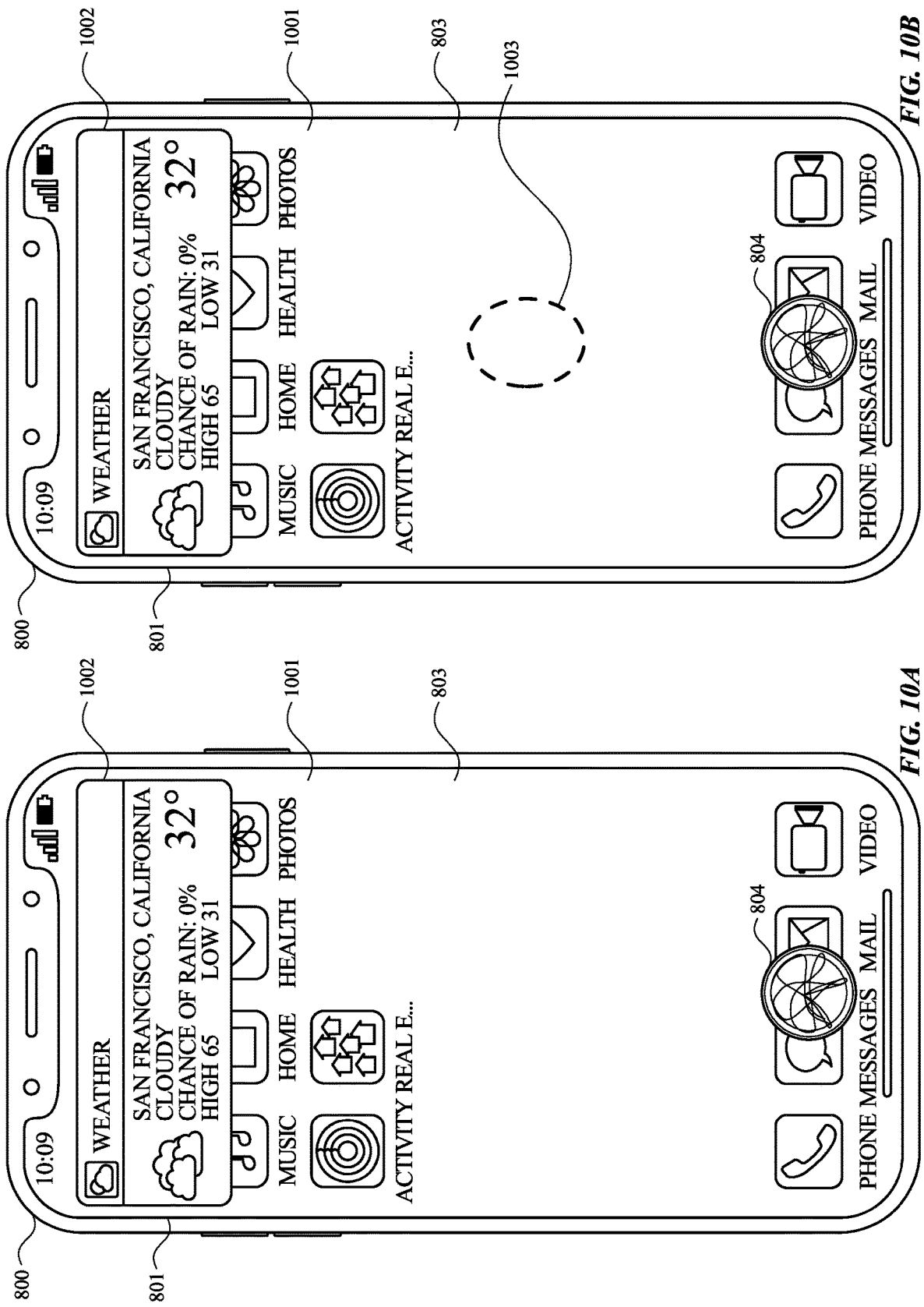
FIGS. 10A-10V illustrate user interfaces and digital assistant user interfaces, according to various examples.
Figure 10E:
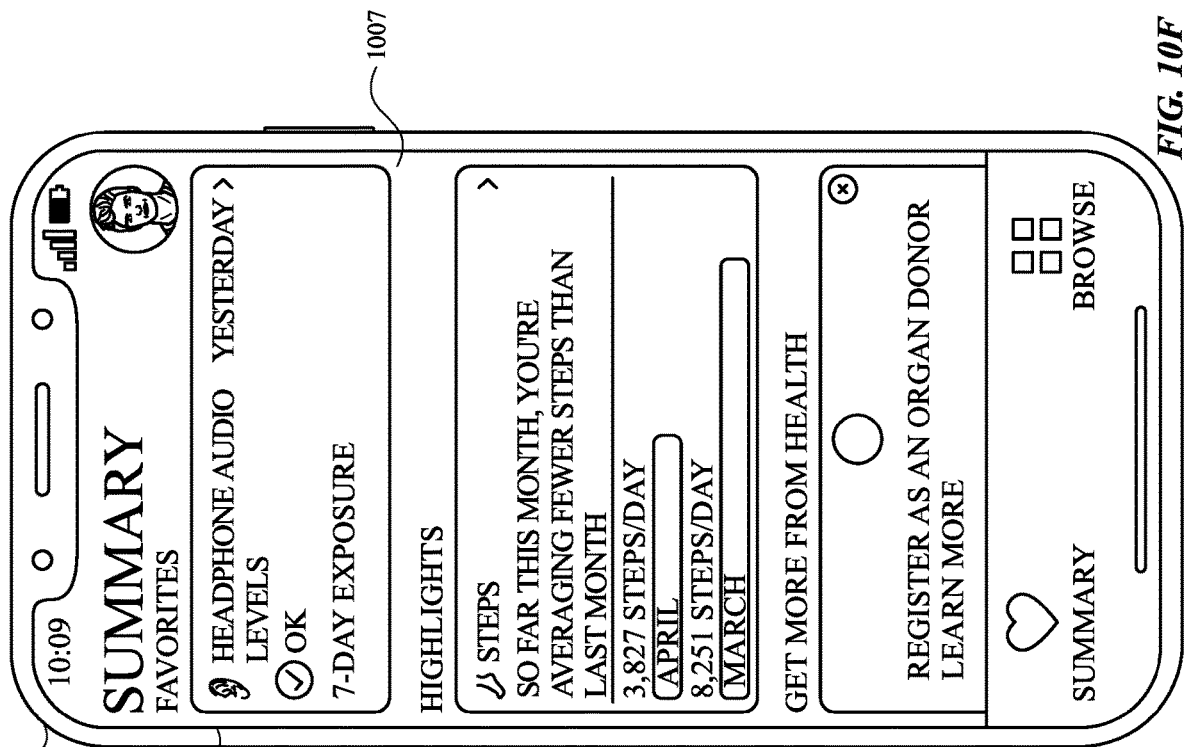
Figure 10F:
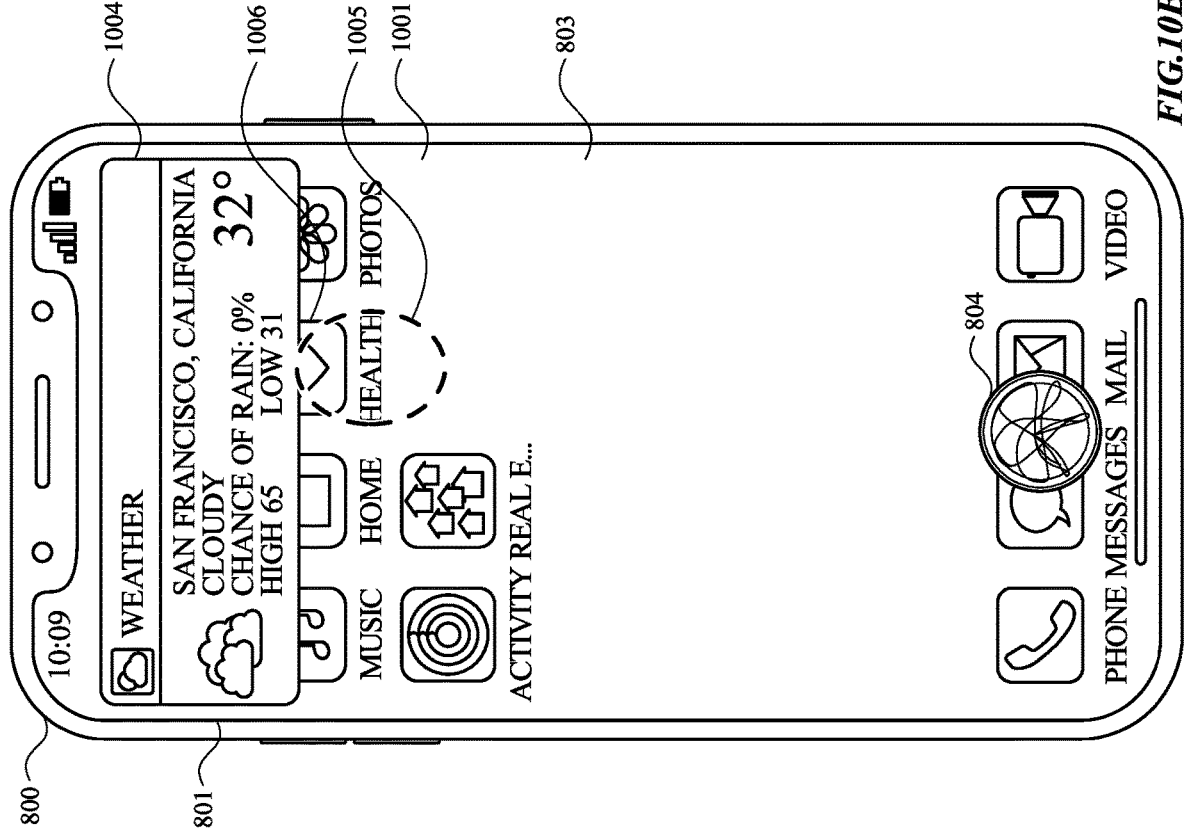
Figure 10H:
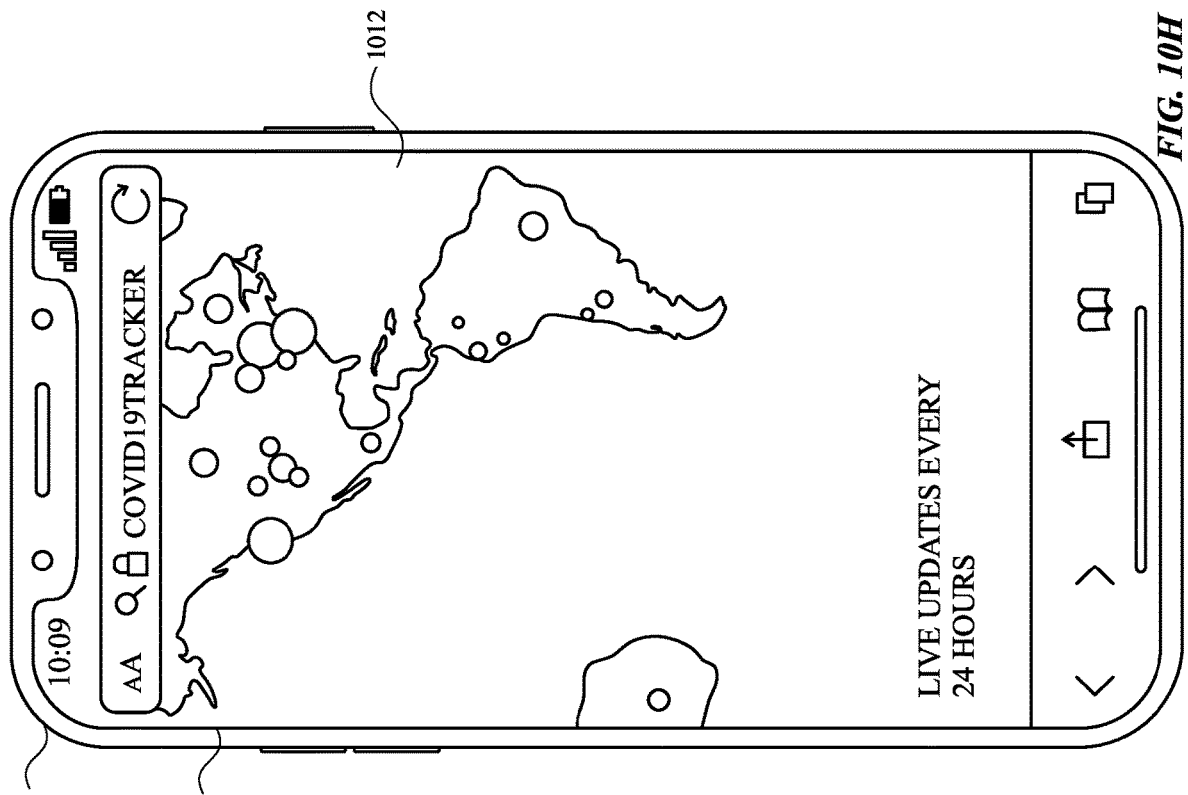
Figure 10G:
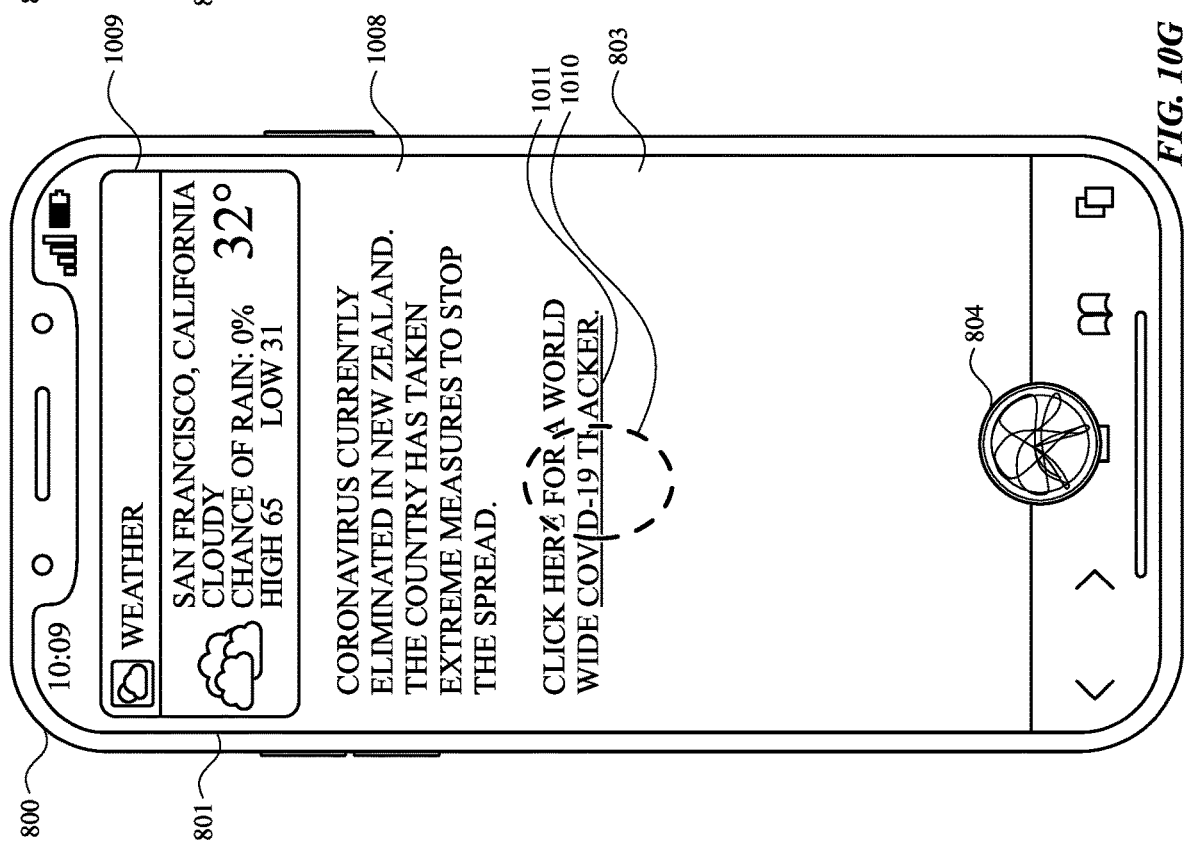
Figure 10Q:
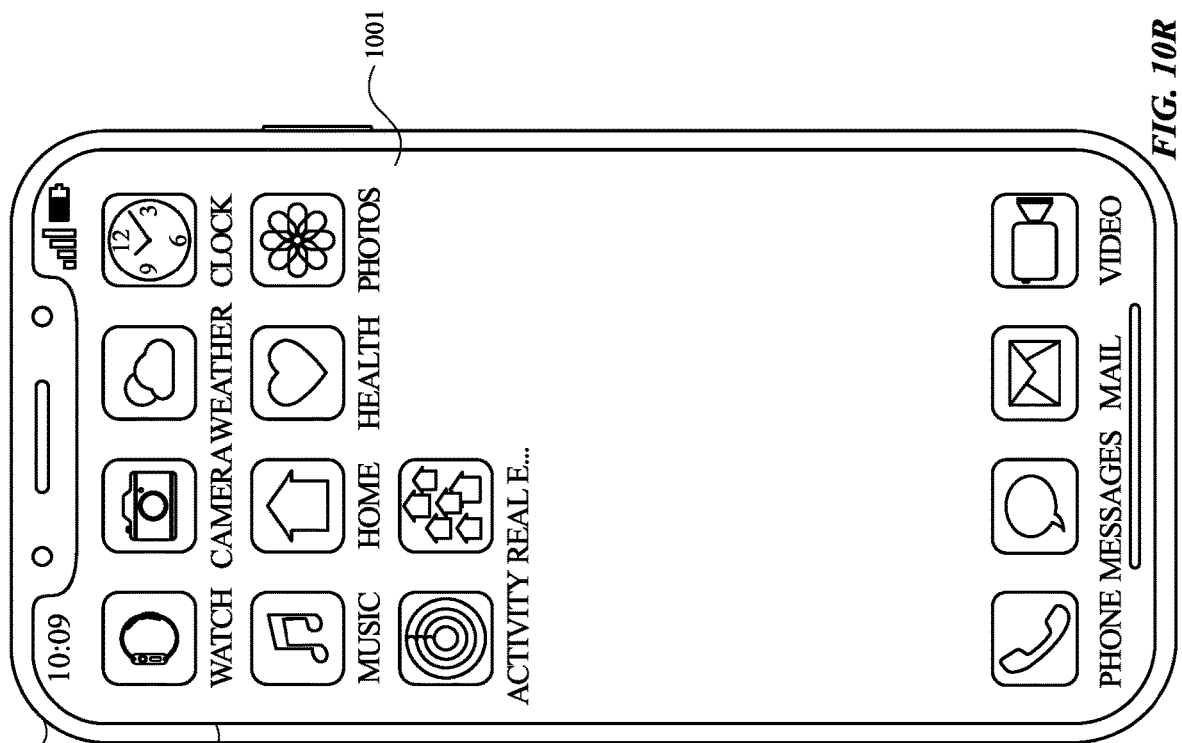
Figure 10R:
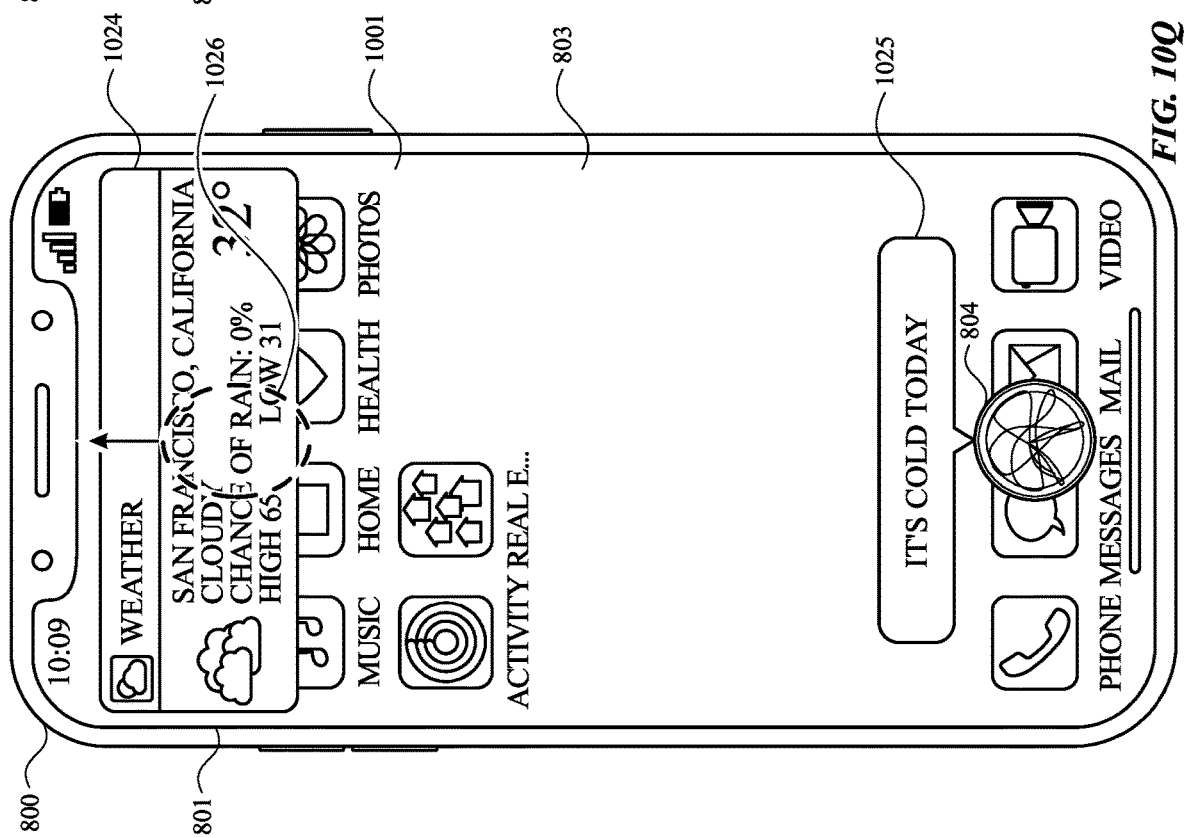
Figure 10T:
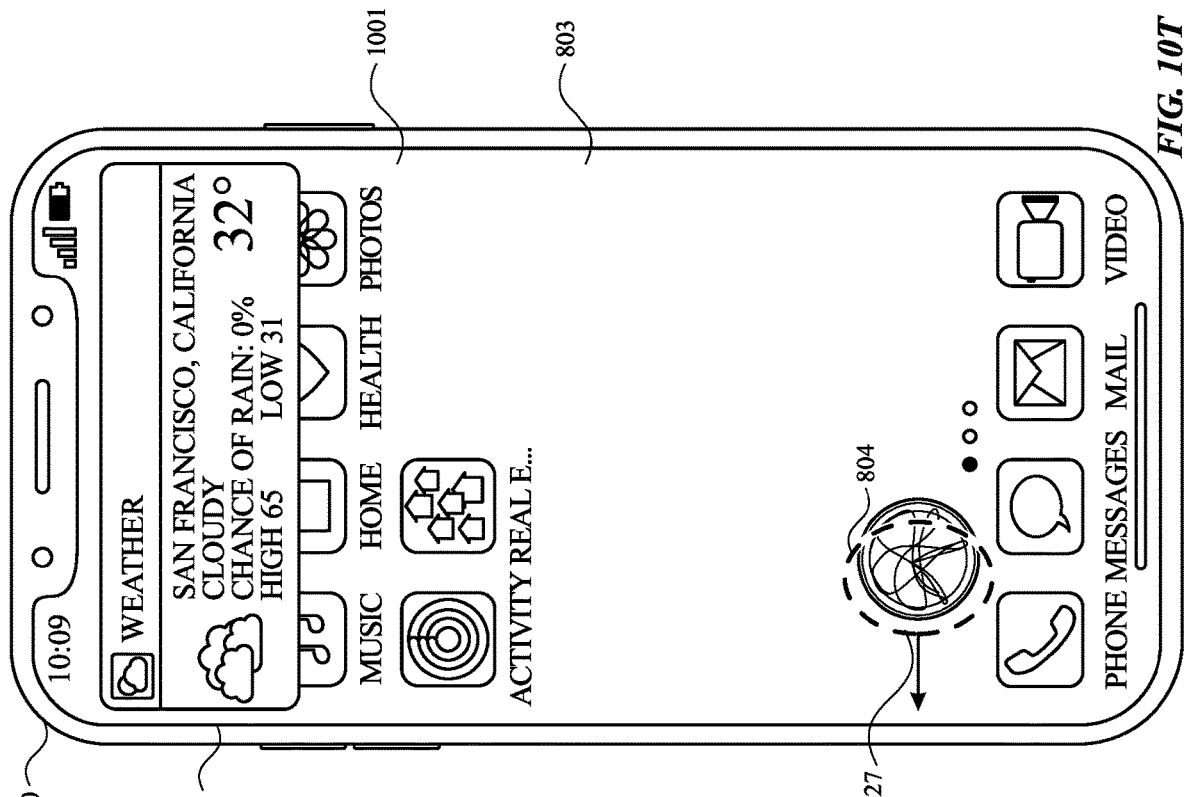
Figure 10S:
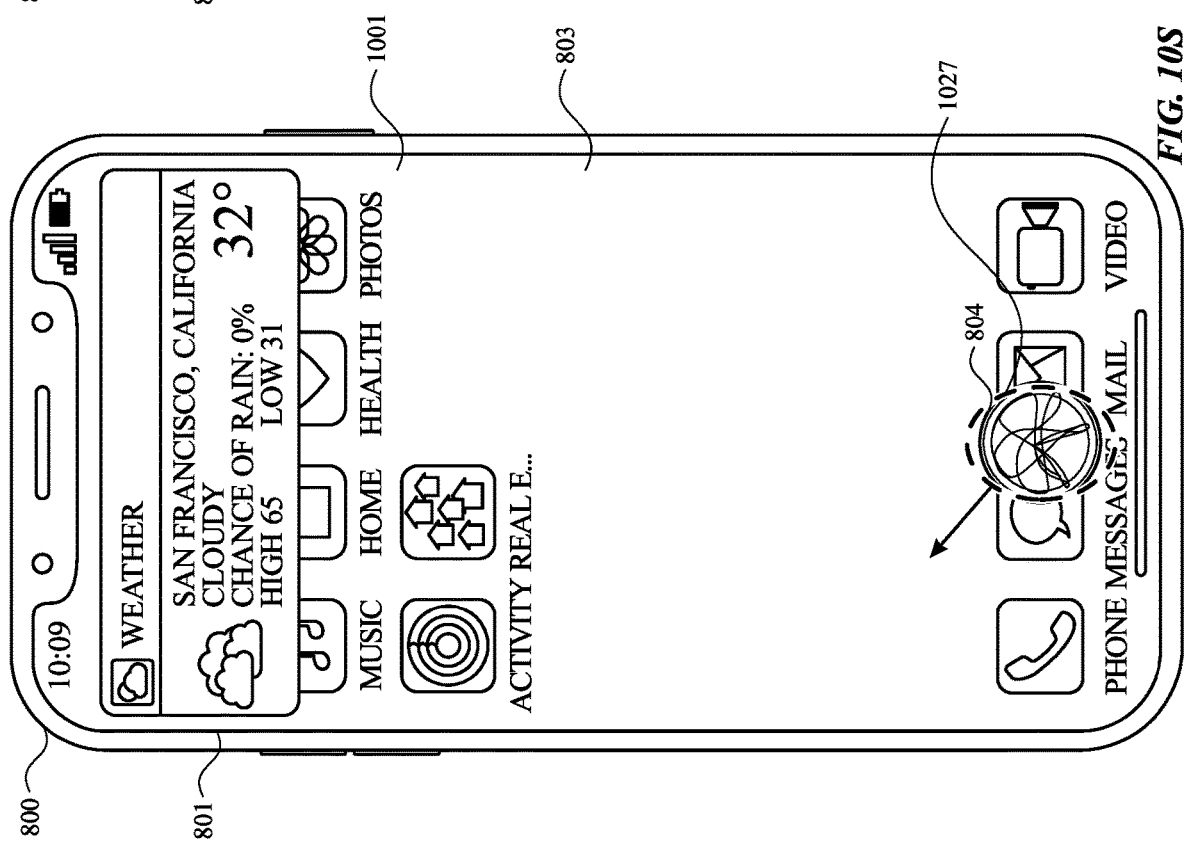
Figure 10V:
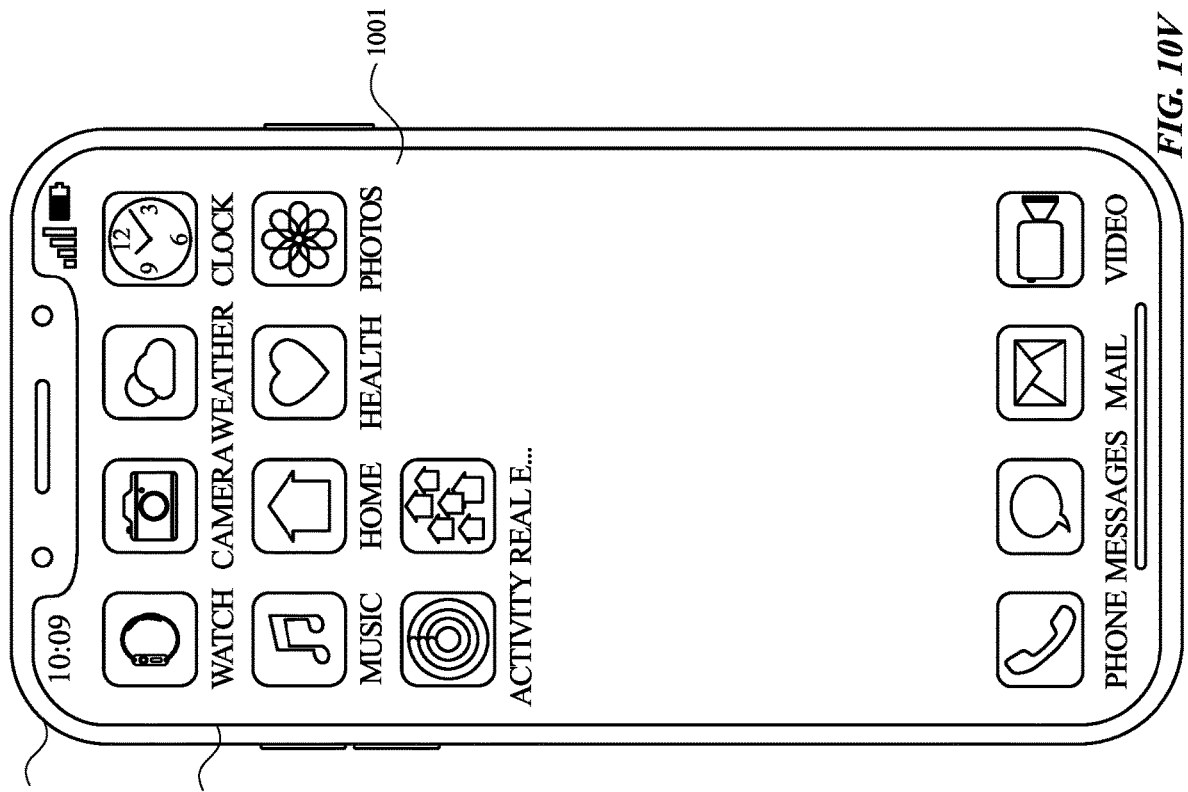
Figure 10U:
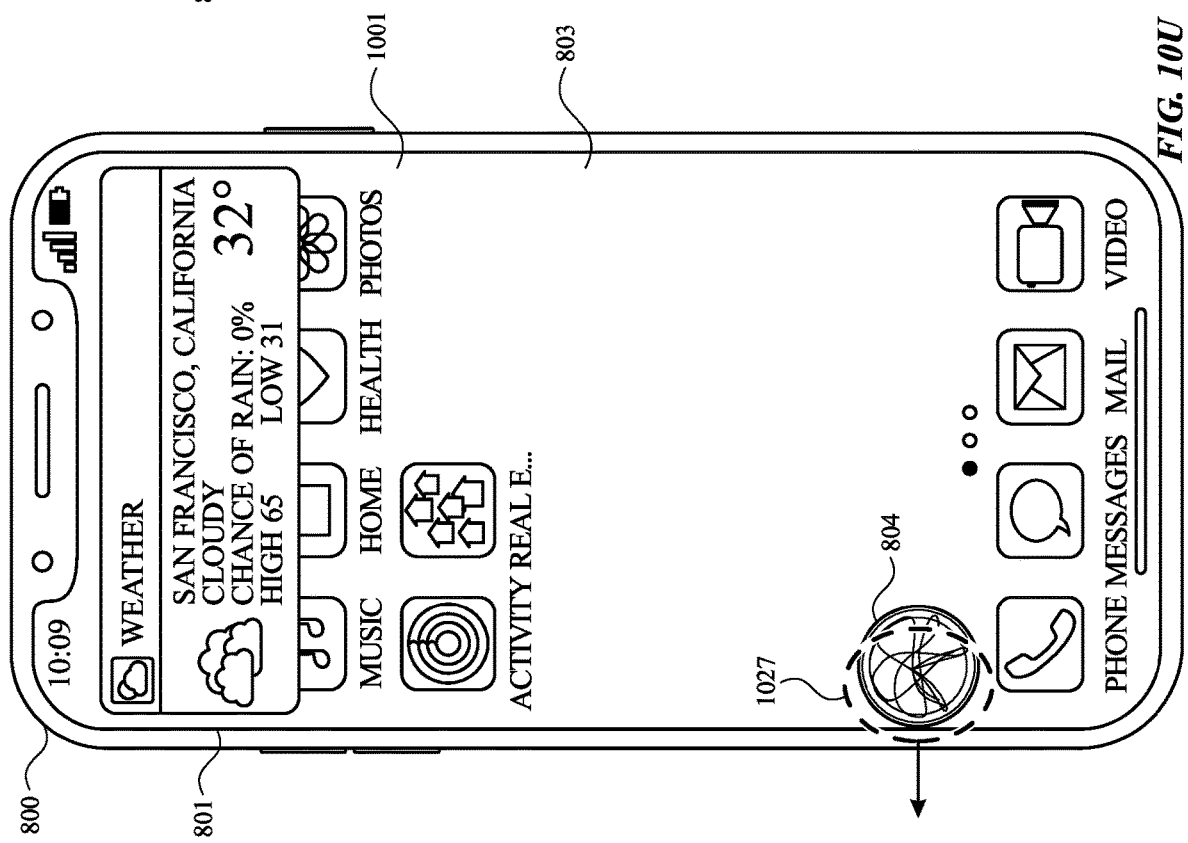

FIGS. 10A-10V illustrate user interfaces and digital assistant user interfaces, according to various examples. FIGS. 10A-10V are used to illustrate the processes described below, including the processes in FIGS. 18A-18B.

FIG. 10A shows device 800. Device 800 displays, on display 801, DA user interface 803 over a user interface. In FIG. 10A, device 800 displays DA user interface 803 over home screen user interface 1001. In other examples, the user interface is another type of user interface, such as a lock screen user interface or an application-specific user interface.

In some examples, DA user interface 803 includes indicator 804 displayed at a first portion (e.g., "indicator portion") of display 801 and a response affordance displayed at a second portion (e.g., "response portion") of display 801. A third portion (e.g., "UI portion") of display 801 displays a portion of the user interface (the user interface DA user interface 803 is displayed over). For example, in FIG. 10A, a first portion of display 801 displays indicator 804, a second portion of display 801 displays response affordance 1002, and a third portion of display 801 displays a portion of home screen user interface 1001.

In some examples, while displaying DA user interface 803 over a user interface, device 800 receives a user input corresponding to a selection of the third portion of display 801. Device 800 determines whether the user input corresponds to a first type of input or a second type of input. In some examples, the first type of user input includes a tap gesture and the second type of user input includes a drag or swipe gesture.

In some examples, in accordance with a determination that the user input corresponds to a first type of input, device 800 ceases to display DA user interface 803. Ceasing to display DA user interface 803 includes ceasing to display any portion of DA user interface 803, e.g., indicator 804, a response affordance, and a dialog affordance (if included). In some examples, ceasing to display DA user interface 803 includes replacing the display(s) of the elements) of DA user interface 803 at their respective portion(s) of display 801 with display of the user interface at the respective portion(s). For example, device 800 replaces the display of indicator 804 with a display of a first portion of the user interface at the first portion of display 801 and replaces the display of the response affordance with a display of a second portion of the user interface at the second portion of display 801.

For example, FIG. 10B shows device 800 receiving user input 1003 (e.g., a tap gesture) corresponding to a selection of the third portion of display 801. Device 800 determines that user input 1003 corresponds to the first type of input. FIG. 10C shows that in accordance with such determination, device 800 ceases to display DA user interface 803 and displays user interface 1001 in its entirety.

In this manner, a user may dismiss DA user interface 803 by providing input selecting a portion of display 801 not displaying any portion of DA user interface 803. For example, in FIGS. 8S-8X above, a tap gesture selecting the portion of display 801 displaying the visually obscured home screen user interface 802 causes device 800 to revert to the display of FIG. 8A.

In some examples, the user input corresponds to a selection of a selectable element displayed in the third portion of display 801. In some examples, in accordance with a determination that the user input corresponds to the first type of input, device 800 displays a user interface corresponding to the selectable element. For example, device 800 replaces the display of the portion of the user interface (displayed at the third portion of display 801), the display of the response affordance, and the display of indicator 804 with a display of the user interface corresponding to the selectable element.

In some examples, the user interface is home screen user interface 1001, the selectable element is an application affordance of home screen user interface 1001, and the user interface corresponding to the selectable element is a user interface corresponding to the application affordance. For example, FIG. 10D shows DA user interface 803 displayed over home screen user interface 1001. Display 801 displays indicator 804 at a first portion, response affordance 1004 at a second portion, and a portion of user interface 1001 at the third portion. FIG. 10E shows device 800 receiving user input 1005 (e.g., a tap gesture) selecting health application affordance 1006 displayed in the third portion. FIG. 10F shows that in accordance with device 800 determining that user input 1005 corresponds to the first type of input, device 800 ceases to display indicator 804, response affordance 1004, and the portion of user interface 1001. Device 800 further displays user interface 1007 corresponding to the health application.

In some examples, the selectable element is a link, and the user interface corresponding to the selectable element is a user interface corresponding to the link. For example, FIG. 10G shows DA user interface 803 displayed over web browsing application user interface 1008. Display 801 displays indicator 804 at a first portion, response affordance 1009 at a second portion, and a portion of user interface 1008 at a third portion. FIG. 10G further shows device 800 receiving user input 1010 (e.g., a tap gesture) selecting link 1011 (e.g., a webpage link) displayed in the third portion. FIG. 10H shows that in accordance with device 800 determining that user input 1010 corresponds to the first type of input, device 800 ceases to display indicator 804, response affordance 1009, and the portion of user interface 1008. Device 800 further displays user interface 1012 corresponding to webpage link 1011.

In this manner, user input selecting the third portion of display 801 may dismiss DA user interface 803 and additionally cause performance of an action (e.g., updating display 801) according to what the user selected.

In some examples, in accordance with a determination that the user input corresponds to a second type of input (e.g., drag or swipe gesture), device 800 updates the display of the user interface at the third portion of display 801 according to the user input. In some examples, while device 800 updates the display of the user interface at the third portion of display 801, device 800 continues to display at least some of the elements of DA user interface 803 at their respective display portions. For example, device 800 displays (e.g., continues to display) the response affordance at the second portion of display 801. In some examples, device 800 further displays (e.g., continues to display) indicator 804 at the first portion of display 801. In some examples, updating the display of the user interface at the third portion includes scrolling a content of the user interface.

For example, FIG. 10I shows DA user interface 803 displayed over web browser application user interface 1013 displaying a webpage. Display 801 displays indicator 804 at a first portion, response affordance 1014 at a second portion, and a portion of user interface 1013 at a third portion. FIG. 10I further shows device 800 receiving user input 1015 (e.g., a drag gesture) selecting the third portion. FIG. 10J shows that in accordance with device 800 determining that user input 1015 corresponds to the second type of input, device 800 updates (e.g., scrolls through) the content of user interface 1013 according to user input 1015, e.g. scrolls through the content of the webpage. FIGS. 10I-10J show that while updating user interface 1013 (at the third portion of display 801), device 800 continues to display indicator 804 at the first portion of display 801 and response affordance 1014 at the second portion of display 801.

As another example, FIG. 10K shows DA user interface 803 displayed over home screen user interface 1001. Display 801 displays indicator 804 at a first portion, response affordance 1016 at a second portion, and a portion of user interface 1001 at a third portion. FIG. 10K further shows device 800 receiving user input 1017 (e.g., a swipe gesture) selecting the third portion. FIG. 10L shows that in accordance with device 800 determining that user input 1017 corresponds to the second type of input, device 800 updates the content of user interface 1001 according to user input 1017. For example, as shown, device 800 updates user interface 1001 to display secondary home screen user interface 1018 including one or more application affordances different from those of home screen user interface 1001. FIGS. 10K-10L show that while updating user interface 1001, device 800 continues to display indicator 804 at the first portion of display 801 and response affordance 1016 at the second portion of display 801.

In this manner, a user may provide input to update a user interface that DA user interface 803 is displayed over, without the input causing DA user interface 803 to dismiss.

In some examples, updating the display of the user interface at the third portion of display 801 is performed in accordance with a determination that the DA is in a listening state. Thus, device 800 may enable drag or swipe gestures to update the user interface (that DA user interface 803 is displayed over) only when the DA is in the listening state. In such examples, if the DA is not in the listening state, in response to receiving a user input corresponding to the second type (and corresponding to the selection of the third portion of display 801), device 800 does not update display 801 responsive to the user input or ceases to display DA user interface 803. In some examples, while updating the display of the user interface while the DA is in the listening state, the display size of indicator 804 varies based on the amplitude of received speech input, as discussed above.

In some examples, while device 800 displays DA user interface 803 over a user interface, device 800 receives a second user input. In some examples, in accordance with a determination that the second user input corresponds to a third type of input, device 800 ceases to display DA user interface 803. In some examples, the third type of input includes a swipe gesture originating from the bottom of display 801 towards the top of display 801. The third type of input is sometimes deemed a "home swipe," as receiving such input when device 800 displays a user interface different from a home screen user interface and does not display DA user interface 803) causes device 800 to revert to display of the home screen user interface.

FIG. 10M shows device 800 displaying DA user interface 803 over home screen user interface 1001. DA user interface 803 includes response affordance 1020 and indicator 804. FIG. 10M further shows device 800 receiving user input 1019, a swipe gesture from the bottom of display 801 towards the top of display 801. FIG. 10N shows that in accordance with device 800 determining that user input 1019 corresponds to the third type of input, device 800 ceases to display response affordance 1020 and indicator 804.

In some examples, the user interface (that DA user interface 803 is displayed over) is an application specific user interface. In some examples, while device 800 displays DA user interface 803 over the application specific user interface, device 800 receives the second user input. In some examples, in accordance with a determination that the second user input corresponds to the third type of input, device ceases to display DA user interface 803 and additionally displays a home screen user interface. For example, FIG. 10O shows device 800 displaying DA user interface 803 over health application user interface 1022. DA user interface 803 includes response affordance 1021 and indicator

804. FIG. 10O further shows device 800 receiving user input 1023, a swipe gesture from the bottom of display 801 towards the top of display 801. FIG. 10P shows that in accordance with device 800 determining that user input 1023 corresponds to the third type of input, device 800 displays home screen user interface 1001. For example, as shown, device 800 replaces the display of indicator 804, response affordance 1021, and messaging application user interface 1022 with display of home screen user interface 1001.

In some examples, while device 800 displays DA user interface 803 over a user interface, device 800 receives a third user input corresponding to a selection of a response affordance. In response to receiving the third user input, device 800 ceases to display DA user interface 803. For example, FIG. 10Q shows DA user interface 803 displayed over home screen user interface 1001. DA user interface 803 includes response affordance 1024, dialog affordance 1025, and indicator 804. FIG. 10Q further shows device 800 receiving user input 1026 (e.g., an upward swipe or drag gesture) selecting response affordance 1024. FIG. 10R shows that responsive to receiving user input 1026, device 800 ceases to display DA user interface 803.

In some examples, while device 800 displays user interface 803 over a user interface, device 800 receives a fourth user input corresponding to a displacement of indicator 804 from the first portion of display 801 to an edge of display 801. In response to receiving the fourth user input, device 800 ceases to display DA user interface 803. For example, FIG. 10S shows DA user interface 803 displayed over home screen user interface 1001. In FIG. 10S, device 800 receives user input 1027 (e.g., a drag or swipe gesture) displacing indicator from the first portion of display 801 to an edge of display 801. FIGS. 10S-10V shows that in response to receiving user input 1027 (e.g., in response to indicator 804 reaching an edge of display 801), device 800 ceases to display DA user interface 803.

5. Digital Assistant Response Modes

Figure 11:
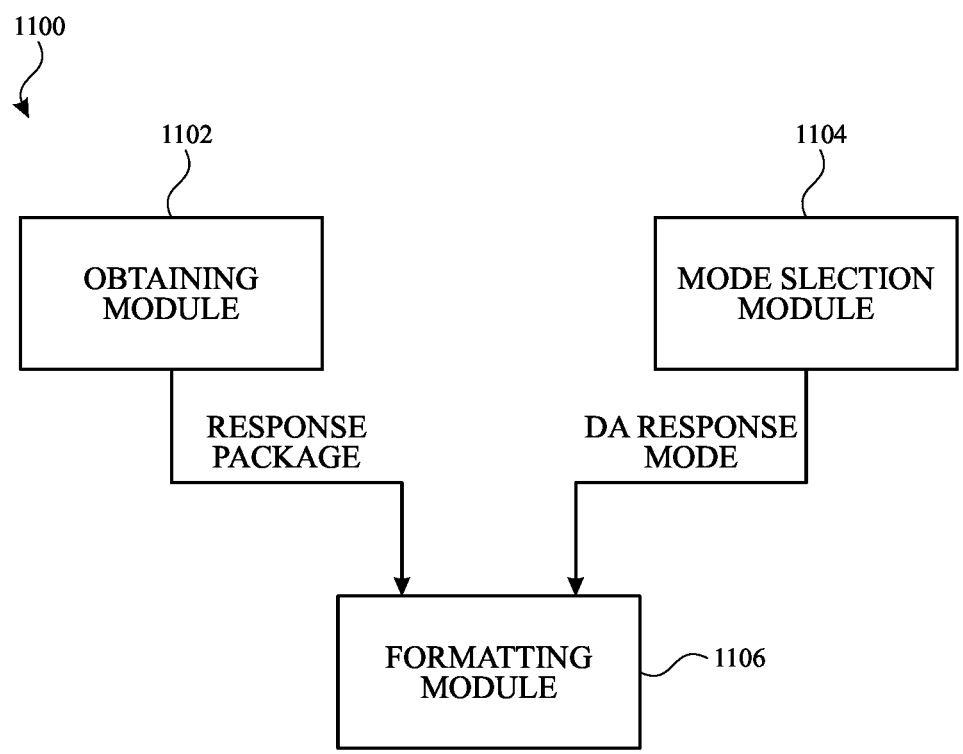
FIG. 11 illustrates a system for selecting a digital assistant response mode and for presenting a response according to the selected digital assistant response mode, according to various examples.

FIG. 11 illustrates system 1100 for selecting a DA response mode and for presenting a response according to the selected DA response mode, according to various examples. In some examples, system 1100 is implemented on a standalone computer system (e.g., device 104, 122, 200, 400, 600, 800, 900, 902, or 904). System 1100 is implemented using hardware, software, or a combination of hardware and software to carry out the principles discussed herein. In some examples, the modules and functions of system 1100 are implemented within a DA system, as discussed above with respect to FIGS. 7A-7C.

System 1100 is exemplary, and thus system 1100 can have more or fewer components than shown, can combine two or more components, or can have a different configuration or arrangement of the components. Further, although the below discussion describes functions being performed at a single component of system 1100, it is to be understood that such functions can be performed at other components of system 1100 and that such functions can be performed at more than one component of system 1100.

Figure 12:
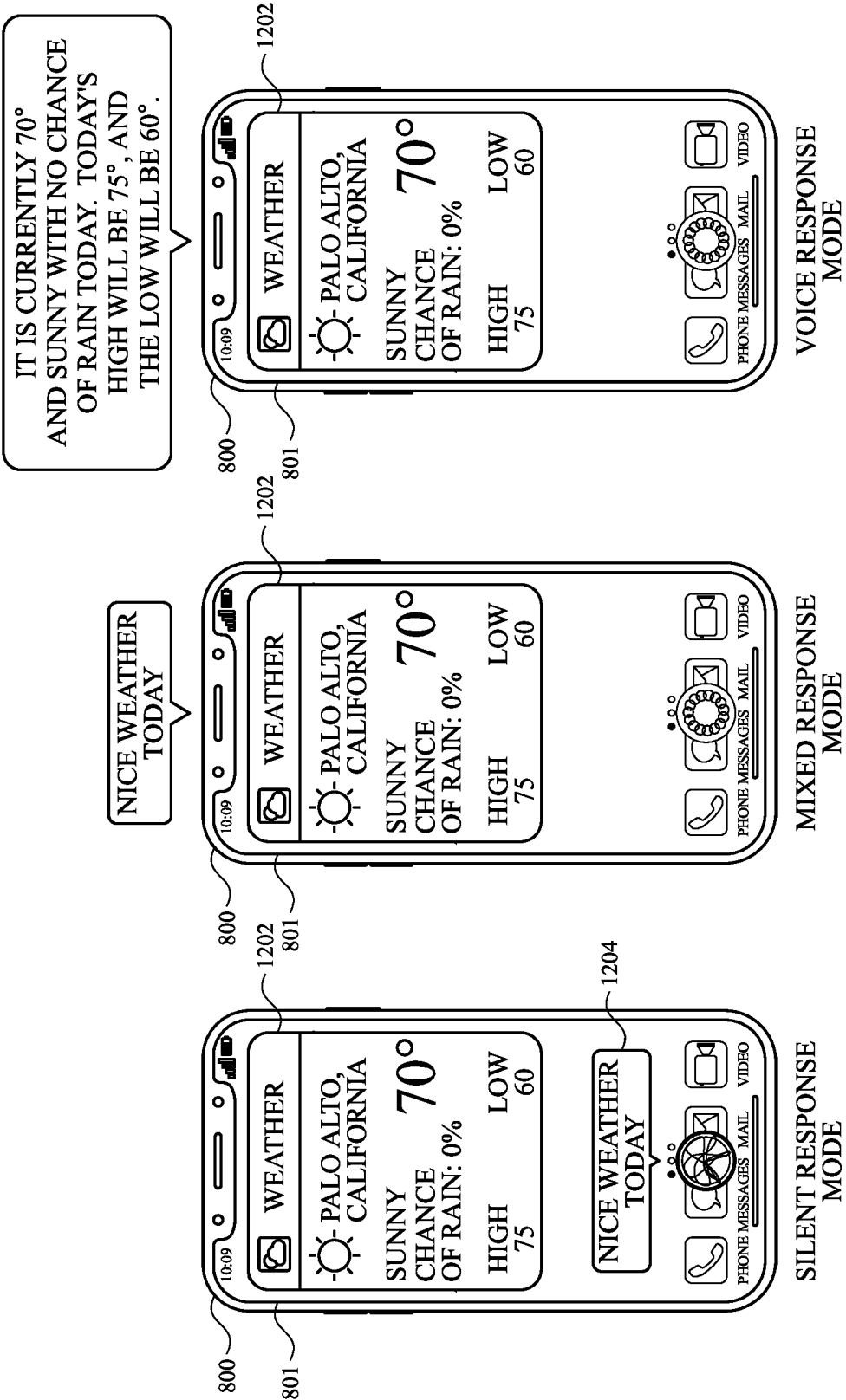
FIG. 12 illustrates a device presenting a response to received natural language input according to different digital assistant response modes, according to various examples.

FIG. 12 illustrates device 800 presenting a response to received natural language input according to different DA response modes, according to various examples. In FIG. 12, for each illustration of device 800, device 800 has initiated a DA and presents a response to the speech input "what's the weather?" according to a silent response mode, a mixed response mode, or a voice response mode, discussed below. Device 800 implementing system 1100, selects the DA response mode and presents the response according to the selected response mode using the techniques discussed below.

System 1100 includes obtaining module 1102. Obtaining module 1102 obtains a response package responsive to the natural language input. The response package includes content (e.g., speakable text) intended as a response to the natural language input. In some examples, the response package includes first text (content text) associated with a digital assistant response affordance (e.g., response affordance 1202) and second text (caption text) associated with the response affordance. In some examples, the caption text is less verbose than (e.g., includes fewer words than) the content text. The content text may provide a complete response to a user's request, while the caption text may provide an abbreviated (e.g., incomplete) response to the request. For a complete response to the request, device 800 may concurrently present the caption text with a response affordance, e.g., whereas presentation of the content text may not require presentation of a response affordance for a complete response.

For example, consider the natural language input "what's the weather?" in FIG. 12. The content text is "it is currently 70 degrees and sunny with no chance of rain today. Today's high will be 75 degrees, and the low will be 60 degrees." The caption text is simply "nice weather today." As shown, the caption text is intended for presentation with response affordance 1202 that visually indicates the information of the content text. Accordingly, presentation of the content text alone may completely answer the request, while presentation of both the caption text and the response affordance may completely answer the request.

In some examples, obtaining module 1102 obtains the response package locally, e.g., by device 800 processing the natural language input as described with respect to FIGS. 7A-7C. In some examples, obtaining module 1102 obtains the response package from an external device, such as DA server 106. In such examples, DA server 106 processes the natural language input as described with respect to FIGS. 7A-7C to determine the response package. In some examples, obtaining module 1102 obtains a portion of the response package locally and another portion of the response package from the external device.

System 1100 includes mode selection module 1104. Selection module 1104 selects, based on context information associated with device 800, a DA response mode from a plurality of DA response modes. A DA response mode specifies the manner (e.g., the format) in which a DA presents a response to natural language input (e.g., the response package).

In some examples, selection module 1104 selects the DA response mode after device 800 receives the natural language input, e.g., based on current context information obtained after receiving the natural language input. In some examples, selection module 1104 selects the DA response mode after obtaining module 1102 obtains the response package, e.g., based on current context information obtained after obtaining the response package. Current context information describes context information at the time selection module 1104 selects the DA response mode. In some examples, the time is after receiving the natural language input and before presenting a response to the natural language input. In some examples, the plurality of DA response modes include a silent response mode, a mixed response mode, and a voice response mode, discussed further below.

System 1100 includes formatting module 1106. In response to selection module 1104 selecting the DA response mode, formatting module 1106 causes the DA to present the response package according to (e.g., in a format consistent with) the selected DA response mode. In some examples, the selected DA response mode is the silent response mode. In some examples, presenting the response package according to the silent response mode includes displaying a response affordance and displaying the caption text without providing audio output representing (e.g., speaking) the caption text (and without providing the content text). In some examples, the selected DA response mode is the mixed response mode. In some examples, presenting the response package according to the mixed response mode includes displaying the response affordance and speaking the caption text without displaying the caption text (and without providing the context text). In some examples, the selected DA response mode is the voice response mode. In some examples, presenting the response package according to the voice response mode includes speaking the content text, e.g., without presenting the caption text and/or without displaying the response affordance.

For example, in FIG. 12, presenting the response package according to the silent response mode includes displaying response affordance 1202 and displaying, in dialog affordance 1204, the caption text "nice weather today" without speaking the caption text. Presenting the response package according to the mixed response mode includes displaying response affordance 1202 and speaking the caption text "nice weather today" without displaying the caption text. Presenting the response package according to the voice response mode includes speaking the content text "it is currently 70 degrees and sunny with no chance of rain today. Today's high will be 75 degrees, and the low will be 60 degrees." Although FIG. 12 shows that device 800 displays response affordance 1202 when presenting the response package according to the voice response mode, in other examples, a response affordance is not displayed when presenting the response package according to the voice response mode.

In some examples, when the DA presents a response according to the silent response mode, device 800 displays a response affordance without displaying a dialog affordance (e.g., including text). In some examples, device 800 forgoes providing the text in accordance with determining that the response affordance includes a direct answer to the natural language request. For example, device 800 determines that the caption text and the response affordance each include respective matching text each answering the user request (thus rendering the caption text redundant). For example, for the natural language request "what's the temperature?", if the response affordance includes the current temperature, in the silent mode, device 800 does not display any caption text, as caption text including the current temperature is redundant with the response affordance. In contrast, consider the example natural language request "is it cold?" A response affordance for the request may include the current temperature and weather status, but may not include a direct (e.g., explicit) answer to the request, such as "yes" or "no." Accordingly, for such natural language input, in the silent mode, device 800 displays both the response affordance and the caption text including a direct answer to the request, e.g., "no it's not cold."

FIG. 12 shows that in some examples, selecting the DA response mode includes determining whether to (1) display the caption text without speaking the caption text or (2) speak the caption text without displaying the caption text. In some examples, selecting the response mode includes determining whether to speak the content text.

Generally, the silent response mode may be suitable when a user desires to view a display and does not desire audio output. The mixed response mode may be suitable when the user desires to view a display and desires audio output. The voice response mode may be suitable when the user does not desire to (or is unable to) view a display. Various techniques and context information selection module 1104 uses to select the DA response mode are now discussed.

Figure 13:
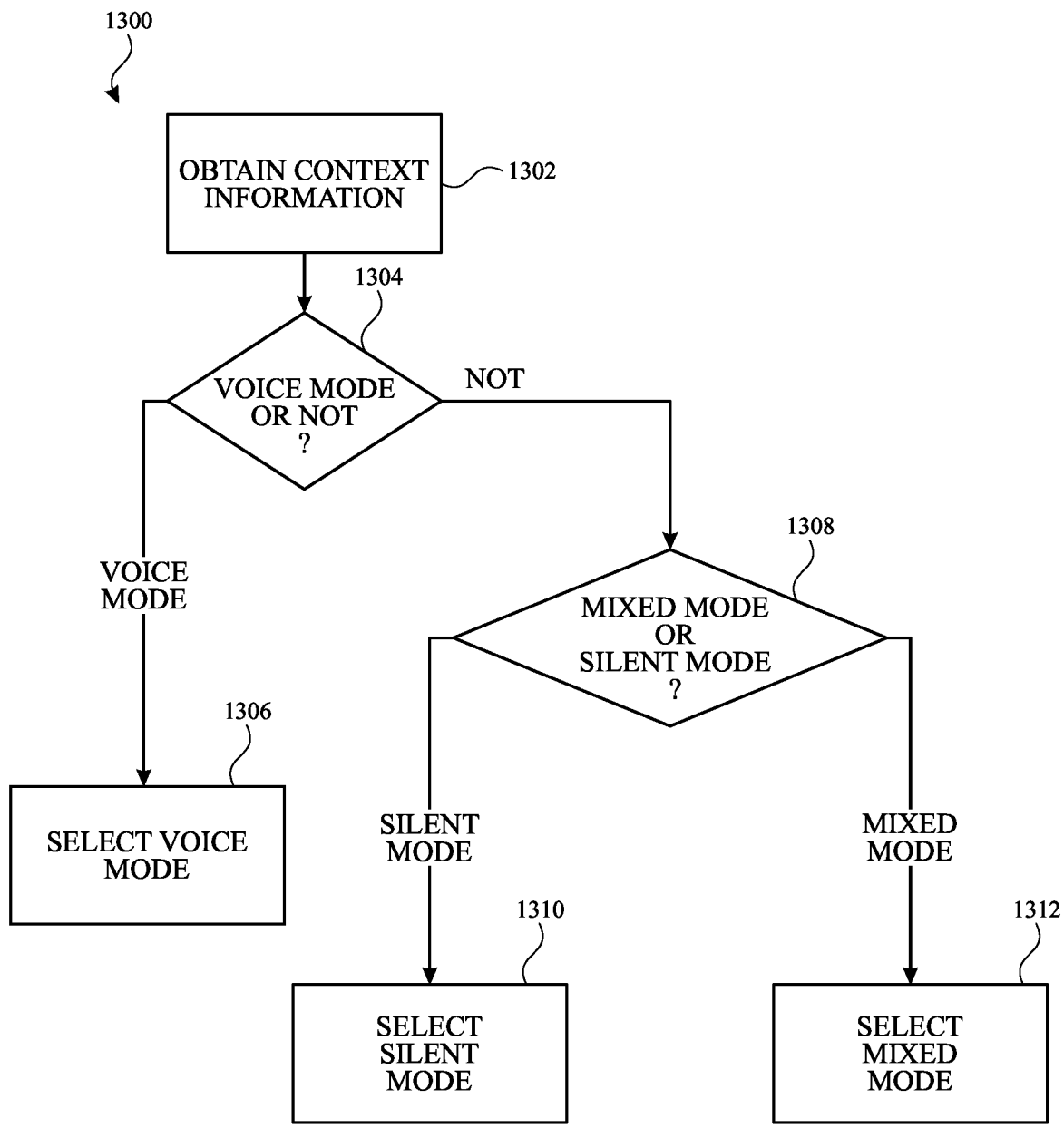
FIG. 13 illustrates an example process implemented to select a digital assistant response mode, according to various examples.

FIG. 13 illustrates example process 1300 implemented by selection module 1104 to select the DA response mode, according to various examples. In some examples, selection module 1104 implements process 1300 as computer executable instructions, e.g., stored in the memories) of device 800.

At block 1302, selection module 1104 obtains (e.g., determines) current context information. At block 1304, module 1104 determines, based on the current context information, whether to select a voice mode. If module 1104 determines to select the voice mode, module 1104 selects the voice mode at block 1306. If module 1104 determines to not select the voice mode, process 1300 proceeds to block 1308. At block 1308, module 1104 selects between the silent mode and the mixed mode. If module 1104 determines to select the silent mode, module 1104 selects the silent mode at block 1310. If module 1104 determines to select the mixed mode, module 1104 selects the mixed mode at block 1312.

In some examples, blocks 1304 and 1308 are implemented using a rule based system. For example, at block 1304, module 1104 determines whether the current context information satisfies certain condition(s) for selecting the voice mode. If the certain condition(s) are satisfied, module 1104 selects the voice mode. If the certain condition(s) are not satisfied (meaning that the current context information satisfies condition(s) for selecting the mixed mode or the voice mode) module 1104 proceeds to block 1308. Similarly, at block 1308, module 1104 determines whether the current context information satisfies certain condition(s) for selecting the silent mode or the mixed mode and selects the silent mode or the mixed mode accordingly.

In some examples, blocks 1304 and 1308 are implemented using a probabilistic (e.g., machine learned) system. For example, at block 1304, module 1104 determines, based on current context information, a probability of selecting the voice mode and a probability of not selecting the voice mode (e.g., the probability of selecting the silent mode or the mixed mode), and selects the branch having the highest probability. At block 1308, module 1104 determines, based on current context information, a probability of selecting the mixed mode and a probability of selecting the silent mode and selects the mode having the highest probability. In some examples, the voice mode, mixed mode, and silent mode probabilities sum to unity.

Various types of current context information used for the determination of blocks 1304 and/or 1308 are now discussed.

In some examples, the context information includes whether device 800 has a display. In a rule based system, a determination that device 800 does not have a display satisfies a condition for selecting the voice mode. In a probabilistic system, a determination that device 800 does not have a display increases the probability of the voice mode and/or decreases the probability of the mixed mode and decreases the probability of the silent mode.

In some examples, the context information includes whether device 800 detected a voice input (e.g., "Hey Sid") to initiate the DA. In a rule based system, detecting the voice input to initiate the DA satisfies a condition for selecting the voice mode. In a rule based system, not detecting the voice input to initiate the DA does not satisfy a condition for selecting the voice mode (and thus satisfies a condition for selecting the mixed mode or the silent mode). In a probabilistic system, in some examples, detecting the voice input to initiate the DA increases the probability of the voice mode and/or decreases the probability of the mixed mode and decreases the probability of the silent mode. In a probabilistic system, in some examples, not detecting the voice input to initiate the DA decreases the probability of the voice mode and/or increases the probability of the mixed mode and increases the probability of the silent mode.

In some examples, the context information includes whether device 800 detected physical contact of device 800 to initiate the DA. In a rule based system, not detecting the physical contact satisfies a condition for selecting the voice mode. In a rule based system, a detection of the physical contact does not satisfy a condition for selecting the voice mode. In a probabilistic system, in some examples, not detecting the physical contact increases the probability of the voice mode and/or decreases the probability of the mixed mode and decreases the probability of the silent mode. In a probabilistic system, in some examples, a detection of the physical contact decreases the probability of the voice mode and/or increases the probability of the mixed mode and increases the probability of the silent mode.

In some examples, the context information includes whether device 800 is in a locked state. In a rule based system, a determination that device 800 is in the locked state satisfies a condition for selecting the voice mode. In a rule based system, a determination that device 800 is not in the locked state does not satisfy a condition for selecting the voice mode. In a probabilistic system, in some examples, a determination that device 800 is in the locked state increases the probability of the voice mode and/or decreases the probability of the mixed mode and decreases the probability of the silent mode. In a probabilistic system, in some examples, a determination that device 800 is not in the locked state decreases the probability of the voice mode and/or increases the probability of the mixed mode and increases the probability of the silent mode.

In some examples, the context information includes whether a display of device 800 was displaying before initiating the DA. In a rule based system, a determination that the display was not displaying before initiating the DA satisfies a condition for selecting the voice mode. In a rule based system, a determination that the display was displaying before initiating the DA does not satisfy a condition for selecting the voice mode. In a probabilistic system, in some examples, a determination that the display was not displaying before initiating the DA increases the probability of the voice mode and/or decreases the probability of the mixed mode and decreases the probability of the silent mode. In a probabilistic system, in some examples, a determination that the display was displaying before initiating the DA decreases the probability of the voice mode and/or increases the probability of the mixed mode and increases the probability of the silent mode.

In some examples, the context information includes a display orientation of device 800. In a rule based system, a determination that the display is face down satisfies a condition for selecting the voice mode. In a rule based system, a determination that the display is face up does not satisfy a condition for selecting the voice mode. In a probabilistic system, in some examples, a determination that the display is face down increases the probability of the voice mode and/or decreases the probability of the mixed mode and decreases the probability of the silent mode. In a probabilistic system, in some examples, a determination that the display is face up decreases the probability of the voice mode and/or increases the probability of the mixed mode and increases the probability of the silent mode.

In some examples, the context information includes whether a display of device 800 is obscured. For example, device 800 uses one or more sensors (e.g., light sensors, microphones, proximity sensors) to determine whether the user cannot view the display. For example, the display may be in an at least partially enclosed space (e.g., pocket, bag, or drawer) or may be covered by an object. In a rule based system, a determination that the display is obscured satisfies a condition for selecting the voice mode. In a rule based system, a determination that the display is not obscured does not satisfy a condition for selecting the voice mode. In a probabilistic system, in some examples, a determination that the display is obscured increases the probability of the voice mode and/or decreases the probability of the mixed mode and decreases the probability of the silent mode. In a probabilistic system, in some examples, a determination that the display is not obscured decreases the probability of the voice mode and/or increases the probability of the mixed mode and increases the probability of the silent mode.

In some examples, the context information includes whether device 800 is coupled to an external audio output device (e.g., headphones, Bluetooth device, speaker). In a rule based system, a determination that device 800 is coupled to the external device satisfies a condition for selecting the voice mode. In a rule based system, a determination that device 800 is not coupled to the external device does not satisfy a condition for selecting the voice mode. In a probabilistic system, in some examples, a determination that device 800 is coupled to the external device increases the probability of the voice mode and/or decreases the probability of the mixed mode and decreases the probability of the silent mode. In a probabilistic system, in some examples, a determination that device 800 is not coupled to the external device decreases the probability of the voice mode and/or increases the probability of the mixed mode and increases the probability of the silent mode.

In some examples, the context information includes whether a direction of user gaze is directed to device 800. In a rule based system, a determination that the direction of user gaze is not directed to device 800 satisfies a condition for selecting the voice mode. In a rule based system, a determination that the direction of user gaze is directed to device 800 does not satisfy a condition for selecting the voice mode. In a probabilistic system, in some examples, a determination that the direction of user gaze is not directed to device 800 increases the probability of the voice mode and/or decreases the probability of the mixed mode and decreases the probability of the silent mode. In a probabilistic system, in some examples, a determination that the direction of user gaze is directed to device 800 decreases the probability of the voice mode and/or increases the probability of the mixed mode and increases the probability of the silent mode.

In some examples, the context information includes whether a predetermined type of gesture of device 800 was detected within a predetermined duration before selecting the response mode. The predetermined type of gesture includes, for example, a raising and/or rotation gesture that causes device 800 to turn on a display. In a rule based system, not detecting the predetermined type of gesture within the predetermined duration satisfies a condition for selecting the voice mode. In a rule based system, a detection of the predetermined type of gesture within the predetermined duration does not satisfy a condition for selecting the voice mode. In a probabilistic system, in some examples, not detecting the predetermined type of gesture within the predetermined duration increases the probability of the voice mode and/or decreases the probability of the mixed mode and decreases the probability of the silent mode. In a probabilistic system, in some examples, a detection of the predetermined type of gesture within the predetermined duration decreases the probability of the voice mode and/or increases the probability of the mixed mode and increases the probability of the silent mode.

In some examples, the context information includes a direction of the natural language input. In a rule based system, a determination that the direction of the natural language input is not oriented towards device 800 satisfies a condition for selecting the voice mode. In a rule based system, a determination that the direction of the natural language input is oriented towards device 800 does not satisfy a condition for selecting the voice mode. In a probabilistic system, in some examples, a determination that the direction of the natural language input is not oriented towards device 800 increases the probability of the voice mode and/or decreases the probability of the mixed mode and decreases the probability of the silent mode. In a probabilistic system, in some examples, a determination that the direction of the natural language input is oriented towards device 800 decreases the probability of the voice mode and/or increases the probability of the mixed mode and increases the probability of the silent mode.

In some examples, the context information includes whether device 800 detected a touch performed on device 800 (e.g., user input selecting response affordance) within a predetermined duration before selecting the response mode. In a rule based system, not detecting the touch within the predetermined duration satisfies a condition for selecting the voice mode. In a rule based system, a detection of the touch within the predetermined duration does not satisfy a condition for selecting the voice mode. In a probabilistic system, in some examples, not detecting the touch within the predetermined duration increases the probability of the voice mode and/or decreases the probability of the mixed mode and decreases the probability of the silent mode. In a probabilistic system, in some examples, a detection of the touch within the predetermined duration decreases the probability of the voice mode and/or increases the probability of the mixed mode and increases the probability of the silent mode.

In some examples, the context information includes whether the natural language input was typed input, e.g., as opposed to spoken input. In a rule based system, a determination that the natural language input was not typed input satisfies a condition for selecting the voice mode. In a rule based system, a determination that the natural language input was typed input does not satisfy a condition for selecting the voice mode. In a probabilistic system, in some examples, a determination that the natural language input was not typed input increases the probability of the voice mode and/or decreases the probability of the mixed mode and decreases the probability of the silent mode. In a probabilistic system, in some examples, a determination that the natural language input was typed input decreases the probability of the voice mode and/or increases the probability of the mixed mode and increases the probability of the silent mode.

In some examples, the context information includes whether device 800 received a notification (e.g., text message, email message, application notification, system notification) within a predetermined duration (e.g., 10, 15, 30 seconds) before selecting the response mode. In a rule based system, not receiving the notification within the predetermined duration satisfies a condition for selecting the voice mode. In a rule based system, receiving the notification within the predetermined duration does not satisfy a condition for selecting the voice mode. In a probabilistic system, in some examples, not receiving the notification within the predetermined duration increases the probability of the voice mode and/or decreases the probability of the mixed mode and decreases the probability of the silent mode. In a probabilistic system, in some examples, receiving the notification within the predetermined duration decreases the probability of the voice mode and/or increases the probability of the mixed mode and increases the probability of the silent mode.

In some examples, the context information includes an ambient noise level detected by device 800. An ambient noise level above a threshold may suggest that the user is unable to hear audio output, e.g., because the user is in a noisy environment. Accordingly, detecting an ambient noise level above the threshold may suggest to select the silent mode (as device 800 provides audio output in the voice mode and the mixed mode). Thus, in a rule based system, a determination that the ambient noise level is below the threshold satisfies a condition for selecting the voice mode, satisfies a condition for selecting the mixed mode (at block 1308), and does not satisfy a condition for selecting the silent mode (at block 1308). In a rule based system, a determination that the ambient noise level is above the threshold does not satisfy a condition for selecting the voice mode, does not satisfy a condition for selecting the mixed mode (block 1308), and satisfies a condition for selecting the silent mode (block 1308). In a probabilistic system, in some examples, a determination that the ambient noise level is below the threshold increases the probability of the voice mode, increases the probability of the mixed mode, and decreases the probability of the silent mode. In a probabilistic system, in some examples, a determination that the ambient noise level is above the threshold decreases the probability of the voice mode, decreases the probability of the mixed mode, and increases the probability of the silent mode.

In some examples, the context information includes whether the natural language input corresponds to whispered input. A user whispering natural language speech input may suggest that the user does not desire audio output, e.g., because the user is in a quiet environment like a movie theatre. Accordingly, determining that the natural language input corresponds to whispered input may suggest to select the silent mode. Thus, in a rule based system, a determination that the natural language input does not correspond to whispered input satisfies a condition for selecting the voice mode, satisfies a condition for selecting the mixed mode (at block 1308), and does not satisfy a condition for selecting the silent mode (at block 1308). In a rule based system, a determination that the natural language input corresponds to whispered input does not satisfy a condition for selecting the voice mode, does not satisfy a condition for selecting the mixed mode (block 1308), and satisfies a condition for selecting the silent mode (block 1308). In a probabilistic system, in some examples, a determination that the natural language input does not correspond to whispered input increases the probability of the voice mode, increases the probability of the mixed mode, and decreases the probability of the silent mode. In a probabilistic system, in some examples, a determination that the natural language input corresponds to whispered input decreases the probability of the voice mode, decreases the probability of the mixed mode, and increases the probability of the silent mode.

In some examples, the context information includes whether a user's schedule information indicates the user is occupied (e.g., in a meeting). Schedule information indicating that the user is occupied may suggest to select the silent mode. Thus, in a rule based system, a determination that the schedule information indicates that the user is not occupied satisfies a condition for selecting the voice mode, satisfies a condition for selecting the mixed mode (at block 1308), and does not satisfy a condition for selecting the silent mode (at block 1308). In a rule based system, a determination that the schedule information indicates that the user is occupied does not satisfy a condition for selecting the voice mode, does not satisfy a condition for selecting the mixed mode (block 1308), and satisfies a condition for selecting the silent mode (block 1308). In a probabilistic system, in some examples, a determination that the schedule information indicates that the user is not occupied increases the probability of the voice mode, increases the probability of the mixed mode, and decreases the probability of the silent mode. In a probabilistic system, in some examples, a determination that the schedule information indicates that the user is occupied decreases the probability of the voice mode, decreases the probability of the mixed mode, and increases the probability of the silent mode.

In some examples, the context information includes whether device 800 is in a vehicle. In some examples, device 800 determines whether it is in a vehicle by detecting a pairing (e.g., via Bluetooth or via CarPlay by Apple Inc.) to the vehicle or by determining activation of a setting indicating that device 800 is in the vehicle (e.g., a do not disturb while driving setting). In some examples, device 800 determines whether it is in a vehicle using the location and/or speed of device 800. For example, data indicating that device 800 is traveling 65 miles per hour on a highway may indicate that device 800 is in a vehicle.

In a rule based system, a determination that device 800 is in a vehicle satisfies a condition for selecting the voice mode. In a rule based system, a determination that device 800 is not in a vehicle does not satisfy a condition for selecting the voice mode. In a probabilistic system, in some examples, a determination that device 800 is in a vehicle increases the probability of the voice mode and/or decreases the probability of the mixed mode and decreases the probability of the silent mode. In a probabilistic system, in some examples, a determination that device 800 is not in a vehicle decreases the probability of the voice mode and/or increases the probability of the mixed mode and increases the probability of the silent mode.

Figure 14:
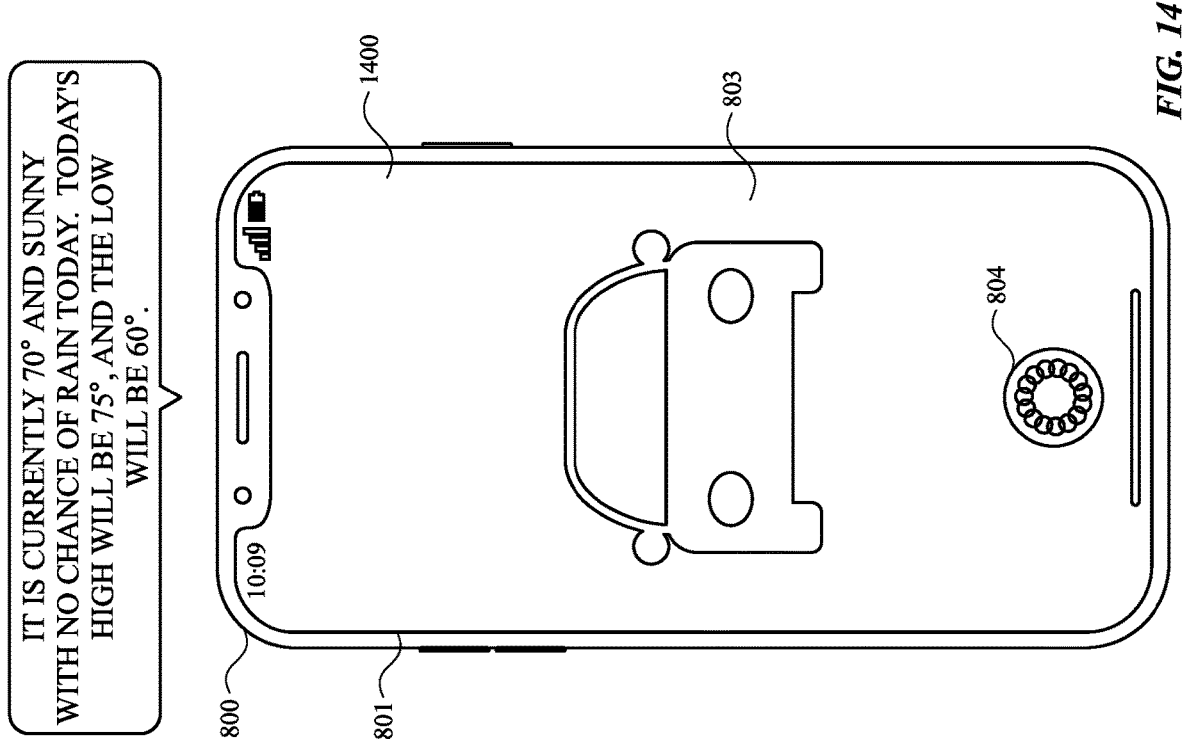
FIG. 14 illustrates a device presenting a response according to the voice response mode when a user is determined to be in a vehicle (e.g., driving), according to various examples.

FIG. 14 illustrates device 800 presenting a response according to the voice response mode when the user is determined to be in a vehicle (e.g., driving), according to various examples. As shown, device 800 displays DA user interface 803 over driving user interface 1400. To minimize visual distraction while the user is driving, DA user interface 803 does not include a response affordance and only includes indicator 804. Responsive to the natural language input "what's the weather?", the DA speaks the content text "it is currently 70 degrees and sunny with no chance of rain today. Today's high will be 75 degrees, and the low will be 60 degrees." Thus, the DA can respond to the user's request in a manner that reduces visual distraction while the user drives.

In some examples, the context information includes whether device 800 is executing a predetermined type of application. In some examples, the predetermined type of application includes a navigation application. In a rule based system, a determination that device 800 is executing the predetermined type of application satisfies a condition for selecting the voice mode. In a rule based system, a determination that device 800 is not executing the predetermined type of application does not satisfy a condition for selecting the voice mode. In a probabilistic system, in some examples, a determination that device 800 is executing predetermined type of application increases the probability of the voice mode and/or decreases the probability of the mixed mode and decreases the probability of the silent mode. In a probabilistic system, in some examples, a determination that device 800 is not executing the predetermined type of application decreases the probability of the voice mode and/or increases the probability of the mixed mode and increases the probability of the silent mode.

Figure 15:
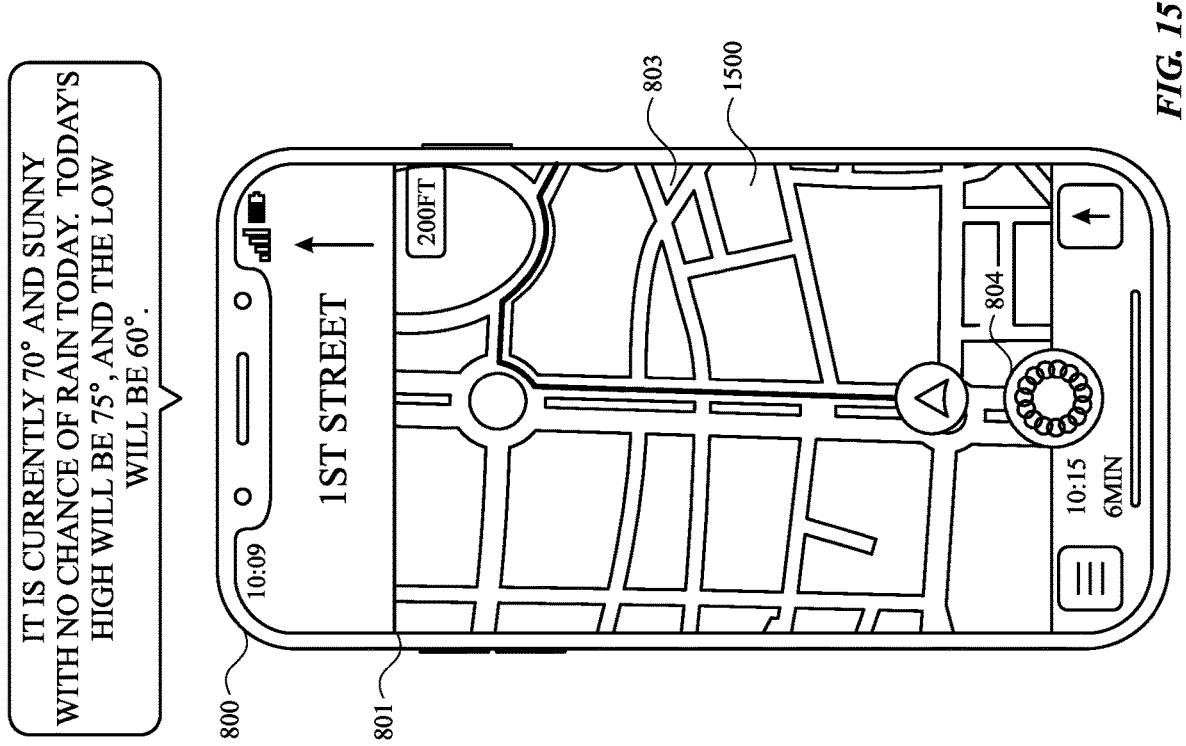
FIG. 15 illustrates a device presenting a response according to the voice response mode when the device is executing a navigation application, according to various examples.

FIG. 15 illustrates device 800 presenting a response according to the voice response mode when device 800 is executing a navigation application, according to various examples. As shown, device 800 displays DA user interface 803 over navigation application user interface 1500. To minimize visual disruption to user interface 1500, DA user interface 803 does not include a response affordance (or a dialog affordance) and only includes indicator 804. Responsive to the natural language input "what's the weather?", the DA speaks the content text "it is currently 70 degrees and sunny with no chance of rain today. Today's high will be 75 degrees, and the low will be 60 degrees." Thus, the DA can respond to the user's request in a manner that reduces visual disruption to an executing navigation application.

Returning to FIG. 13, at block 1308, module 1104 selects between the silent mode and the mixed mode. In some examples, module 1104 selects the mode for which certain condition(s) have been satisfied (recall that performing block 1304 may also determine whether current context information satisfies condition(s) for selecting the mixed mode or condition(s) for selecting the silent mode). In some examples, module 1104 selects the mode for which the probability is highest (recall that performing block 1304 may determine the respective probabilities of the silent mode and the mixed mode). In some examples, at block 1308, module 1104 selects between the silent mode and the mixed mode based on current context information, discussed below.

In some examples, the context information includes a DA voice feedback setting indicating whether the DA should provide audio output responsive to a user request. In some examples, the voice feedback setting indicates to provide voice feedback (e.g., always). In a rule based system, a determination that the voice feedback setting indicates to provide voice feedback satisfies a condition for selecting the mixed mode and does not satisfy a condition for selecting the silent mode. In a probabilistic system, in some examples, a determination that the voice feedback setting indicates to provide voice feedback increases the probability of the mixed mode and decreases the probability of the silent mode.

In some examples, the DA voice feedback setting indicates to control voice feedback with a switch of device 800 (e.g., a ringer switch). For example, the voice feedback setting indicates to provide voice feedback when the ringer switch is on and to not provide voice feedback when the ringer switch is off. In such examples, in a rule based system, a determination that the ringer switch is on (the voice feedback setting indicates to provide voice feedback) satisfies a condition for selecting the mixed mode and does not satisfy a condition for selecting the silent mode. In a rule based system, a determination that the ringer switch is off (the voice feedback setting indicates to not provide voice feedback) satisfies a condition for selecting the silent mode and does not satisfy a condition for selecting the mixed mode. In a probabilistic system, in some examples, a determination that the ringer switch is on increases the mixed mode probability and decreases the silent mode probability. In a probabilistic system, in some examples, a determination that the ringer switch is off decreases the mixed mode probability and increases the silent mode probability.

In some examples, the DA voice feedback setting indicates to provide voice feedback in a "hands-free" context. For example, the DA voice feedback setting specifies to only provide voice feedback if the DA is initiated using speech input or if device is coupled to/paired to an external device (e.g., headphones, a Bluetooth device, or a device implementing CarPlay by Apple Inc.). In some examples, a determination that the voice feedback setting indicates to provide voice feedback in a "hands-free" context causes module 1104 to determine whether device 800 detected physical contact to initiate the DA. In a rule based system, a determination that device 800 detected the physical contact satisfies a condition for selecting the silent mode and does not satisfy a condition for selecting the mixed mode. In a rule based system, a determination that device 800 did not detect the physical contact satisfies a condition for selecting the mixed mode and does not satisfy a condition for selecting the silent mode. In a probabilistic system, in some examples, a determination that device 800 detected the physical contact increases the silent mode probability and decreases the mixed mode probability. In a probabilistic system, in some examples, a determination that device 800 did not detect the physical contact decreases the silent mode probability and increases the mixed mode probability. In some examples, a determination that the voice feedback setting does not indicate to provide voice feedback in a "hands-free" context causes module 1104 to select the mixed mode or the silent mode according to another voice feedback setting (e.g., to control voice feedback with the ringer switch or to always provide voice feedback), as discussed above.

In some examples, in a rule based system, module 1104 selects a particular DA response mode even if one or more conditions for selecting the particular mode are not satisfied (or not determined), e.g., as long as other condition(s) for selecting the particular mode are satisfied. In some examples, the conditions for selecting a particular mode are sequential. For example, after module 1104 determines the context information does (or does not) satisfy a condition for selecting a particular mode, module 1104 determines whether the context information satisfies another condition for selecting the particular mode, and so on, to select the particular mode. In some examples, certain condition(s) for selecting a particular mode take precedence over other condition(s), e.g., such that module 1104 selects the particular mode if the certain condition(s) are satisfied, regardless of whether other condition(s) are satisfied. The certain condition(s) and the sequence in which various conditions are (or are not) satisfied to select a particular mode can vary according to various implementations of module 1104. For example, module 1104 selects a voice response mode if device 800 is determined to be in a vehicle, even though device 800 detected a physical contact to initiate the DA (which satisfies a condition for selecting the mixed mode or the silent mode, not the voice mode).

In some examples, particular type(s) of context information are not determined in a probabilistic system. In some examples, in a probabilistic system, the amount by which module 1104 increases or decreases the respective response mode probabilities varies based on the particular type of context information considered, e.g., such that different types of context information have different weights when selecting a particular response mode. For example, module 1104 increases the probability of a particular mode by a first amount responsive to determining that first context information indicates to increase the probability, and increases the probability by a different second amount responsive to determining that different second context information indicates to increase the probability. As a specific example, a determination that device 800 is in a vehicle increases the voice mode probability by a large amount, while a determination that device 800 is in the locked state increases the voice mode probability by a smaller amount. In some examples, module 1104 selects a particular mode when the probability of the mode exceeds a threshold. In some examples, particular types of context information do not affect a probability of a particular mode, e.g., such that the context information has no weight when selecting the particular mode. For example, context information indicating that device 800 did not receive voice input to initiate the DA does not affect the probability of selecting the voice mode, the mixed mode, and the silent mode, or a sub combination thereof.

It should be appreciated that process 1300 is exemplary and does not restrict the manner in which module 1104 may select a response mode. Thus, the present disclosure contemplates other manners of selecting a response mode based on the context information discussed above. For example, instead of first determining whether to select the voice mode, module 1104 simultaneously determines respective probabilities for the voice, silent, and mixed modes based on the context information. As another example, module 1104 implements a decision tree or flowchart to select a response mode based on whether the context information satisfies particular conditions, in a manner consistent with the teachings herein. The particular configuration of the decision tree or flowchart can vary according to various implementations of module 1104.

In some examples, the selected DA response mode varies throughout the course of a multi-turn DA interaction. A multi-turn DA interaction describes an interaction where a user provides a first natural language input to the DA, and the DA presents a response requesting further user input. Accordingly, in some examples, device 800 receives a first natural language input and the DA presents a first response package (responsive to the first natural language input) according to a first selected response mode. Presentation of the first response package includes requesting further user input. Thus, after presenting the first response package, device 800 receives a second natural language input responsive to the presentation of the first response package. Device 800 obtains a second response package responsive to the second natural language input. After receiving the second natural language input, device 800 further selects a second DA response mode (different from the first DA response mode) from the plurality of DA response modes. In response to selecting the second response mode, the DA presents the second response package according to the second response mode.

Figure 16:
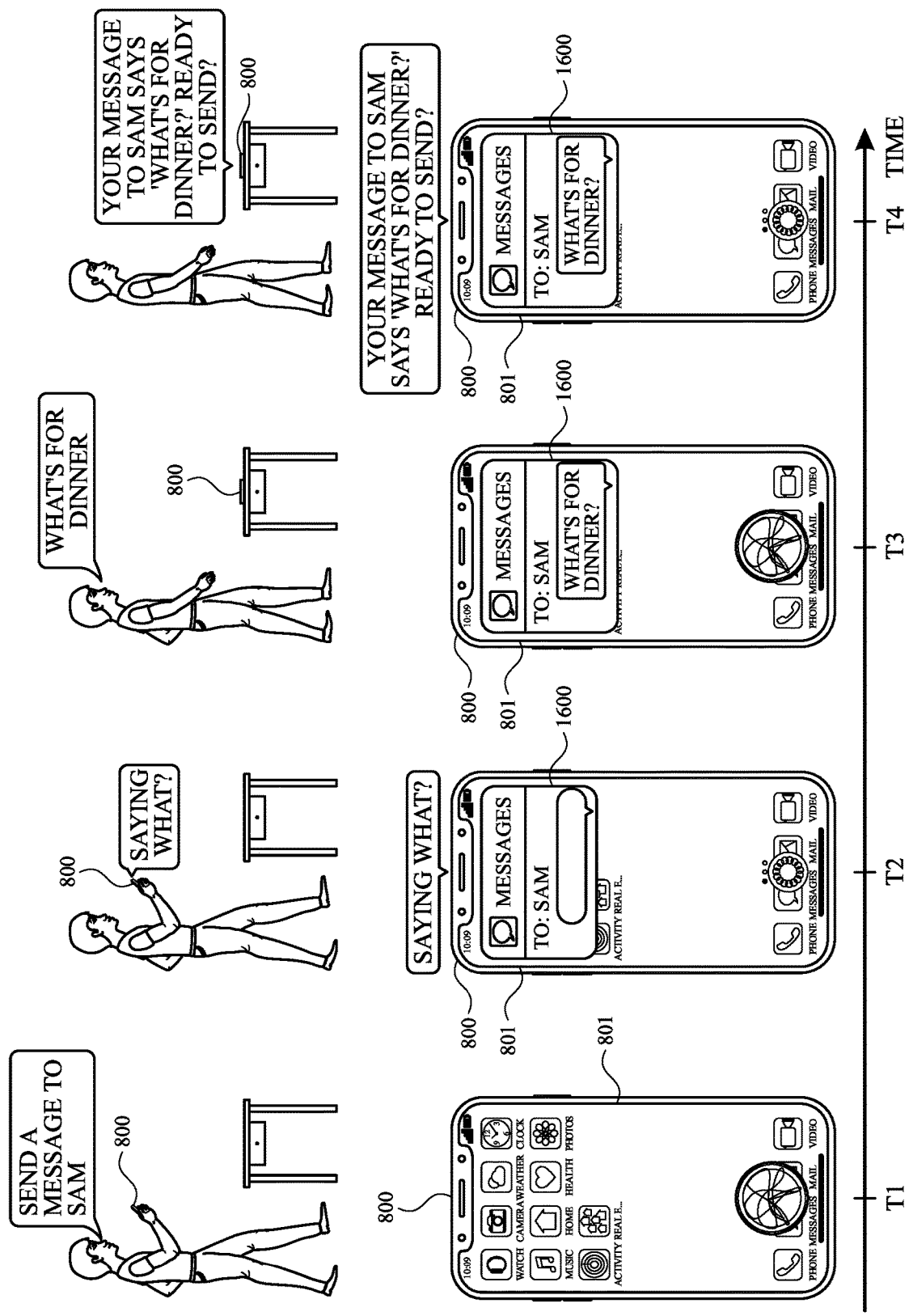
FIG. 16 illustrates response mode variation throughout the course of a multi-turn DA interaction, according to various examples.

FIG. 16 illustrates response mode variation throughout the course of a multi-turn DA interaction, according to various examples. In FIG. 16, at time T1, the user has initiated a DA and provides the first speech input "send a message to Sam." Device 800 obtains a first response package responsive to the first speech input. The first response package includes the content text "what do you want your message to Sam to say?" and the caption text "saying what?" Device 800 further selects the mixed response mode, e.g., because the user initiated the DA by physically touching device 800 and/or device 800's DA voice feedback setting indicates to provide voice feedback. Accordingly, at time T2, the DA presents the first response package according to the mixed response mode. Specifically, device 800 speaks the caption text "saying what?" and displays response affordance 1600 indicating a message to Sam.

At time T3, the user has placed the display of device 800 face down on the table, and provides the second speech input "what's for dinner?". Device 800 obtains a second response package responsive to the second speech input. The second response package includes the caption text "here's your message, ready to send?" and the content text "your message to Sam says 'what's for dinner?' ready to send?" Device 800 further selects the voice response mode, e.g., because the display of device 800 is face down after receiving the second speech input. Accordingly, at time T4, the DA presents the second response package according to the voice response mode. Specifically, device 800 speaks the content text (not the caption text) "your message to Sam says 'what's for dinner?' ready to send?"

In this manner, a DA can intelligently respond in a manner appropriate for a current context of device 800. For example, at time T2, the mixed mode was appropriate because the user could view display 801. Thus, at time T2, response affordance 1600 visually indicates a message to Sam without the DA audibly indicating the message to Sam, as device 800 only speaks "saying what?" The DA does not speak the longer content text (indicating the message to Sam) thus increasing the interaction efficiency. However, at time T4, the user cannot view display 801. Because the user cannot visually confirm the message content, the DA does not simply present the caption text "here's your message, ready to send?" Rather, the DA speaks the more informative content text to audibly confirm the message content.

6. Process for Operating a Digital Assistant

Figure 17B:
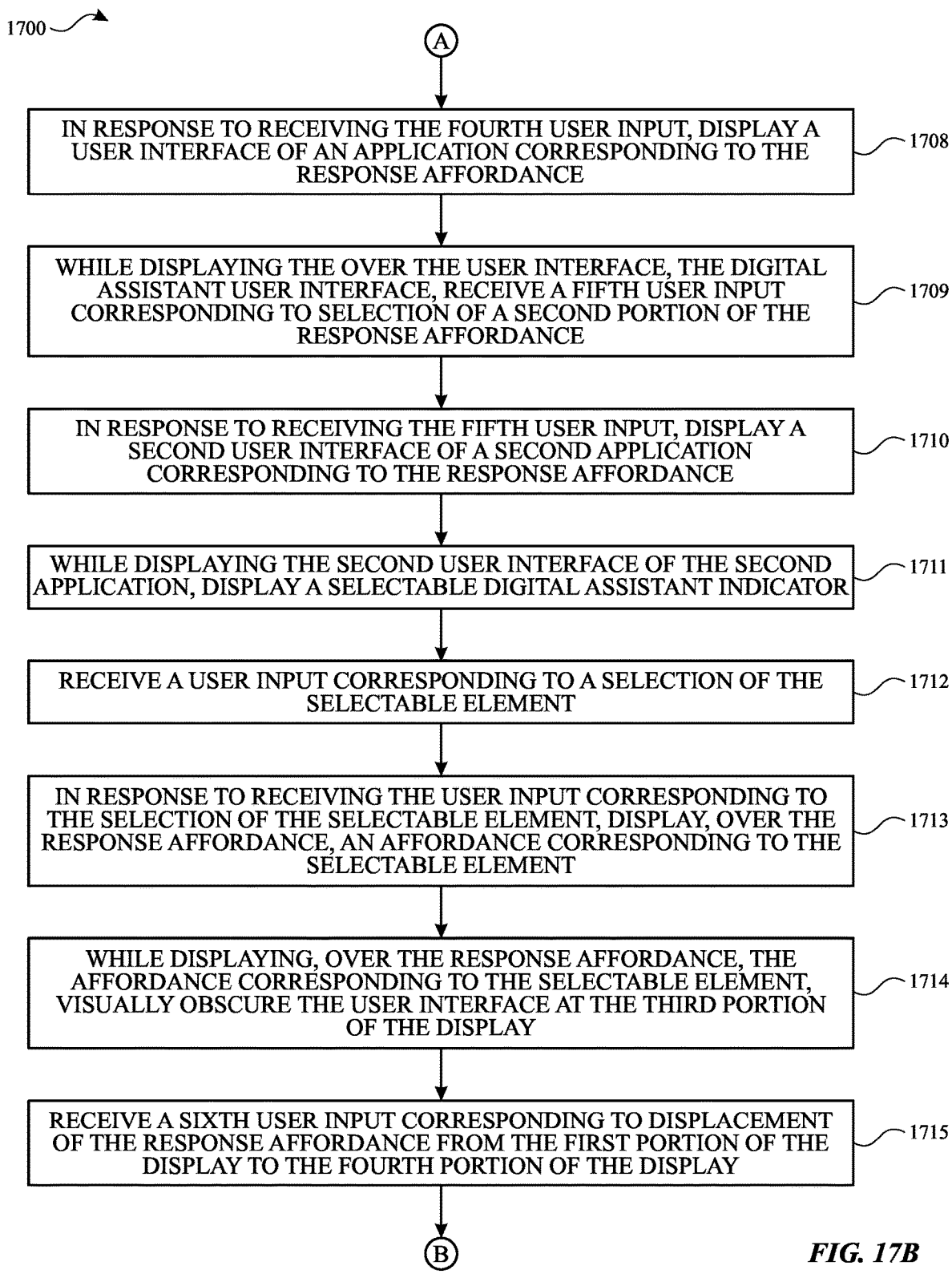
Figure 17C:
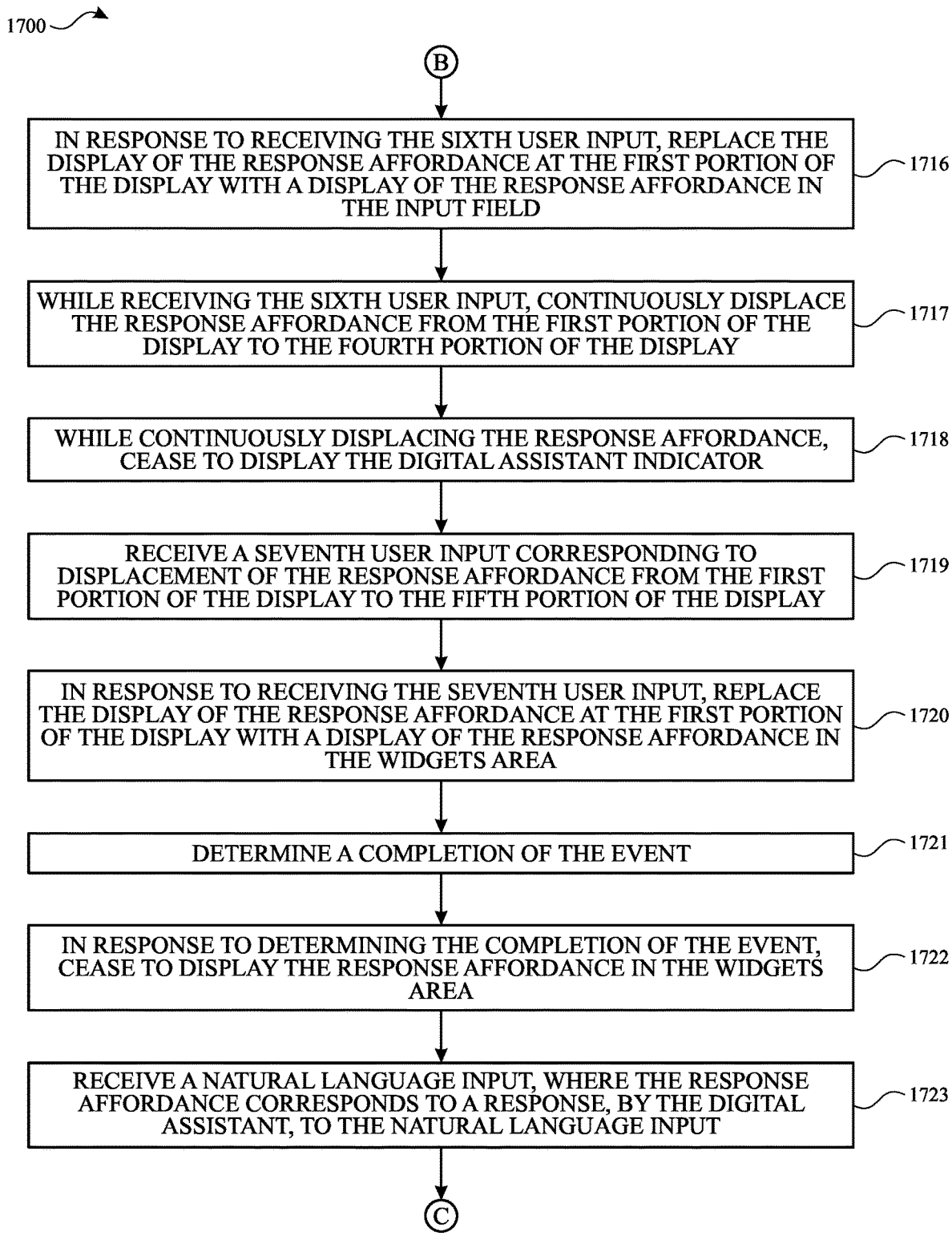
Figure 17D:
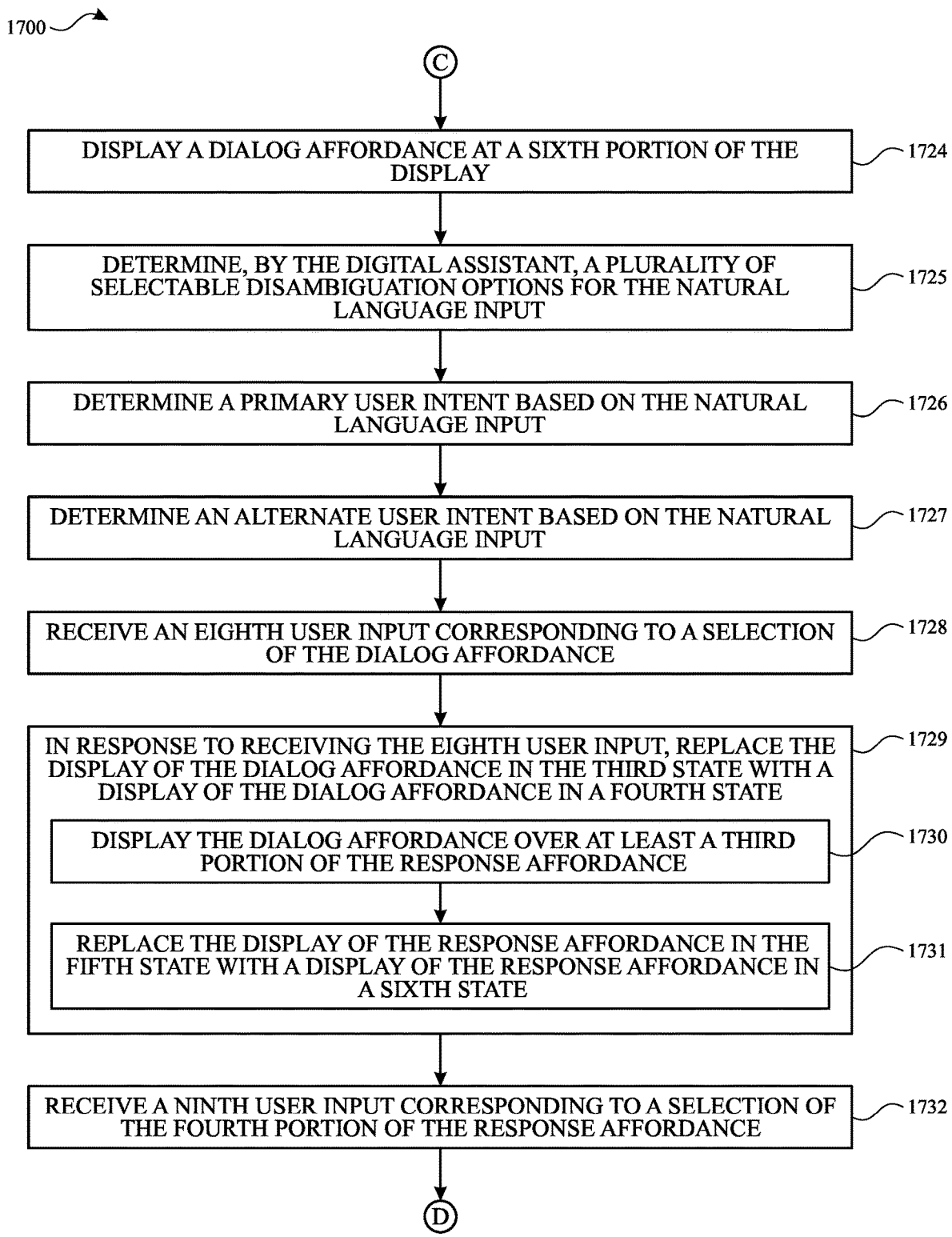
Figure 17E:
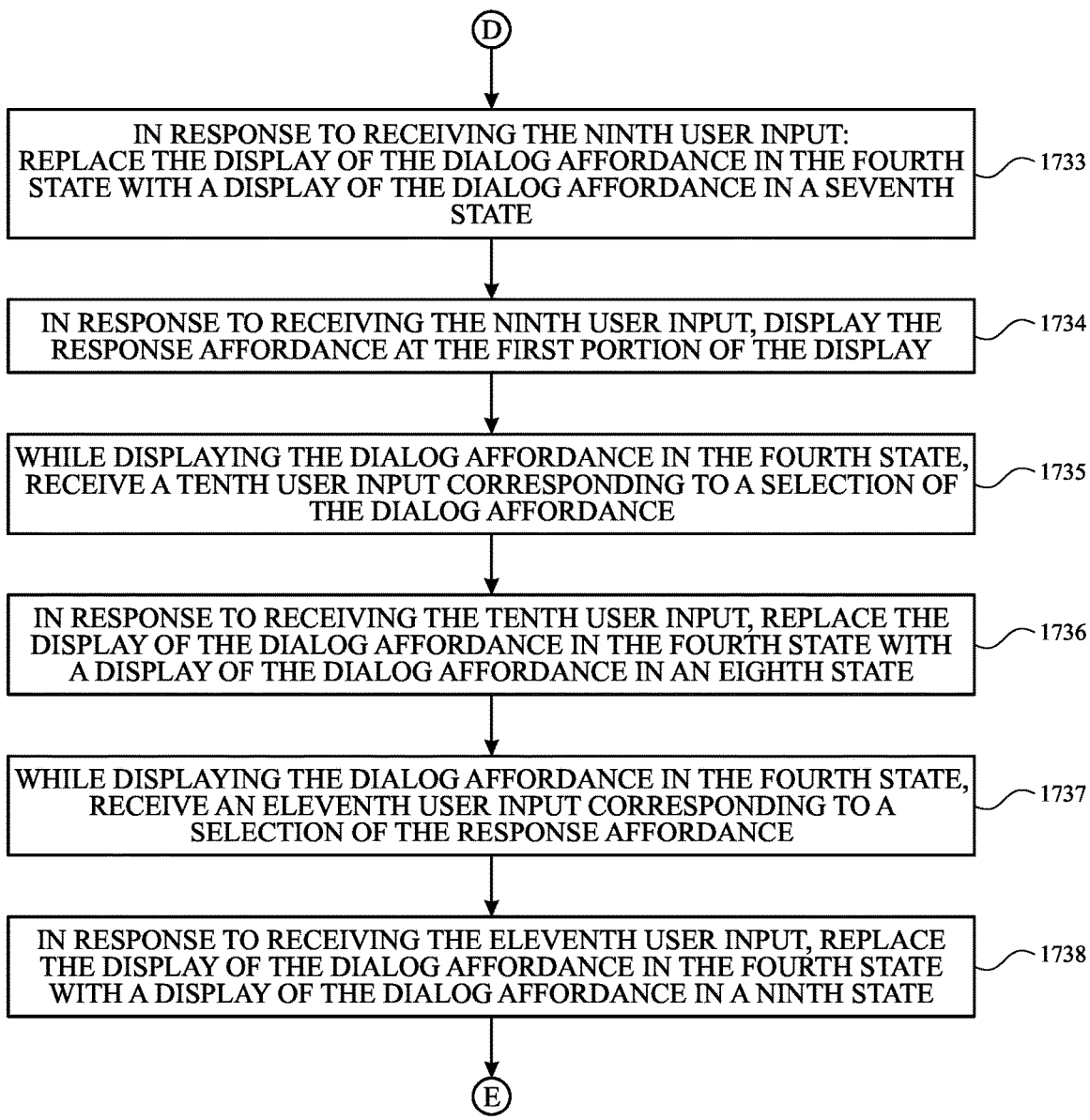
Figure 17F:
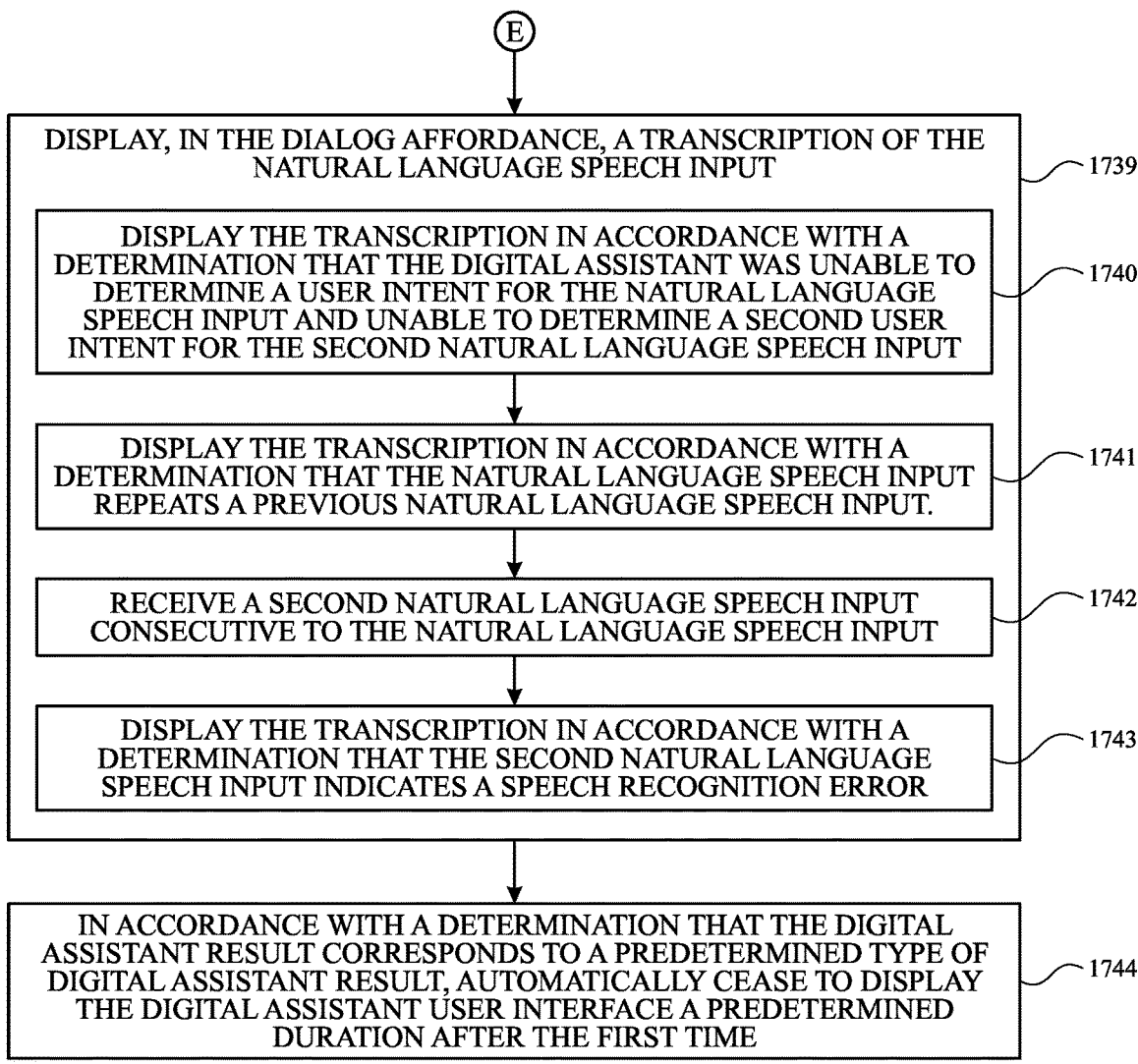

FIGS. 17E-17F illustrate process 1700 for operating a digital assistant, according to various examples. Process 1700 is performed, for example, using one or more electronic devices implementing a digital assistant. In some examples, process 1700 is performed using a client-server system (e.g., system 100), and the blocks of process 1700 are divided up in any manner between the server (e.g., DA server 106) and a client device (e.g., device 800, 900, 902, or 904). In other examples, the blocks of process 1700 are divided up between the server and multiple client devices (e.g., a mobile phone and a smart watch). Thus, while portions of process 1700 are described herein as being performed by particular devices of a client-server system, it will be appreciated that process 1700 is not so limited. In other examples, process 1700 is performed using only a client device (e.g., user device 104) or only multiple client devices. In process 1700, some blocks are, optionally, combined, the order of some blocks is, optionally, changed, and some blocks are, optionally, omitted. In some examples, additional steps may be performed in combination with the process 1700.

Generally, process 1700 is illustrated using FIGS. 8A-8CT, discussed above. However, it should be appreciated that other Figures discussed above may be equally applicable to process 1700.

At block 1701, while displaying (e.g., at display 801) a user interface (e.g., user interface 802 in FIG. 8A) different from a digital assistant user interface, a user input is received.

At block 1702, in accordance with a determination that the user input satisfies a criterion for initiating a digital assistant: a digital assistant user interface (e.g., DA user interface 803 in FIG. 8F) is displayed over the user interface. The digital assistant user interface includes a digital assistant indicator (e.g., indicator 804 in FIG. 8F) displayed at a first portion of the display and a response affordance (e.g., response affordance 805 in FIG. 8F) displayed at a second portion of the display. A portion of the user interface remains visible at a third portion of the display. In some examples, the third portion is between the first portion and the second portion. In some examples, the portion of the user interface was displayed at the third portion of the display prior to receiving the user input. In some examples, user interface is a home screen user interface (e.g., user interface 802 in FIG. 8A) or an application specific user interface (e.g., user interface 809 in FIG. 8J).

In some examples, the response affordance is displayed in a first state (e.g., response affordance 805 in FIG. 8G). In some examples, at block 1703, while displaying the over the user interface, the digital assistant user interface, a second user input corresponding to a selection of the response affordance (e.g., input 806 in FIG. 8G) is received. In some examples, at block 1704, in response to receiving the second user input, the display of the response affordance in the first state is replaced with a display of the response affordance in a second state (e.g., response affordance 805 in FIG. 8H). In some examples, the first state is a compact state and the second state is an expanded state.

In some examples, at block 1705, while displaying the response affordance in the second state, a third user input requesting to display the response affordance in the first state is received. In some examples, at block 1706, in response to receiving the third user input, the display of the response affordance in the second state is replaced with the display of the response affordance in the first state.

In some examples, at block 1707, while displaying the response affordance in the second state, a fourth user input corresponding to a selection of the response affordance (e.g., input 808 in FIG. 8I) is received. In some examples, at block 1708, in response to receiving the fourth user input, a user interface of an application corresponding to the response affordance (e.g., user interface 809 in FIG. 8J) is displayed.

In some examples, the second user input corresponds to a selection of a first portion of the response affordance (e.g., the selected portion of response affordance 805 in FIG. 8G). In some examples, at block 1709, while displaying the over the user interface, the digital assistant user interface including the response affordance displayed in the first state, a fifth user input corresponding to a selection of a second portion of the response affordance (e.g., input 812 in FIG. 8M) is received. In some examples, at block 1710, in response to receiving the fifth user input, a second user interface of a second application corresponding to the response affordance (e.g., user interface 809 in FIG. 8N) is displayed. In some examples, at block 1711, while displaying the second user interface of the second application, a selectable digital assistant indicator (e.g., indicator 810 in FIG. 8N) is displayed.

In some examples, the response affordance (e.g., response affordance 816 in FIG. 8Q) includes a selectable element (e.g., selectable element 817 in FIG. 8Q). In some examples, at block 1712, a user input corresponding to a selection of the selectable element (e.g., input 818 in FIG. 8R) is received. In some examples, at block 1713, in response to receiving the user input corresponding to the selection of the selectable element, an affordance corresponding to the selectable element (e.g., affordance 819 in FIG. 8S) is displayed over the response affordance. In some examples, at block 1714, while displaying, over the response affordance, the affordance corresponding to the selectable element, the user interface is visually obscured at the third portion of the display (e.g., user interface 802 in FIG. 8S).

In some examples, the user interface includes an input field (e.g. input field 826 in FIG. 8Z) occupying a fourth portion of the display. In some examples, at block 1715, a sixth user input corresponding to displacement of the response affordance from the first portion of the display to the fourth portion of the display (e.g., input 828 in FIGS. 8AB-8AC) is received. In some examples, at block 1716, in response to receiving the sixth user input, the display of the response affordance at the first portion of the display is replaced with a display of the response affordance in the input field (e.g., FIG. 8AD). In some examples, the input field corresponds to a messaging application, an email application, or a note taking application. In some examples, at block 1717, while receiving the sixth user input, the response affordance is continuously displaced from the first portion of the display to the fourth portion of the display (e.g., FIGS. 8AB-8AC). In examples, at block 1718, while continuously displacing the response affordance, the display of the digital assistant indicator is ceased.

In some examples, the user interface includes a widgets area occupying a fifth portion of the display (e.g., widgets area 832 in FIG. 8AG). In some examples, at block 1719, a seventh user input corresponding to displacement of the response affordance from the first portion of the display to the fifth portion of the display (e.g., user input 834 in FIGS. 8AH-8AI) is received. In some examples, at block 1720, in response to receiving the seventh user input, the display of the response affordance at the first portion of the display is replaced with a display of the response affordance in the widgets area (e.g., FIG. 8AJ). In some examples, the response affordance corresponds to an event. In some examples, at block 1721, a completion of the event is determined. In some examples, at block 1722, in response to determining the completion of the event, the display the response affordance in the widgets area is ceased.

In some examples, at block 1723, a natural language input is received and the response affordance corresponds to a response, by the digital assistant, to the natural language input. In some examples, the digital assistant determines a plurality of results corresponding to the natural language input and the response affordance includes a single result of the plurality of results (e.g., response affordance 839 in FIG. 8AO). In some examples, the response affordance includes an editable text field, the editable text field including text determined from the natural language input (e.g., editable text field 850 in FIG. 8AR).

In some examples, the digital assistant user interface includes a dialog affordance (e.g., dialog affordance 863 in FIG. 8BM). In some examples, at block 1724, the dialog affordance is displayed at a sixth portion of the display. In some examples, the sixth portion is between the first portion and the second portion. In some examples, the dialog affordance includes dialog, generated by the digital assistant, responsive to the natural language input.

In some examples, at block 1725, a plurality of selectable disambiguation options for the natural language input is determined by the digital assistant. In some examples, the dialog includes the plurality of selectable disambiguation options (e.g., options 865 and 866 in FIG. 8BL).

In some examples, at block 1726, a primary user intent based on the natural language input is determined. In some examples, the response affordance corresponds to the primary user intent (e.g., response affordance 870 in FIG. 8BN). In some examples, at block 1727, an alternate user intent based on the natural language input is determined. In some examples, the dialog includes a selectable option corresponding to the alternate user intent (e.g., option 872 in FIG. 8BN).

In some examples, the dialog affordance is displayed in a third state (e.g., dialog affordance 873 in FIG. 8BO). In some examples, at block 1728, an eighth user input corresponding to a selection of the dialog affordance (e.g., user input 874 in FIGS. 8BP-8BR) is received. In some examples, at block 1729, in response to receiving the eighth user input, the display of the dialog affordance in the third state is replaced with a display of the dialog affordance in a fourth state (e.g., dialog affordance in FIG. 8BQ, 8BR, 8BS, or 8BT). In some examples, the fourth state corresponds to a maximum size of the dialog affordance. In some examples, while displaying the dialog affordance in the fourth state, user input to scroll through a content of the dialog affordance is enabled (e.g., FIG. 8BS).

In some examples, the display of the dialog affordance in the fourth state occupies at least a portion of the first portion of the display (e.g., FIGS. 8BR-8BT). In some examples, at block 1730, displaying the dialog affordance in the fourth state includes displaying the dialog affordance over at least a third portion of the response affordance FIGS. 8BR-8BT).

In some examples, prior to receiving the eighth user input, the response affordance was displayed in a fifth state (e.g., response affordance 875 in FIG. 8BO). In some examples, at block 731, displaying the dialog affordance in the fourth state includes replacing the display of the response affordance in the fifth state with a display of the response affordance in a sixth state (e.g., response affordance 875 in FIGS. 8BR-8BT).

In some examples, the fourth state corresponds to a second maximum size of the dialog affordance. In some examples, a fourth portion of the response affordance remains visible when displaying the dialog affordance in the fourth state (e.g., FIGS. 8BS-8BT).

In some examples, at block 1732, a ninth user input corresponding to a selection of the fourth portion of the response affordance (e.g., input 877 in FIG. 8BT) is received. In some examples, at block 1733, in response to receiving the ninth user input, the display of the dialog affordance in the fourth state is replaced with a display of the dialog affordance in a seventh state (e.g., dialog affordance 873 in FIG. 8BU). In some examples, at block 1734, in response to receiving the ninth user input, the response affordance is displayed at the first portion of the display (e.g., response affordance 875 in FIG. 8BU).

In some examples, at block 1735, while displaying the dialog affordance in the fourth state, a tenth user input corresponding to a selection of the dialog affordance (e.g., input 883 in FIG. 8BX) is received. In some examples, at block 1736, in response to receiving the tenth user input, the display of the dialog affordance in the fourth state is replaced with a display of the dialog affordance in an eighth state (e.g., dialog affordance 882 in FIG. 8BY).

In some examples, at block 1737, while displaying the dialog affordance in the fourth state, an eleventh user input corresponding to a selection of the response affordance is received (e.g., input 880 in FIG. 8BV). In some examples, at block 1738, in response to receiving the eleventh user input, the display of the dialog affordance in the fourth state is replaced with a display of the dialog affordance in a ninth state (e.g., dialog affordance 879 in FIG. 8BW).

In some examples, the natural language input is a natural language speech input. In some examples, at block 1739, a transcription of the natural language speech input is displayed in the dialog affordance (FIG. 8BZ).

In some examples, the natural language speech input is consecutive to a second natural language speech input received prior to the natural language speech input. In some examples, at block 1740 displaying the transcription is performed in accordance with a determination that the digital assistant was unable to determine a user intent for the natural language speech input and unable to determine a second user intent for the second natural language speech input (e.g., FIGS. 8CA-8CC).

In some examples, at block 1741, displaying the transcription is performed in accordance with a determination that the natural language speech input repeats a previous natural language speech input (e.g., FIGS. 8CD-8CF).

In some examples, at block 1742, a second natural language speech input consecutive to the natural language speech input is received after receiving the natural language speech input. In some examples, at block 1743, displaying the transcription is performed in accordance with a determination that the second natural language speech input indicates a speech recognition error (e.g., FIGS. 8CG-8CI).

In some examples, a digital assistant result is presented at a first time. In some examples, at block 1744, in accordance with a determination that the digital assistant result corresponds to a predetermined type of digital assistant result, the display of the digital assistant user interface is automatically ceased a predetermined duration after the first time (e.g., FIGS. 8CM-8CN).

The operations described above with reference to FIGS. 17A-17F are optionally implemented by components depicted in FIGS. 1-4, 6A-6B, 7A-7C, and 8A-8CT. For example, the operations of process 1700 may be implemented by device 800. It would be clear to a person having ordinary skill in the art how other processes are implemented based on the components depicted in FIGS. 1-4, 6A-6B, and 7A-7C.

Note that details of process 1700 described above with respect to FIGS. 17A-17F are also applicable in an analogous manner to process 1800 described below. For example, process 1800 optionally includes one or more of the characteristics of process 1700 discussed above. For example, when interacting with the user interfaces described below with respect to process 1800, a user may provide one or more inputs to interact with the digital assistant user interface as described with respect to process 1700. For brevity, these details are not repeated below.

7. Process for Operating a Digital Assistant

Figure 18B:
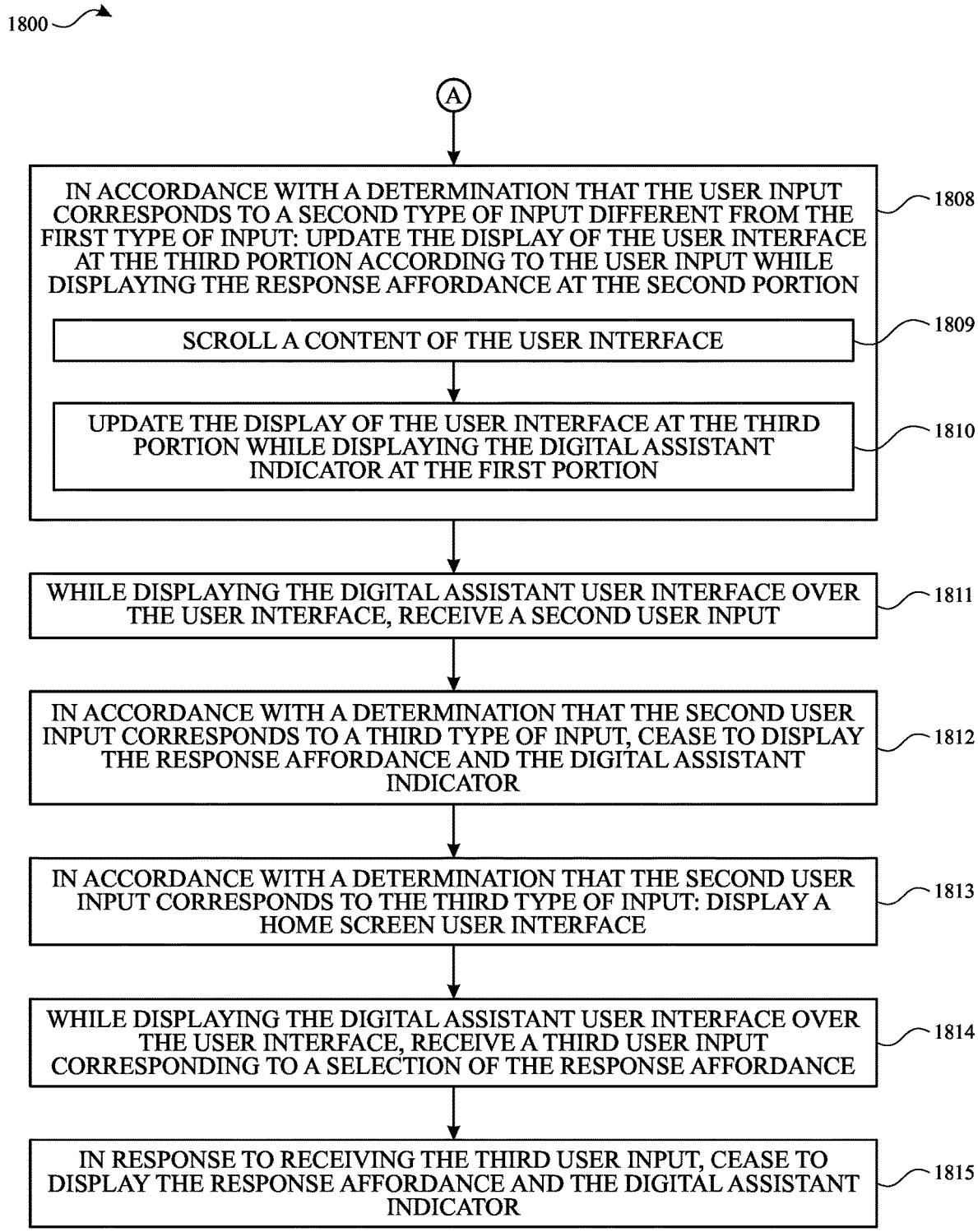
Figure 19A:
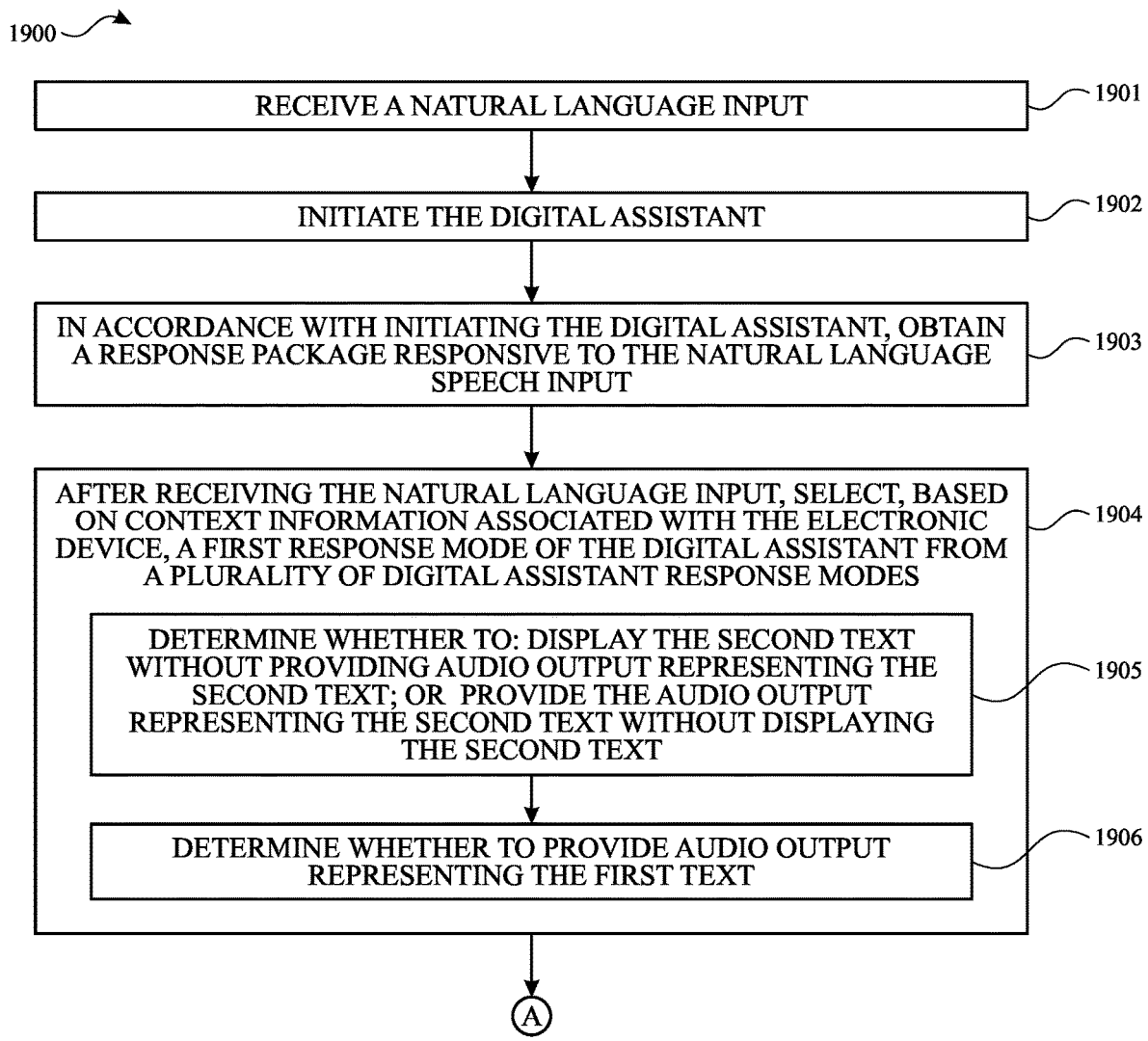
FIGS. 19A-19E illustrate a process for selecting a digital assistant response mode, according to various examples.
Figure 19B:
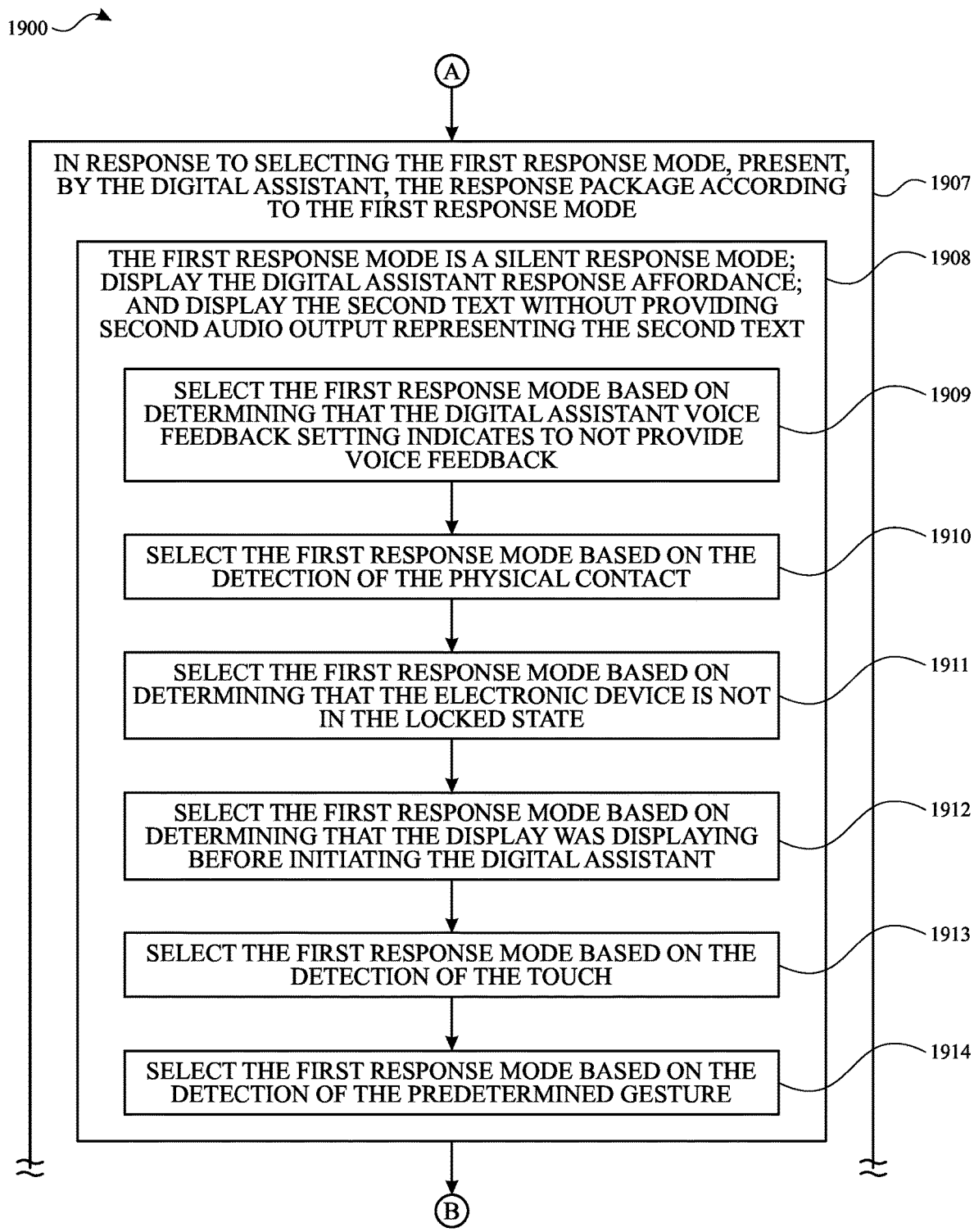
Figure 19C:
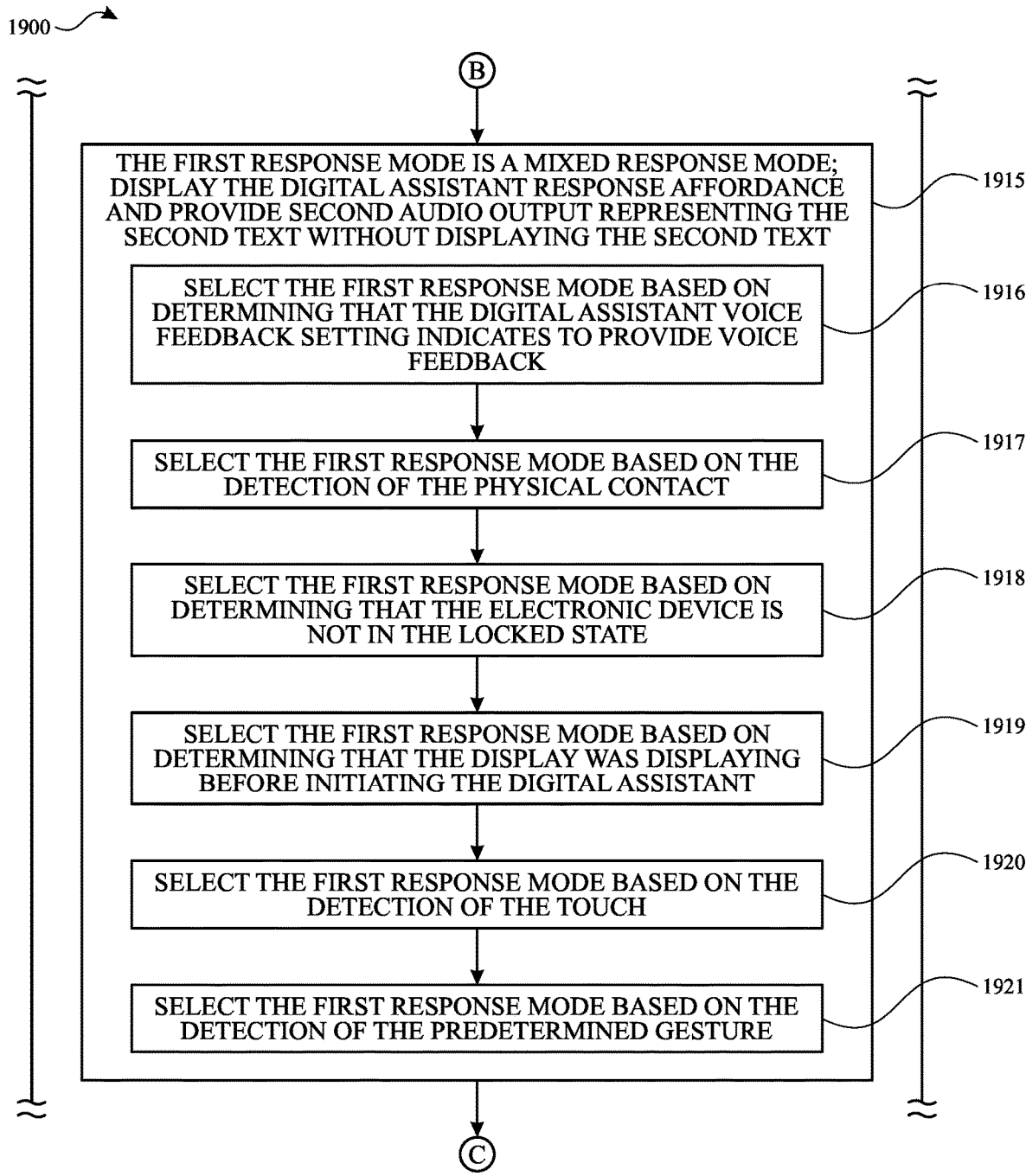
Figure 19D:
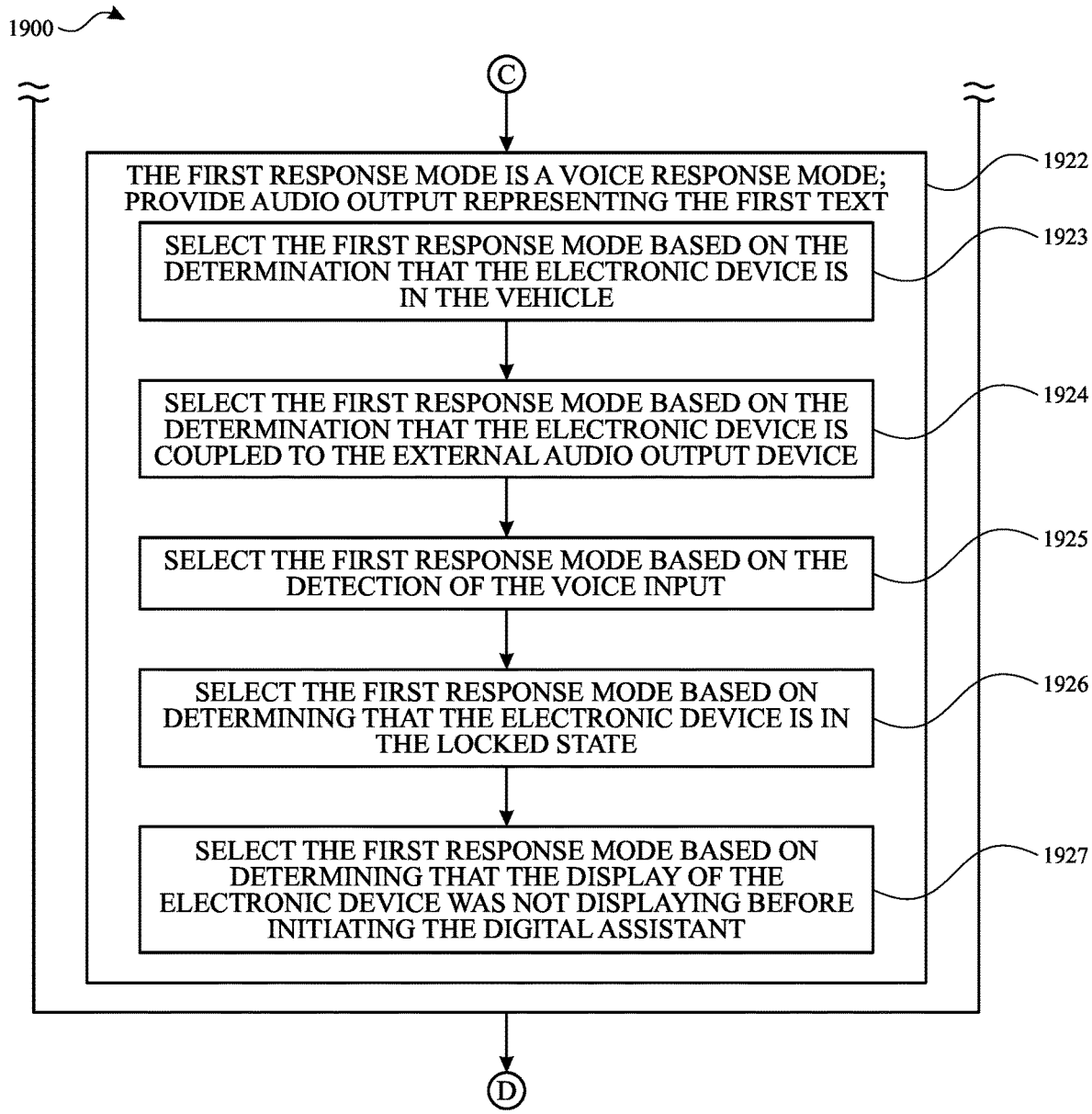
Figure 19E:
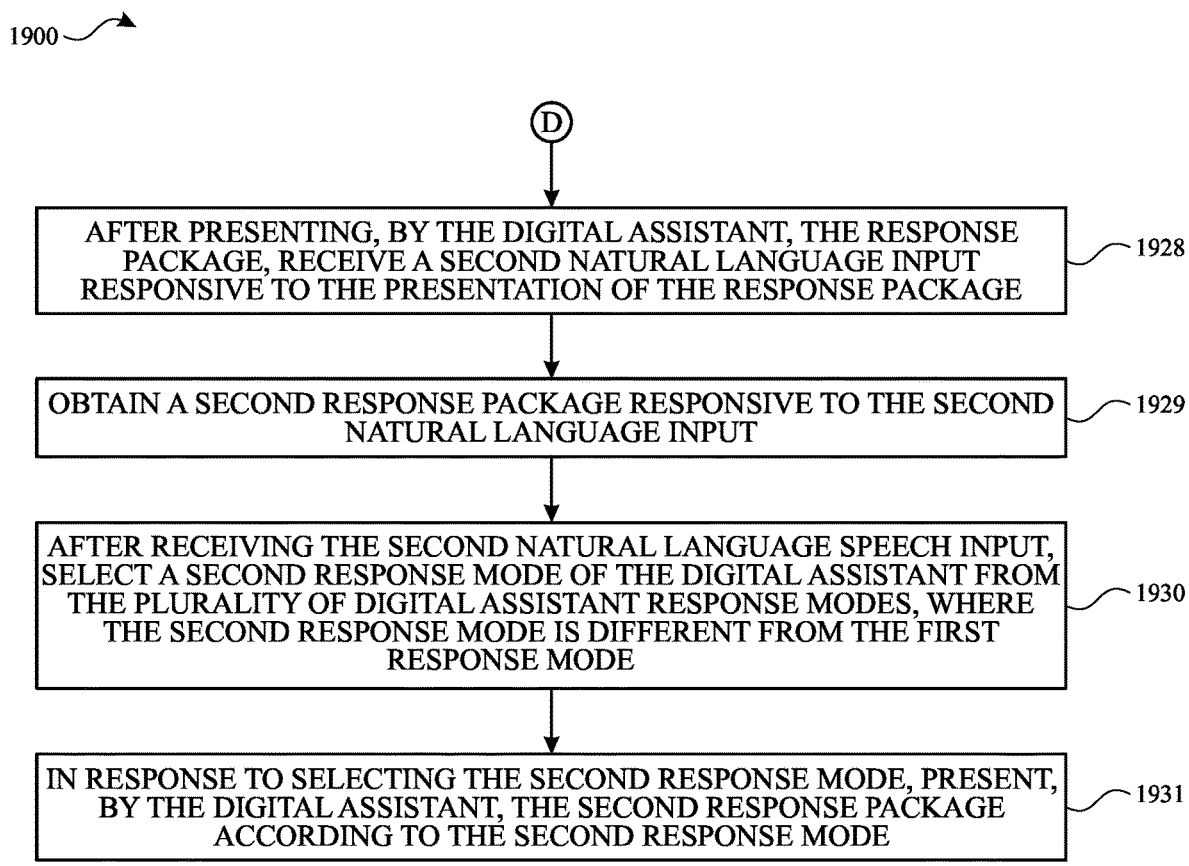

FIGS. 18A-18B illustrate process 1800 for operating a digital assistant, according to various examples. Process 1800 is performed, for example, using one or more electronic devices implementing a digital assistant. In some examples, process 1800 is performed using a client-server system (e.g., system 100), and the blocks of process 1800 are divided up in any manner between the server (e.g., DA server 106) and a client device (e.g., device 800, 900, 902, or 904). In other examples, the blocks of process 1800 are divided up between the server and multiple client devices (e.g., a mobile phone and a smart watch). Thus, while portions of process 1800 are described herein as being performed by particular devices of a client-server system, it will be appreciated that process 1800 is not so limited. In other examples, process 1800 is performed using only a client device (e.g., user device 104) or only multiple client devices. In process 1800, some blocks are, optionally, combined, the order of some blocks is, optionally, changed, and some blocks are, optionally, omitted. In some examples, additional steps may be performed in combination with the process 1800.

Generally, process 1800 is illustrated using FIGS. 10A-10V, discussed above. However, it should be appreciated that other Figures discussed above may be equally applicable to process 1800.

At block 1801, a digital assistant user interface (e.g., user interface 803 in FIG. 10A) is displayed over a user interface (e.g., user interface 1001 in FIG. 10A). The digital assistant user interface includes a digital assistant indicator displayed at a first portion of the display (e.g., indicator 804 in FIG. 10A) and a response affordance (e.g., response affordance 1002 in FIG. 10A) displayed at a second portion of the display.

At block 1802, while displaying the digital assistant user interface over the user interface, a user input corresponding to a selection of a third portion of the display (e.g., input 1003 in FIG. 10B or input 1015 in FIG. 10I) is received. The third portion displays a portion of the user interface. In some examples, the user interface is different from the digital assistant user interface.

At block 1803, in accordance with a determination that the user input corresponds to a first type of input (e.g., input 1003 in FIG. 10B), the digital assistant indicator and the response affordance cease to be displayed (e.g., FIG. 10C). In some examples, the first type of input includes a tap gesture. In some examples, at block 1804, ceasing to display the digital assistant indicator and the response affordance includes replacing the display of the digital assistant indicator with a display of a first portion of the user interface at the first portion of the display. In some examples, at block 1805, ceasing to display the digital assistant indicator and the response affordance includes replacing the display of the response affordance with a display of a second portion of the user interface at the second portion of the display.

In some examples, the user input corresponds to a selection of a selectable element displayed in the third portion of the display (e.g., selectable element 1006 in FIG. 10E or selectable element 1011 in FIG. 10G). In some examples, at block 1806, in accordance with a determination that the user input corresponds to the first type of input, a user interface corresponding to the selectable element is displayed (e.g., user interface 1007 in FIG. 10F or user interface 1012 in FIG. 10H). In some examples, at block 1807, displaying the user interface corresponding to the selectable element includes replacing the display of the portion of the user interface, the display of the response affordance, and the display of the digital assistant indicator with a display of the user interface corresponding to the selectable element.

In some examples, the selectable element is a link (e.g., link 1011 in FIG. 10G), and the user interface corresponding to the selectable element is a user interface corresponding to the link (user interface 1012 in FIG. 10H). In some examples, the user interface is a home screen user interface (e.g., user interface 1001 in FIG. 10E), the selectable element is an application affordance of the home screen user interface (e.g., application affordance 1006 in FIG. 10E), and the user interface corresponding to the selectable element is a user interface corresponding to the application affordance (e.g., user interface 1007 in FIG. 10F).

In some examples, at block 1808, in accordance with a determination that the user input corresponds to a second type of input (e.g., input 1015 in FIG. 10I) different from the first type of input, the display of the user interface is updated at the third portion according to the user input while displaying the response affordance at the second portion (e.g., FIG. 10J). In some examples, the second type of input includes drag gesture. In some examples, at block 1809, updating the display of the user interface at the third portion includes scrolling a content of the user interface (e.g., FIGS. 10I-10J and FIGS. 10K-10L). In some examples, at block 1810, updating the display of the user interface at the third portion is performed while displaying the digital assistant indicator at the first portion (e.g., FIGS. 10I-10J and FIGS. 10K-10L). In some examples, updating the display of the user interface at the third portion is performed further in accordance with a determination that a digital assistant corresponding to the digital assistant user interface is in a listening state.

In some examples, at block 1811, while displaying the digital assistant user interface over the user interface, a second user input is received (e.g., input 1019 in FIG. 10M or input 1023 in FIG. 10O). In some examples, at block 1812, in accordance with a determination that the second user input corresponds to a third type of input, the response affordance and the digital assistant indicator cease to be displayed (e.g., FIGS. 10M-10N or FIGS. 10O-10P). In some examples, the user interface is an application specific user interface (e.g., user interface 1022 in FIG. 10O). In some examples, at block 1813, in accordance with a determination that the second user input corresponds to the third type of input, a home screen user interface is displayed (e.g., user interface 1001 in FIG. 10P).

In some examples, at block 1814, while displaying the digital assistant user interface over the user interface, a third user input corresponding to a selection of the response affordance input 1026 in FIG. 10Q) is received. In some examples, at block 1815, in response to receiving the third user input, the response affordance and the digital assistant indicator cease to be displayed (e.g., FIG. 10R).

The operations described above with reference to FIGS. 18A-18B are optionally implemented by components depicted in FIGS. 1-4, 6A-6B, 7A-7C, and 10A-10V. For example, the operations of process 1800 may be implemented by device 800. It would be clear to a person having ordinary skill in the art how other processes are implemented based on the components depicted in FIGS. 1-4, 6A-6B, and 7A-7C.

Note that details of process 1800 described above with respect to FIGS. 18A-18B are also applicable in an analogous manner to process 1900 described below. For example, process 1900 optionally includes one or more of the characteristics of process 1800 discussed above. For example, a user may provide one or more inputs to interact with a digital assistant user interface (as discussed with respect to process 1800) while the digital assistant presents a response according to a selected digital assistant response mode, discussed below with respect to process 1900. For brevity, these details are not repeated below.

8. Process for Selecting a Digital Assistant Response Mode

FIGS. 19A-19E illustrate process 1900 for selecting a digital assistant response mode, according to various examples. Process 1900 is performed, for example, using one or more electronic devices implementing a digital assistant. In some examples, process 1900 is performed using a client-server system (e.g., system 100), and the blocks of process 1900 are divided up in any manner between the server (e.g., DA server 106) and a client device (e.g., device 800, 900, 902, or 904). In other examples, the blocks of process 1900 are divided up between the server and multiple client devices (e.g., a mobile phone and a smart watch). Thus, while portions of process 1900 are described herein as being performed by particular devices of a client-server system, it will be appreciated that process 1900 is not so limited. In other examples, process 1900 is performed using only a client device (e.g., user device 104) or only multiple client devices. In process 1900, some blocks are, optionally, combined, the order of some blocks is, optionally, changed, and some blocks are, optionally, omitted. In some examples, additional steps may be performed in combination with the process 1900.

Generally, process 1900 is illustrated using FIGS. 11-16, discussed above. However, it should be appreciated that other Figures discussed above may be equally applicable to process 1900.

At block 1901, a natural language input is received (e.g., by device 800).

At block 1902, a digital assistant is initiated (e.g., by device 800).

At block 1903, in accordance with initiating the digital assistant, a response package responsive to the natural language input is obtained (e.g., by module 1102). In some examples, the response package includes first text associated with a digital assistant response affordance; and second text associated with the digital assistant response affordance. In some examples, the second text has fewer words than the first text.

At block 1904, after receiving the natural language input, a first response mode of the digital assistant is selected from a plurality of digital assistant response modes based on context information associated with the electronic device (e.g., by module 1104). In some examples, the plurality of digital assistant response modes include a silent response mode, a mixed response mode, and a voice response mode (e.g., FIG. 12). In some examples, selecting the first response mode of the digital assistant is performed after obtaining the response package. In some examples, at block 1905, selecting the first response mode includes determining whether to: display the second text without providing audio output representing the second text or provide the audio output representing the second text without displaying the second text. In some examples, at block 1906, selecting the first, response mode includes determining whether to provide audio output representing the first text.

At block 1907, in response to selecting the first response mode, the response package is presented by the digital assistant according to the first response mode (e.g., using formatting module 1106).

In some examples, the first response mode is a silent response mode and presenting, by the digital assistant, the response package according to the first response mode includes displaying the digital assistant response affordance and displaying the second text without providing second audio output representing the second text, as shown in block 1908.

In some examples, the context information includes a digital assistant voice feedback setting and selecting the silent response mode is based on determining that the digital assistant voice feedback setting indicates to not provide voice feedback, as shown in block 1909.

In some examples, the context information includes a detection of physical contact of the electronic device to initiate the digital assistant and selecting the silent response mode is based on the detection of the physical contact, as shown in block 1910.

In some examples, the context information includes whether the electronic device is in a locked state and selecting the silent response mode is based on determining that the electronic device is not in the locked state, as shown in block 1911.

In some examples, the context information includes whether a display of the electronic device was displaying before initiating the digital assistant and selecting the silent response mode is based on determining that the display was displaying before initiating the digital assistant, as shown in block 1912.

In some examples, the context information includes a detection of a touch performed on the electronic device within a predetermined duration before selecting the silent response mode and selecting the silent response mode is based on the detection of the touch, as shown in block 1913.

In some examples, the context information includes a detection of a predetermined gesture of the electronic device within a second predetermined duration before selecting the silent response mode and selecting the silent response mode is based on the detection of the predetermined gesture, as shown in block 1914.

In some examples, the first response mode is a mixed response mode and presenting, by the digital assistant, the response package according to the first response mode includes displaying the digital assistant response affordance and providing second audio output representing the second text without displaying the second text, as shown in block 1915.

In some examples, the context information includes a digital assistant voice feedback setting and selecting the mixed response mode is based on determining that the digital assistant voice feedback setting indicates to provide voice feedback, as shown in block 1916.

In some examples, the context information includes a detection of physical contact of the electronic device to initiate the digital assistant and selecting the mixed response mode is based on the detection of the physical contact, as shown in block 1917.

In some examples, the context information includes whether the electronic device is in a locked state and selecting the mixed response mode is based on determining that the electronic device is not in the locked state, as shown in block 1918.

In some examples, the context information includes whether a display of the electronic device was displaying before initiating the digital assistant and selecting the mixed response mode is based on determining that the display was displaying before initiating the digital assistant, as shown in block 1919.

In some examples, the context information includes a detection of a touch performed on the electronic device within a predetermined duration before selecting the mixed response mode and selecting the mixed response mode is based on the detection of the touch, as shown in block 1920.

In some examples, the context information includes a detection of a predetermined gesture of the electronic device within a second predetermined duration before selecting the mixed response mode and selecting the mixed response mode is based on the detection of the predetermined gesture, as shown in block 1921.

In some examples, the first response mode is a voice response mode and presenting, by the digital assistant, the response package according to the first response mode includes providing audio output representing the first text, as shown in block 1922.

In some examples, the context information includes a determination that the electronic device is in a vehicle and selecting the voice response mode is based on the determination that the electronic device is in the vehicle, as shown in block 1923.

In some examples, the context information includes a determination that the electronic device is coupled to an external audio output device and selecting the voice response mode is based on the determination that the electronic device is coupled to the external audio output device, as shown in block 1924.

In some examples, the context information includes a detection of a voice input to initiate the digital assistant and selecting the voice response mode is based on the detection of the voice input, as shown in block 1925.

In some examples, the context information includes whether the electronic device is in a locked state and selecting the voice response mode is based on determining that the electronic device is in the locked state, as shown in block 1926.

In some examples, the context information includes whether a display of the electronic device was displaying before initiating the digital assistant and selecting the voice response mode is based on determining that the display of the electronic device was not displaying before initiating the digital assistant, as shown in block 1927.

In some examples, at block 1928, after presenting, by the digital assistant, the response package, a second natural language input responsive to the presentation of the response package is received (e.g., by device 800).

In some examples, at block 1929, a second response package responsive to the second natural language input is obtained (e.g., by module 1102).

In some examples, at block 1930, after receiving the second natural language speech input, a second response mode of the digital assistant is selected from the plurality of digital assistant response modes (e.g., by module 1104), where the second response mode is different from the first response mode.

In some examples, at block 1931, in response to selecting the second response mode, the second response package is presented by the digital assistant according to the second response mode (e.g., using module 1106) (e.g., FIG. 16).

The operations described above with reference to FIGS. 19A-19E are optionally implemented by components depicted in FIGS. 1-4, 6A-6B, 7A-7C, 11, and 12. For example, the operations of process 1900 may be implemented by device 800 implementing system 1100. It would be clear to a person having ordinary skill in the art how other processes are implemented based on the components depicted in FIGS. 1-4, 6A-6B, and 7A-7C.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the format in which a digital assistant presents a response to a user request. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to adapt a digital assistant's response to be appropriate for a user's current context. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of or access to, personal information data. That is, the present disclosure contemplates that hardware and/or software elements can be provided to prevent or block access to such personal information data. For example, in the case of collecting context data to select a digital assistant response mode, the present technology can be configured to allow users to select to "opt in" or "opt out" of participation in the collection of personal information data during registration for services or anytime thereafter. In another example, users can select not to allow a device to collect context data for selection of a digital assistant response mode. In yet another example, users can select to limit the length of time context data is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a device may select a default digital assistant response mode when context data is unavailable (e.g., if the user prohibits the collection of context data to select a digital assistant response mode), or select a digital assistant response mode based on non-personal information data or a bare minimum amount of personal information, such as the content being requested by the device associated with a user, other non-personal information available to the device (e.g., whether the device is in locked state), or publicly available information.

What is claimed is:

1. A non-transitory computer-readable storage medium storing one or more programs, the one or more programs comprising instructions, which when executed by one or more processors of an electronic device with a display and a touch-sensitive surface, cause the electronic device to:
while displaying a user interface different from a digital assistant user interface, receive a user input;
in accordance with a determination that the user input satisfies a criterion for initiating a digital assistant:
receive a natural language input;
without dismissing the digital assistant after receiving the natural language input, display, over the user interface, the digital assistant user interface, the digital assistant user interface including:
a digital assistant indicator displayed at a first portion of the display; and
a response affordance displayed at a second portion of the display, wherein the response affordance is concurrently displayed with the digital assistant indicator and corresponds to a response, by the digital assistant, to the natural language input wherein the response affordance is presented at a first time, and wherein when the response affordance and the digital assistant indicator are concurrently displayed:
a portion of the user interface remains visible at a third portion of the display when the response affordance is initially displayed, the third portion of the display occupying a majority of the display; and
the third portion is between the first portion and the second portion;
in accordance with a determination that the response affordance corresponds to a predetermined type of response affordance, automatically cease to display the digital assistant user interface a predetermined duration after the first time.

2. The non-transitory computer-readable storage medium of claim 1, wherein the response affordance is displayed in a first state, and wherein the one or more programs further comprise instructions, which when executed by the one or more processors, cause the electronic device to:
while displaying over the user interface, the digital assistant user interface, receive a second user input corresponding to a selection of the response affordance; and
in response to receiving the second user input, replace the display of the response affordance in the first state with a display of the response affordance in a second state.

3. The non-transitory computer-readable storage medium of claim 2, wherein the first state is a compact state and the second state is an expanded state.

4. The non-transitory computer-readable storage medium of claim 2, wherein the one or more programs further comprise instructions, which when executed by the one or more processors, cause the electronic device to:
while displaying the response affordance in the second state, receive a third user input requesting to display the response affordance in the first state; and
in response to receiving the third user input, replace the display of the response affordance in the second state with the display of the response affordance in the first state.

5. The non-transitory computer-readable storage medium of claim 2, wherein the one or more programs further comprise instructions, which when executed by the one or more processors, cause the electronic device to:
while displaying the response affordance in the second state, receive a fourth user input corresponding to a selection of the response affordance; and
in response to receiving the fourth user input, display a user interface of an application corresponding to the response affordance.

6. The non-transitory computer-readable storage medium of claim 1, wherein the user interface includes an input field occupying a fourth portion of the display, and wherein the one or more programs further comprise instructions, which when executed by the one or more processors, cause the electronic device to:
receive a fifth user input corresponding to displacement of the response affordance from the first portion of the display to the fourth portion of the display; and
in response to receiving the fifth user input, replace the display of the response affordance at the first portion of the display with a display of the response affordance in the input field.

7. The non-transitory computer-readable storage medium of claim 1, wherein the response affordance includes an editable text field, the editable text field including text determined from the natural language input.

8. The non-transitory computer-readable storage medium of claim 1, wherein:
the digital assistant user interface further includes a dialog affordance displayed at a sixth portion of the display; and
the sixth portion is between the first portion and the second portion.

9. The non-transitory computer-readable storage medium of claim 8, wherein the dialog affordance includes dialog, generated by the digital assistant, responsive to the natural language input.

10. The non-transitory computer-readable storage medium of claim 9, wherein the one or more programs further comprise instructions, which when executed by the one or more processors, cause the electronic device to:
determine, by the digital assistant, a plurality of selectable disambiguation options for the natural language input, wherein the dialog includes the plurality of selectable disambiguation options.

11. The non-transitory computer-readable storage medium of claim 9, wherein the one or more programs further comprise instructions, which when executed by the one or more processors, cause the electronic device to:
determine a primary user intent based on the natural language input, wherein the response affordance corresponds to the primary user intent; and
determine an alternate user intent based on the natural language input, wherein the dialog includes a selectable option corresponding to the alternate user intent.

12. The non-transitory computer-readable storage medium of claim 8, wherein the dialog affordance is displayed in a third state, and wherein the one or more programs further comprise instructions, which when executed by the one or more processors, cause the electronic device to:
receive a sixth user input corresponding to a selection of the dialog affordance; and
in response to receiving the sixth user input, replace the display of the dialog affordance in the third state with a display of the dialog affordance in a fourth state.

13. The non-transitory computer-readable storage medium of claim 12, wherein:
the display of the dialog affordance in the fourth state occupies at least a portion of the first portion of the display; and
displaying the dialog affordance in the fourth state includes displaying the dialog affordance over at least a third portion of the response affordance.

14. The non-transitory computer-readable storage medium of claim 13, wherein:
prior to receiving the sixth user input, the response affordance was displayed in a fifth state; and
displaying the dialog affordance in the fourth state includes replacing the display of the response affordance in the fifth state with a display of the response affordance in a sixth state.

15. The non-transitory computer-readable storage medium of claim 13, wherein:
the fourth state corresponds to a maximum size of the dialog affordance; and
a fourth portion of the response affordance remains visible when displaying the dialog affordance in the fourth state.

16. The non-transitory computer-readable storage medium of claim 15, wherein the one or more programs further comprise instructions, which when executed by the one or more processors, cause the electronic device to:
receive an seventh user input corresponding to a selection of the fourth portion of the response affordance; and
in response to receiving the seventh user input:
replace the display of the dialog affordance in the fourth state with a display of the dialog affordance in a seventh state; and
display the response affordance at the first portion of the display.

17. The non-transitory computer-readable storage medium of claim 12, wherein the one or more programs further comprise instructions, which when executed by the one or more processors, cause the electronic device to:
while displaying the dialog affordance in the fourth state, receive a eighth user input corresponding to a selection of the dialog affordance; and
in response to receiving the eighth user input, replace the display of the dialog affordance in the fourth state with a display of the dialog affordance in an eighth state.

18. The non-transitory computer-readable storage medium of claim 12, wherein the one or more programs further comprise instructions, which when executed by the one or more processors, cause the electronic device to:
while displaying the dialog affordance in the fourth state, receive a ninth user input corresponding to a selection of the response affordance; and
in response to receiving the ninth user input, replace the display of the dialog affordance in the fourth state with a display of the dialog affordance in a ninth state.

19. The non-transitory computer-readable storage medium of claim 8, wherein the natural language input is a natural language speech input, and wherein the one or more programs further comprise instructions, which when executed by the one or more processors, cause the electronic device to:
display, in the dialog affordance, a transcription of the natural language speech input.

20. The non-transitory computer-readable storage medium of claim 19, wherein:
the natural language speech input is consecutive to a second natural language speech input received prior to the natural language speech input; and
displaying the transcription is performed in accordance with a determination that the digital assistant was unable to determine a user intent for the natural language speech input and unable to determine a second user intent for the second natural language speech input.

21. The non-transitory computer-readable storage medium of claim 19, wherein displaying the transcription is performed in accordance with a determination that the natural language speech input repeats a previous natural language speech input.

22. The non-transitory computer-readable storage medium of claim 19, wherein the natural language input is a natural language speech input, and wherein the one or more programs further comprise instructions, which when executed by the one or more processors, cause the electronic device to:
after receiving the natural language speech input, receive a second natural language speech input consecutive to the natural language speech input, wherein displaying the transcription is performed in accordance with a determination that the second natural language speech input indicates a speech recognition error, and wherein the display does not display any transcription of the natural language speech input prior to the determination that the second natural language speech input indicates the speech recognition error.

23. The non-transitory computer-readable storage medium of claim 1, wherein the user interface is a home screen user interface or an application specific user interface.

24. The non-transitory computer-readable storage medium of claim 1, wherein the portion of the user interface was displayed at the third portion of the display prior to receiving the user input.

25. An electronic device, comprising:
a display;
a touch-sensitive surface;
one or more processors;
a memory; and
one or more programs, wherein the one or more programs are stored in the memory and configured to be executed by the one or more processors, the one or more programs including instructions for:
while displaying a user interface different from a digital assistant user interface, receiving a user input;
in accordance with a determination that the user input satisfies a criterion for initiating a digital assistant:
receiving a natural language input;
without dismissing the digital assistant after receiving the natural language input, displaying, over the user interface, the digital assistant user interface, the digital assistant user interface including:
a digital assistant indicator displayed at a first portion of the display; and
a response affordance displayed at a second portion of the display, wherein the response affordance is concurrently displayed with the digital assistant indicator and corresponds to a response, by the digital assistant, to the natural language input, wherein the response affordance is presented at a first time, and wherein when the response affordance and the digital assistant indicator are concurrently displayed:

a portion of the user interface remains visible at a third portion of the display when the response affordance is initially displayed, the third portion of the display occupying a majority of the display and the third portion of the display is static; and in accordance with a determination that the response affordance corresponds to a predetermined type of response affordance, automatically ceasing to display the digital assistant user interface a predetermined duration after the first time.

26. The electronic device of claim 25, wherein the one or more programs further include instructions for:

while displaying over the user interface, the digital assistant user interface, receiving a second user input corresponding to a selection of the response affordance; and in response to receiving the second user input, replacing the display of the response affordance in the first state with a display of the response affordance in a second state.

27. The electronic device of claim 26, wherein the one or more programs further include instructions for:

While displaying the response affordance in the second state, receiving a third user input corresponding to a selection of the response affordance; and in response to receiving the third user input, displaying a user interface of an application corresponding to the response affordance.

28. The electronic device of claim 25, wherein the one or more programs further include instructions for:

receiving a fourth user input corresponding to displacement of the response affordance from the first portion of the display to the fourth portion of the display; and in response to receiving the fourth user input, replacing the display of the response affordance at the first portion of the display with a display of the response affordance in the input field.

29. The electronic device of claim 25, wherein the response affordance includes an editable text field, the editable text field including text determined from the natural language input.

30. The electronic device of claim 25, wherein:

the digital assistant user interface further includes a dialog affordance displayed at a sixth portion of the display; and the sixth portion is between the first portion and the second portion.

31. The electronic device of claim 30, wherein the dialog affordance includes dialog, generated by the digital assistant, responsive to the natural language input.

32. The electronic device of claim 30, wherein the natural language input is a natural language speech input, and wherein the one or more programs further include instructions for:

displaying, in the dialog affordance, a transcription of the natural language speech input.

33. The electronic device of claim 32, wherein:

the natural language speech input is consecutive to a second natural language speech input received prior to the natural language speech input; and displaying the transcription is performed in accordance with a determination that the digital assistant was unable to determine a user intent for the natural language speech input and unable to determine a second user intent for the second natural language speech input.

34. The electronic device of claim 32, wherein the natural language input is a natural language speech input, and wherein the one or more programs further include instructions for:

after receiving the natural language speech input, receiving a second natural language speech input consecutive to the natural language speech input, wherein displaying the transcription is performed in accordance with a determination that the second natural language speech input indicates a speech recognition error, and wherein the display does not display any transcription of the natural language speech input prior to the determination that the second natural language speech input indicates the speech recognition error.

35. A method, comprising:

at an electronic device with a display and a touch-sensitive surface:

while displaying a user interface different from a digital assistant user interface, receiving a user input;

in accordance with a determination that the user input satisfies a criterion for initiating a digital assistant:

receiving a natural language input;

without dismissing the digital assistant after receiving the natural language input, displaying, over the user interface, the digital assistant user interface, the digital assistant user interface including:

a digital assistant indicator displayed at a first portion of the display; and a response affordance displayed at a second portion of the display, wherein the response affordance is concurrently displayed with the digital assistant indicator and corresponds to a response, by the digital assistant, to the natural language input, wherein the response affordance is presented at a first time, and wherein when the response affordance and the digital assistant indicator are concurrently displayed:

a portion of the user interface remains visible at a third portion of the display when the response affordance is initially displayed, the third portion of the display occupying a majority of the display;

the third portion is between the first portion and the second portion; and in accordance with a determination that the response affordance corresponds to a predetermined type of response affordance, automatically ceasing to display the digital assistant user interface a predetermined duration after the first time.

36. The method of claim 35, further comprising:

while displaying over the user interface, the digital assistant user interface, receiving a second user input corresponding to a selection of the response affordance; and in response to receiving the second user input, replacing the display of the response affordance in the first state with a display of the response affordance in a second state.

37. The method of claim 36, further comprising:

while displaying the response affordance in the second state, receiving a third user input corresponding to a selection of the response affordance; and in response to receiving the third user input, displaying a user interface of an application corresponding to the response affordance.

38. The method of claim 35, further comprising:
receiving a fourth user input corresponding to displacement of the response affordance from the first portion of the display to the fourth portion of the display; and
in response to receiving the fourth user input, replacing the display of the response affordance at the first portion of the display with a display of the response affordance in the input field.

39. The method of claim 35, wherein the response affordance includes an editable text field, the editable text field including text determined from the natural language input.

40. The method of claim 35, wherein:
the digital assistant user interface further includes a dialog affordance displayed at a sixth portion of the display; and
the sixth portion is between the first portion and the second portion.

41. The method of claim 40, wherein the dialog affordance includes dialog, generated by the digital assistant, responsive to the natural language input.

42. The method of claim 40, wherein the natural language input is a natural language speech input, and wherein the one or more programs further include instructions for:
displaying, in the dialog affordance, a transcription of the natural language speech input.

43. The method of claim 42, wherein:
the natural language speech input is consecutive to a second natural language speech input received prior to the natural language speech input; and
displaying the transcription is performed in accordance with a determination that the digital assistant was unable to determine a user intent for the natural language speech input and unable to determine a second user intent for the second natural language speech input.

44. The method of claim 42, wherein the natural language input is a natural language speech input, and wherein the one or more programs further include instructions for:
after receiving the natural language speech input, receiving a second natural language speech input consecutive to the natural language speech input, wherein displaying the transcription is performed in accordance with a determination that the second natural language speech input indicates a speech recognition error, and wherein the display does not display any transcription of the natural language speech input prior to the determination that the second natural language speech input indicates the speech recognition error.

45. A non-transitory computer-readable storage medium storing one or more programs, the one or more programs comprising instructions, which when executed by one or more processors of an electronic device with a display and a touch-sensitive surface, cause the electronic device to:
while displaying a user interface different from a digital assistant user interface, receive a user input;
in accordance with a determination that the user input satisfies a criterion for initiating a digital assistant:
receive a natural language input;
without dismissing the digital assistant after receiving the natural language input, display, over the user interface, the digital assistant user interface, the digital assistant user interface including:
a digital assistant indicator displayed at a first portion of the display; and
a response affordance displayed concurrently with the digital assistant indicator and displayed entirely at a second portion of the display, wherein:
the response affordance corresponds to a response, by the digital assistant, to the natural language input; and
while the digital assistant user interface is displayed:
a portion of the user interface remains visible at a third portion of the display between the first portion and the second portion, wherein the second portion and the third portion each do not include any same area of the display and wherein the third portion of the display occupies a majority of the display;
in accordance with a determination that the response affordance corresponds to a predetermined type of response affordance, automatically ceasing to display the digital assistant user interface a predetermined duration after the first time.

* * * * *

UNITED STATES PATENT AND TRADEMARK OFFICE
CERTIFICATE OF CORRECTION

PATENT NO. : 12,045,437 B2
APPLICATION NO. : 17/227012
DATED : July 23, 2024
INVENTOR(S) : Neal Ellis et al.

It is certified that error appears in the above-identified patent and that said Letters Patent is hereby corrected as shown below:

On the Title Page

List of References, Other Publications, Column 2, Line 2: Delete "7" and insert -- 15 --.

In the Claims

Column 93, Line 26: In Claim 1, delete "input" and insert -- input, --.

Signed and Sealed this
Third Day of September, 2024

Katherine Kelly Vidal
*Director of the United States Patent and Trademark Office*